United States Patent
Ricci

(10) Patent No.: US 9,378,601 B2
(45) Date of Patent: Jun. 28, 2016

(54) PROVIDING HOME AUTOMATION INFORMATION VIA COMMUNICATION WITH A VEHICLE

(71) Applicant: AutoConnect Holdings LLC, Wellesley, MA (US)

(72) Inventor: Christopher P. Ricci, Saratoga (CA)

(73) Assignee: AutoConnect Holdings LLC, Wellesley, MA (US)

( * ) Notice: Subject to any disclaimer, the term of this patent is extended or adjusted under 35 U.S.C. 154(b) by 52 days.

(21) Appl. No.: 14/252,978

(22) Filed: Apr. 15, 2014

(65) Prior Publication Data

US 2014/0306833 A1 Oct. 16, 2014

Related U.S. Application Data

(60) Provisional application No. 61/811,981, filed on Apr. 15, 2013, provisional application No. 61/865,954, filed on Aug. 14, 2013, provisional application No. 61/870,698, filed on Aug. 27, 2013, provisional (Continued)

(51) Int. Cl.
*G08G 1/00* (2006.01)
*G07C 9/00* (2006.01)
(Continued)

(52) U.S. Cl.
CPC ............ *G07C 9/00158* (2013.01); *B60Q 1/00* (2013.01); *B60R 16/037* (2013.01); *B60R 16/0373* (2013.01); *B60R 25/00* (2013.01); *B60R 25/1004* (2013.01); *B60W 40/09* (2013.01);
(Continued)

(58) Field of Classification Search
CPC .... G07C 9/00158; B60Q 1/00; B60R 16/037; B60R 16/0373; B60R 25/00; B60R 25/1004

USPC ........................................................ 340/901
See application file for complete search history.

(56) References Cited

U.S. PATENT DOCUMENTS 4,754,255 A 6/1988 Sanders et al.
5,204,817 A 4/1993 Yoshida
(Continued)

FOREIGN PATENT DOCUMENTS

| EP | 1909069 | 12/2010 |
|---|---|---|
| KR | 2006-0128484 | 12/2006 |
| WO | WO 2012/102879 | 8/2012 |

OTHER PUBLICATIONS

U.S. Appl. No. 14/543,535, filed Nov. 17, 2014, Ricci.
(Continued)

*Primary Examiner* — Kerri McNally
(74) *Attorney, Agent, or Firm* — Sheridan Ross P.C.

(57) ABSTRACT

Methods and systems of providing home automation information via communication with a vehicle. A home automation system can determine a state of the home and determine when occupants enter a home. The home automation system can identify an occupant and monitor the status and location of the occupant in the home and determine a status change for the occupant, such when the occupant leaves or is scheduled to leave the home, the occupant going to sleep, experiencing a health crisis, or entering an area of the home the occupant is not authorized to enter. The home automation system can send alerts and information to a vehicle operation system of a vehicle and to a communication device of a user. The alerts can include information related to the identity and the status of the occupant and information related to the state of the home.

15 Claims, 58 Drawing Sheets

Related U.S. Application Data application No. 61/891,217, filed on Oct. 15, 2013, provisional application No. 61/904,205, filed on Nov. 14, 2013, provisional application No. 61/924,572, filed on Jan. 7, 2014, provisional application No. 61/926,749, filed on Jan. 13, 2014.

(51) Int. Cl.

| | |
|---|---|
| *B60Q 1/00* | (2006.01) |
| *B60R 16/037* | (2006.01) |
| *B60R 25/00* | (2013.01) |
| *B60R 25/10* | (2013.01) |
| *B60W 40/09* | (2012.01) |
| *B60W 50/08* | (2012.01) |
| *G01C 21/00* | (2006.01) |
| *G01C 21/26* | (2006.01) |
| *G01C 21/34* | (2006.01) |
| *G01C 21/36* | (2006.01) |
| *G05D 1/00* | (2006.01) |
| *G05D 1/02* | (2006.01) |
| *G05D 23/19* | (2006.01) |
| *G06F 3/01* | (2006.01) |
| *G06F 3/0481* | (2013.01) |
| *G06F 3/0484* | (2013.01) |
| *G06F 9/445* | (2006.01) |
| *G06F 17/28* | (2006.01) |
| *G06F 17/30* | (2006.01) |
| *G06F 21/00* | (2013.01) |
| *G06F 21/31* | (2013.01) |
| *G06F 21/32* | (2013.01) |
| *G06K 9/00* | (2006.01) |
| *G06Q 10/00* | (2012.01) |
| *G06Q 10/02* | (2012.01) |
| *G06Q 20/14* | (2012.01) |
| *G06Q 30/00* | (2012.01) |
| *G06Q 30/02* | (2012.01) |
| *G06Q 30/06* | (2012.01) |
| *G06Q 50/30* | (2012.01) |
| *G07C 5/00* | (2006.01) |
| *G07C 5/08* | (2006.01) |
| *G08B 13/196* | (2006.01) |
| *G08B 21/02* | (2006.01) |
| *G08B 25/01* | (2006.01) |
| *G08G 1/0965* | (2006.01) |
| *G08G 1/16* | (2006.01) |
| *H04L 29/06* | (2006.01) |
| *H04L 29/08* | (2006.01) |
| *H04N 21/214* | (2011.01) |
| *H04N 21/218* | (2011.01) |
| *H04N 21/258* | (2011.01) |
| *H04N 21/414* | (2011.01) |
| *H04N 21/454* | (2011.01) |
| *H04N 21/475* | (2011.01) |
| *H04W 4/00* | (2009.01) |
| *H04W 4/04* | (2009.01) |
| *H04W 4/12* | (2009.01) |
| *H04W 4/20* | (2009.01) |
| *H04W 36/00* | (2009.01) |
| *H04W 36/32* | (2009.01) |
| *H04W 36/34* | (2009.01) |
| *H04W 48/02* | (2009.01) |
| *H04W 48/04* | (2009.01) |
| *H04W 76/02* | (2009.01) |
| *B60Q 1/52* | (2006.01) |
| *G06F 3/0488* | (2013.01) |
| *G08B 21/06* | (2006.01) |
| *G08B 29/18* | (2006.01) |
| *G08G 1/0967* | (2006.01) |
| *H04N 7/18* | (2006.01) |
| *H04W 12/06* | (2009.01) |
| *H04W 12/08* | (2009.01) |
| *H04W 84/00* | (2009.01) |

(52) U.S. Cl.
CPC ............... *B60W 50/08* (2013.01); *G01C 21/00* (2013.01); *G01C 21/26* (2013.01); *G01C 21/34* (2013.01); *G01C 21/36* (2013.01); *G01C 21/3647* (2013.01); *G05D 1/0027* (2013.01); *G05D 1/0212* (2013.01); *G05D 23/1917* (2013.01); *G06F 3/016* (2013.01); *G06F 3/017* (2013.01); *G06F 3/0481* (2013.01); *G06F 3/04842* (2013.01); *G06F 8/65* (2013.01); *G06F 17/28* (2013.01); *G06F 17/30247* (2013.01); *G06F 17/30557* (2013.01); *G06F 17/30864* (2013.01); *G06F 21/00* (2013.01); *G06F 21/31* (2013.01); *G06F 21/32* (2013.01); *G06K 9/00255* (2013.01); *G06K 9/00268* (2013.01); *G06Q 10/00* (2013.01); *G06Q 10/02* (2013.01); *G06Q 10/20* (2013.01); *G06Q 20/145* (2013.01); *G06Q 30/00* (2013.01); *G06Q 30/012* (2013.01); *G06Q 30/0265* (2013.01); *G06Q 30/0633* (2013.01); *G06Q 30/0639* (2013.01); *G06Q 30/0645* (2013.01); *G06Q 50/30* (2013.01); *G07C 5/00* (2013.01); *G07C 5/008* (2013.01); *G07C 5/085* (2013.01); *G07C 5/0808* (2013.01); *G07C 9/00126* (2013.01); *G08B 13/19647* (2013.01); *G08B 21/0205* (2013.01); *G08B 25/016* (2013.01); *G08G 1/0965* (2013.01); *G08G 1/166* (2013.01); *H04L 63/08* (2013.01); *H04L 67/10* (2013.01); *H04L 67/12* (2013.01); *H04N 21/214* (2013.01); *H04N 21/2181* (2013.01); *H04N 21/25841* (2013.01); *H04N 21/41422* (2013.01); *H04N 21/4542* (2013.01); *H04N 21/4751* (2013.01); *H04W 4/003* (2013.01); *H04W 4/046* (2013.01); *H04W 4/12* (2013.01); *H04W 4/206* (2013.01); *H04W 36/0005* (2013.01); *H04W 36/32* (2013.01); *H04W 36/34* (2013.01); *H04W 48/02* (2013.01); *H04W 48/04* (2013.01); *H04W 76/021* (2013.01); *H05K 999/00* (2013.01); *B60Q 1/52* (2013.01); *G06F 3/0488* (2013.01); *G08B 21/06* (2013.01); *G08B 29/188* (2013.01); *G08G 1/096725* (2013.01); *G08G 1/096741* (2013.01); *G08G 1/096775* (2013.01); *H04N 7/181* (2013.01); *H04W 12/06* (2013.01); *H04W 12/08* (2013.01); *H04W 84/005* (2013.01)

(56) References Cited

U.S. PATENT DOCUMENTS

| | | |
|---|---|---|
| 5,296,840 A | 3/1994 | Gieffers |
| 5,529,138 A | 6/1996 | Shaw et al. |
| 5,531,122 A | 7/1996 | Chatham et al. |
| 5,572,450 A | 11/1996 | Worthy |
| 5,825,283 A | 10/1998 | Camhi |
| 5,986,575 A | 11/1999 | Jones et al. |
| 6,148,261 A | 11/2000 | Obradovich et al. |
| 6,356,838 B1 | 3/2002 | Paul |
| 6,557,752 B1 | 5/2003 | Yacoob |
| 6,563,910 B2 | 5/2003 | Menard et al. |
| 6,587,739 B1 | 7/2003 | Abrams et al. |
| 6,607,212 B1 | 8/2003 | Reimer et al. |

(56) References Cited

U.S. PATENT DOCUMENTS

| | | |
|---|---|---|
| 6,617,981 B2 | 9/2003 | Basinger |
| 6,675,081 B2 | 1/2004 | Shuman et al. |
| 6,757,593 B2 | 6/2004 | Mori et al. |
| 6,778,888 B2 | 8/2004 | Cataldo et al. |
| 6,892,131 B2 | 5/2005 | Coffee et al. |
| 6,944,533 B2 | 9/2005 | Kozak et al. |
| 7,020,544 B2 | 3/2006 | Shinada et al. |
| 7,047,129 B2 | 5/2006 | Uotani |
| 7,058,898 B2 | 6/2006 | McWalter et al. |
| 7,096,431 B2 | 8/2006 | Tambata et al. |
| 7,142,696 B1 | 11/2006 | Engelsberg et al. |
| 7,233,861 B2 | 6/2007 | Van Buer et al. |
| 7,239,960 B2 | 7/2007 | Yokota et al. |
| 7,295,904 B2 | 11/2007 | Kanevsky et al. |
| 7,313,547 B2 | 12/2007 | Mocek et al. |
| 7,333,012 B1 | 2/2008 | Nguyen |
| 7,346,435 B2 | 3/2008 | Amendola et al. |
| 7,526,539 B1 | 4/2009 | Hsu |
| 7,667,618 B2 | 2/2010 | Chitor et al. |
| 7,748,021 B2 | 6/2010 | Obradovich |
| 7,796,190 B2 | 9/2010 | Basso et al. |
| 7,832,762 B2 | 11/2010 | Breed |
| 7,864,073 B2 | 1/2011 | Lee et al. |
| 7,873,471 B2 | 1/2011 | Gieseke |
| 7,969,324 B2 | 6/2011 | Chevion et al. |
| 8,060,631 B2 | 11/2011 | Collart et al. |
| 8,233,919 B2 | 7/2012 | Haag et al. |
| 8,245,609 B1 | 8/2012 | Greenwald et al. |
| 8,334,847 B2 | 12/2012 | Tomkins |
| 8,346,233 B2 | 1/2013 | Aaron et al. |
| 8,350,721 B2 | 1/2013 | Carr |
| 8,417,449 B1 | 4/2013 | Denise |
| 8,442,389 B2 | 5/2013 | Kashima et al. |
| 8,442,758 B1 | 5/2013 | Rovik et al. |
| 8,497,842 B2 | 7/2013 | Tomkins et al. |
| 8,509,982 B2 | 8/2013 | Montemerlo et al. |
| 8,521,410 B2 | 8/2013 | Mizuno et al. |
| 8,543,330 B2 | 9/2013 | Taylor et al. |
| 8,547,340 B2 | 10/2013 | Sizelove et al. |
| 8,548,669 B2 | 10/2013 | Naylor |
| 8,552,886 B2 | 10/2013 | Bensoussan |
| 8,578,279 B2 | 11/2013 | Chen et al. |
| 8,600,611 B2 | 12/2013 | Seize |
| 8,613,385 B1 | 12/2013 | Hulet et al. |
| 8,634,984 B2 | 1/2014 | Sumizawa |
| 8,660,735 B2 | 2/2014 | Tengler et al. |
| 8,671,068 B2 | 3/2014 | Harber et al. |
| 8,718,797 B1 | 5/2014 | Addepalli et al. |
| 8,730,033 B2 | 5/2014 | Yarnold et al. |
| 8,782,262 B2 | 7/2014 | Collart et al. |
| 8,788,220 B2 | 7/2014 | Soles et al. |
| 8,793,034 B2 | 7/2014 | Ricci |
| 8,793,065 B2 | 7/2014 | Seltzer et al. |
| 8,798,918 B2 | 8/2014 | Onishi et al. |
| 8,812,171 B2 | 8/2014 | Filev et al. |
| 8,818,725 B2 | 8/2014 | Ricci |
| 8,825,031 B2 | 9/2014 | Aaron et al. |
| 8,825,277 B2 | 9/2014 | McClellan et al. |
| 8,825,362 B2 | 9/2014 | Kirsch |
| 8,825,382 B2 | 9/2014 | Liu |
| 8,831,826 B2 | 9/2014 | Ricci |
| 8,838,095 B2 | 9/2014 | Jouin |
| 8,862,299 B2 | 10/2014 | Ricci |
| 8,862,317 B2 | 10/2014 | Shin et al. |
| 2002/0009978 A1 | 1/2002 | Dukach et al. |
| 2002/0026278 A1 | 2/2002 | Feldman et al. |
| 2002/0065046 A1 | 5/2002 | Mankins et al. |
| 2002/0077985 A1 | 6/2002 | Kobata et al. |
| 2002/0103622 A1 | 8/2002 | Burge |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0174021 A1 | 11/2002 | Chu et al. |
| 2003/0004624 A1 | 1/2003 | Wilson et al. |
| 2003/0060937 A1 | 3/2003 | Shinada et al. |
| 2003/0065432 A1 | 4/2003 | Shuman et al. |
| 2003/0101451 A1 | 5/2003 | Bentolila et al. |
| 2003/0204290 A1 | 10/2003 | Sadler et al. |
| 2004/0017292 A1* | 1/2004 | Reese ................ G08B 25/008 340/539.1 |
| 2004/0036622 A1 | 2/2004 | Dukach et al. |
| 2004/0039504 A1 | 2/2004 | Coffee et al. |
| 2004/0093155 A1 | 5/2004 | Simonds et al. |
| 2004/0153356 A1 | 8/2004 | Lockwood et al. |
| 2004/0204837 A1 | 10/2004 | Singleton |
| 2004/0217850 A1 | 11/2004 | Perttunen et al. |
| 2004/0225557 A1 | 11/2004 | Phelan et al. |
| 2004/0260470 A1 | 12/2004 | Rast |
| 2005/0038598 A1 | 2/2005 | Oesterling et al. |
| 2005/0065716 A1 | 3/2005 | Timko et al. |
| 2005/0097541 A1 | 5/2005 | Holland |
| 2005/0122235 A1 | 6/2005 | Teffer et al. |
| 2005/0159853 A1 | 7/2005 | Takahashi et al. |
| 2005/0197748 A1 | 9/2005 | Holst et al. |
| 2005/0261815 A1 | 11/2005 | Cowelchuk et al. |
| 2005/0283284 A1 | 12/2005 | Grenier et al. |
| 2006/0036358 A1 | 2/2006 | Hale et al. |
| 2006/0058948 A1 | 3/2006 | Blass et al. |
| 2006/0130033 A1 | 6/2006 | Stoffels et al. |
| 2006/0173841 A1 | 8/2006 | Bill |
| 2006/0175403 A1 | 8/2006 | McConnell et al. |
| 2006/0243056 A1 | 11/2006 | Sundermeyer et al. |
| 2006/0287807 A1 | 12/2006 | Teffer |
| 2007/0032225 A1 | 2/2007 | Konicek et al. |
| 2007/0061057 A1 | 3/2007 | Huang et al. |
| 2007/0118301 A1 | 5/2007 | Andarawis et al. |
| 2007/0135995 A1 | 6/2007 | Kikuchi et al. |
| 2007/0182625 A1 | 8/2007 | Kerai et al. |
| 2007/0192486 A1 | 8/2007 | Wilson et al. |
| 2007/0194944 A1 | 8/2007 | Galera et al. |
| 2007/0200663 A1 | 8/2007 | White et al. |
| 2008/0033635 A1 | 2/2008 | Obradovich et al. |
| 2008/0042824 A1* | 2/2008 | Kates ................ G08B 13/183 340/522 |
| 2008/0082237 A1 | 4/2008 | Breed |
| 2008/0086455 A1 | 4/2008 | Meisels et al. |
| 2008/0104227 A1 | 5/2008 | Birnie et al. |
| 2008/0129475 A1 | 6/2008 | Breed et al. |
| 2008/0147280 A1 | 6/2008 | Breed |
| 2008/0161986 A1 | 7/2008 | Breed |
| 2008/0169940 A1 | 7/2008 | Lee et al. |
| 2008/0255721 A1 | 10/2008 | Yamada |
| 2008/0300778 A1 | 12/2008 | Kuznetsov |
| 2009/0006525 A1 | 1/2009 | Moore |
| 2009/0040026 A1* | 2/2009 | Tanaka ................ G08B 25/003 340/10.1 |
| 2009/0119657 A1 | 5/2009 | Link, II |
| 2009/0125174 A1 | 5/2009 | Delean |
| 2009/0138336 A1 | 5/2009 | Ashley et al. |
| 2009/0157312 A1 | 6/2009 | Black et al. |
| 2009/0222200 A1 | 9/2009 | Link et al. |
| 2009/0234578 A1 | 9/2009 | Newby et al. |
| 2009/0254446 A1 | 10/2009 | Chernyak |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2010/0023204 A1 | 1/2010 | Basir et al. |
| 2010/0036560 A1 | 2/2010 | Wright et al. |
| 2010/0057337 A1 | 3/2010 | Fuchs |
| 2010/0066498 A1 | 3/2010 | Fenton |
| 2010/0070338 A1 | 3/2010 | Siotia et al. |
| 2010/0087984 A1 | 4/2010 | Joseph |
| 2010/0087987 A1 | 4/2010 | Huang et al. |
| 2010/0106344 A1 | 4/2010 | Edwards et al. |
| 2010/0106418 A1 | 4/2010 | Kindo et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0136944 A1 | 6/2010 | Taylor et al. |
| 2010/0137037 A1 | 6/2010 | Basir |
| 2010/0145700 A1 | 6/2010 | Kennewick et al. |
| 2010/0145987 A1 | 6/2010 | Harper et al. |

(56) References Cited

U.S. PATENT DOCUMENTS

| | | |
|---|---|---|
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0222939 A1 | 9/2010 | Namburu et al. |
| 2010/0235891 A1 | 9/2010 | Oglesbee et al. |
| 2010/0274410 A1 | 10/2010 | Tsien et al. |
| 2010/0289643 A1 | 11/2010 | Trundle et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0321151 A1 | 12/2010 | Matsuura et al. |
| 2010/0332130 A1 | 12/2010 | Shimizu et al. |
| 2011/0040438 A1 | 2/2011 | Kluge et al. |
| 2011/0077808 A1 | 3/2011 | Hyde et al. |
| 2011/0078024 A1 | 3/2011 | Messier et al. |
| 2011/0090078 A1 | 4/2011 | Kim et al. |
| 2011/0093438 A1 | 4/2011 | Poulsen |
| 2011/0093846 A1 | 4/2011 | Moinzadeh et al. |
| 2011/0112717 A1 | 5/2011 | Resner |
| 2011/0130915 A1 | 6/2011 | Wright et al. |
| 2011/0137520 A1 | 6/2011 | Rector et al. |
| 2011/0184642 A1 | 7/2011 | Rotz et al. |
| 2011/0197187 A1 | 8/2011 | Roh |
| 2011/0210867 A1 | 9/2011 | Benedikt |
| 2011/0224865 A1 | 9/2011 | Gordon et al. |
| 2011/0231091 A1 | 9/2011 | Gourlay et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0257973 A1 | 10/2011 | Chutorash et al. |
| 2011/0291926 A1 | 12/2011 | Gokturk et al. |
| 2011/0301844 A1 | 12/2011 | Aono |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0010807 A1 | 1/2012 | Zhou |
| 2012/0030512 A1 | 2/2012 | Wadhwa et al. |
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0101876 A1 | 4/2012 | Turvey et al. |
| 2012/0101914 A1 | 4/2012 | Kumar et al. |
| 2012/0105613 A1 | 5/2012 | Weng et al. |
| 2012/0109451 A1 | 5/2012 | Tan |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0204166 A1 | 8/2012 | Ichihara |
| 2012/0254763 A1 | 10/2012 | Protopapas et al. |
| 2012/0254804 A1 | 10/2012 | Shema et al. |
| 2012/0289253 A1 | 11/2012 | Haag et al. |
| 2012/0316720 A1 | 12/2012 | Hyde et al. |
| 2012/0323413 A1 | 12/2012 | Kedar-Dongarkar et al. |
| 2012/0327231 A1 | 12/2012 | Cochran et al. |
| 2013/0019252 A1 | 1/2013 | Haase et al. |
| 2013/0024060 A1 | 1/2013 | Sukkari et al. |
| 2013/0030645 A1 | 1/2013 | Divine et al. |
| 2013/0031540 A1 | 1/2013 | Throop et al. |
| 2013/0055096 A1 | 2/2013 | Kim et al. |
| 2013/0059607 A1 | 3/2013 | Herz et al. |
| 2013/0066512 A1 | 3/2013 | Willard et al. |
| 2013/0079964 A1 | 3/2013 | Sukkari et al. |
| 2013/0083805 A1 | 4/2013 | Lu et al. |
| 2013/0099915 A1 | 4/2013 | Prasad et al. |
| 2013/0103196 A1 | 4/2013 | Monceaux et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144463 A1 | 6/2013 | Ricci et al. |
| 2013/0144470 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Ricci |
| 2013/0158821 A1 | 6/2013 | Ricci |
| 2013/0166096 A1 | 6/2013 | Jotanovic |
| 2013/0166097 A1 | 6/2013 | Ricci |
| 2013/0166208 A1 | 6/2013 | Forstall et al. |
| 2013/0167159 A1 | 6/2013 | Ricci et al. |
| 2013/0197796 A1 | 8/2013 | Obradovich et al. |
| 2013/0198031 A1 | 8/2013 | Mitchell et al. |
| 2013/0204455 A1 | 8/2013 | Chia et al. |
| 2013/0207794 A1 | 8/2013 | Patel et al. |
| 2013/0212065 A1 | 8/2013 | Rahnama |
| 2013/0215116 A1 | 8/2013 | Siddique et al. |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226449 A1 | 8/2013 | Rovik et al. |
| 2013/0231784 A1 | 9/2013 | Rovik et al. |
| 2013/0241720 A1 | 9/2013 | Ricci et al. |
| 2013/0245882 A1 | 9/2013 | Ricci |
| 2013/0261966 A1 | 10/2013 | Wang et al. |
| 2013/0282946 A1 | 10/2013 | Ricci |
| 2013/0293364 A1 | 11/2013 | Ricci et al. |
| 2013/0293452 A1 | 11/2013 | Ricci et al. |
| 2013/0295913 A1 | 11/2013 | Matthews et al. |
| 2013/0300554 A1 | 11/2013 | Braden |
| 2013/0304371 A1 | 11/2013 | Kitatani et al. |
| 2013/0325568 A1 | 12/2013 | Mangalvedkar et al. |
| 2013/0332023 A1 | 12/2013 | Bertosa et al. |
| 2013/0338914 A1 | 12/2013 | Weiss |
| 2013/0345929 A1 | 12/2013 | Bowden et al. |
| 2014/0028542 A1 | 1/2014 | Lovitt et al. |
| 2014/0058672 A1 | 2/2014 | Wansley et al. |
| 2014/0067201 A1 | 3/2014 | Visintainer et al. |
| 2014/0067564 A1 | 3/2014 | Yuan |
| 2014/0109075 A1 | 4/2014 | Hoffman et al. |
| 2014/0164611 A1 | 6/2014 | Molettiere et al. |
| 2014/0169621 A1 | 6/2014 | Burr |
| 2014/0207328 A1 | 7/2014 | Wolf et al. |
| 2014/0220966 A1 | 8/2014 | Muetzel et al. |
| 2014/0244111 A1 | 8/2014 | Gross et al. |
| 2014/0244156 A1 | 8/2014 | Magnusson et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282470 A1 | 9/2014 | Buga et al. |

(56) References Cited

U.S. PATENT DOCUMENTS

| | | |
|---|---|---|
| 2014/0292545 A1 | 10/2014 | Nemoto |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2015/0007155 A1 | 1/2015 | Hoffman et al. |

OTHER PUBLICATIONS

"Accessibility A guide for Businesses and Organizations," Microsoft, 2011, 53 pages.

"Accessibility Guide for Educators," Microsoft, 2014, 1 page [retrieved from www.microsoft.com/enable/education/].

"Guide for Individuals with Language and Communication Impairments," Microsoft, 2014, 9 pages [retrieved from www.microsoft.com/enable/guides/language.aspx].

"Guide for Individuals with Vision Impairments," Microsoft, 2014, 8 pages [retrieved from www.microsoft/com/enable/guides/vision.aspx].

"Guide for Individuals with Age-related Impairments," Microsoft, 2014, 1 page [retrieved from www.icrosoft.com/enable/aging].

"Guide for Individuals with Learning Impairments," Microsoft, 2014, 1 page [retrieved from www.microsoft.com/enable/guides/learning.aspx].

"Guide for Individuals with Dexterity and Mobility Impairments," Microsoft, 2014, 6 pages [retrieved from www.microsoft.com/enable/guides/dexterity.aspx].

"Guide for Individuals with Hearing Impairments," Microsoft, 2014, 5 pages [retrieved from www.microsoft.com/enable/guides/hearing.aspx].

Bennett "Meet Samsung's Version of Apple AirPlay," CNET.com, Oct. 10, 2012, 11 pages [retrieved from the internet on Aug. 14, 2014 from www.cnet.com/products/samsung-allsharecast-hub-eadt10jdegsta/].

International Search Report and Written Opinion for International (PCT) Patent Application No. PCT/US2014/034092, mailed Aug. 22, 2014 8 pages.

International Search Report and Written Opinion for International (PCT) Patent Application No. PCT/US2014/034099, mailed Aug. 25, 2014 8 pages.

International Search Report and Written Opinion for International (PCT) Patent Application No. PCT/US2014/034087, mailed Aug. 22, 2014 7 pages.

International Search Report and Written Opinion for International (PCT) Patent Application No. PCT/US14/34232, mailed Sep. 15, 2014 8 pages.

International Search Report and Written Opinion for International (PCT) Patent Application No. PCT/US14/34098, mailed Sep. 15, 2014 10 pages.

International Search Report and Written Opinion for International (PCT) Patent Application No. PCT/US14/34108, mailed Sep. 15, 2014 7 pages.

International Search Report and Written Opinion for International (PCT) Patent Application No. PCT/US2014/034101, mailed Aug. 22, 2014 7 pages.

International Search Report and Written Opinion for International (PCT) Patent Application No. PCT/US2014/034103, mailed Sep. 3, 2014 7 pages.

International Search Report and Written Opinion for International (PCT) Patent Application No. PCT/US14/34114, mailed Sep. 15, 2014 9 pages.

International Search Report and Written Opinion for International (PCT) Patent Application No. PCT/US14/34125, mailed Sep. 15, 2014 8 pages.

International Search Report and Written Opinion for International (PCT) Patent Application No. PCT/US14/34254, mailed Sep. 15, 2014 10 pages.

Official Action for U.S. Appl. No. 14/253,729, mailed Nov. 19, 2014 8 pages.

Official Action for U.S. Appl. No. 14,253,405, mailed Nov. 18, 2014 6 pages.

Official Action for U.S. Appl. No. 14/253,838, mailed Nov. 20, 2014 31 pages.

Official Action for U.S. Appl. No. 14/253,506, mailed Nov. 14, 2014 9 pages.

Background of the Invention for the above-captioned application.

(56) References Cited

OTHER PUBLICATIONS

International Search Report and Written Opinion for International (PCT) Patent Application No. PCT/US2014/034088, mailed Dec. 24, 2014 9 pages.
International Search Report and Written Opinion for International (PCT) Patent Application No. PCT/US14/034194, mailed Dec. 31, 2014 11 pages.
Official Action for U.S. Appl. No. 14/253,836, mailed Feb. 24, 2015 12 pages.
Official Action for U.S. Appl. No. 14/253,706, mailed Jan. 29, 2015 8 pages.
Official Action for U.S. Appl. No. 14/253,729, mailed Mar. 6, 2015 7 pages.
Official Action for U.S. Appl. No. 14/252,871, mailed Mar. 27, 2015 10 pages.
Official Action for U.S. Appl. No. 14/253,2014, mailed Jan. 26, 2015 6 pages.
Official Action for U.S. Appl. No. 14/253,330, mailed Apr. 13, 2015 11 pages.
Official Action for U.S. Appl. No. 14/252,858, mailed Jan. 26, 2015 8 pages.
Official Action for U.S. Appl. No. 14/253,034, mailed Jan. 26, 2015 2 pages.
Notice of Allowance for U.S. Appl. No. 14/253,405, mailed Mar. 5, 2015 5 pages.
Official Action for U.S. Appl. No. 14/252,876, mailed Jan. 30, 2015 9 pages.
Official Action for U.S. Appl. No. 14/253,838, mailed Mar. 12, 2015 32 pages.
Notice of Allowance for U.S. Appl. No. 14/253,312, mailed Dec. 19, 2014 8 pages.
Official Action for U.S. Appl. No. 14/253,334, mailed Jan. 27, 2015 13 pages.
Official Action for U.S. Appl. No. 14/253,371, mailed Dec. 16, 2014 7 pages.
Notice of Allowance for U.S. Appl. No. 14/253,371, mailed Apr. 15, 2015 6 pages.
Official Action for U.S. Appl. No. 14/253,416, mailed Dec. 1, 2014 8 pages.
Notice of Allowance for U.S. Appl. No. 14/253,416, mailed Mar. 18, 2015 6 pages.
Notice of Allowance for U.S. Appl. No. 14/253,058, mailed Jan. 28, 2015 9 pages.
Official Action for U.S. Appl. No. 14/253,022, mailed Feb. 20, 2015 13 pages.
Official Action for U.S. Appl. No. 14/253,251, mailed Dec. 29, 2014 8 pages.
Notice of Allowance for U.S. Appl. No. 14/253,251, mailed Apr. 10, 2015 5 pages.
Official Action for U.S. Appl. No. 14/253,388, mailed Jan. 30, 2015 8 pages.
Official Action for U.S. Appl. No. 14/253,406, mailed Dec. 11, 2014 6 pages.
Notice of Allowance for U.S. Appl. No. 14/253,406, mailed Apr. 6, 2015 6 pages.
Official Action for U.S. Appl. No. 14/253,464, mailed Jan. 28, 2015 9 pages.
Official Action for U.S. Appl. No. 14/253,755, mailed Apr. 24, 2015 13 pages.
Official Action for U.S. Appl. No. 14/253,727, mailed Jan. 6, 2015 8 pages.
Official Action for U.S. Appl. No. 14/253,743, mailed Feb. 12, 2015 8 pages.
Official Action for U.S. Appl. No. 14/253,766, mailed Dec. 12, 2014 7 pages.
Notice of Allowance for U.S. Appl. No. 14/253,766, mailed Apr. 10, 2015 5 pages.
Notice of Allowance for U.S. Appl. No. 14/253,506, mailed Mar. 6, 2015 5 pages.

* cited by examiner

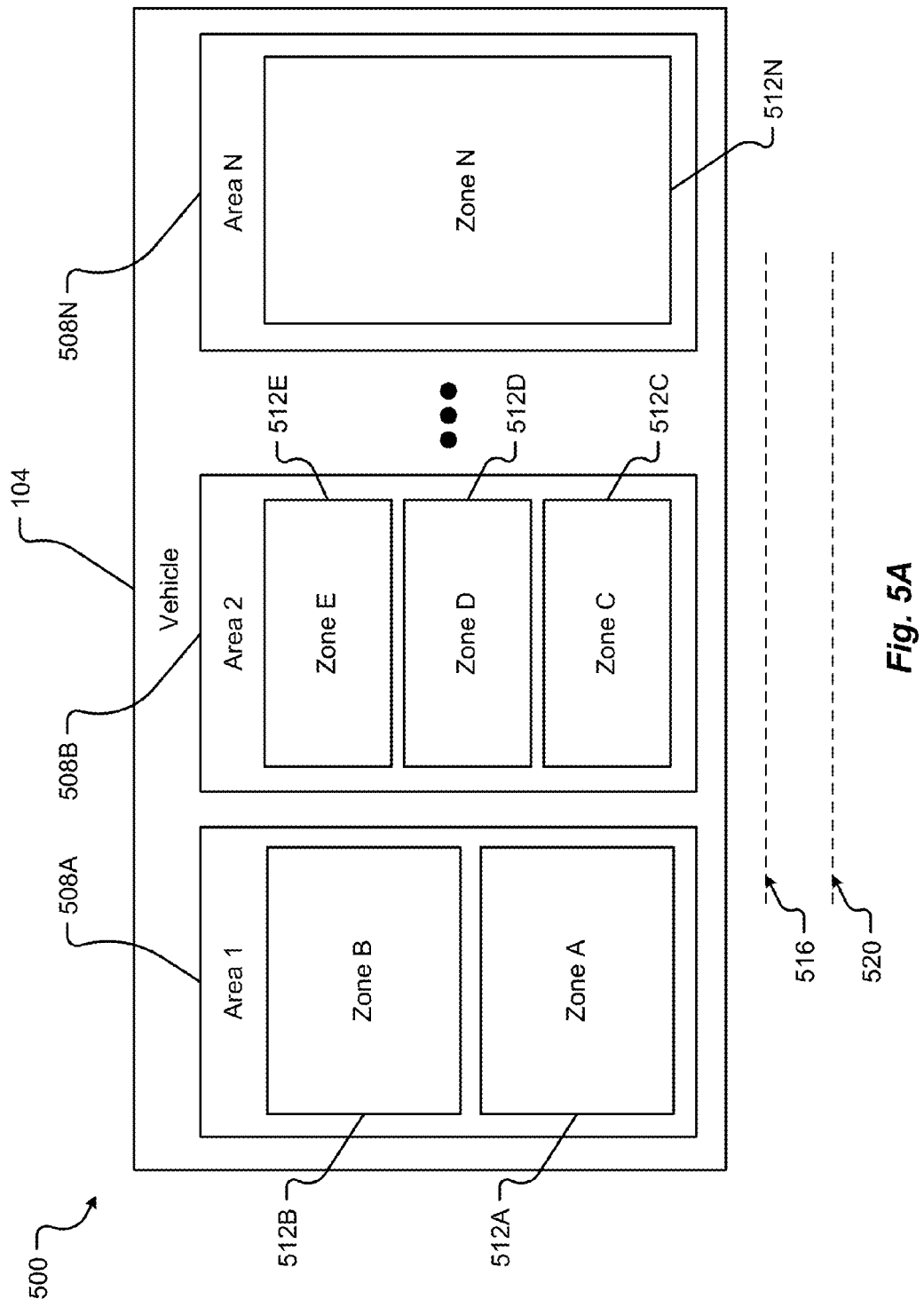

Tap

Long Press

Drag

Flick

Pinch

Spread

PROVIDING HOME AUTOMATION INFORMATION VIA COMMUNICATION WITH A VEHICLE

CROSS REFERENCE TO RELATED APPLICATIONS

The present application claims the benefits of and priority, under 35 U.S.C. §119(e), to U.S. Provisional Application Ser. No. 61/811,981, filed on Apr. 15, 2013, entitled "Functional Specification for a Next Generation Automobile"; 61/865,954, filed on Aug. 14, 2013, entitled "Gesture Control of Vehicle Features"; 61/870,698, filed on Aug. 27, 2013, entitled "Gesture Control and User Profiles Associated with Vehicle Features"; 61/891,217, filed on Oct. 15, 2013, entitled "Gesture Control and User Profiles Associated with Vehicle Features"; 61/904,205, filed on Nov. 14, 2013, entitled "Gesture Control and User Profiles Associated with Vehicle Features"; 61/924,572, filed on Jan. 7, 2014, entitled "Gesture Control and User Profiles Associated with Vehicle Features"; and 61/926,749, filed on Jan. 13, 2014, entitled "Method and System for Providing Infotainment in a Vehicle." The entire disclosures of the applications listed above are hereby incorporated by reference, in their entirety, for all that they teach and for all purposes.

This application is also related to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,292, filed Nov. 16, 2012, entitled "Branding of Electrically Propelled Vehicles Via the Generation of Specific Operating Output"; Ser. No. 13/679,400, filed Nov. 16, 2012, entitled "Vehicle Climate Control"; Ser. No. 13/840,240, filed on Mar. 15, 2013, entitled "Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Whether using private, commercial, or public transport, the movement of people and/or cargo has become a major industry. In today's interconnected world, daily travel is essential to engaging in commerce. Commuting to and from work can account for a significant portion of a traveler's day. As a result, vehicle manufacturers have begun to focus on making this commute, and other journeys, more enjoyable.

Currently, vehicle manufacturers attempt to entice travelers to use a specific conveyance based on any number of features. Most of these features focus on vehicle safety or efficiency. From the addition of safety-restraints, air-bags, and warning systems to more efficient engines, motors, and designs, the vehicle industry has worked to appease the supposed needs of the traveler. Recently, however, vehicle manufactures have shifted their focus to user and passenger comfort as a primary concern. Making an individual more comfortable while travelling instills confidence and pleasure in using a given vehicle, increasing an individual's preference for a given manufacturer and/or vehicle type.

One way to instill comfort in a vehicle is to create an environment within the vehicle similar to that of an individual's home. Integrating features in a vehicle that are associated with comfort found in an individual's home can ease a traveler's transition from home to vehicle. Several manufacturers have added comfort features in vehicles such as the following: leather seats, adaptive and/or personal climate control systems, music and media players, ergonomic controls, and, in some cases, Internet connectivity. However, because these manufacturers have added features to a conveyance, they have built comfort around a vehicle and failed to build a vehicle around comfort.

SUMMARY

There is a need for a vehicle ecosystem, which can integrate both physical and mental comforts, while seamlessly communicating with current electronic devices to result in a totally intuitive and immersive user experience. These and other needs are addressed by the various aspects, embodiments, and/or configurations of the present disclosure. Also, while the disclosure is presented in terms of exemplary and optional embodiments, it should be appreciated that individual aspects of the disclosure can be separately claimed.

Embodiments include a method for controlling a home automation system by a vehicle control system of a vehicle, the method comprising: identifying, by a microprocessor executable home automation module, at least one occupant of a vehicle; accessing, by the microprocessor executable home automation module, an account of the at least one identified vehicle occupant, the account defining at least one home location for the identified vehicle occupant; connecting, by the microprocessor executable home automation module, to a home automation system of one of the at least one home locations; receiving, in a microprocessor executable home automation module, a state of features of the home automation system; retrieving, by a microprocessor executable home automation module, from the account of the at least one identified vehicle occupant, arrival settings for features of the home automation system; generating, microprocessor executable home automation module, commands to implement the arrival settings; and sending, microprocessor executable home automation module, the commands to the home automation system.

Aspects of the above method include wherein the microprocessor executable home automation module sends a first set of commands to the home automation system at a first time and a second set of commands to the home automation system at a second time. Aspects of the above method include wherein the microprocessor executable home automation module sends the first set of commands to the home automation system when the vehicle is a first distance from the home location, wherein the microprocessor executable home automation module sends the second set of commands when the vehicle is a second distance from the home location, and wherein the first distance is greater than the second distance. Aspects of the above method include wherein the first time and the second time are determined by one of the account of the at least one identified and the microprocessor executable home automation module based at least in part on the state of features of the home automation system. Aspects of the above method include wherein the microprocessor of the vehicle control system determines the first time and the second time. Aspects of the above method include wherein the settings comprise at least one of activating, deactivating, and changing a setting of at least one of an interior light, an exterior light, a security system, an interior entertainment system, an exterior entertainment system, a thermostat, and a door lock of the home automation system. Aspects of the above method include wherein the at least one identified vehicle occupant comprises a first identified vehicle occupant and a second identified vehicle occupant, and further comprising: determining, by the microprocessor executable home automation module, a conflict between at least one setting of the first identified vehicle occupant and at least one setting of the second identified vehicle occupant; determining, by the microprocessor executable home automation module, a first priority of the first identified vehicle occupant and a second priority of the second identified vehicle occupant; when the first priority is greater than the second priority, generating, by the microprocessor executable home automation module, commands to implement the at least one setting of the first identified vehicle occupant; and when the second priority is greater than the first priority, generating, by the microprocessor executable home automation module, commands to implement the at least one setting of the second identified vehicle occupant.

Aspects of the above method include wherein when the first identified vehicle occupant is identified as a driver the first priority is greater than the second priority.

Aspects of the method above further comprise: receiving, by the microprocessor executable home automation module, a number of occupants in the home location from the home automation system; determining, by the microprocessor executable home automation module, that the home location is occupied, wherein: during the retrieving, the microprocessor executable home automation module retrieves alternate settings from the account of the at least one identified vehicle occupant; and during the generating, the microprocessor executable home automation module generates commands to implement the alternate settings.

Aspects of the method above further comprise: determining, by the microprocessor executable home automation module, one of an audio channel and a video channel presenting a media item to the at least one identified vehicle occupant; and during the generating, generating commands to tune an entertainment system of the home automation system to one of the audio channel and the video channel presenting the media item to the at least one identified vehicle occupant.

Aspects of the method above further comprise determining, further comprising determining, by the microprocessor executable home automation module, that a destination of the vehicle is one of a plurality of home locations of the at least one identified vehicle occupant.

Aspects of the method above further comprise: receiving, by the home automation system, the commands; and configuring features of the home automation system in response to receiving the commands.

Aspects of the method above further comprise: determining, by the microprocessor executable home automation module, that the vehicle is leaving the one of the at least one home locations; connecting, by the microprocessor executable home automation module, to the home automation system of the one of the at least one home locations; receiving, by the microprocessor executable home automation module, the state of features of the home automation system; retrieving, by the microprocessor executable home automation module, from the account of the at least one identified vehicle occupant, departure settings for features of the home automation system; generating, by the microprocessor executable home automation module, commands to implement the departure settings; and sending, by the microprocessor executable home automation module, the commands to the home automation system.

Aspects of the above method include wherein identifying the at least one vehicle occupant comprises: identifying facial features associated with the at least one vehicle occupant via at least one image sensor; determining whether the identified facial features associated with the at least one vehicle occupant match user characteristics stored in a memory; and when the identified facial features associated with the at least one vehicle occupant do not match the user characteristics stored in the memory, identifying the at least one vehicle occupant further comprises: prompting the at least one vehicle occupant for identification information; receiving identification information from the at least one vehicle occupant; and storing the identification information received from the at least one vehicle occupant in the memory. Aspects of the above method include wherein identifying the at least one vehicle occupant further comprises detecting a device associated with the at least one vehicle occupant in an area of the vehicle.

Embodiments include a non-transitory computer readable medium having instructions stored thereon that, when executed by a processor, perform operations comprising the above methods. Embodiments include a device, means, and/or system configured to perform the above methods.

Embodiments include a vehicle control system, comprising: identify at least one occupant of the vehicle; access an account of the at least one identified vehicle occupant, the account defining at least one home location for the identified vehicle occupant; connect to a home automation system of one of the at least one home locations; receive a state of features of the home automation system; retrieve, from the account of the at least one identified vehicle occupant, arrival settings for features of the home automation system; generate a first set of commands and a second set of commands to implement the arrival settings; send the first set of commands to the home automation system when the vehicle is a first distance from the home location; and send the second set of commands to the home automation system when the vehicle is a second distance from the home location, wherein the first distance is greater than the second distance.

Aspects of the above system include wherein the microprocessor is further operable to: identify a first vehicle occupant and a second vehicle occupant; determine a conflict between at least one setting of the first identified vehicle occupant and at least one setting of the second identified vehicle occupant; determine a first priority of the first identified vehicle occupant and a second priority of the second identified vehicle occupant; when the first priority is greater than the second priority, generate commands to implement the at least one setting of the first identified vehicle occupant; and when the second priority is greater than the first priority, generate commands to implement the at least one setting of the second identified vehicle occupant.

Aspects of the above system include wherein the microprocessor sends a first set of commands to the home automation system at a first time and a second set of commands to the home automation system at a second time. Aspects of the above system include wherein the microprocessor sends the first set of commands to the home automation system when the vehicle is a first distance from the home location, wherein the microprocessor sends the second set of commands when the vehicle is a second distance from the home location, and wherein the first distance is greater than the second distance. Aspects of the above system include wherein the account of the at least one identified vehicle occupant defines the first time and the second time. Aspects of the above system include wherein the microprocessor of the vehicle control system determines the first time and the second time. Aspects of the above system include wherein the settings comprise at least one of activating, deactivating, and changing a setting of at least one of an interior light, an exterior light, a security system, an interior entertainment system, an exterior entertainment system, a thermostat, and a door lock of the home automation system. Aspects of the above system include wherein the at least one identified vehicle occupant comprises a first identified vehicle occupant and a second identified vehicle occupant, and further the microprocessor further operable to: determine a conflict between at least one setting of the first identified vehicle occupant and at least one setting of the second identified vehicle occupant; determine a first priority of the first identified vehicle occupant and a second priority of the second identified vehicle occupant; when the first priority is greater than the second priority, generate commands to implement the at least one setting of the first identified vehicle occupant; and when the second priority is greater than the first priority, generate, commands to implement the at least one setting of the second identified vehicle occupant. Aspects of the above system include wherein when the first identified vehicle occupant is identified as a driver the first priority is greater than the second priority.

Aspects of the system above further comprise the microprocessor operable to: receive a number of occupants in the home location from the home automation system; determine that the home location is occupied, wherein during the retrieving, the microprocessor retrieves alternate settings from the account of the at least one identified vehicle occupant; and during the generating, the microprocessor generates commands to implement the alternate settings.

Aspects of the system above further comprise the microprocessor operable to: determine one of an audio channel and a video channel presenting a media item to the at least one identified vehicle occupant; and during the generating, generate commands to tune an entertainment system of the home automation system to one of the audio channel and the video channel presenting the media item to the at least one identified vehicle occupant.

Aspects of the system above further comprise the microprocessor operable to: determine that a destination of the vehicle is one of a plurality of home locations of the at least one identified vehicle occupant.

Aspect of the system above further comprising: receiving, by the home automation system, the commands; and configuring features of the home automation system in response to receiving the commands.

Aspects of the system above further comprise the microprocessor operable to: determine that the vehicle is leaving the home location; connect to the home automation system of the home location; receive the state of features of the home automation system; retrieve from the account of the at least one identified vehicle occupant, departure settings for features of the home automation system; generate commands to implement the departure settings; and send the commands to the home automation system.

Aspects of the system above include wherein identifying the at least one vehicle occupant further comprises the microprocessor: identifying facial features associated with the at least one vehicle occupant via the at least one image sensor; determining whether the identified facial features associated with the at least one vehicle occupant match user characteristics stored in the memory; and when the identified facial features associated with the at least one vehicle occupant do not match the user characteristics stored in the memory, identifying the at least one vehicle occupant further comprises: prompting the at least one vehicle occupant for identification information; receiving identification information from the at least one vehicle occupant; and storing the identification information received from the at least one vehicle occupant in the memory.

Aspects of the above system include wherein identifying the at least one vehicle occupant further comprises detecting a device associated with the at least one vehicle occupant in an area of the vehicle.

Embodiments include a method, comprising: determining, by a microprocessor executable home automation system, that a person has entered a home associated with a vehicle user; sending, by the microprocessor executable home automation system, an alert to a vehicle control system indicating the person has entered the home.

Aspects of the method above further comprise: monitoring, by the microprocessor executable home automation system, the status of the person in the home; determining, by the microprocessor executable home automation system, that the status of the person has changed; and sending, by the microprocessor executable home automation system, a status alert to the vehicle control system.

Aspects of the method above further include wherein the microprocessor executable home automation system determines at least one of: the person can be identified and the status alert includes the name of the person; the person cannot be identified and the status alert includes an intruder alert; the person is leaving the home and the status alert includes one of an estimated time the person will leave the home and the time the person has left the home; the person is asleep and the status alert indicates that the person is asleep; the person is experiencing a health crisis and the status alert includes information about the health crisis; and the person has entered an area of the home the person is not authorized to enter and the status alert includes information about the location in the home of the person.

Aspects of the method above further include: wherein the microprocessor executable home automation system determines the person is experiencing the health crisis using information from at least one of a sensor of the home automation system and a device worn by the person; wherein the information from the sensor is a call for help from the person; wherein the device worn by the person is at least one of a heart rate monitor, a blood pressure monitor, a glucose monitor, and a medical alert device activated by the person; wherein the sensor of the home automation system includes one or more of an interior motion sensor, an exterior motion sensor, an interior camera, an exterior camera, an interior sound receiver, an exterior sound receiver, an infrared sensor, a weight sensor, a biometric sensor, a device worn by the person, a Bluetooth sensor, a radio frequency signal sensor, and a door motion sensor; wherein the alert includes one or more of an identity of the person, a picture of the person, a voice recording of the person, a time the person entered the home, and a location of the person in the home; and wherein the person includes a plurality of persons and the microprocessor sends an alert to the vehicle control system for each of the plurality of persons;

Aspects of the method above further comprise: sending, by the microprocessor executable home automation system, the alert to one or more of a cell phone, a laptop, a tablet computer, and a personal digital assistant.

Aspects of the method above further comprise: sending, by the microprocessor, the occupant alert to one or more of a cell phone, a laptop, a tablet computer, and a personal digital assistant; and presenting, by the vehicle control system, the occupant alert to a user in the vehicle.

Embodiments include a non-transitory computer readable medium having instructions stored thereon that, when executed by a processor, perform operations comprising the above methods. Embodiments include a device, means, and/or system configured to perform the above methods.

Embodiments include a home automation system, comprising: a memory; and a microprocessor in communication with the memory, the microprocessor operable to: determine that a person has entered a home associated with a vehicle user; send an alert to a vehicle control system indicating the person has entered the home.

Aspects of the above system further include the microprocessor further operable to: monitor a status of the person in the home; determine that the status of the person has changed; and send a status alert to the vehicle control system, wherein: when the person can be identified the status alert includes the name of the person; when the person cannot be identified the status alert includes an intruder alert; when the person is leaving the home the status alert includes one of an estimated time the person will leave the home and the time the person has left the home; when the person is asleep and status alert indicates that the person is asleep; when the person is experiencing a health crisis and status alert includes information about the health crisis; and when the person has entered an area of the home the person is not authorized to enter and status alert includes information about the location in the home of the person.

Aspects of the above system further include the microprocessor further operable to receive information from at least one sensor, wherein the at least one sensor includes one or more of an interior motion sensor, an exterior motion sensor, an interior camera, an exterior camera, an interior sound receiver, an exterior sound receiver, an infrared sensor, a weight sensor, a biometric sensor, a device worn by the person, a Bluetooth sensor, a radio frequency signal sensor, and a door motion sensor.

Aspects of the above system include: wherein the alert includes one or more of an identity of the person, a picture of the person, a voice recording of the person, a time the person entered the home, and a location of the person in the home.

Embodiments include a method, comprising: displaying, by a dash configuration module, in a first area, an instrument display of a vehicle in a first configuration, wherein the instrument display comprises one or more instruments that indicate a state of the vehicle; determining, by a traffic law module, that a second configuration of the instrument display is required in a second area, the first and second configurations being different; determining, by the dash configuration module, that the vehicle has entered, or is about to enter, the second area; and in response, displaying the instrument display in the second configuration.

Aspects of the method above further include: wherein the instrument display comprises at least one of a configurable dash display and a heads-up display, wherein the first configuration and the second configuration display the same vehicle state information, and wherein the second configuration of the instrument display is selected from one or more preconfigured instrument display configurations; wherein the configurable dash display comprises at least one instrument not displayed by the heads-up display; wherein the one or more instruments include at least one of a speedometer, an odometer, a tachometer, a trip odometer, a fuel gage, a coolant temperature gage, and a battery charge meter; wherein the second configuration includes at least one instrument not displayed by the first configuration, wherein determining that the second configuration of the instrument display is required includes changing at least one of: a size; a scale; a unit of measure to one of metric units and non-metric units; and a language of at least one instrument displayed in the first configuration; and wherein the first configuration includes at least one instrument not displayed by the second configuration.

Aspects of the method above further comprise: presenting, by an alert module, an alert on at least one of an instrument display and a communication device, wherein the alert includes information about traffic rules of the second area that are different than traffic rules of the first area, and wherein the alert includes information about the differences between the first configuration and the second configuration.

Aspects of the method above further comprise: retrieving, by the traffic law module, one or more traffic laws and vehicle regulations for the second area from an external memory of the vehicle, wherein the traffic law module determines that the second configuration of the instrument display is required in the second area by interpreting the one or more traffic laws and vehicle regulations applicable in the second area.

Aspects of the method above further comprise: determining, by the traffic law module, that the vehicle is approaching the second area, wherein the microprocessor determines that the vehicle is approaching the second area after a least one of receiving one or more signals sent from a plurality of sensing elements associated with the vehicle, receiving a location of the vehicle from a vehicle navigation system, receiving the location of the vehicle from a communication device, and receiving a destination of the vehicle entered into the vehicle navigation system; and selecting, by the dash configuration module, the second configuration.

Aspects of the above method further comprise: receiving, by the traffic law module, one or more signals sent from a plurality of sensing elements associated with the vehicle; retrieving, by the traffic law module, rules that define a plurality of signal conditions corresponding to the plurality of emergency events; interpreting, by the traffic law module, the one or more signals using the rules to determine that one of a plurality of emergency events has occurred; and automatically displaying, by an alert module, an emergency alert on the instrument display.

Aspects of the above method include: wherein the emergency event comprises one of: the vehicle travelling in a wrong direction in a lane of a road; the vehicle travelling in a wrong lane of the road; the vehicle travelling in a restricted lane of the road; and the vehicle travelling too fast.

Aspect of the above method further include: determining, by the traffic law module, that a second language is used in the second area; imaging, by one or more sensors of the vehicle, road signs in the second area; translating, by a traffic sign translation module, the imaged road signs into the first language of the first area; and displaying the text of the translated road sign on the instrument display.

Aspects of the above method further include: determining, by a network monitoring module, that at least one of data rate and voice rates charged by a service provider will change in the second area; determining, by the network monitoring module, if an alternate provider is available in the second area; providing, by an alert module, an alert to a driver of the vehicle, wherein the alert includes information associated with: the change of the at least one data rate and voice rate in the second area; a way to maximize data and voice usage in the second area; and the alternate provider; and switching, by the network monitoring module, to the alternate provider.

Aspects of the above method further include: determining, by the network monitoring module, that the second area is associated with an interruption of service for at least one of a data provider and a voice provider; determining, by the network monitoring module, if an alternate provider is available in the second area associated with the interruption of service; providing, by an alert module, an alert to a driver of the vehicle, wherein the alert includes information associated with: the interruption of service; and the alternate provider; and switching, by the network monitoring module, to the alternate provider. Aspects of the above method include wherein the communication device is not within the vehicle, and wherein the communication device comprises one or more of a smart phone, a laptop, and a computer.

Embodiments include a non-transitory computer readable medium having instructions stored thereon that, when executed by a processor, perform operations comprising the above methods. Embodiments include a device, means, and/or system configured to perform the above methods.

Embodiments include vehicle control system of a vehicle, comprising: a memory; and a microprocessor in communication with the memory, the microprocessor operable to: display, in a first area, an instrument display of the vehicle in a first configuration, wherein the instrument display comprises one or more instruments that indicate a state of the vehicle; retrieve one or more traffic laws and vehicle regulations for the second area; determine that a second configuration of the instrument display is required in a second area based on the one or more traffic laws and vehicle regulations for the second area, the first and second configurations being different; determine that the vehicle has entered, or is about to enter, the second area; and display the instrument display in the second configuration.

Aspects of the above system include wherein the microprocessor is further operable to: receive one or more signals sent from a plurality of sensing elements associated with the vehicle; retrieve rules that define a plurality of signal conditions corresponding to the plurality of emergency events; interpret the one or more signals using the rules to determine that one of a plurality of emergency events has occurred; and automatically display an emergency alert on the instrument display.

Aspects of the above system include: wherein the instrument display comprises at least one of a configurable dash display and a heads-up display; wherein the configurable dash display comprises at least one instrument not displayed by the heads-up display; wherein the second configuration of the instrument display is selected from one or more preconfigured instrument display configurations; wherein the one or more instruments include at least one of a speedometer, an odometer, a tachometer, a trip odometer, a fuel gage, a coolant temperature gage, and a battery charge meter; wherein the second configuration includes at least one instrument not displayed by the first configuration; wherein the first configuration includes at least one instrument not displayed by the second configuration; wherein determining that the second configuration of the instrument display is required includes adjusting a size of at least one instrument displayed in the first configuration; wherein determining that the second configuration of the instrument display is required includes adjusting a scale of at least one instrument displayed in the first configuration; wherein determining that the second configuration of the instrument display is required includes changing a unit of measure of at least one instrument displayed in the first configuration to one of metric units and non-metric units; wherein determining that the second configuration of the instrument display is required includes changing a language of at least one instrument displayed in the first configuration to a required language of the second area; wherein the alert includes information about traffic rules of the second area that are different than traffic rules of the first area; and wherein the alert includes information about the differences between the first configuration and the second configuration.

Aspects of the system above further comprise the microprocessor operable to: receive one or more signals sent from a plurality of sensing elements associated with the vehicle; interpret the one or more signals to determine that one of a plurality of emergency events has occurred, wherein the interpreting further comprises referring to the memory of the vehicle control system, wherein the memory stores rules that define a plurality of signal conditions corresponding to the plurality of emergency events, and wherein the emergency event comprises one of the vehicle travelling in a wrong direction in a lane of a road, the vehicle travelling in a wrong lane of the road, the vehicle travelling in a restricted lane of the road, and the vehicle travelling too fast; and, after determining that an emergency event has occurred, automatically displaying an emergency alert on the instrument display.

Aspects of the system above further comprise the microprocessor operable to: determine that a second language is used in the second area; image, by one or more sensors of the vehicle, road signs in the second area; translate the imaged road signs into the first language of the first area; and display the text of the translated road sign on the instrument display.

Aspects of the system above further comprise the microprocessor operable to: determine that at least one of data rate and voice rates charged by a service provider will change in the second area; determine if an alternate provider is available in the second area; and before the vehicle enters the second area, provide an alert to a driver of the vehicle, wherein the alert includes information about: the change of the at least one data rate and voice rate in the second area; a way to maximize data and voice usage in the second area; and the alternate provider. Aspects of the system above further comprise switching, by the microprocessor, to the alternate provider.

Aspects of the system above further comprise the microprocessor operable to: determine that the second area is associated with an interruption of service for at least one of a data provider and a voice provider; determine if an alternate provider is available in the second area associated with the interruption of service; and before the vehicle enters the second area associated with the interruption of service, provide an alert to a driver of the vehicle, wherein the alert includes information about: the interruption of service; and the alternate provider. Aspects of the system above further comprise the micro-processor operable to switch to the alternate provider.

Aspects of the system above further comprise the microprocessor further operable to download the one or more traffic laws and vehicle regulations for the second area to from an external memory of the vehicle.

Aspects of the system above further comprise: wherein the microprocessor determines that the second configuration of the instrument display is required in the second area by accessing one or more traffic laws and vehicle regulations applicable in the second area; wherein the microprocessor determines that the vehicle is approaching the second area after a least one of receiving one or more signals sent from a plurality of sensing elements associated with the vehicle, receiving a location of the vehicle from a vehicle navigation system, and receiving a destination of the vehicle entered into the vehicle navigation system; wherein the first configuration and the second configuration display the same vehicle state information; and wherein the communication device is not within the vehicle, and wherein the communication device comprises one or more of a smart phone, a laptop, and a computer.

Embodiments include a method, comprising: receiving, by a microprocessor executable vehicle environment module of a vehicle, one or more signals from a plurality of sensing elements respecting an environment external to the vehicle; interpreting, by the microprocessor executable vehicle environment module, the one or more signals to determine if at least one predetermined environmental condition exists; determining, by the microprocessor executable vehicle environment module, that the predetermined environmental condition exists; determining, by the microprocessor executable vehicle environment module, a severity of the predetermined environmental condition using one or more of rules and templates in a memory; determining, by the microprocessor executable vehicle environment module, if control of one or more vehicle functions is required based on the determined severity; displaying an alert on an instrument display of the vehicle; and performing the one or more vehicle functions, wherein the one or more vehicle functions is at least one of activating vehicle head-lights, activating vehicle fog lights, changing a brake system mode, changing a steering system mode, changing a setting of collision avoidance system, changing a setting of an automatic response system, activating a traffic sign translation system, activating an automobile controller, and deactivating multimedia and infotainment systems within the vehicle.

Aspects of the method above include: wherein the instrument display comprises at least one of a configurable dash display and a heads-up display; wherein the alert is selected from one or more preconfigured environmental condition alerts, and wherein the one or more preconfigured environmental condition alerts comprise one or more of a maximum safe speed to drive, a recommended speed to drive, a fog warning, an ice warning, a snow warning, a water on road warning, an object in road warning, a flood warning, and a high wind warning.

Aspects of the method above include wherein changing the braking mode includes changing the function of brakes of the vehicle based on the predetermined environmental condition; wherein changing the steering mode includes changing the responsiveness of a steering system of the vehicle based on the predetermined environmental condition; wherein changing the setting of collision avoidance system comprises selecting a collision avoidance system setting associated with the predetermined environmental condition; wherein changing the setting of an automatic response system comprises selecting a automatic response system setting associated with the predetermined environmental condition; and wherein activating the automobile controller comprises the vehicle control system controlling the vehicle and bringing the vehicle to a stop in a safe location.

Aspects of the method above include: wherein the plurality of sensing elements includes sensors associated with the vehicle, non-vehicle sensors, information from communication networks, and information from a communication device; wherein sensors associated with the vehicle include one or more of optical sensors, light sensors, photo sensors, inductive sensors, infra-red sensors, thermometers, moisture sensors, wind sensors, wheel state sensors, force sensors, capacitive sensors, laser-based sensors, radar, lidar, ladar, acoustic-type sensors, and a communications module; and wherein non-vehicle sensors include one or more of sensors located: in a road, adjacent to the road; and in a plurality of other vehicles.

Aspects of the method above include: wherein the vehicle is privately owned and is not operated by a government; and wherein performing one or more vehicle functions comprises at least one of changing a sensitivity of the steering system, changing a response time of the brake system, and limiting a range of motion of a steering wheel.

Aspects of the method above further comprise activating a traffic sign translation module and displaying traffic sign information on at least one of a configurable dash display and a heads-up display.

Aspects of the method above include wherein the interpreting further comprises referring to the rules and templates in the memory of the vehicle control system, and wherein rules and templates define a plurality of signal conditions corresponding to the plurality of predetermined environmental conditions.

Aspects of the method above further comprise: sending the alert to a communication device associated with a user, wherein the user is not located in the vehicle, and wherein the communication device is one of a cell phone, a laptop computer, a tablet computer, and a personal digital assistant; modifying, by the user, at least one of the rules and templates in the memory of the vehicle control system using the communication device; determining, by the microprocessor executable vehicle environment module, a new determined severity of the predetermined environmental condition using one or more of the modified rules and templates; determining, by the microprocessor executable vehicle environment module, if control of one or more additional vehicle functions is required based on the new determined severity; and performing the one or more additional vehicle functions.

Aspects of the above method further comprise: determining an identity of a driver of the vehicle; accessing, by the microprocessor executable vehicle environment module, rules and templates associated with the identified driver; interpreting, by the microprocessor executable vehicle environment module, the one or more signals based at least partially on the rules and templates associated with the identified driver to determine if at least one predetermined environmental condition exists; determining, by the microprocessor executable vehicle environment module, the severity of the predetermined environmental condition using the rules and templates associated with the identified driver; determining, by the microprocessor executable vehicle environment module, if control of one or more vehicle functions is required based on the determined severity; displaying the alert on the instrument display of the vehicle; and performing the one or more vehicle functions.

Aspects of the method above further include wherein the identified driver is less than 16 years old and the rules prohibit the identified driver from operating the vehicle at night; wherein the rules prohibit the identified driver from operating the vehicle in a low traction condition associated with one or more of ice and snow on a road surface.

Embodiments include a non-transitory computer readable medium having instructions stored thereon that, when executed by a processor, perform operations comprising the above methods. Embodiments include a device, means, and/or system configured to perform the above methods.

Embodiments include a vehicle control system of a vehicle, comprising: a memory; and a microprocessor in communication with the memory, the microprocessor operable to: receive one or more signals from a plurality of sensing elements respecting an environment external to the vehicle; interpret the one or more signals to determine if at least one predetermined environmental condition exists; determine that the predetermined environmental condition exists; determine a severity of the predetermined environmental condition using one or more of rules and templates in a memory of the vehicle control system; determine if control of one or more vehicle functions is required based on the determined severity; display an alert on an instrument display of the vehicle; and perform the one or more vehicle functions, wherein the one or more vehicle functions is at least one of activating vehicle head-lights, activating vehicle fog lights, changing a brake system mode, changing a steering system mode, changing a setting of collision avoidance system, changing a setting of an automatic response system, activating a traffic sign translation system, activating an automobile controller, and deactivating multimedia and infotainment systems within the vehicle.

Aspects of the above system include: wherein the plurality of sensing elements includes sensors associated with the vehicle, non-vehicle sensors, information from communication networks, and information from a communication device; wherein sensors associated with the vehicle include one or more of optical sensors, light sensors, photo sensors, inductive sensors, infra-red sensors, thermometers, moisture sensors, wind sensors, wheel state sensors, force sensors, capacitive sensors, laser-based sensors, radar, lidar, ladar, acoustic-type sensors, and a communications module; and wherein non-vehicle sensors include one or more of sensors located: in a road, adjacent to the road; and in a plurality of other vehicles.

Aspects of the above system include: wherein changing the braking mode includes changing the function of brakes of the vehicle based on the predetermined environmental condition; wherein changing the steering mode includes changing the responsiveness of a steering system of the vehicle based on the predetermined environmental condition; wherein changing the setting of collision avoidance system comprises selecting a collision avoidance system setting associated with the predetermined environmental condition; wherein changing the setting of an automatic response system comprises selecting a automatic response system setting associated with the predetermined environmental condition; and wherein activating the automobile controller comprises the vehicle control system controlling the vehicle and bringing the vehicle to a stop in a safe location.

Aspects of the above system include: wherein the plurality of sensing elements includes sensors associated with the vehicle, non-vehicle sensors, information from communication networks, and information from a communication device; wherein sensors associated with the vehicle include one or more of optical sensors, light sensors, photo sensors, inductive sensors, infra-red sensors, thermometers, moisture sensors, wind sensors, wheel state sensors, force sensors, capacitive sensors, laser-based sensors, radar, lidar, ladar, acoustic-type sensors, and a communications module; wherein non-vehicle sensors include one or more of sensors located: in a road, adjacent to the road; and in a plurality of other vehicles; and wherein the vehicle is privately owned and is not operated by a government.

Aspect of the above system include: wherein performing one or more vehicle functions comprises at least one of changing a sensitivity of the steering system, changing a response time of the brake system, and limiting a range of motion of a steering wheel; and wherein the interpreting further comprises referring to the rules and templates in the memory of the vehicle control system, and wherein rules and templates define a plurality of signal conditions corresponding to the plurality of predetermined environmental conditions.

Aspects of the above system further comprise the microprocessor operable to activate a traffic sign translation module and displaying traffic sign information on at least one of a configurable dash display and a heads-up display.

Aspects of the above system further comprise the microprocessor operable to: modify at least one of the rules and templates in the memory of the vehicle control system using the communication device, wherein the user is not located in the vehicle, and wherein the communication device is one of a cell phone, a laptop computer, a tablet computer, and a personal digital assistant; determine a new severity of the predetermined environmental condition using one or more of the modified rules and templates; determine if control of one or more additional vehicle functions is required based on the new severity and the modified rules and templates; and perform the one or more additional vehicle functions.

Aspects of the above system further comprise the microprocessor operable to: determine an identity of the driver of the vehicle; access rules and templates associated with the identified driver; interpret the one or more signals based at least partially on the rules and templates associated with the identified driver to determine if at least one predetermined environmental condition exists; determine the severity of the predetermined environmental condition using the rules and templates associated with the identified driver; determine if control of one or more vehicle functions is required based on the severity and the rules and the templates associated with the identified driver; display the alert on the instrument display of the vehicle and the communication device associated with the user; and perform the one or more vehicle functions.

Aspect of the above system include: wherein the identified driver is less than 16 years old and the rules prohibit the identified driver from operating the vehicle at night; and wherein the rules prohibit the identified driver from operating the vehicle in a low traction condition associated with one or more of ice and snow on a road surface.

Embodiments include a method, comprising: determining, by a microprocessor executable fee area module, that a vehicle is approaching a fee area; retrieving, by the microprocessor executable fee area module, rules associated with the fee area, wherein the fee area comprises one of a toll road, a high occupancy vehicle road, a park, a vehicle ferry, and a parking area; determining, by the microprocessor executable fee area module, a fee required for the vehicle to enter the fee area based on the rules; displaying an alert on an instrument display of the vehicle, wherein the instrument display comprises at least one of a configurable dash display and a heads-up display; accessing, by a microprocessor executable payment module, a payment profile for the vehicle; connecting to a server of the fee area; and sending, by the microprocessor executable payment module, instructions to the server of the fee area to pay the fee required.

Aspects of the above method include: wherein the fee area is one of the toll road, the high occupancy vehicle road, and the vehicle ferry; and wherein the rules associated with the fee area comprise one or more of a rate charged per mile, a rate charged per unit of time, a rate based on a number of occupants in the vehicle, a rate based on a weight of the vehicle, a rate based on a number of axles of the vehicle, a rate based on an emission level of the vehicle, a rate based on a time of the day, and a rate based on a congestion level of the fee area; and wherein the rules associated with the fee area are retrieved from one or more of a communications device, a cloud, another vehicle, and the server of the fee area.

Aspects of the above method include: wherein the connection to the server of the fee area is at least partially encrypted; wherein sending instructions to the server of the fee area to pay the fee further comprises creating, by the microprocessor executable payment module, a payment account with the server of the pay area; wherein the payment account is associated with the vehicle; and wherein in response to sending instructions to the server of the fee area to pay the fee required, receiving, by the microprocessor executable payment module, a confirmation of access into the fee area; and wherein the payment profile of the vehicle includes at least one of a credit card number, a debit card number, a bank account number, and a payment account number associated with the fee area.

Aspects of the above method include: wherein the fee area is the high occupancy vehicle road, wherein the rules require a minimum number of occupants to be inside the vehicle to drive in the high occupancy vehicle road to avoid paying a penalty, and wherein the method further comprises: determining, by the microprocessor executable fee area module, a number of occupants in the vehicle; determining, by the microprocessor executable fee area module, a fee required for the vehicle to enter the high occupancy vehicle road based on the number of occupants in the vehicle, wherein the fee includes the penalty if less than the required minimum number of occupants are in the vehicle; and sending, by the microprocessor executable payment module, the number of occupants in the vehicle and instructions to the server of the fee area to pay the fee required.

Aspects of the method above further comprise: determining, by the microprocessor executable fee area module, an identity of a driver of the vehicle, wherein determining the identity of the driver further comprises: identifying facial features associated with the driver detected via at least one image sensor; and determining whether the identified facial features associated with the driver match user characteristics stored in a memory.

Aspects of the method above further comprise: wherein the identified facial features associated with the driver do not match the user characteristics stored in the memory, and wherein determining the identity of the driver further comprises: prompting the driver for identification information; receiving identification information from the driver; and storing the identification information received from the driver in the memory.

Aspects of the method above further include wherein the identified facial features associated with the driver match the user characteristics stored in the memory, and wherein the payment profile is retrieved from a profile associated with the identified driver.

Aspects of the method above further comprise sending an alert to a communication device of an owner of the vehicle. Aspects of the method above further comprise determining, by the microprocessor executable fee area module, one or more alternate routes to a destination of the vehicle; determining, by the microprocessor executable fee area module, a cost of using each of the one or more alternate routes to the destination; and displaying, by the microprocessor executable fee area module, the cost of using each of the one or more alternate routes to the destination in the alert.

Embodiments include a non-transitory computer readable medium having instructions stored thereon that, when executed by a processor, perform operations comprising the above methods. Embodiments include a device, means, and/or system configured to perform the above methods.

Embodiments include a vehicle control system of a vehicle, comprising: a memory; and a microprocessor in communication with the memory, the microprocessor operable to: determine that a vehicle is approaching a fee area; retrieve rules associated with the fee area, wherein the fee area comprises one of a toll road, a high occupancy vehicle road, a park, a vehicle ferry, and a parking area; determine a fee required for the vehicle to enter the fee area based on the rules; display an alert on an instrument display of the vehicle, wherein the instrument display comprises at least one of a configurable dash display and a heads-up display; access a payment profile for the vehicle; connect to a server of the fee area; and send instructions to the server of the fee area to pay the fee required.

Aspects of the system above include wherein the microprocessor is further operable to: determine if a discount applies to the vehicle, wherein the discount comprises one or more of a senior discount, a handicapped driver discount, a frequent user discount, a fuel-efficiency discount, and a discount based on a number of people in the vehicle; determine one or more alternate routes to a destination of the vehicle; determine a cost of using each of the one or more alternate routes to the destination; display the cost of using each of the one or more alternate routes to the destination in the alert; and send an alert to a communication device of an owner of the vehicle, wherein the owner is not located within the vehicle.

Aspects of the system above include: wherein the fee area is one of the toll road, the high occupancy vehicle road, and the vehicle ferry; wherein the rules associated with the fee area comprise one or more of a rate charged per mile, a rate charged per unit of time, a rate based on a number of occupants in the vehicle, a rate based on a weight of the vehicle, a rate based on a number of axles of the vehicle, a rate based on an emission level of the vehicle, a rate based on a time of the day, and a rate based on a congestion level of the fee area; wherein the rules associated with the fee area are retrieved from one or more of a communications device, a cloud, another vehicle, and the server of the fee area; wherein the connection to the server of the fee area is at least partially encrypted; wherein sending instructions to the server of the fee area to pay the fee further comprises creating a payment account with the server of the pay area; and wherein, in response to sending instructions to the server of the fee area to pay the fee required, receiving a confirmation of access into the fee area.

Aspects of the system above include wherein the fee area is the high occupancy vehicle road, wherein the rules require a minimum number of occupants to be inside the vehicle to drive in the high occupancy vehicle road to avoid paying a penalty, and the micro-processor further operable to: determine a number of occupants in the vehicle; determine a fee required for the vehicle to enter the high occupancy vehicle road based on the number of occupants in the vehicle, wherein the fee includes the penalty if less than the required minimum number of occupants are in the vehicle; and sending the number of occupants in the vehicle and instructions to the server of the fee area to pay the fee required.

Aspects of the system above include the micro-processor further operable to: determine an identity of a driver of the vehicle, wherein determining the identity of the driver further comprises: identifying facial features associated with the driver detected via at least one image sensor; and determine whether the identified facial features associated with the driver match user characteristics stored in a memory.

Aspects of the system above include wherein the identified facial features associated with the driver do not match the user characteristics stored in the memory, and wherein determining the identity of the driver further comprises to microprocessor operable to: prompt the driver for identification information; receive identification information from the driver; and store the identification information received from the driver in the memory.

Aspects of the system above include: wherein the identified facial features associated with the driver match the user characteristics stored in the memory; and wherein the payment profile is retrieved from a profile associated with the identified driver.

Aspects of the system above include the micro-processor further operable to: send an alert to a communication device of an owner of the vehicle, wherein the owner is not located within the vehicle; determine one or more alternate routes to a destination of the vehicle; determine a cost of using each of the one or more alternate routes to the destination; and display the cost of using each of the one or more alternate routes to the destination in the alert.

Aspects of the system above include the micro-processor further operable to: determine if a discount applies to the vehicle, wherein the discount comprises one or more of a senior discount, a handicapped driver discount, a frequent user discount, a fuel-efficiency discount, and a discount based on a number of people in the vehicle.

Embodiments include a method, comprising: connecting, by a microprocessor executable destination coordination module of a first vehicle, to one or more devices, wherein the devices are at least one of: (a) in a different second vehicle; and (b) carried by a person not in the first vehicle; determining, by the microprocessor executable destination coordination module, a common destination for the first vehicle and the one or more devices; receiving, by the microprocessor executable destination coordination module, position information from each of the one or more devices; generating, by the microprocessor executable destination coordination module, directions to the common destination for each of the one or more devices; and sending the directions to each of the one or more devices.

Aspects of the above method further comprise: determining, by the microprocessor executable destination coordination module, that at least one of the one or more devices is travelling to an incorrect destination; and sending an alert and directions to the correct destination to the at least one of the one or more devices.

Aspects of the above method include wherein determining the common destination comprises receiving an input from a user in the first vehicle, wherein the input comprises one of: entering the common destination in a vehicle navigation system; entering the common destination in a communication device in communication with the vehicle; and describing the common destination in one of a text message, an email message, and a phone conversation addressed to the one or more devices.

Aspects of the above method further comprise: receiving, by the microprocessor executable destination coordination module, updated position information from at least one of the one or more devices; and comparing, by the microprocessor executable destination coordination module, the updated position information of the at least one of the one or more devices to the common destination; generating, by the microprocessor executable destination coordination module, updated directions to the common destination for the least one of the one or more devices; and sending the updated directions to the least one of the one or more devices.

Aspects of the above method include: wherein the updated directions comprise spoken directions that are updated as the at least one of the one or more devices travels to the common destination; wherein the one or more devices comprise one or more of a communication device, a smart phone, a laptop, and a vehicle control system of the second vehicle.

Aspects of the above method further comprise: determining, by the microprocessor executable destination coordination module, a presence of a user inside the first vehicle, wherein determining the presence of the user inside the first vehicle further comprises detecting the user via at least one image sensor associated with the first vehicle; determining an identity of the user, wherein determining the identity of the user further comprises: identifying facial features associated with the user detected via the at least one image sensor; and determining whether the identified facial features associated with the user match user characteristics stored in a memory.

Aspects of the above method include: wherein the identified facial features associated with the user do not match the user characteristics stored in the memory, and wherein determining the identity of the user further comprises: prompting the user for identification information; receiving identification information from the user; and storing the identification information received from the user in the memory.

Aspects of the above method include: wherein determining the identity of the user further comprises detecting a device associated with the user in the vehicle.

Aspects of the above method include wherein the common destination is a location of one of the communication device, the smart phone, the laptop, and the second vehicle. Aspects of the above method include wherein the common destination is a location of the first vehicle.

Embodiments include a non-transitory computer readable medium having instructions stored thereon that, when executed by a processor, perform operations comprising the above methods. Embodiments include a device, means, and/or system configured to perform the above methods.

Embodiments include a vehicle control system of a vehicle, comprising: a memory; and a microprocessor in communication with the memory, the microprocessor operable to: connect to one or more devices, wherein the devices are at least one of (a) in a different second vehicle and (b) carried by a person not in the vehicle; determine a common destination for the vehicle and the one or more devices; receive position information from each of the one or more devices; generate directions to the common destination for each of the one or more devices; and send the directions to each of the one or more devices.

Aspects of the system above further comprise the microprocessor operable to determine that at least one of the one or more devices is travelling to an incorrect destination; and send an alert and directions to the correct destination to the at least one of the one or more devices.

Aspects of the system above further comprise the microprocessor operable to receive updated position information from at least one of the one or more devices; generate updated directions to the common destination for the least one of the one or more devices; send the updated directions to the least one of the one or more devices; and compare the updated position information of the at least one of the one or more devices to the common destination.

Aspects of the system above include wherein the one or more devices comprise one or more of a communication device, a smart phone, a laptop, and a vehicle control system of the second vehicle; and wherein the common destination is a location of one of the communication device, the smart phone, the laptop, the vehicle, and the second different vehicle.

Aspects of the system above further comprise the microprocessor operable to: generate updated directions to the common destination for the least one of the one or more devices; and send the updated directions to the least one of the one or more devices.

Aspects of the system above include: wherein the updated directions comprise spoken directions that are updated as the at least one of the one or more devices travels to the common destination; and wherein the one or more devices comprise one or more of a communication device, a smart phone, a laptop, and a vehicle control system of a second vehicle.

Aspects of the system above further comprise the microprocessor operable to: determine a presence of a user inside the first vehicle, wherein determining the presence of the user inside the first vehicle further comprises detecting the user via at least one image sensor associated with the first vehicle; determine an identity of the user, wherein determining the identity of the user further comprises: identifying facial features associated with the user detected via the at least one image sensor; and determine whether the identified facial features associated with the user match user characteristics stored in a memory.

Aspects of the system above include: wherein the identified facial features associated with the user do not match the user characteristics stored in the memory, and wherein determining the identity of the user further comprises: prompting the user for identification information; receiving identification information from the user; and storing the identification information received from the user in the memory.

Aspects of the system above include wherein determining the identity of the user further comprises detecting a device associated with the user in the vehicle.

Aspects of the above system include wherein the common destination is a location of one of the communication device, the smart phone, the laptop, and the second vehicle. Aspects of the above method include wherein the common destination is a location of the first vehicle.

The present disclosure can provide a number of advantages depending on the particular aspect, embodiment, and/or configuration. One advantage includes providing user profiles with settings, configurations, and information associated with a user. The settings can be transferred by a user from vehicle-to-vehicle, from communication device-to-communication device, from building-to-vehicle, vehicle-to-building, and/or combinations thereof. The profiles can serves as a repository for user information and preferences. The profiles can be used to configure settings of a home automation system associated with the user and devices controlled thereby. The profiles can also be used by the vehicle to determine when to initiate a connection to a home automation system to receive information about occupants in the home and the settings of the home automation system and features thereof.

Another advantage includes a system that can determine the location of the vehicle and configure a vehicle dash and/or other displays of the vehicle to present instruments and information in a form and language required in the location where the vehicle is located. This can include adding, removing, and rearranging instruments on one or more vehicle displays. The system can also provide alerts to a driver or other users about different traffic laws that apply where the vehicle is located. The alerts can include warnings, and/or control of vehicle functions, when the vehicle determines that the vehicle is not operated in accordance with the traffic laws.

Yet another advantage is a system that can monitor quality, performance, and capabilities of communications networks. The system can determine interruptions, coverage gaps, and rate changes of communications systems and determine other available and accessible communication networks. The system can provide alerts to a user and provide recommendations on efficient use of communications networks. Additionally, accessible and available communication networks can be ranked based at least partially on rules and the system can select an alternate communication network either automatically or after receiving a user selection.

Further advantages include a system that monitors the operating environment of the vehicle. The system can determine the presence of one or more environmental conditions and provide alerts to the driver and other users. Additionally, the system can characterize the severity of the environmental condition and determine a response. Based at least in part on the environmental condition and the severity of the condition, the system can change vehicle settings and may activate or deactivate one or more vehicle features. Further, the system can reassess the severity of the condition based at least in part on the driver's response and take further control measures, including taking control of the vehicle's steering system and engine to bring the vehicle to a stop in a safe location.

Still another advantage includes a system that can automatically pay fees associated with a fee area, including toll roads, high occupancy vehicle lanes or roads, parking, and the like. The system can determine required fees and connect to computer systems associated with the fee areas. Alerts can be provided to the user regarding the presence of the fee area and potential alternate routes to avoid the fee area. The system can also locate, reserve, and pay for vehicle parking based at least in part on preferences of the user.

Additional advantages include a system that can coordinate the arrival of one or more users travelling separately to a common destination. The system can send alerts to users that are determined to be travelling to an incorrect destination. The alert can include instructions and directions to reach the common destination. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "automotive navigation system" can refer to a satellite navigation system designed for use in vehicles. It typically uses a GPS navigation device to acquire position data to locate the user on a road in the unit's map database. Using the road database, the unit can give directions to other locations along roads also in its database. Dead reckoning using distance data from sensors attached to the drivetrain, a gyroscope and an accelerometer can be used for greater reliability, as GPS signal loss and/or multipath can occur due to urban canyons or tunnels.

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The terms "communication device," "smartphone," and "mobile device," and variations thereof, as used herein, can be used interchangeably and may include any type of device capable of communicating with one or more of another device and/or across a communications network, via a communications protocol, and the like. Exemplary communication devices may include but are not limited to smartphones, handheld computers, laptops, netbooks, notebook computers, sub-notebooks, tablet computers, scanners, portable gaming devices, phones, pagers, GPS modules, portable music players, and other Internet-enabled and/or network-connected devices.

A "communication modality" can refer to any protocol- or standard defined or specific communication session or interaction, such as Voice-Over-Internet-Protocol ("VoIP), cellular communications (e.g., IS-95, 1G, 2G, 3G, 3.5G, 4G, 4G/IMT-Advanced standards, 3GPP, WIMAX™, GSM, CDMA, CDMA2000, EDGE, 1xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The terms dash and dashboard and variations thereof, as used herein, may be used interchangeably and can be any panel and/or area of a vehicle disposed adjacent to an operator, user, and/or passenger. Dashboards may include, but are not limited to, one or more control panel(s), instrument housing(s), head unit(s), indicator(s), gauge(s), meter(s), light(s), audio equipment, computer(s), screen(s), display(s), HUD unit(s), and graphical user interface(s).

The term "module" as used herein refers to any known or later developed hardware, software, firmware, artificial intelligence, fuzzy logic, or combination of hardware and software that is capable of performing the functionality associated with that element.

The term "desktop" refers to a metaphor used to portray systems. A desktop is generally considered a "surface" that may include pictures, called icons, widgets, folders, etc. that can activate and/or show applications, windows, cabinets, files, folders, documents, and other graphical items. The icons are generally selectable to initiate a task through user interface interaction to allow a user to execute applications and/or conduct other operations.

The term "display" refers to a portion of a physical screen used to display the output of a computer to a user.

The term "displayed image" refers to an image produced on the display. A typical displayed image is a window or desktop. The displayed image may occupy all or a portion of the display.

The term "display orientation" refers to the way in which a rectangular display is oriented for viewing. The two most common types of display orientations are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. A multi-screen display can have one composite display that encompasses all the screens. The composite display can have different display characteristics based on the various orientations of the device.

The term "electronic address" can refer to any contactable address, including a telephone number, instant message handle, e-mail address, Uniform Resource Locator ("URL"), Global Universal Identifier ("GUID"), Universal Resource Identifier ("URI"), Address of Record ("AOR"), electronic alias in a database, etc., combinations thereof.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can be received by sensors in three-dimensional space. Further, the gesture capture can occur in one or more areas of a screen, for example, on a touch-sensitive display or a gesture capture region. A gesture region can be on the display, where it may be referred to as a touch sensitive display, or off the display, where it may be referred to as a gesture capture area.

The terms "infotainment" and "infotainment system" may be used interchangeably and can refer to the hardware/software products, data, content, information, and/or systems, which can be built into or added to vehicles to enhance driver and/or passenger experience. Infotainment may provide media and/or multimedia content. An example is information-based media content or programming that also includes entertainment content.

A "multi-screen application" refers to an application that is capable of producing one or more windows that may simultaneously occupy one or more screens. A multi-screen application commonly can operate in single-screen mode in which one or more windows of the application are displayed only on one screen or in multi-screen mode in which one or more windows are displayed simultaneously on multiple screens.

A "single-screen application" refers to an application that is capable of producing one or more windows that may occupy only a single screen at a time.

The terms "online community," "e-community," or "virtual community" can mean a group of people that interact via a computer network, for social, professional, educational, and/or other purposes. The interaction can use a variety of media formats, including wilds, blogs, chat rooms, Internet forums, instant messaging, email, and other forms of electronic media. Many media formats may be used in social software separately and/or in combination, including text-based chat rooms and forums that use voice, video text or avatars.

The term "satellite positioning system receiver" can refer to a wireless receiver or transceiver to receive and/or send location signals from and/or to a satellite positioning system (SPS), such as the Global Positioning System ("GPS") (US), GLONASS (Russia), Galileo positioning system (EU), Compass navigation system (China), and Regional Navigational Satellite System (India).

The term "social network service" may include a service provider that builds online communities of people, who share interests and/or activities, or who are interested in exploring the interests and/or activities of others. Social network services can be network-based and may provide a variety of ways for users to interact, such as e-mail and instant messaging services.

The term "social network" can refer to a network-based social network.

The term "screen," "touch screen," "touchscreen," or "touch-sensitive display" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop. The dimensions and orientation of the window may be configurable either by another module or by a user. When the window is expanded, the window can occupy substantially all of the display space on a screen or screens.

The terms "determine," "calculate," and "compute," and variations thereof, as used herein, are used interchangeably and include any type of methodology, process, mathematical operation, or technique.

It shall be understood that the term "means," as used herein, shall be given its broadest possible interpretation in accordance with 35 U.S.C., Section 112, Paragraph 6 or other applicable law. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The terms "vehicle," "car," "automobile," and variations thereof may be used interchangeably herein and can refer to a device or structure for transporting animate and/or inanimate or tangible objects (e.g., persons and/or things), such as a self-propelled conveyance. A vehicle as used herein can include any conveyance or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The term "profile," as used herein, can refer to any data structure, data store, and/or database that includes one or more items of information associated with a vehicle, a vehicle system, a device (e.g., a mobile device, laptop, mobile phone, etc.), or a person.

The term "in communication with," as used herein, refers to any coupling, connection, or interaction using electrical signals to exchange information or data, using any system, hardware, software, protocol, or format, regardless of whether the exchange occurs wirelessly or over a wired connection.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 5A is a first block diagram of an embodiment of a vehicle interior environment separated into areas and/or zones;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference letter or label.

DETAILED DESCRIPTION

Presented herein are embodiments of systems, devices, processes, data structures, user interfaces, etc. The embodiments may relate to an automobile and/or an automobile environment. The automobile environment can include systems associated with the automobile and devices or other systems in communication with the automobile and/or automobile systems. Furthermore, the systems can relate to communications systems and/or devices and may be capable of communicating with other devices and/or to an individual or group of individuals. Further, the systems can receive user input in unique ways. The overall design and functionality of the systems provide for an enhanced user experience making the automobile more useful and more efficient. As described herein, the automobile systems may be electrical, mechanical, electro-mechanical, software-based, and/or combinations thereof.

Figure 1:
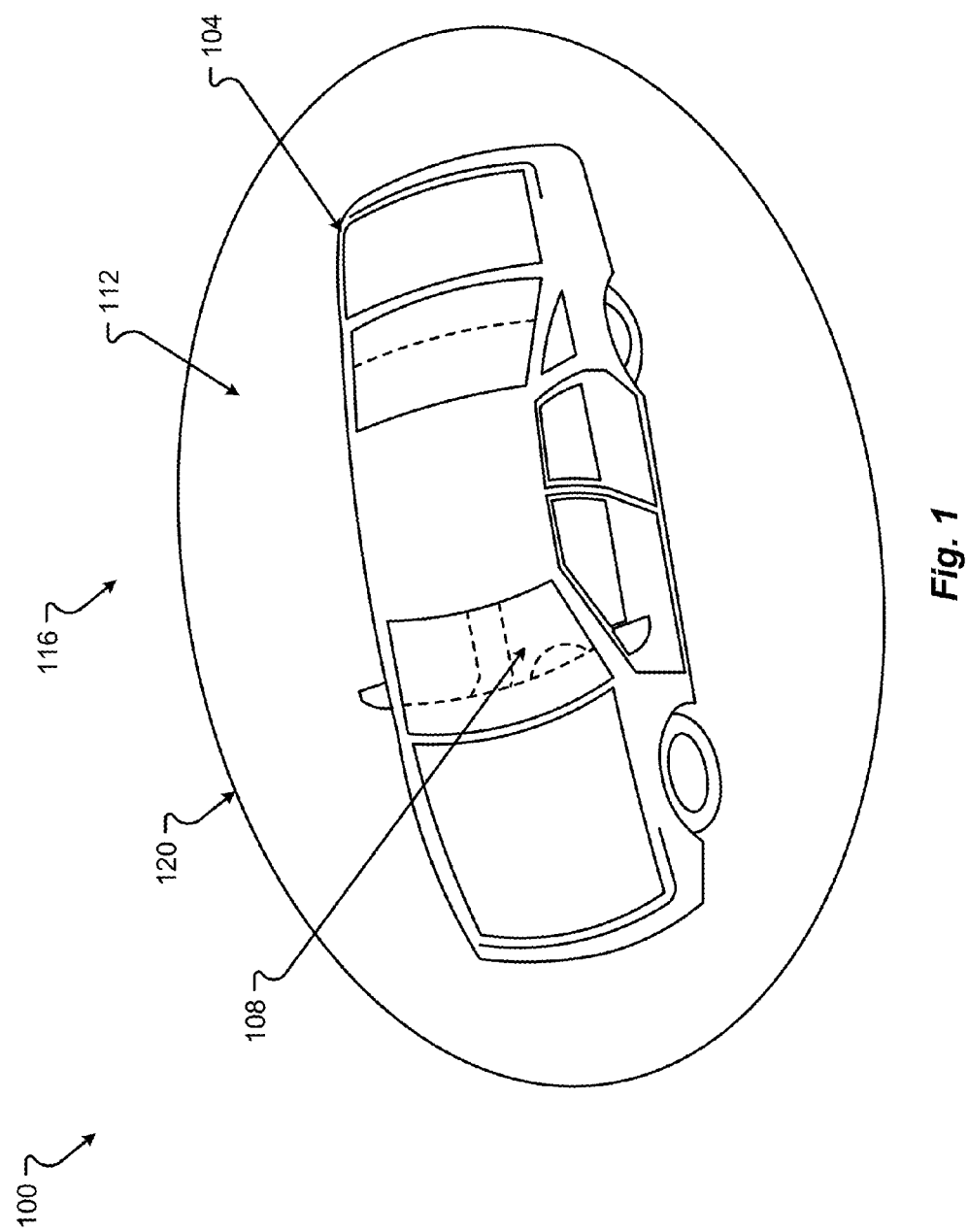
FIG. 1 depicts an embodiment of a vehicle operating environment.

A vehicle environment 100 that may contain a vehicle ecosystem is shown in FIG. 1. The vehicle environment 100 can contain areas associated with a vehicle or conveyance 104. The vehicle 104 is shown as a car but can be any type of conveyance. The environment 100 can include at least three zones. A first zone 108 may be inside a vehicle 104. The zone 108 includes any interior space, trunk space, engine compartment, or other associated space within or associated with the vehicle 104. The interior zone 108 can be defined by one or more techniques, for example, geo-fencing.

A second zone 112 may be delineated by line 120. The zone 112 is created by a range of one or more sensors associated with the vehicle 104. Thus, the area 112 is exemplary of the range of those sensors and what can be detected by those sensors associated with the vehicle 104. Although sensor range is shown as a fixed and continuous oval, the sensor range may be dynamic and/or discontinuous. For example, a ranging sensor (e.g., radar, lidar, ladar, etc.) may provide a variable range depending on output power, signal characteristics, or environmental conditions (e.g., rain, fog, clear, etc.). The rest of the environment includes all space beyond the range of the sensors and is represented by space 116. Thus, the environment 100 may have an area 116 that includes all areas beyond the sensor range 112. The area 116 may include locations of travel that the vehicle 104 may proceed to in the future.

Figure 2:
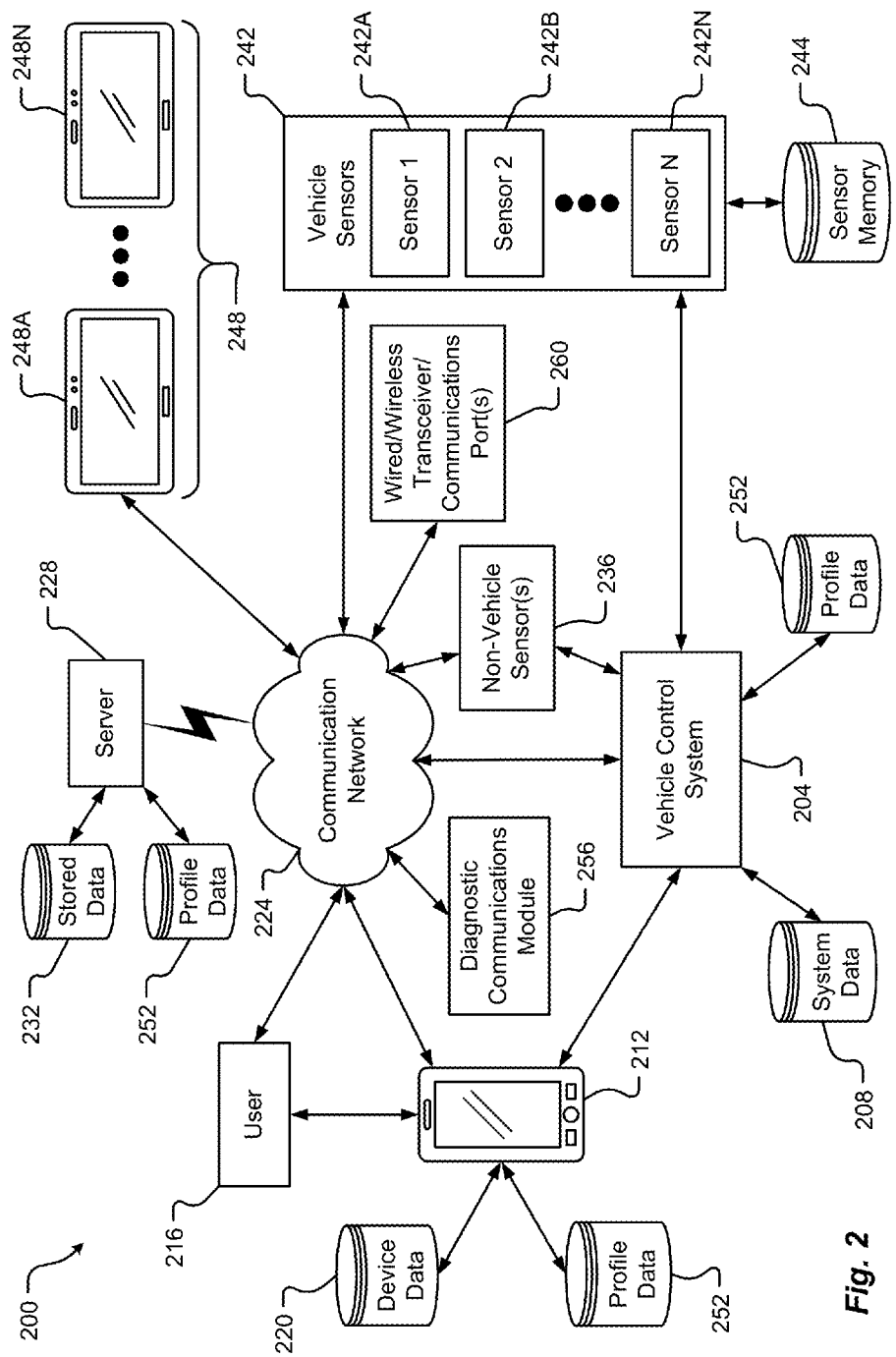
FIG. 2 is a block diagram of an embodiment of a vehicle system.

An embodiment of a vehicle system 200 is shown in FIG. 2. The vehicle system 200 may comprise hardware and/or software that conduct various operations for or with the vehicle 104. The operations can include, but are not limited to, providing information to the user 216, receiving input from the user 216, and controlling the functions or operation of the vehicle 104, etc. The vehicle system 200 can include a vehicle control system 204. The vehicle control system 204 can be any type of computing system operable to conduct the operations as described herein. An example of a vehicle control system may be as described in conjunction with FIG. 3.

The vehicle control system 204 may interact with a memory or storage system 208 that stores system data. System data 208 may be any type of data needed for the vehicle control system 204 to control effectively the vehicle 104. The system data 208 can represent any type of database or other storage system. Thus, the system data 208 can be a flat file data system, an object-oriented data system, or some other data system that may interface with the vehicle control system 204.

The vehicle control system 204 may communicate with a device or user interface 212, 248. The user interface 212, 248 may be operable to receive user input either through touch input, on one or more user interface buttons, via voice command, via one or more image sensors, or through a graphical user interface that may include a gesture capture region, as described in conjunction with the other figures provided herein. Further, the symbol 212, 248 can represent a device that is located or associated with the vehicle 104. The device 212, 248 can be a mobile device, including, but not limited to, a mobile telephone, a mobile computer, or other type of computing system or device that is either permanently located in or temporarily associated with, but not necessarily connected to, the vehicle 104. Thus, the vehicle control system 204 can interface with the device 212, 248 and leverage the device's computing capability to provide one or more of the features or functions as described herein.

The device or user interface 212, 248 can receive input or provide information to a user 216. The user 216 may thus interact with the vehicle control system 204 through the interface or device 212, 248. Further, the device 212, 248 may include or have access to device data 220 and/or profile data 252. The device data 220 can be any type of data that is used in conjunction with the device 212, 248 including, but not limited to, multimedia data, preferences data, device identification information, or other types of data. The profile data 252 can be any type of data associated with at least one user 216 including, but in no way limited to, bioinformatics, medical information, driving history, personal information (e.g., home physical address, business physical address, contact addresses, likes, dislikes, hobbies, size, weight, occupation, business contacts—including physical and/or electronic addresses, personal contacts—including physical and/or electronic addresses, family members, and personal information related thereto, etc.), other user characteristics, advertising information, user settings and feature preferences, travel information, associated vehicle preferences, communication preferences, historical information (e.g., including historical, current, and/or future travel destinations), Internet browsing history, or other types of data. In any event, the data may be stored as device data 220 and/or profile data 252 in a storage system similar to that described in conjunction with FIGS. 12A through 12D.

As an example, the profile data 252 may include one or more user profiles. User profiles may be generated based on data gathered from one or more of vehicle preferences (e.g., seat settings, HVAC settings, dash configurations, and the like), recorded settings, geographic location information (e.g., provided by a satellite positioning system (e.g., GPS), Wi-Fi hotspot, cell tower data, etc.), mobile device information (such as mobile device electronic addresses, Internet browsing history and content, application store selections, user settings and enabled and disabled features, and the like), private information (such as user information from a social network, user presence information, user business account, and the like), secure data, biometric information, audio information from on board microphones, video information from on board cameras, Internet browsing history and browsed content using an on board computer and/or the local area network enabled by the vehicle 104, geographic location information (e.g., a vendor storefront, roadway name, city name, etc.), and the like.

The profile data 252 may include one or more user accounts. User accounts may include access and permissions to one or more settings and/or feature preferences associated with the vehicle 104, communications, infotainment, content, etc. In one example, a user account may allow access to certain settings for a particular user, while another user account may deny access to the settings for another user, and vice versa. The access controlled by the user account may be based on at least one of a user account priority, role, permission, age, family status, a group priority (e.g., the user account priority of one or more users, etc.), a group age (e.g., the average age of users in the group, a minimum age of the users in the group, a maximum age of the users in the group, and/or combinations thereof, etc.).

For example, a user 216 may be allowed to purchase applications (e.g., software, etc.) for the vehicle 104 and/or a device associated with the vehicle 104 based on information associated with the user account. This user account information may include a preferred payment method, permissions, and/or other account information. As provided herein, the user account information may be part of the user profile and/or other data stored in the profile data 252.

As another example, an adult user (e.g., a user with an age of 18 years old and/or over, etc.) may be located in an area of a vehicle 104, such as a rear passenger area. Continuing this example a child user (e.g., a user with an age of 17 years old and/or less, etc.) may be located in the same, or close, area. In this example, the user account information in the profile data 252 associated with both the adult user and the child user may be used by the vehicle 104 in determining whether content is appropriate for the area given the age of the child user. For instance, a graphic movie containing violence (e.g., a movie associated with a mature rating, such as a Motion Picture Association of America (MPAA) rating of "R," "NC-17," etc.) may be suitable to present to a display device associated with the adult user but may not be acceptable to present to the display device if a 12-year old child user may see and/or hear the content of the movie.

The vehicle control system 204 may also communicate with or through a communication network 224. The communication network 224 can represent any type of wireless and/or wired communication system that may be included within the vehicle 104 or operable to communicate outside the vehicle 104. Thus, the communication network 224 can include a local area communication capability and a wide area communication capability. For example, the communication network 224 can include a Bluetooth® wireless system, an 802.11x (e.g., 802.11G/802.11N/802.11AC, or the like, wireless system), a CAN bus, an Ethernet network within the vehicle 104, or other types of communication networks that may function with or be associated with the vehicle 104. Further, the communication network 224 can also include wide area communication capabilities, including one or more of, but not limited to, a cellular communication capability, satellite telephone communication capability, a wireless wide area network communication capability, or other types of communication capabilities that allow for the vehicle control system 204 to communicate outside the vehicle 104.

The vehicle control system 204 may communicate through the communication network 224 to a server 228 that may be located in a facility that is not within physical proximity to the vehicle 104. Thus, the server 228 may represent a cloud computing system or cloud storage that allows the vehicle control system 204 to either gain access to further computing capabilities or to storage at a location outside of the vehicle 104. The server 228 can include a computer processor and memory and be similar to any computing system as understood to one skilled in the art.

Further, the server 228 may be associated with stored data 232. The stored data 232 may be stored in any system or by any method, as described in conjunction with system data 208, device data 220, and/or profile data 252. The stored data 232 can include information that may be associated with one or more users 216 or associated with one or more vehicles 104. The stored data 232, being stored in a cloud or in a distant facility, may be exchanged among vehicles 104 or may be used by a user 216 in different locations or with different vehicles 104. Additionally or alternatively, the server may be associated with profile data 252 as provided herein. It is anticipated that the profile data 252 may be accessed across the communication network 224 by one or more components of the system 200. Similar to the stored data 232, the profile data 252, being stored in a cloud or in a distant facility, may be exchanged among vehicles 104 or may be used by a user 216 in different locations or with different vehicles 104.

The vehicle control system 204 may also communicate with one or more sensors 236, 242, which are either associated with the vehicle 104 or communicate with the vehicle 104. Vehicle sensors 242 may include one or more sensors for providing information to the vehicle control system 204 that determine or provide information about the environment 100 in which the vehicle 104 is operating. Embodiments of these sensors may be as described in conjunction with FIGS. 6A-7B. Non-vehicle sensor 236 can be any type of sensor that is not currently associated with the vehicle 104. For example, non-vehicle sensor 236 can be sensors in a traffic system operated by a third party that provides data to the vehicle control system 204. Further, the non-vehicle sensor(s) 236 can be other types of sensors which provide information about the distant environment 116 or other information about the vehicle 104 or the environment 100. These non-vehicle sensors 236 may be operated by third parties but provide information to the vehicle control system 204. Examples of information provided by the sensors 236 and that may be used by the vehicle control system 204 may include weather tracking data, traffic data, user health tracking data, vehicle maintenance data, or other types of data, which may provide environmental or other data to the vehicle control system 204. The vehicle control system 204 may also perform signal processing of signals received from one or more sensors 236, 242. Such signal processing may include estimation of a measured parameter from a single sensor, such as multiple measurements of a range state parameter from the vehicle 104 to an obstacle, and/or the estimation, blending, or fusion of a measured state parameter from multiple sensors such as multiple radar sensors or a combination of a ladar/lidar range sensor and a radar sensor. Signal processing of such sensor signal measurements may comprise stochastic signal processing, adaptive signal processing, and/or other signal processing techniques known to those skilled in the art.

The various sensors 236, 242 may include one or more sensor memory 244. Embodiments of the sensor memory 244 may be configured to store data collected by the sensors 236, 242. For example, a temperature sensor may collect temperature data associated with a vehicle 104, user 216, and/or environment, over time. The temperature data may be collected incrementally, in response to a condition, or at specific time periods. In this example, as the temperature data is collected, it may be stored in the sensor memory 244. In some cases, the data may be stored along with an identification of the sensor and a collection time associated with the data. Among other things, this stored data may include multiple data points and may be used to track changes in sensor measurements over time. As can be appreciated, the sensor memory 244 can represent any type of database or other storage system.

The diagnostic communications module 256 may be configured to receive and transmit diagnostic signals and information associated with the vehicle 104. Examples of diagnostics signals and information may include, but is in no way limited to, vehicle system warnings, sensor data, vehicle component status, service information, component health, maintenance alerts, recall notifications, predictive analysis, and the like. Embodiments of the diagnostic communications module 256 may handle warning/error signals in a predetermined manner. The signals, for instance, can be presented to one or more of a third party, occupant, vehicle control system 204, and a service provider (e.g., manufacturer, repair facility, etc.).

Optionally, the diagnostic communications module 256 may be utilized by a third party (i.e., a party other than the user 216, etc.) in communicating vehicle diagnostic information. For instance, a manufacturer may send a signal to a vehicle 104 to determine a status associated with one or more components associated with the vehicle 104. In response to receiving the signal, the diagnostic communications module 256 may communicate with the vehicle control system 204 to initiate a diagnostic status check. Once the diagnostic status check is performed, the information may be sent via the diagnostic communications module 256 to the manufacturer. This example may be especially useful in determining whether a component recall should be issued based on the status check responses returned from a certain number of vehicles.

Wired/wireless transceiver/communications ports 260 may be included. The wired/wireless transceiver/communications ports 260 may be included to support communications over wired networks or links, for example with other communication devices, server devices, and/or peripheral devices. Examples of wired/wireless transceiver/communications ports 260 include Ethernet ports, Universal Serial Bus (USB) ports, Institute of Electrical and Electronics Engineers (IEEE) 1594, or other interface ports.

Figure 3:
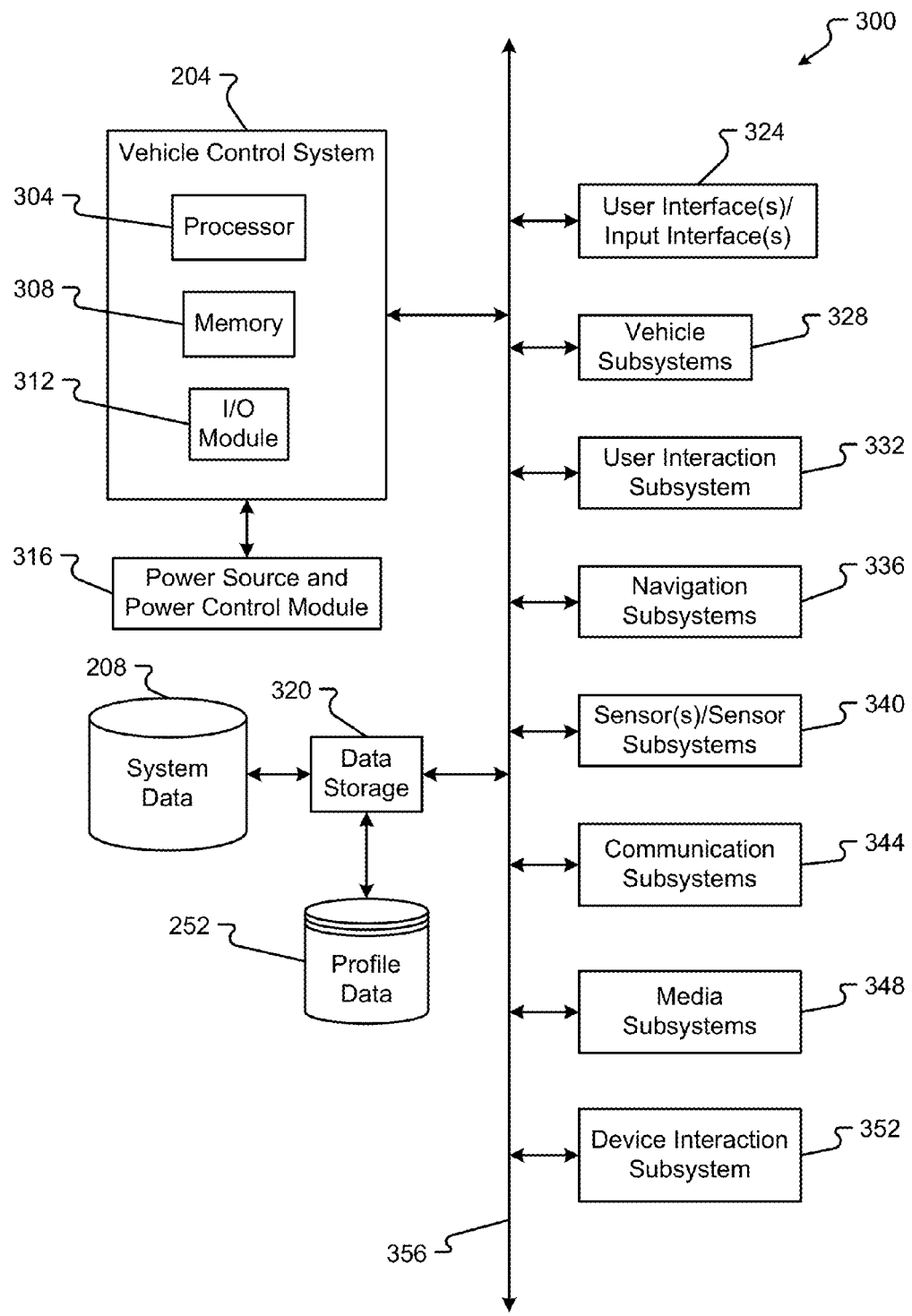
FIG. 3 is a block diagram of an embodiment of a vehicle control system environment.

An embodiment of a vehicle control environment 300 including a vehicle control system 204 may be as shown in FIG. 3. Beyond the vehicle control system 204, the vehicle control environment 300 can include one or more of, but is not limited to, a power source and/or power control module 316, a data storage module 320, user interface(s)/input interface(s) 324, vehicle subsystems 328, user interaction subsystems 332, Global Positioning System (GPS)/Navigation subsystems 336, sensor(s) and/or sensor subsystems 340, communication subsystems 344, media subsystems 348, and/or device interaction subsystems 352. The subsystems, modules, components, etc. 316-352 may include hardware, software, firmware, computer readable media, displays, input devices, output devices, etc. or combinations thereof. The system, subsystems, modules, components, etc. 204, 316-352 may communicate over a network or bus 356. This communication bus 356 may be bidirectional and perform data communications using any known or future-developed standard or protocol. An example of the communication bus 356 may be as described in conjunction with FIG. 4.

The vehicle control system 204 can include a processor 304, memory 308, and/or an input/output (I/O) module 312. Thus, the vehicle control system 204 may be a computer system, which can comprise hardware elements that may be electrically coupled. The hardware elements may include one or more central processing units (CPUs) 304; one or more components of the I/O module 312 including input devices (e.g., a mouse, a keyboard, etc.) and/or one or more output devices (e.g., a display device, a printer, etc.).

The processor 304 may comprise a general purpose programmable processor or controller for executing application programming or instructions. The processor 304 may, optionally, include multiple processor cores, and/or implement multiple virtual processors. Additionally or alternatively, the processor 304 may include multiple physical processors. As a particular example, the processor 304 may comprise a specially configured application specific integrated circuit (ASIC) or other integrated circuit, a digital signal processor, a controller, a hardwired electronic or logic circuit, a programmable logic device or gate array, a special purpose computer, or the like. The processor 304 generally functions to run programming code or instructions implementing various functions of the vehicle control system 204.

The input/output module 312 and associated ports may be included to support communications over wired or wireless networks or links, for example with other communication devices, server devices, and/or peripheral devices. Examples of an input/output module 312 include an Ethernet port, a Universal Serial Bus (USB) port, Institute of Electrical and Electronics Engineers (IEEE) 1594, or other interface.

The vehicle control system 204 may also include one or more storage devices 308. By way of example, storage devices 308 may be disk drives, optical storage devices, solid-state storage devices such as a random access memory ("RAM") and/or a read-only memory ("ROM"), which can be programmable, flash-updateable and/or the like. The vehicle control system 204 may additionally include a computer-readable storage media reader; a communications system (e.g., a modem, a network card (wireless or wired), an infra-red communication device, etc.); and working memory 308, which may include RAM and ROM devices as described above. The vehicle control system 204 may also include a processing acceleration unit, which can include a digital signal processor (DSP), a special-purpose processor, and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with an external or internal network and/or any other computer or device described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

Figure 10:
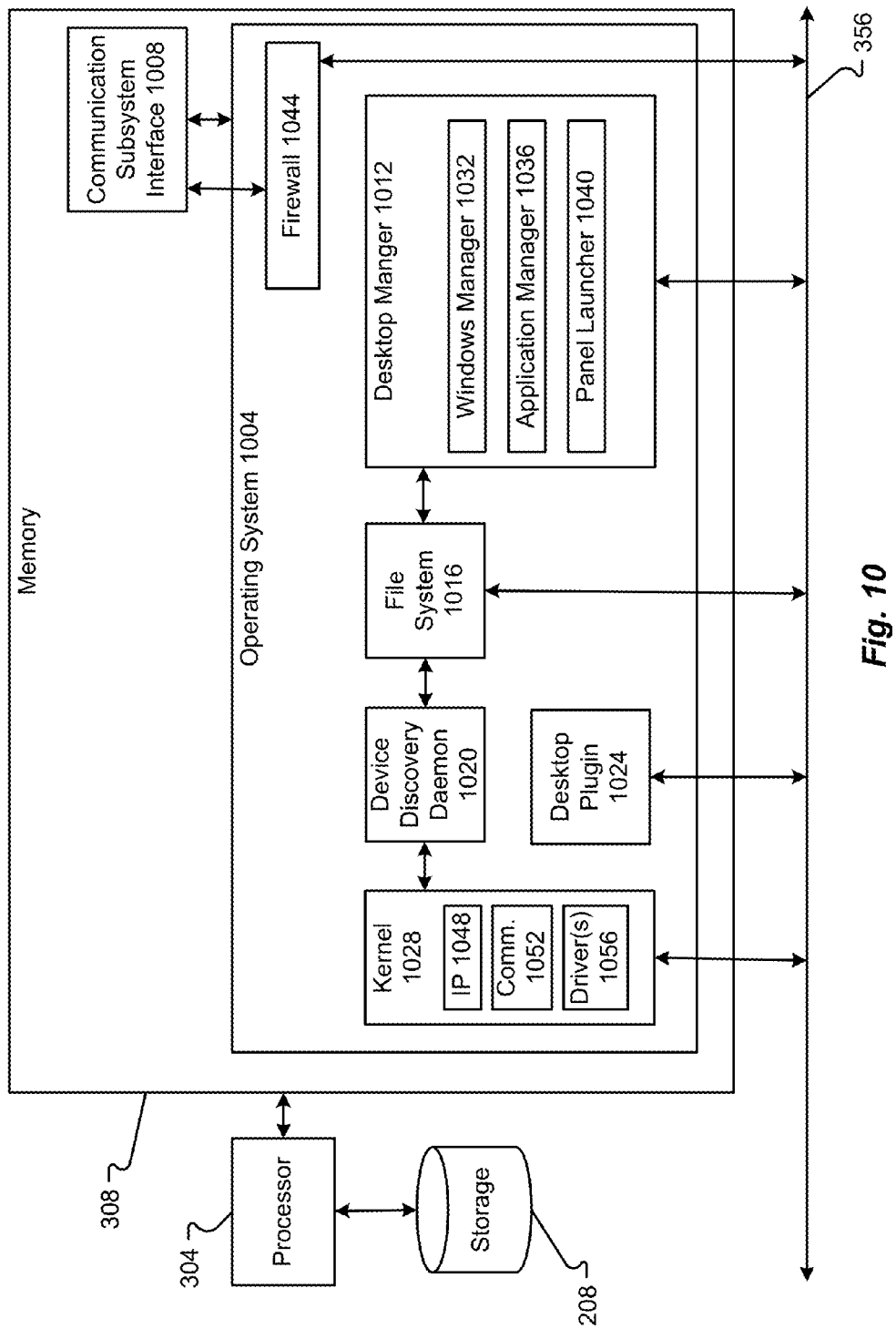
FIG. 10 is a block diagram of an embodiment of a software architecture for the vehicle control system.

The vehicle control system 204 may also comprise software elements including an operating system and/or other code, as described in conjunction with FIG. 10. It should be appreciated that alternates to the vehicle control system 204 may have numerous variations from that described herein. For example, customized hardware might also be used and/or particular elements might be implemented in hardware, software (including portable software, such as applets), or both. Further, connection to other computing devices such as network input/output devices may be employed.

The power source and/or power control module 316 can include any type of power source, including, but not limited to, batteries, alternating current sources (from connections to a building power system or power line), solar cell arrays, etc. One or more components or modules may also be included to control the power source or change the characteristics of the provided power signal. Such modules can include one or more of, but is not limited to, power regulators, power filters, alternating current (AC) to direct current (DC) converters, DC to AC converters, receptacles, wiring, other converters, etc. The power source and/or power control module 316 functions to provide the vehicle control system 204 and any other system with power.

The data storage 320 can include any module for storing, retrieving, and/or managing data in one or more data stores and/or databases. The database or data stores may reside on a storage medium local to (and/or resident in) the vehicle control system 204 or in the vehicle 104. Alternatively, some of the data storage capability may be remote from the vehicle control system 204 or automobile, and in communication (e.g., via a network) to the vehicle control system 204. The database or data stores may reside in a storage-area network ("SAN") familiar to those skilled in the art. Similarly, any necessary files for performing the functions attributed to the vehicle control system 204 may be stored locally on the respective vehicle control system 204 and/or remotely, as appropriate. The databases or data stores may be a relational database, and the data storage module 320 may be adapted to store, update, and retrieve data in response to specifically-formatted commands. The data storage module 320 may also perform data management functions for any flat file, object oriented, or other type of database or data store.

A first data store that may be part of the vehicle control environment 300 is a profile data store 252 for storing data about user profiles and data associated with the users. A system data store 208 can include data used by the vehicle control system 204 and/or one or more of the components 324-352 to facilitate the functionality described herein. The data stores 208 and/or 252 may be as described in conjunction with FIGS. 1 and/or 12A-12D.

The user interface/input interfaces 324 may be as described herein for providing information or data and/or for receiving input or data from a user. Vehicle systems 328 can include any of the mechanical, electrical, electromechanical, computer, or other systems associated with the function of the vehicle 100. For example, vehicle systems 328 can include one or more of, but is not limited to, the steering system, the braking system, the engine and engine control systems, the electrical system, the suspension, the drive train, the cruise control system, the radio, the heating, ventilation, air conditioning (HVAC) system, the windows and/or doors, etc. These systems are well known in the art and will not be described further.

Examples of the other systems and subsystems 324-352 may be as described further herein. For example, the user interface(s)/input interface(s) 324 may be as described in FIGS. 2 and 8B; the vehicle subsystems 328 may be as described in FIG. 6a et. seq.; the user interaction subsystem 332 may be as described in conjunction with the user/device interaction subsystem 817 of FIG. 8B; the Navigation subsystem 336 may be as described in FIGS. 6A and 8C; the sensor(s)/sensor subsystem 340 may be as described in FIGS. 7A and 7B; the communication subsystem 344 may be as described in FIGS. 2, 4, 5B, 5C, and 9; the media subsystem 348 may be as described in FIG. 8A; and, the device interaction subsystem 352 may be as described in FIG. 2 and in conjunction with the user/device interaction subsystem 817 of FIG. 8B.

Figure 4:
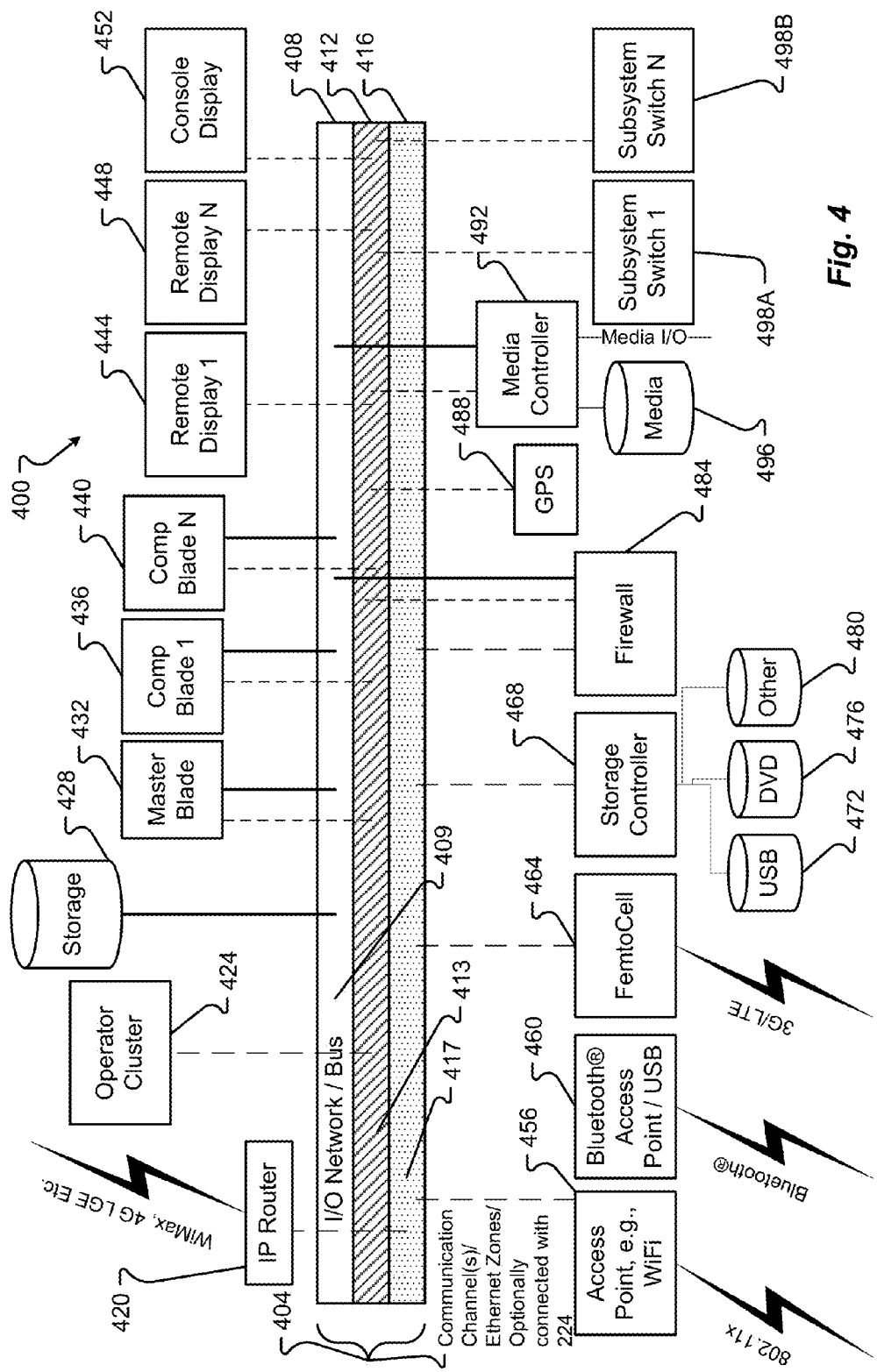
FIG. 4 is a block diagram of an embodiment of a vehicle communications subsystem.

FIG. 4 illustrates an optional communications channel architecture 400 and associated communications components. FIG. 4 illustrates some of the optional components that can be interconnected via the communication channels/zones 404. Communication channels/zones 404 can carry information on one or more of a wired and/or wireless communications link with, in the illustrated example, there being three communications channels/zones, 408, 412, and 416.

This optional environment 400 can also include an IP router 420, an operator cluster 424, one or more storage devices 428, one or more blades, such as master blade 432, and computational blades 436 and 440. Additionally, the communications channels/zones 404 can interconnect one or more displays, such as, remote display 1 444, remote display N 448, and console display 452. The communications channels/zones 404 also interconnect an access point 456, a Bluetooth® access point/USB hub 460, a Femtocell 464, a storage controller 468, that is connected to one or more of USB devices 472, DVDs 476, or other storage devices 480. To assist with managing communications within the communication channel, the environment 400 optionally includes a firewall 484 which will be discussed hereinafter in greater detail. Other components that could also share the communications channel/zones 404 include GPS 488, media controller 492, which is connected to one or more media sources 496, and one or more subsystems, such as subsystem switches 498.

Optionally, the communications channels/zones 404 can be viewed as an I/O network or bus where the communications channels are carried on the same physical media. Optionally, the communication channels 404 can be split amongst one or more physical media and/or combined with one or more wireless communications protocols. Optionally, the communications channels 404 can be based on wireless protocols with no physical media interconnecting the various elements described herein.

The environment 400 shown in FIG. 4 can include a collection of blade processors that are housed in a "crate." The crate can have a PC-style backplane connector 408 and a backplane Ethernet 408 that allows the various blades to communicate with one another using, for example, an Ethernet.

Various other functional elements illustrated in FIG. 4 can be integrated into this crate architecture with, as discussed hereinafter, various zones utilized for security. Optionally, as illustrated in FIG. 4, the backplane 404/408 can have two separate Ethernet zones that may or may not be on the same communications channel. Optionally, the zones exist on a single communications channel on the I/O network/bus 408. Optionally, the zones are actually on different communications channels, e.g., 412, 416; however, the implementation is not restricted to any particular type of configuration. Rather, as illustrated in FIG. 4, there can be a red zone 417 and a green zone 413, and the I/O backplane on the network/bus 408 that enables standard I/O operations. This backplane or I/O network/bus 408 also optionally can provide power distribution to the various modules and blades illustrated in FIG. 4. The red and green Ethernet zones, 417 and 413 respectively, can be implemented as Ethernet switches, with one on each side of the firewall 484. Two Ethernets (untrusted and trusted) are not connected in accordance with an optional embodiment. Optionally, the connector geometry for the firewall can be different for the Ethernet zones than for the blades that are a part of the system.

The red zone 417 only needs to go from the modular connector to the input side of the backplane connector of the firewall 484. While FIG. 4 indicates that there are five external red zone connectors to the firewall 484, provisions can be made for any number of ports with the connections being made at the access point 456, the Bluetooth® access point (combo controller) 460, Femtocell 464, storage controller 468, and/or firewall 484. Optionally, the external port connections can be made through a manufacturer configurable modular connector panel, and one or more of the red zone Ethernet ports could be available through a customer supplied crate which allows, for example, wired Ethernet connections from a bring-your-own-device (BYOD) to the firewall 484.

The green zone 413 goes from the output side of the firewall 484 and generally defines the trusted Ethernet. The Ethernet on the backplane 408 essentially implements an Ethernet switch for the entire system, defining the Ethernet backbone of the vehicle 104. All other modules, e.g., blades, etc., can connect to a standard backplane bus and the trusted Ethernet. Some number of switch ports can be reserved to connect to an output modular connector panel to distribute the Ethernet throughout the vehicle 104, e.g., connecting such elements as the console display 452, remote displays 444, 448, GPS 488, etc. Optionally, only trusted components, either provided or approved by the manufacturer after testing, can be attached to the green zone 413, which is by definition in the trusted Ethernet environment.

Optionally, the environment 400, shown in FIG. 4, utilizes IPv6 over Ethernet connections wherever possible. Using, for example, the Broadcom single-twisted pair Ethernet technology, wiring harnesses are simplified and data transmission speeds are maximized. However, while the Broadcom single-twisted pair Ethernet technology can be used, in general, systems and methods can work comparably well with any type of well-known Ethernet technology or other comparable communications technology.

As illustrated in FIG. 4 the I/O network/bus 408 is a split-bus concept that contains three independent bus structures:

The red zone 417—the untrusted Ethernet environment. This zone 417 may be used to connect network devices and customer provided devices to the vehicle information system with these devices being on the untrusted side of the firewall 484.

The green zone 413—the trusted Ethernet environment, this zone 413 can be used to connect manufacturer certified devices such as GPS units, remote displays, subsystem switches, and the like, to the vehicle network 404. Manufacturer certified devices can be implemented by vendors that allow the vehicle software system to validate whether or not a device is certified to operate with the vehicle 100. Optionally, only certified devices are allowed to connect to the trusted side of the network.

The I/O bus 409—the I/O bus may be used to provide power and data transmission to bus-based devices such as the vehicle solid state drive, the media controller blade 492, the computational blades 436, 440, and the like.

As an example, the split-bus structure can have the following minimum configuration:

Two slots for the red zone Ethernet;

One slot for built-in LTE/WiMax access 420 from the car to other network resources such as the cloud/Internet;

One slot for user devices or bring-your-own device access, this slot can implement, for example, WiFi, Bluetooth®, and/or USB connectivity 456, which can be provided in, for example, the customer crate;

One slot for combined red zone and green zone Ethernet, this slot can be reserved for the firewall controller;

Two slots for computational blades. Here the two computation blades are illustratively as shown the optional master blade and the multimedia blade or controller 492 which can be provided as standard equipment; and The expansion controller that allows the I/O bus to be extended and provides additional Ethernet switch ports for one or more of the red or green zones, which may require that the basic green zone Ethernet switch implementation will support additional ports beyond the initial three that are needed for the basic exemplary system.

It should be possible to build 8 or 16 or more Ethernet switches that allow for the expansion with existing component(s) in a straight-forward manner.

The red zone 417 can be implemented as an 8-port Ethernet switch that has three actual bus ports within the crate with the remaining five ports being available on the customer crate. The crate implements red zone slots for the firewall controller 484, the combo controller which includes WiFi, Bluetooth®, USB hub (456, 460) and the IP router 420.

The firewall controller 484 can have a dedicated slot that bridges the red zone 417, green zone 413, and uses the I/O bus for power connections. In accordance with an optional low cost implementation, the firewall 484 can be implemented by a dummy module that simply bridges the red zone 417 and the green zone 413 without necessarily providing any firewall functionality. The combo controller 460 that includes the WiFi, Bluetooth®, and USB hub can be provided for consumer device connections. This controller can also implement the IPv6 (un-routable) protocol to insure that all information is packetized for transmission via IP over the Ethernet in the I/O network/bus 408.

The combo controller 460 with the USB hub can have ports in the customer crate. The combo controller 460 can implement USB discovery functions and packetizes the information for transmission via IP over Ethernet. The combo controller 460 can also facilitate installation of the correct USB driver for the discovered device, such as a BYOD from the user. The combo controller 460 and USB hub can then map the USB address to a "local" IPv6 address for interaction with one or more of the computational blades which is generally going to be the media controller 492.

The IP router 420 can implement Internet access through a manufacturer provided service. This service can allow, for example, a manufacturer to offer value-added services to be integrated into the vehicle information systems. The existence of the manufacturer provided Internet access can also allow the "e-Call" function and other vehicle data recorder functions to be implemented. IP router 420 also allows, for example, WiMax, 4G LTE, and other connections to the Internet through a service provider that can be, for example, contracted by the manufacturer. Internally, the IP router 420 can allow cellular handset connections to the Internet through a Femtocell 464 that is part of the IP router implementation. The IP router 420, with the Femtocell 464, can also allow a cone of silence functionality to be implemented. The IP router 420 can be an optional component for a vehicle provided by, for example, the manufacturer, a dealer, or installed by a user. In the absence of the IP router 420, it is possible to connect a consumer handheld device to the I/O network/bus 408 using, for example, either WiFi or Bluetooth® 456, 460. While functionality may be somewhat reduced when using a handheld device instead of a built-in Ethernet connection, systems and methods of this invention can also work utilizing this consumer handheld device which then connects to the Internet via, for example, WiMax, 4G, 4G LTE, or the like.

Figure 5B:
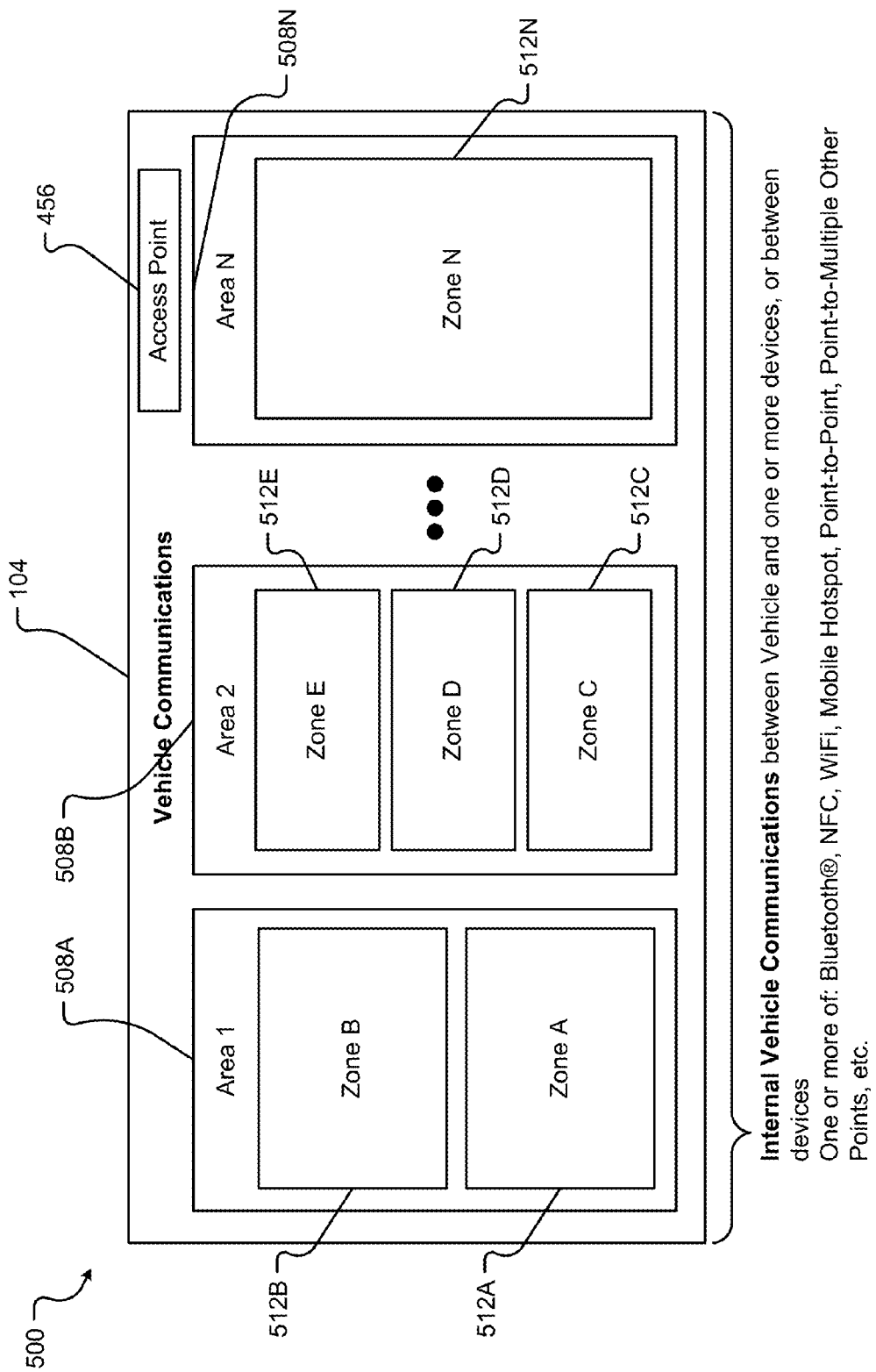
FIG. 5B is a second block diagram of an embodiment of a vehicle interior environment separated into areas and/or zones.
Figure 5C:
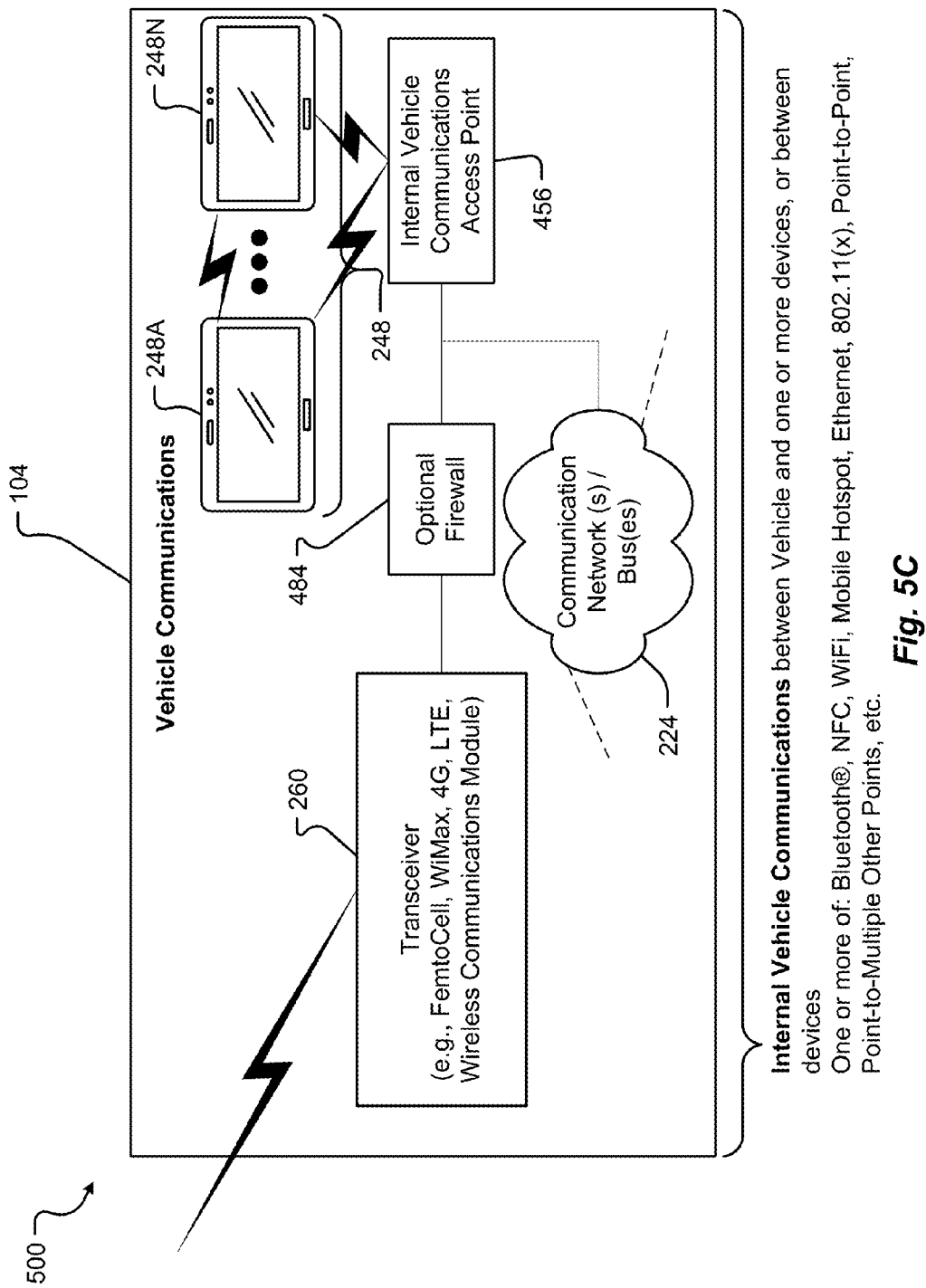
FIG. 5C is a third block diagram of an embodiment of a vehicle interior environment separated into areas and/or zones.

FIGS. 5A-5C show configurations of a vehicle 104. In general, a vehicle 104 may provide functionality based at least partially on one or more areas, zones, and distances, associated with the vehicle 104. Non-limiting examples of this functionality are provided herein below.

An arrangement or configuration for sensors within a vehicle 104 is as shown in FIG. 5A. The sensor arrangement 500 can include one or more areas 508 within the vehicle. An area can be a larger part of the environment inside or outside of the vehicle 104. Thus, area one 508A may include the area within the trunk space or engine space of the vehicle 104 and/or the front passenger compartment. Area two 508B may include a portion of the interior space 108 (e.g., a passenger compartment, etc.) of the vehicle 104. The area N, 508N, may include the trunk space or rear compartment area, when included within the vehicle 104. The interior space 108 may also be divided into other areas. Thus, one area may be associated with the front passenger's and driver's seats, a second area may be associated with the middle passengers' seats, and a third area may be associated with a rear passenger's seat. Each area 508 may include one or more sensors that are positioned or operate to provide environmental information about that area 508.

Each area 508 may be further separated into one or more zones 512 within the area 508. For example, area 1 508A may be separated into zone A 512A, and zone B 512B. Each zone 512 may be associated with a particular portion of the interior occupied by a passenger. For example, zone A 512A may be associated with a driver. Zone B 512B, may be associated with a front passenger. Each zone 512 may include one or more sensors that are positioned or configured to collect information about the environment or ecosystem associated with that zone or person.

A passenger area 508B may include more than two zones as described in conjunction with area 508A. For example, area 508B may include three zones, 512C, 512D, and 512E. These three separate zones 512C, 512D, and 512E may be associated with three passenger seats typically found in the rear passenger area of a vehicle 104. An area 508N and may include a single zone 512N as there may be no separate passenger areas but may include a single trunk area within the vehicle 104. The number of zones 512 is unlimited within the areas as the areas are also unlimited inside the vehicle 104. Further, it should be noted that there may be one or areas 508 or zones 512 that may be located outside the vehicle 104 that may have a specific set of sensors associated therewith.

Optionally, each area/access point 508, 456, 516, 520, and/or zone 512, associated with a vehicle 104, may comprise one or more sensors to determine a presence of a user 216 and/or device 212, 248 in and/or adjacent to each area 508, 456, 516, 520, and/or zone 512. The sensors may include vehicle sensors 242 and/or non-vehicle sensors 236 as described herein. It is anticipated that the sensors may be configured to communicate with a vehicle control system 204 and/or the diagnostic communications module 256. Additionally or alternatively, the sensors may communicate with a device 212, 248. The communication of sensors with the vehicle 104 may initiate and/or terminate the control of device 212, 248 features. For example, a vehicle operator may be located in a second outside area 520 associated with a vehicle 104. As the operator approaches the first outside area 516, associated with the vehicle 104, the vehicle control system 204 may determine to control features associated with one or more device 212, 248 and diagnostic communications module 256.

Optionally, the location of the device 212, 248 relative to the vehicle 104 may determine vehicle functionality and/or features to be provided and/or restricted to a user 216. By way of example, a device 212, 248 associated with a user 216 may be located at a second outside area 520 from the vehicle 104. In this case, and based at least partially on the distance of the device 212, 248 from the vehicle 104 (e.g., provided by detecting the device 212, 248 at or beyond the second outside area 520) the vehicle 104 may lock one or more features (e.g., ignition access, vehicle access, communications ability, etc.) associated with the vehicle 104. Optionally, the vehicle 104 may provide an alert based on the distance of the device 212, 248 from the vehicle 104. Continuing the example above, once the device 212, 248 reaches the first outside area 516 of the vehicle 104 at least one of the vehicle features may be unlocked. For instance, by reaching the first outside area 516, the vehicle 104 may unlock a door of the vehicle 104. In some cases, when the device is detected to be inside the vehicle 104, the various sensors 236, 242 may determine that the user 216 is in an area 508 and/or zone 512. As is further described herein, features of the vehicle 104, device 212, 248, and/or other components may be controlled based on rules stored in a memory.

FIG. 5B illustrates optional internal vehicle communications between one or more of the vehicle and one or more devices or between devices. Various communications can occur utilizing one or more Bluetooth®, NFC, WiFi, mobile hot spot, point-to-point communications, point-to-multipoint other point communications, an ad hoc network, or in general any known communications protocol over any known communications media or media-types.

Optionally, various types of internal vehicle communications can be facilitated using an access point 456 that utilizes one or more of Bluetooth®, NFC, WiFi, wireless Ethernet, mobile hot spot technology, or the like. Upon being connected with, and optionally authenticated to the access point 456, the connected device is able to communicate with one or more of the vehicle and one or more other devices that are connected to the access point 456. The type of connection to the access point 456 can be based on, for example, the zone 512, in which the device is located.

The user may identify their zone 512 in conjunction with an authentication procedure to the access point 456. For example, a driver in zone A 512A, upon authenticating to the access point 456, can cause the access point 456 to send a query to the device asking the device user in which zone 512 they are located. As discussed hereinafter, the zone 512 the user device is located in may have an impact on the type of communications, available bandwidth, the types of other devices or vehicle systems or subsystems the device could communicate with, and the like. As a brief introduction, internal communications with zone A 512A may be given preferential treatment over those communications originating from area 2 508B, which could have in itself, preferential treatment over communications originating within area N 508N.

Moreover, the device in zone A 512A can include profile information that governs the other devices that are allowed to connect to the access point 456 and what those devices have access to, how they can communicate, how much bandwidth they are allocated, and the like. While, optionally, the device associated with zone A 512A will be considered the "master" controller of the profile that governs the internal vehicle communications, it should be appreciated that this was arbitrarily chosen since it is assumed that there will always be a driver in a car that is present in zone A 512A. However, it should be appreciated the driver in zone A 512A, for example, may not have a communications device in which case a device associated with one of the other areas or zones, such as zone B 512B, area 2 508B, or area N 508N could also be associated with or control this master profile.

Optionally, various devices located within the various zones 512 can connect using, for example, ports provided by access point 456 or Bluetooth® access point/USB hub 460 as illustrated in FIG. 4. Similarly, the device(s) could connect utilizing the Femtocell 464 and optionally be directly connected via, for example, a standard Ethernet port.

As discussed, each one of the areas, area 1 508A, area 2 508B, and area N 508N, can each have associated therewith a profile that governs, for example, how many and what types of devices can connect from that area 508, bandwidth allocated to that area 508, the types of media or content available to device(s) within that area 508, the interconnection of devices within that area 508 or between areas 508, or, in general, can control any aspect of communication of an associated device with any one or more other associated devices/vehicle systems within the vehicle 104.

Optionally, area 2 508B devices can be provided with full access to multimedia and infotainment available within the vehicle 104, however, devices in area 2 508B may be restricted from any access to vehicle functions. Only devices in area 1 508A may be able to access vehicle control functions such as when "parents" are located in area 1 508A and the children are located in area 2 508B. Optionally, devices found in zone E 512E of area 2 508B may be able to access limited vehicle control functionality such as climate control within area 2. Similarly, devices in area N 508N may be able to control climate features within zone N 512N.

As will be appreciated, profiles can be established that allow management of communications within each of the areas 508, and further optionally within each of the zones 512. The profile can be granular in nature controlling not only what type of devices can connect within each zone 512, but how those devices can communicate with other devices and/or the vehicle and types of information that can be communicated.

To assist with identifying a location of a device within a zone 512, a number of different techniques can be utilized. One optional technique involves one or more of the vehicle sensors detecting the presence of an individual within one of the zones 512. Upon detection of an individual in a zone 512, communications subsystems 344 and the access point 456 can cooperate to not only associate the device within the zone 512 with the access point 456 but to also determine the location of the device within an area, and optionally within a zone 512. Once the device is established within a zone 512, a profile associated with the vehicle 104 can store information identifying that device and/or a person and optionally associating it with a particular zone 512 as a default. As discussed, there can be a master profile optionally associated with the device in zone A 512A, this master profile can govern communications with the communications subsystems 340 and where communications within vehicle 104 are to occur.

Some optional profiles are illustrated below where the Master Profile governs other device connectivity:

| Area 1 508A | Area 2 508B | Area N 508N | Other |
|---|---|---|---|
| Master Profile: | | | |
| All Communications | Allow Access to Infotainment | No Access | Master Profile acts as Firewall and Router |
| All Vehicle Controls | Allow Area 2 Climate Control | | |
| Secondary Profile (e.g., device in Zone B 512B, Area 1 508A) | | | |
| All Communications | Allow Access to Infotainment | Allow Access to Infotainment | Master Profile acts as Firewall and Router |
| All Vehicle Controls | Allow Area 2 Climate Control | Allow Area 2 Climate Control | |
| Secondary Profile, Option 2 | | | |
| All Communications | Allow Access to Infotainment, Internet | Allow Access to Infotainment | |
| All Vehicle Controls Except Driver-centric Controls | Allow Area 2 Climate Control | Allow Area 2 Climate Control | |

Some optional profiles are illustrated below where the Area/Zone governs device connectivity:

| Area 1 508A | Area 2 508B | Area N 508N | Other |
|---|---|---|---|
| Area 2 508B Profile: | | | |
| No Communications with Area 1 Devices | Allow Access to Infotainment, Allow Access to Other Area 2 or Zone N Devices, Internet | | |
| No Vehicle Controls | Allow Area 2 Climate Control | | |
| Area N 508N Profile: | | | |
| Communications with Area 1, Zone B Device | | Allow Access to Infotainment, Allow Access to Other Area N or Zone N Devices | |
| No Vehicle Controls | | Allow Area N Climate Control | |
| Area 2 508B Profile: | | | |
| Media Sharing with Area 1, Zone B and Vehicle | Allow Access to Infotainment, Allow Access to Other Area 2 or Zone N Devices, Internet and Femtocell | | |
| No Vehicle Controls | | | |

Optionally, a user's device, such as a SmartPhone, can store in, for example a profile, with which zone 512 the user's device is associated. Then, assuming the user sits in the same zone 512 and area 508 as previously, the user's device can re-establish the same communications protocols with the access point 456 as were previously established.

In addition or in the alternative, the areas 508 and zones 512 can have associated therewith restrictions as to which one or more other user's devices with which users' devices can connect. For example, a first user's device can connect with any other user device in area 2 508B or area N 508N, however is restricted from connecting with a user device in area 1 508A, zone A 512A. However, the first user device may be able to communicate with another user's device that is located in area 1 508A, zone B 512B. These communications can include any type of standard communications such as sharing content, exchanging messages, forwarding or sharing multimedia or infotainment, or in general can include any communications that would ordinarily be available between two devices and/or the vehicle and vehicle systems. As discussed, there may be restrictions on the type of communications that can be sent to the device in area 1 508A, zone A 512A. For example, the user's device in area 1 508A, zone A 512A may be restricted from receiving one or more of text messages, multimedia, infotainment, or in general anything that can be envisioned as a potential distraction to the driver. Moreover, it should be appreciated that the communications between the various devices and the various zones 512 need not necessarily occur with the assistance of access point 456, but the communications could also occur directly between the device(s).

FIG. 5C outlines optional internal vehicle communications between one or more of the vehicle and one or more devices. More specifically, FIG. 5C illustrates an example of vehicle communications where the vehicle 104 is equipped with the necessary transceivers to provide a mobile hot spot functionality to any user device(s) therein, such as user devices 248A and 248N.

Optionally, and as discussed above, one or more user devices can connect to the access point 456. This access point 456 is equipped to handle communications routing to not only the communication network/buses 224 for intra-vehicle communications, but optionally can also communicate with, for example, the Internet or the cloud, in cooperation with transceiver 260. Optionally included is a firewall 484 that has the capability of not only blocking certain types of content, such as a malicious content, but can also operate to exclude certain type of communications from emanating from the vehicle 104 and transceiver 260. As will be appreciated, various profiles could be established in the firewall 484 that controls not only the type of communications that can be received at the vehicle 104, but the type of communications that can be sent from the vehicle 104.

The transceiver 260 can be any type of well-known wireless transceiver that communicates using a known communications protocol such as WiMax, 4G, 4G LTE, 3G, or the like. The user devices can communicate via, for example, WiFi link 248 with the access point 456, with the transceiver 260 providing Internet connectivity to the various user devices. As will be appreciated, there may need to be an account associated with transceiver 260 with a wireless carrier to provide data and/or voice connectivity to enable the user devices to communicate with the Internet. Typically, the account is established on a month-to-month basis with an associated fee but could also be performed based on the amount of data to be transmitted, received, or in any other manner.

Moreover, one or more of the user's devices and access point 456 can maintain profile information that governs how the user's devices are able to communicate with other devices, and optionally the Internet. Optionally, a profile can exist that only allows the user's devices to communicate with other user's devices and/or the vehicle, multimedia and/or the vehicle infotainment system, and may not be allowed access to the Internet via transceiver 260. The profile can stipulate that the user's device could connect to the Internet via transceiver 260 for a specified period of time and/or up to a certain amount of data usage. The user's device can have full access to the Internet via transceiver 260 with no limit on time or data usage which would reduce the data usage of the user's device since it is connected via WiFi to the access point 456, but however, would increase the data usage by transceiver 260, and therefore, shift the billing for that data usage to the transceiver 260 instead of the user's device. Still further, and as previously discussed, the various profiles may stipulate which user's device has priority for use of the bandwidth provided by the transceiver 260. For example, a user's device located area 1 508A, zone A 512A may be given preferential routing treatment of data above that of a user's device in zone N 512N. In this manner, for example, a driver would be given priority for Internet access above that of the passengers. This could become important, for example, when the driver is trying to obtain traffic or direction information or, for example, when the vehicle is performing a download to update various software features.

As will be appreciated, the optional firewall 484 can cooperate with the access point 456 and the various profiles that area 508 associated with the various devices within the vehicle 104 and can fully implement communications restrictions, control bandwidth limits, Internet accessibility, malicious software blocking, and the like. Moreover, the optional firewall 484 can be accessed by an administrator with one or more of these configuration settings edited through an administrator's control panel. For example, in a scenario where parents are always in area 1 508A, it may be appropriate to give all of the user's devices in area 1 508A full access to the Internet utilizing transceiver 260, however, while restricting access and/or bandwidth to any other user devices within the vehicle 104. As the user's device and profile would be known by the firewall 484, upon the user's device being associated with the access point 456, the firewall 484 and transceiver 260 can be configured to allow communications in accordance with the stored profile.

Figure 6A:
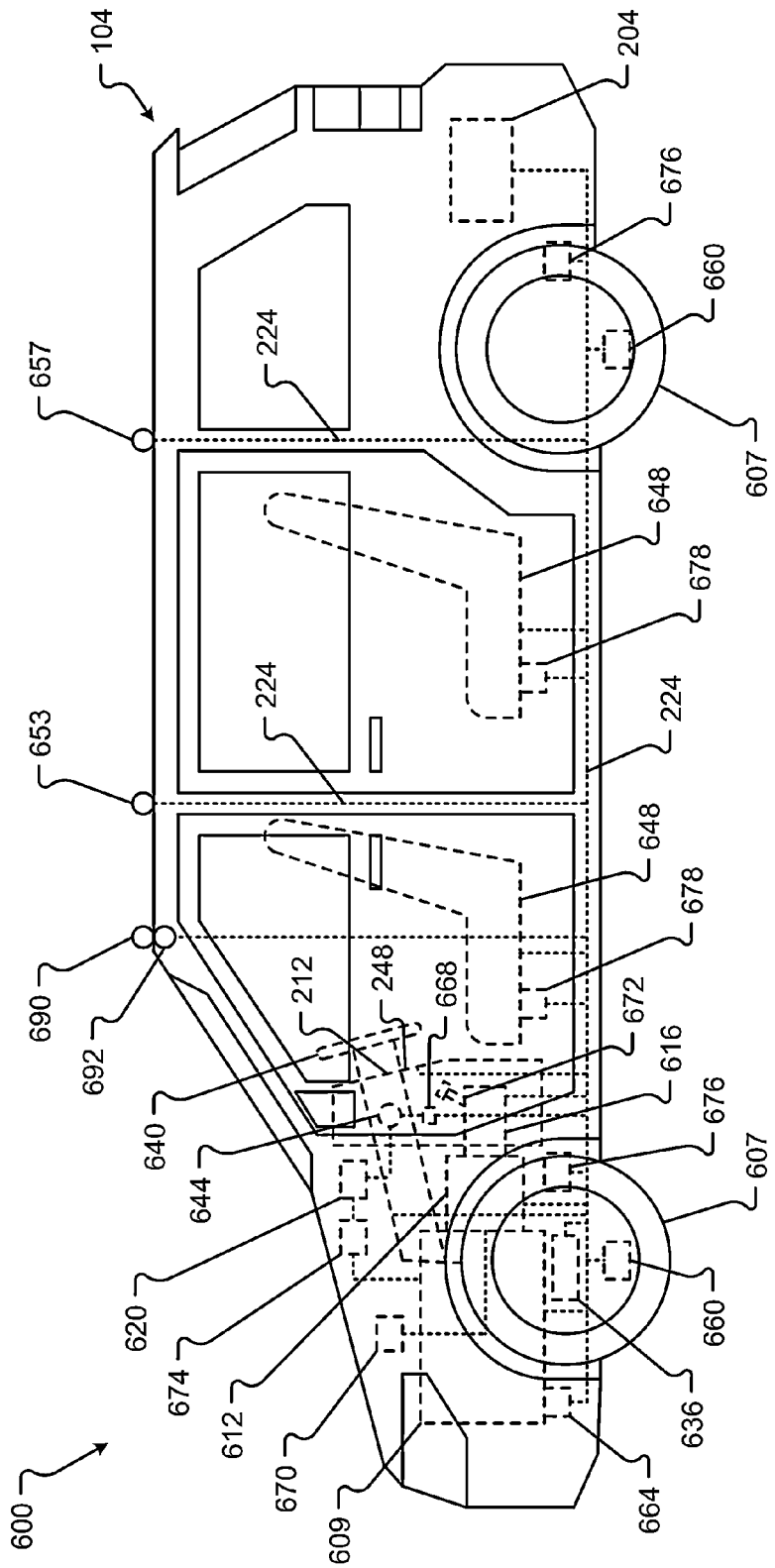
FIG. 6A depicts an embodiment of a sensor configuration for a vehicle.

A set of sensors or vehicle components 600 associated with the vehicle 104 may be as shown in FIG. 6A. The vehicle 104 can include, among many other components common to vehicles, wheels 607, a power source 609 (such as an engine, motor, or energy storage system (e.g., battery or capacitive energy storage system)), a manual or automatic transmission 612, a manual or automatic transmission gear controller 616, a power controller 620 (such as a throttle), a vehicle control system 204, the display device 212, a braking system 636, a steering wheel 640, a power source activation/deactivation switch 644 (e.g., an ignition), an occupant seating system 648, a wireless signal receiver 653 to receive wireless signals from signal sources such as roadside beacons and other electronic roadside devices, and a satellite positioning system receiver 657 (e.g., a Global Positioning System ("GPS") (US), GLONASS (Russia), Galileo positioning system (EU), Compass navigation system (China), and Regional Navigational Satellite System (India) receiver), driverless systems (e.g., cruise control systems, automatic steering systems, automatic braking systems, etc.).

The vehicle 104 can include a number of sensors in wireless or wired communication with the vehicle control system 204 and/or display device 212, 248 to collect sensed information regarding the vehicle state, configuration, and/or operation. Exemplary sensors may include one or more of, but are not limited to, wheel state sensor 660 to sense one or more of vehicle speed, acceleration, deceleration, wheel rotation, wheel speed (e.g., wheel revolutions-per-minute), wheel slip, and the like, a power source energy output sensor 664 to sense a power output of the power source 609 by measuring one or more of current engine speed (e.g., revolutions-per-minute), energy input and/or output (e.g., voltage, current, fuel consumption, and torque) (e.g., turbine speed sensor, input speed sensor, crankshaft position sensor, manifold absolute pressure sensor, mass flow sensor, and the like), and the like, a switch state sensor 668 to determine a current activation or deactivation state of the power source activation/deactivation switch 644, a transmission setting sensor 670 to determine a current setting of the transmission (e.g., gear selection or setting), a gear controller sensor 672 to determine a current setting of the gear controller 616, a power controller sensor 674 to determine a current setting of the power controller 620, a brake sensor 676 to determine a current state (braking or non-braking) of the braking system 636, a seating system sensor 678 to determine a seat setting and current weight of seated occupant, if any) in a selected seat of the seating system 648, exterior and interior sound receivers 690 and 692 (e.g., a microphone, sonar, and other type of acoustic-to-electric transducer or sensor) to receive and convert sound waves into an equivalent analog or digital signal. Examples of other sensors (not shown) that may be employed include safety system state sensors to determine a current state of a vehicular safety system (e.g., air bag setting (deployed or undeployed) and/or seat belt setting (engaged or not engaged)), light setting sensor (e.g., current headlight, emergency light, brake light, parking light, fog light, interior or passenger compartment light, and/or tail light state (on or off)), brake control (e.g., pedal) setting sensor, accelerator pedal setting or angle sensor, clutch pedal setting sensor, emergency brake pedal setting sensor, door setting (e.g., open, closed, locked or unlocked) sensor, engine temperature sensor, passenger compartment or cabin temperature sensor, window setting (open or closed) sensor, one or more interior-facing or exterior-facing cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, odometer reading sensor, trip mileage reading sensor, wind speed sensor, radar transmitter/receiver output, brake wear sensor, steering/torque sensor, oxygen sensor, ambient lighting sensor, vision system sensor, ranging sensor, parking sensor, heating, venting, and air conditioning (HVAC) sensor, water sensor, air-fuel ratio meter, blind spot monitor, hall effect sensor, microphone, radio frequency (RF) sensor, infrared (IR) sensor, vehicle control system sensors, wireless network sensor (e.g., Wi-Fi and/or Bluetooth® sensor), cellular data sensor, and other sensors either future-developed or known to those of skill in the vehicle art.

In the depicted vehicle embodiment, the various sensors can be in communication with the display device 212, 248 and vehicle control system 204 via signal carrier network 224. As noted, the signal carrier network 224 can be a network of signal conductors, a wireless network (e.g., a radio frequency, microwave, or infrared communication system using a communications protocol, such as Wi-Fi), or a combination thereof. The vehicle control system 204 may also provide signal processing of one or more sensors, sensor fusion of similar and/or dissimilar sensors, signal smoothing in the case of erroneous "wild point" signals, and/or sensor fault detection. For example, ranging measurements provided by one or more RF sensors may be combined with ranging measurements from one or more IR sensors to determine one fused estimate of vehicle range to an obstacle target.

The control system 204 may receive and read sensor signals, such as wheel and engine speed signals, as a digital input comprising, for example, a pulse width modulated (PWM) signal. The processor 304 can be configured, for example, to read each of the signals into a port configured as a counter or configured to generate an interrupt on receipt of a pulse, such that the processor 304 can determine, for example, the engine speed in revolutions per minute (RPM) and the speed of the vehicle in miles per hour (MPH) and/or kilometers per hour (KPH). One skilled in the art will recognize that the two signals can be received from existing sensors in a vehicle comprising a tachometer and a speedometer, respectively. Alternatively, the current engine speed and vehicle speed can be received in a communication packet as numeric values from a conventional dashboard subsystem comprising a tachometer and a speedometer. The transmission speed sensor signal can be similarly received as a digital input comprising a signal coupled to a counter or interrupt signal of the processor 304 or received as a value in a communication packet on a network or port interface from an existing subsystem of the vehicle 104. The ignition sensor signal can be configured as a digital input, wherein a HIGH value represents that the ignition is on and a LOW value represents that the ignition is OFF. Three bits of the port interface can be configured as a digital input to receive the gear shift position signal, representing eight possible gear shift positions. Alternatively, the gear shift position signal can be received in a communication packet as a numeric value on the port interface. The throttle position signal can be received as an analog input value, typically in the range 0-5 volts. Alternatively, the throttle position signal can be received in a communication packet as a numeric value on the port interface. The output of other sensors can be processed in a similar fashion.

Other sensors may be included and positioned in the interior space 108 of the vehicle 104. Generally, these interior sensors obtain data about the health of the driver and/or passenger(s), data about the safety of the driver and/or passenger(s), and/or data about the comfort of the driver and/or passenger(s). The health data sensors can include sensors in the steering wheel that can measure various health telemetry for the person (e.g., heart rate, temperature, blood pressure, blood presence, blood composition, etc.). Sensors in the seats may also provide for health telemetry (e.g., presence of liquid, weight, weight shifts, etc.). Infrared sensors could detect a person's temperature; optical sensors can determine a person's position and whether the person has become unconscious. Other health sensors are possible and included herein.

Safety sensors can measure whether the person is acting safely. Optical sensors can determine a person's position and focus. If the person stops looking at the road ahead, the optical sensor can detect the lack of focus. Sensors in the seats may detect if a person is leaning forward or may be injured by a seat belt in a collision. Other sensors can detect that the driver has at least one hand on a steering wheel. Other safety sensors are possible and contemplated as if included herein.

Comfort sensors can collect information about a person's comfort. Temperature sensors may detect a temperature of the interior cabin. Moisture sensors can determine a relative humidity. Audio sensors can detect loud sounds or other distractions. Audio sensors may also receive input from a person through voice data. Other comfort sensors are possible and contemplated as if included herein.

Figure 6B:
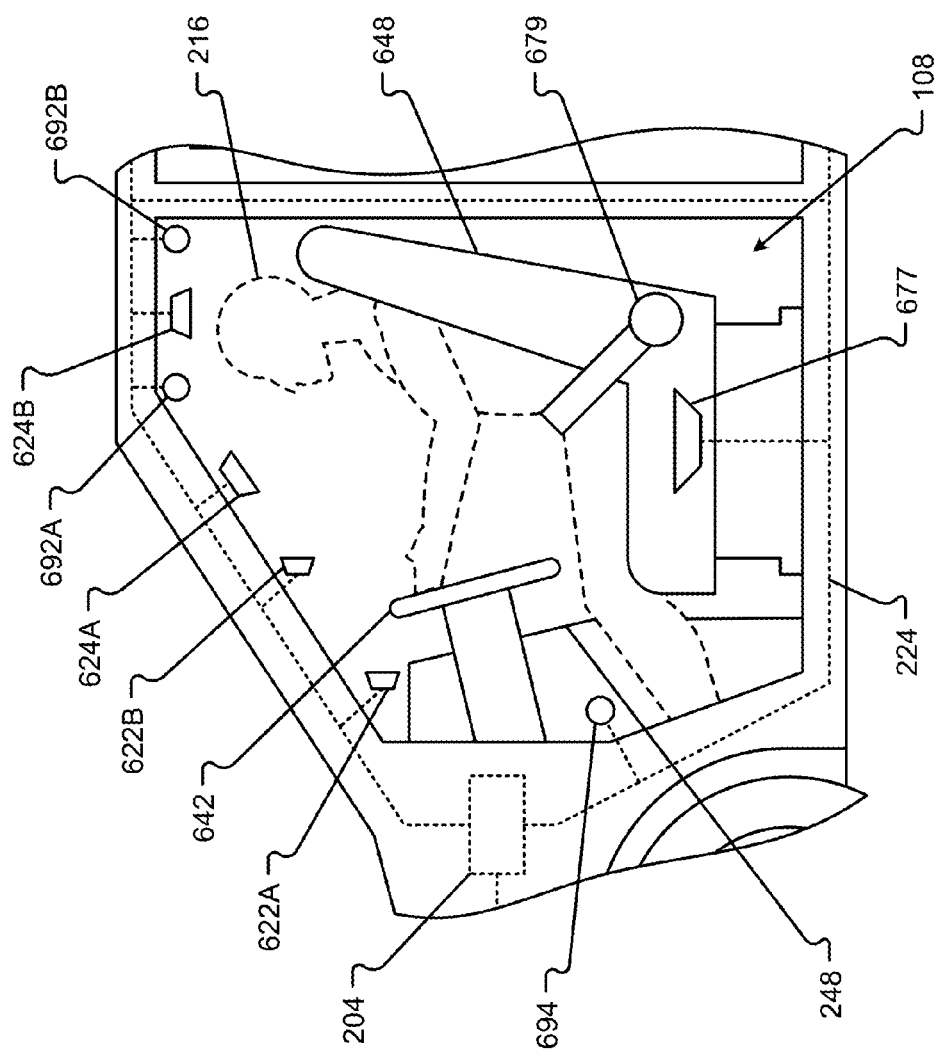
FIG. 6B depicts an embodiment of a sensor configuration for a zone of a vehicle.

FIG. 6B shows an interior sensor configuration for one or more zones 512 of a vehicle 104 optionally. Optionally, the areas 508 and/or zones 512 of a vehicle 104 may include sensors that are configured to collect information associated with the interior 108 of a vehicle 104. In particular, the various sensors may collect environmental information, user information, and safety information, to name a few. Embodiments of these sensors may be as described in conjunction with FIGS. 7A-8B.

Optionally, the sensors may include one or more of optical, or image, sensors 622A-B (e.g., cameras, etc.), motion sensors 624A-B (e.g., utilizing RF, IR, and/or other sound/image sensing, etc.), steering wheel user sensors 642 (e.g., heart rate, temperature, blood pressure, sweat, health, etc.), seat sensors 677 (e.g., weight, load cell, moisture, electrical, force transducer, etc.), safety restraint sensors 679 (e.g., seatbelt, airbag, load cell, force transducer, etc.), interior sound receivers 692A-B, environmental sensors 694 (e.g., temperature, humidity, air, oxygen, etc.), and the like.

The image sensors 622A-B may be used alone or in combination to identify objects, users 216, and/or other features, inside the vehicle 104. Optionally, a first image sensor 622A may be located in a different position within a vehicle 104 from a second image sensor 622B. When used in combination, the image sensors 622A-B may combine captured images to form, among other things, stereo and/or three-dimensional (3D) images. The stereo images can be recorded and/or used to determine depth associated with objects and/or users 216 in a vehicle 104. Optionally, the image sensors 622A-B used in combination may determine the complex geometry associated with identifying characteristics of a user 216. For instance, the image sensors 622A-B may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user 216. As can be appreciated, utilizing stereo images can allow for a user 216 to provide complex gestures in a 3D space of the vehicle 104. These gestures may be interpreted via one or more of the subsystems as disclosed herein. Optionally, the image sensors 622A-B may be used to determine movement associated with objects and/or users 216 within the vehicle 104. It should be appreciated that the number of image sensors used in a vehicle 104 may be increased to provide greater dimensional accuracy and/or views of a detected image in the vehicle 104.

The vehicle 104 may include one or more motion sensors 624A-B. These motion sensors 624A-B may detect motion and/or movement of objects inside the vehicle 104. Optionally, the motion sensors 624A-B may be used alone or in combination to detect movement. For example, a user 216 may be operating a vehicle 104 (e.g., while driving, etc.) when a passenger in the rear of the vehicle 104 unbuckles a safety belt and proceeds to move about the vehicle 104. In this example, the movement of the passenger could be detected by the motion sensors 624A-B. Optionally, the user 216 could be alerted of this movement by one or more of the devices 212, 248 in the vehicle 104. In another example, a passenger may attempt to reach for one of the vehicle control features (e.g., the steering wheel 640, the console, icons displayed on the head unit and/or device 212, 248, etc.). In this case, the movement (i.e., reaching) of the passenger may be detected by the motion sensors 624A-B. Optionally, the path, trajectory, anticipated path, and/or some other direction of movement/motion may be determined using the motion sensors 624A-B. In response to detecting the movement and/or the direction associated with the movement, the passenger may be prevented from interfacing with and/or accessing at least some of the vehicle control features (e.g., the features represented by icons may be hidden from a user interface, the features may be locked from use by the passenger, combinations thereof, etc.). As can be appreciated, the user 216 may be alerted of the movement/motion such that the user 216 can act to prevent the passenger from interfering with the vehicle 104 controls. Optionally, the number of motion sensors in a vehicle 104, or areas of a vehicle 104, may be increased to increase an accuracy associated with motion detected in the vehicle 104.

The interior sound receivers 692A-B may include, but are not limited to, microphones and other types of acoustic-to-electric transducers or sensors. Optionally, the interior sound receivers 692A-B may be configured to receive and convert sound waves into an equivalent analog or digital signal. The interior sound receivers 692A-B may serve to determine one or more locations associated with various sounds in the vehicle 104. The location of the sounds may be determined based on a comparison of volume levels, intensity, and the like, between sounds detected by two or more interior sound receivers 692A-B. For instance, a first interior sound receiver 692A may be located in a first area of the vehicle 104 and a second interior sound receiver 692B may be located in a second area of the vehicle 104. If a sound is detected at a first volume level by the first interior sound receiver 692A and a second, higher, volume level by the second interior sound receiver 692B in the second area of the vehicle 104, the sound may be determined to be closer to the second area of the vehicle 104. As can be appreciated, the number of sound receivers used in a vehicle 104 may be increased (e.g., more than two, etc.) to increase measurement accuracy surrounding sound detection and location, or source, of the sound (e.g., via triangulation, etc.).

Seat sensors 677 may be included in the vehicle 104. The seat sensors 677 may be associated with each seat and/or zone 512 in the vehicle 104. Optionally, the seat sensors 677 may provide health telemetry and/or identification via one or more of load cells, force transducers, weight sensors, moisture detection sensor, electrical conductivity/resistance sensor, and the like. For example, the seat sensors 677 may determine that a user 216 weighs 180 lbs. This value may be compared to user data stored in memory to determine whether a match exists between the detected weight and a user 216 associated with the vehicle 104. In another example, if the seat sensors 677 detect that a user 216 is fidgeting, or moving, in a seemingly uncontrollable manner, the system may determine that the user 216 has suffered a nervous and/or muscular system issue (e.g., seizure, etc.). The vehicle control system 204 may then cause the vehicle 104 to slow down and in addition or alternatively the automobile controller 8104 (described below) can safely take control of the vehicle 104 and bring the vehicle 104 to a stop in a safe location (e.g., out of traffic, off a freeway, etc).

Health telemetry and other data may be collected via the steering wheel user sensors 642. Optionally, the steering wheel user sensors 642 may collect heart rate, temperature, blood pressure, and the like, associated with a user 216 via at least one contact disposed on or about the steering wheel 640.

The safety restraint sensors 679 may be employed to determine a state associated with one or more safety restraint devices in a vehicle 104. The state associated with one or more safety restraint devices may serve to indicate a force observed at the safety restraint device, a state of activity (e.g., retracted, extended, various ranges of extension and/or retraction, deployment, buckled, unbuckled, etc.), damage to the safety restraint device, and more.

Environmental sensors 694, including one or more of temperature, humidity, air, oxygen, carbon monoxide, smoke, and other environmental condition sensors may be used in a vehicle 104. These environmental sensors 694 may be used to collect data relating to the safety, comfort, and/or condition of the interior space 108 of the vehicle 104. Among other things, the data collected by the environmental sensors 694 may be used by the vehicle control system 204 to alter functions of a vehicle. The environment may correspond to an interior space 108 of a vehicle 104 and/or specific areas 508 and/or zones 512 of the vehicle 104. It should be appreciate that an environment may correspond to a user 216. For example, a low oxygen environment may be detected by the environmental sensors 694 and associated with a user 216 who is operating the vehicle 104 in a particular zone 512. In response to detecting the low oxygen environment, at least one of the subsystems of the vehicle 104, as provided herein, may alter the environment, especially in the particular zone 512, to increase the amount of oxygen in the zone 512. Additionally or alternatively, the environmental sensors 694 may be used to report conditions associated with a vehicle (e.g., fire detected, low oxygen, low humidity, high carbon monoxide, etc.). The conditions may be reported to a user 216 and/or a third party via at least one communications module as provided herein.

Among other things, the sensors as disclosed herein may communicate with each other, with devices 212, 248, and/or with the vehicle control system 204 via the signal carrier network 224. Additionally or alternatively, the sensors disclosed herein may serve to provide data relevant to more than one category of sensor information including, but not limited to, combinations of environmental information, user information, and safety information to name a few.

Figure 7A:
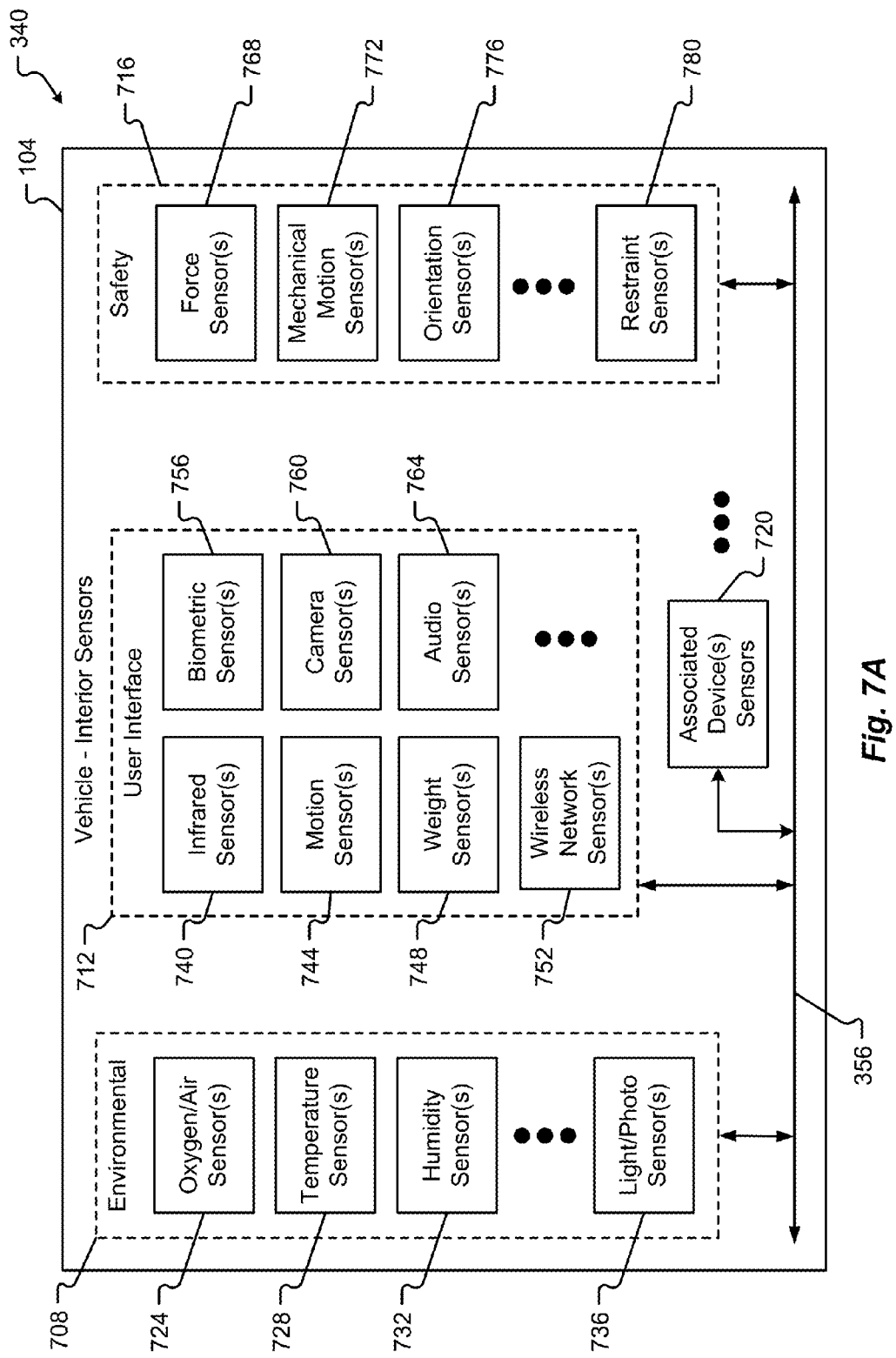
FIG. 7A is a block diagram of an embodiment of interior sensors for a vehicle.
Figure 7B:
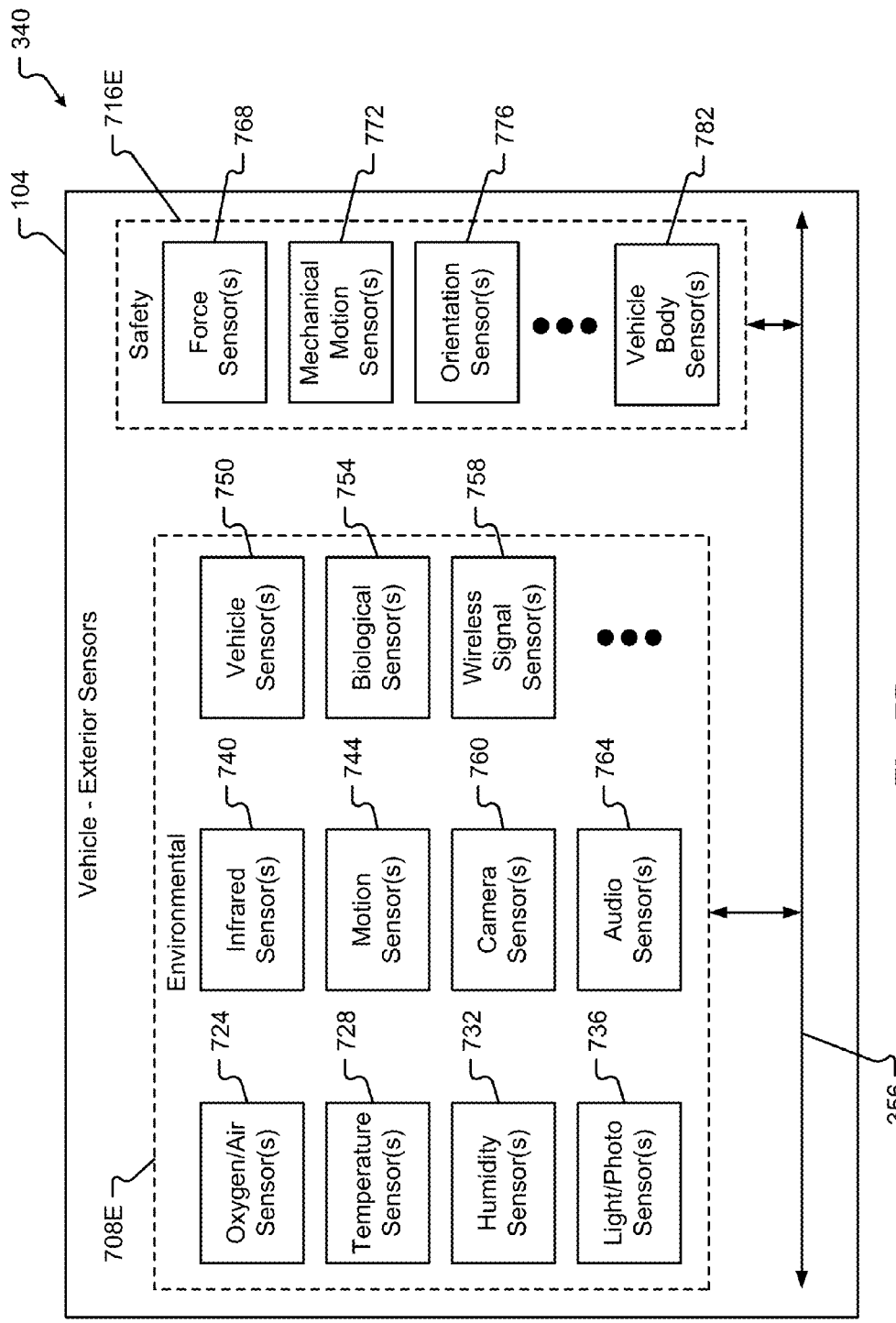
FIG. 7B is a block diagram of an embodiment of exterior sensors for a vehicle.

FIGS. 7A-7B show block diagrams of various sensors that may be associated with a vehicle 104. Although depicted as interior and exterior sensors, it should be appreciated that any of the one or more of the sensors shown may be used in both the interior space 108 and the exterior space of the vehicle 104. Moreover, sensors having the same symbol or name may include the same, or substantially the same, functionality as those sensors described elsewhere in the present disclosure. Further, although the various sensors are depicted in conjunction with specific groups (e.g., environmental 708, 708E, user interface 712, safety 716, 716E, etc.) the sensors should not be limited to the groups in which they appear. In other words, the sensors may be associated with other groups or combinations of groups and/or disassociated from one or more of the groups shown. The sensors as disclosed herein may communicate with each other, the devices 212, 248, and/or the vehicle control system 204 via one or more communications channel(s) 356.

FIG. 7A is a block diagram of an embodiment of interior sensors 340 for a vehicle 104 is provided. The interior sensors 340 may be arranged into one or more groups, based at least partially on the function of the interior sensors 340. The interior space 108 of a vehicle 104 may include an environmental group 708, a user interface group 712, and a safety group 716. Additionally or alternatively, there may be sensors associated with various devices inside the vehicle (e.g., devices 212, 248, smart phones, tablets, mobile computers, etc.)

The environmental group 708 may comprise sensors configured to collect data relating to the internal environment of a vehicle 104. It is anticipated that the environment of the vehicle 104 may be subdivided into areas 508 and zones 512 in an interior space 108 of a vehicle 104. In this case, each area 508 and/or zone 512 may include one or more of the environmental sensors. Examples of environmental sensors associated with the environmental group 708 may include, but are not limited to, oxygen/air sensors 724, temperature sensors 728, humidity sensors 732, light/photo sensors 736, and more. The oxygen/air sensors 724 may be configured to detect a quality of the air in the interior space 108 of the vehicle 104 (e.g., ratios and/or types of gasses comprising the air inside the vehicle 104, dangerous gas levels, safe gas levels, etc.). Temperature sensors 728 may be configured to detect temperature readings of one or more objects, users 216, and/or areas 508 of a vehicle 104. Humidity sensors 732 may detect an amount of water vapor present in the air inside the vehicle 104. The light/photo sensors 736 can detect an amount of light present in the vehicle 104. Further, the light/photo sensors 736 may be configured to detect various levels of light intensity associated with light in the vehicle 104.

The user interface group 712 may comprise sensors configured to collect data relating to one or more users 216 in a vehicle 104. As can be appreciated, the user interface group 712 may include sensors that are configured to collect data from users 216 in one or more areas 508 and zones 512 of the vehicle 104. For example, each area 508 and/or zone 512 of the vehicle 104 may include one or more of the sensors in the user interface group 712. Examples of user interface sensors associated with the user interface group 712 may include, but are not limited to, infrared sensors 740, motion sensors 744, weight sensors 748, wireless network sensors 752, biometric sensors 756, camera (or image) sensors 760, audio sensors 764, and more.

Infrared sensors 740 may be used to measure IR light irradiating from at least one surface, user 216, or other object in the vehicle 104. Among other things, the Infrared sensors 740 may be used to measure temperatures, form images (especially in low light conditions), identify users 216, and even detect motion in the vehicle 104.

The motion sensors 744 may be similar to the motion detectors 624A-B, as described in conjunction with FIG. 6B. Weight sensors 748 may be employed to collect data relating to objects and/or users 216 in various areas 508 of the vehicle 104. In some cases, the weight sensors 748 may be included in the seats and/or floor of a vehicle 104.

Optionally, the vehicle 104 may include a wireless network sensor 752. This sensor 752 may be configured to detect one or more wireless network(s) inside the vehicle 104. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 104 via the wireless network sensor 752. In this case, the vehicle 104 may determine to utilize and/or share the mobile hotspot detected via/with one or more other devices 212, 248 and/or components associated with the vehicle 104.

Biometric sensors 756 may be employed to identify and/or record characteristics associated with a user 216. It is anticipated that biometric sensors 756 can include at least one of image sensors, IR sensors, fingerprint readers, weight sensors, load cells, force transducers, heart rate monitors, blood pressure monitors, and the like as provided herein.

The camera sensors 760 may be similar to image sensors 622A-B, as described in conjunction with FIG. 6B. Optionally, the camera sensors may record still images, video, and/or combinations thereof. The audio sensors 764 may be similar to the interior sound receivers 692A-B, as described in conjunction with FIGS. 6A-6B. The audio sensors may be configured to receive audio input from a user 216 of the vehicle 104. The audio input from a user 216 may correspond to voice commands, conversations detected in the vehicle 104, phone calls made in the vehicle 104, and/or other audible expressions made in the vehicle 104.

The safety group 716 may comprise sensors configured to collect data relating to the safety of a user 216 and/or one or more components of a vehicle 104. The vehicle 104 may be subdivided into areas 508 and/or zones 512 in an interior space 108 of a vehicle 104 where each area 508 and/or zone 512 may include one or more of the safety sensors provided herein. Examples of safety sensors associated with the safety group 716 may include, but are not limited to, force sensors 768, mechanical motion sensors 772, orientation sensors 776, restraint sensors 780, and more.

The force sensors 768 may include one or more sensors inside the vehicle 104 configured to detect a force observed in the vehicle 104. One example of a force sensor 768 may include a force transducer that converts measured forces (e.g., force, weight, pressure, etc.) into output signals.

Mechanical motion sensors 772 may correspond to encoders, accelerometers, damped masses, and the like. Optionally, the mechanical motion sensors 772 may be adapted to measure the force of gravity (i.e., G-force) as observed inside the vehicle 104. Measuring the G-force observed inside a vehicle 104 can provide valuable information related to a vehicle's acceleration, deceleration, collisions, and/or forces that may have been suffered by one or more users 216 in the vehicle 104. As can be appreciated, the mechanical motion sensors 772 can be located in an interior space 108 or an exterior of the vehicle 104.

Orientation sensors 776 can include accelerometers, gyroscopes, magnetic sensors, and the like that are configured to detect an orientation associated with the vehicle 104. Similar to the mechanical motion sensors 772, the orientation sensors 776 can be located in an interior space 108 or an exterior of the vehicle 104.

The restraint sensors 780 may be similar to the safety restraint sensors 679 as described in conjunction with FIGS. 6A-6B. These sensors 780 may correspond to sensors associated with one or more restraint devices and/or systems in a vehicle 104. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 720 can include any sensors that are associated with a device 212, 248 in the vehicle 104. As previously stated, typical devices 212, 248 may include smart phones, tablets, laptops, mobile computers, and the like. It is anticipated that the various sensors associated with these devices 212, 248 can be employed by the vehicle control system 204. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 720 may be used by one or more subsystems of the vehicle system 200.

In FIG. 7B, a block diagram of an embodiment of exterior sensors 340 for a vehicle 104 is shown. The exterior sensors may include sensors that are identical, or substantially similar, to those previously disclosed in conjunction with the interior sensors of FIG. 7A. Optionally, the exterior sensors 340 may be configured to collect data relating to one or more conditions, objects, users 216, and other events that are external to the interior space 108 of the vehicle 104. For instance, the oxygen/air sensors 724 may measure a quality and/or composition of the air outside of a vehicle 104. As another example, the motion sensors 744 may detect motion outside of a vehicle 104.

The external environmental group 708E may comprise sensors configured to collect data relating to the external environment of a vehicle 104. In addition to including one or more of the sensors previously described, the external environmental group 708E may include additional sensors, such as, vehicle sensors 750, biological sensors, and wireless signal sensors 758. Vehicle sensors 750 can detect vehicles that are in an environment surrounding the vehicle 104. For example, the vehicle sensors 750 may detect vehicles in a first outside area 516, a second outside area 520, and/or combinations of the first and second outside areas 516, 520. Optionally, the vehicle sensors 750 may include one or more of RF sensors, IR sensors, image sensors, and the like to detect vehicles, people, hazards, etc. that are in an environment exterior to the vehicle 104. Additionally or alternatively, the vehicle sensors 750 can provide distance/directional information relating to a distance (e.g., distance from the vehicle 104 to the detected object) and/or a direction (e.g., direction of travel, etc.) associated with the detected object.

The biological sensors 754 may determine whether one or more biological entities (e.g., an animal, a person, a user 216, etc.) is in an external environment of the vehicle 104. Additionally or alternatively, the biological sensors 754 may provide distance information relating to a distance of the biological entity from the vehicle 104. Biological sensors 754 may include at least one of RF sensors, IR sensors, image sensors and the like that are configured to detect biological entities. For example, an IR sensor may be used to determine that an object, or biological entity, has a specific temperature, temperature pattern, or heat signature. Continuing this example, a comparison of the determined heat signature may be compared to known heat signatures associated with recognized biological entities (e.g., based on shape, locations of temperature, and combinations thereof, etc.) to determine whether the heat signature is associated with a biological entity or an inanimate, or non-biological, object.

The wireless signal sensors 758 may include one or more sensors configured to receive wireless signals from signal sources such as Wi-Fi™ hotspots, cell towers, roadside beacons, other electronic roadside devices, and satellite positioning systems. Optionally, the wireless signal sensors 758 may detect wireless signals from one or more of a mobile phone, mobile computer, keyless entry device, RFID device, near field communications (NFC) device, and the like.

The external safety group 716E may comprise sensors configured to collect data relating to the safety of a user 216 and/or one or more components of a vehicle 104. Examples of safety sensors associated with the external safety group 716E may include, but are not limited to, force sensors 768, mechanical motion sensors 772, orientation sensors 776, vehicle body sensors 782, and more. Optionally, the exterior safety sensors 716E may be configured to collect data relating to one or more conditions, objects, vehicle components, and other events that are external to the vehicle 104. For instance, the force sensors 768 in the external safety group 716E may detect and/or record force information associated with the outside of a vehicle 104. For instance, if an object strikes the exterior of the vehicle 104, the force sensors 768 from the exterior safety group 716E may determine a magnitude, location, and/or time associated with the strike.

The vehicle 104 may include a number of vehicle body sensors 782. The vehicle body sensors 782 may be configured to measure characteristics associated with the body (e.g., body panels, components, chassis, windows, etc.) of a vehicle 104. For example, two vehicle body sensors 782, including a first body sensor and a second body sensor, may be located at some distance apart. Continuing this example, the first body sensor may be configured to send an electrical signal across the body of the vehicle 104 to the second body sensor, or vice versa. Upon receiving the electrical signal from the first body sensor, the second body sensor may record a detected current, voltage, resistance, and/or combinations thereof associated with the received electrical signal. Values (e.g., current, voltage, resistance, etc.) for the sent and received electrical signal may be stored in a memory. These values can be compared to determine whether subsequent electrical signals sent and received between vehicle body sensors 782 deviate from the stored values. When the subsequent signal values deviate from the stored values, the difference may serve to indicate damage and/or loss of a body component. Additionally or alternatively, the deviation may indicate a problem with the vehicle body sensors 782. The vehicle body sensors 782 may communicate with each other, a vehicle control system 204, and/or systems of the vehicle system 200 via a communications channel 356. Although described using electrical signals, it should be appreciated that alternative embodiments of the vehicle body sensors 782 may use sound waves and/or light to perform a similar function.

Figure 8A:
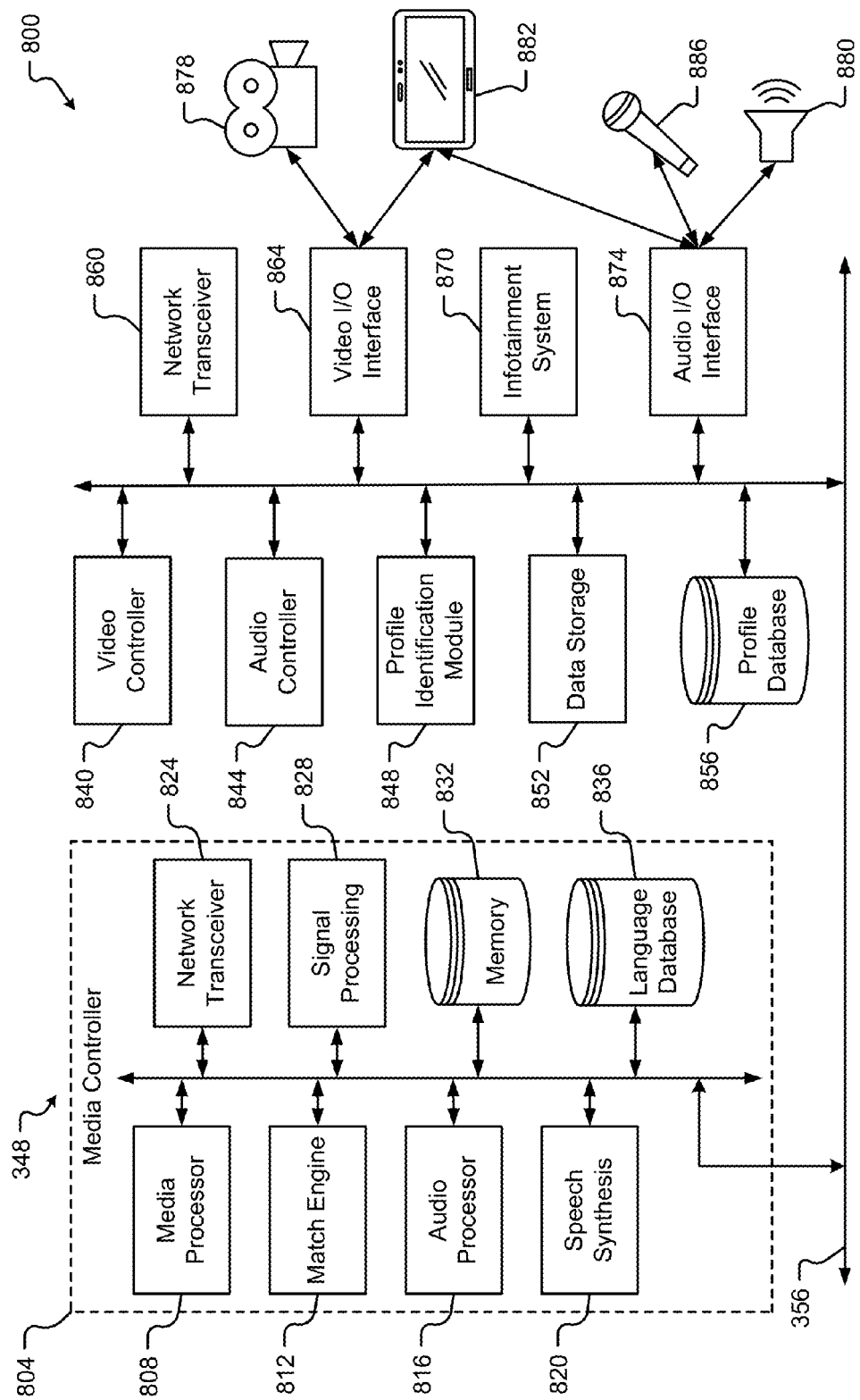
FIG. 8A is a block diagram of an embodiment of a media subsystem for a vehicle.

FIG. 8A is a block diagram of an embodiment of a media controller subsystem 348 for a vehicle 104. The media controller subsystem 348 may include, but is not limited to, a media controller 804, a media processor 808, a match engine 812, an audio processor 816, a speech synthesis module 820, a network transceiver 824, a signal processing module 828, memory 832, and a language database 836. Optionally, the media controller subsystem 348 may be configured as a dedicated blade that implements the media-related functionality of the system 200. Additionally or alternatively, the media controller subsystem 348 can provide voice input, voice output, library functions for multimedia, and display control for various areas 508 and/or zones 512 of the vehicle 104.

Optionally, the media controller subsystem 348 may include a local IP address (e.g., IPv4, IPv6, combinations thereof, etc.) and even a routable, global unicast address. The routable, global unicast address may allow for direct addressing of the media controller subsystem 348 for streaming data from Internet resources (e.g., cloud storage, user accounts, etc.). It is anticipated, that the media controller subsystem 348 can provide multimedia via at least one Internet connection, or wireless network communications module, associated with the vehicle 104. Moreover, the media controller subsystem 348 may be configured to service multiple independent clients simultaneously.

The media processor 808 may comprise a general purpose programmable processor or controller for executing application programming or instructions related to the media subsystem 348. The media processor 808 may include multiple processor cores, and/or implement multiple virtual processors. Optionally, the media processor 808 may include multiple physical processors. By way of example, the media processor 808 may comprise a specially configured application specific integrated circuit (ASIC) or other integrated circuit, a digital signal processor, a controller, a hardwired electronic or logic circuit, a programmable logic device or gate array, a special purpose computer, or the like. The media processor 808 generally functions to run programming code or instructions implementing various functions of the media controller 804.

The match engine 812 can receive input from one or more components of the vehicle system 800 and perform matching functions. Optionally, the match engine 812 may receive audio input provided via a microphone 886 of the system 800. The audio input may be provided to the media controller subsystem 348 where the audio input can be decoded and matched, via the match engine 812, to one or more functions available to the vehicle 104. Similar matching operations may be performed by the match engine 812 relating to video input received via one or more image sensors, cameras 878, and the like.

The media controller subsystem 348 may include a speech synthesis module 820 configured to provide audio output to one or more speakers 880, or audio output devices, associated with the vehicle 104. Optionally, the speech synthesis module 820 may be configured to provide audio output based at least partially on the matching functions performed by the match engine 812.

As can be appreciated, the coding/decoding, the analysis of audio input/output, and/or other operations associated with the match engine 812 and speech synthesis module 820, may be performed by the media processor 808 and/or a dedicated audio processor 816. The audio processor 816 may comprise a general purpose programmable processor or controller for executing application programming or instructions related to audio processing. Further, the audio processor 816 may be similar to the media processor 808 described herein.

The network transceiver 824 can include any device configured to transmit and receive analog and/or digital signals. Optionally, the media controller subsystem 348 may utilize a network transceiver 824 in one or more communication networks associated with the vehicle 104 to receive and transmit signals via the communications channel 356. Additionally or alternatively, the network transceiver 824 may accept requests from one or more devices 212, 248 to access the media controller subsystem 348. One example of the communication network is a local-area network (LAN). As can be appreciated, the functionality associated with the network transceiver 824 may be built into at least one other component of the vehicle 104 (e.g., a network interface card, communications module, etc.).

The signal processing module 828 may be configured to alter audio/multimedia signals received from one or more input sources (e.g., microphones 886, etc.) via the communications channel 356. Among other things, the signal processing module 828 may alter the signals received electrically, mathematically, combinations thereof, and the like.

The media controller 804 may also include memory 832 for use in connection with the execution of application programming or instructions by the media processor 808, and for the temporary or long term storage of program instructions and/or data. As examples, the memory 832 may comprise RAM, DRAM, SDRAM, or other solid state memory.

The language database 836 may include the data and/or libraries for one or more languages, as are used to provide the language functionality as provided herein. In one case, the language database 836 may be loaded on the media controller 804 at the point of manufacture. Optionally, the language database 836 can be modified, updated, and/or otherwise changed to alter the data stored therein. For instance, additional languages may be supported by adding the language data to the language database 836. In some cases, this addition of languages can be performed via accessing administrative functions on the media controller 804 and loading the new language modules via wired (e.g., USB, etc.) or wireless communication. In some cases, the administrative functions may be available via a vehicle console device 248, a user device 212, 248, and/or other mobile computing device that is authorized to access administrative functions (e.g., based at least partially on the device's address, identification, etc.).

One or more video controllers 840 may be provided for controlling the video operation of the devices 212, 248, 882 associated with the vehicle. Optionally, the video controller 840 may include a display controller for controlling the operation of touch sensitive screens, including input (touch sensing) and output (display) functions. Video data may include data received in a stream and unpacked by a processor and loaded into a display buffer. In this example, the processor and video controller 840 can optimize the display based on the characteristics of a screen of a display device 212, 248, 882. The functions of a touch screen controller may be incorporated into other components, such as a media processor 808 or display subsystem.

The audio controller 844 can provide control of the audio entertainment system (e.g., radio, subscription music service, multimedia entertainment, etc.), and other audio associated with the vehicle 104 (e.g., navigation systems, vehicle comfort systems, convenience systems, etc.). Optionally, the audio controller 844 may be configured to translate digital signals to analog signals and vice versa. As can be appreciated, the audio controller 844 may include device drivers that allow the audio controller 844 to communicate with other components of the system 800 (e.g., processors 816, 808, audio I/O 874, and the like).

The system 800 may include a profile identification module 848 to determine whether a user profile is associated with the vehicle 104. Among other things, the profile identification module 848 may receive requests from a user 216, or device 212, 228, 248, to access a profile stored in a profile database 856 or profile data 252. Additionally or alternatively, the profile identification module 848 may request profile information from a user 216 and/or a device 212, 228, 248, to access a profile stored in a profile database 856 or profile data 252. In any event, the profile identification module 848 may be configured to create, modify, retrieve, and/or store user profiles in the profile database 856 and/or profile data 252. The profile identification module 848 may include rules for profile identification, profile information retrieval, creation, modification, and/or control of components in the system 800.

By way of example, a user 216 may enter the vehicle 104 with a smart phone or other device 212. In response to determining that a user 216 is inside the vehicle 104, the profile identification module 848 may determine that a user profile is associated with the user's smart phone 212. As another example, the system 800 may receive information about a user 216 (e.g., from a camera 878, microphone 886, etc.), and, in response to receiving the user information, the profile identification module 848 may refer to the profile database 856 to determine whether the user information matches a user profile stored in the database 856. It is anticipated that the profile identification module 848 may communicate with the other components of the system to load one or more preferences, settings, and/or conditions based on the user profile. Further, the profile identification module 848 may be configured to control components of the system 800 based on user profile information.

Optionally, data storage 852 may be provided. Like the memory 832, the data storage 852 may comprise a solid state memory device or devices. Alternatively or in addition, the data storage 852 may comprise a hard disk drive or other random access memory. Similar to the data storage 852, the profile database 856 may comprise a solid state memory device or devices.

An input/output module 860 and associated ports may be included to support communications over wired networks or links, for example with other communication devices, server devices, and/or peripheral devices. Examples of an input/output module 860 include an Ethernet port, a Universal Serial Bus (USB) port, CAN Bus, Institute of Electrical and Electronics Engineers (IEEE) 1594, or other interface. Users may bring their own devices (e.g., Bring Your Own Device (BYOD), device 212, etc.) into the vehicle 104 for use with the various systems disclosed. Although most BYOD devices can connect to the vehicle systems (e.g., the media controller subsystem 348, etc.) via wireless communications protocols (e.g., Wi-Fi™, Bluetooth®, etc.) many devices may require a direct connection via USB, or similar. In any event, the input/output module 860 can provide the necessary connection of one or more devices to the vehicle systems described herein.

A video input/output interface 864 can be included to receive and transmit video signals between the various components in the system 800. Optionally, the video input/output interface 864 can operate with compressed and uncompressed video signals. The video input/output interface 864 can support high data rates associated with image capture devices. Additionally or alternatively, the video input/output interface 864 may convert analog video signals to digital signals.

The infotainment system 870 may include information media content and/or entertainment content, informational devices, entertainment devices, and the associated programming therefor. Optionally, the infotainment system 870 may be configured to handle the control of one or more components of the system 800 including, but in no way limited to, radio, streaming audio/video devices, audio devices 880, 882, 886, video devices 878, 882, travel devices (e.g., GPS, navigational systems, etc.), wireless communication devices, network devices, and the like. Further, the infotainment system 870 can provide the functionality associated with other infotainment features as provided herein.

An audio input/output interface 874 can be included to provide analog audio to an interconnected speaker 880 or other device, and to receive analog audio input from a connected microphone 886 or other device. As an example, the audio input/output interface 874 may comprise an associated amplifier and analog to digital converter. Alternatively or in addition, the devices 212, 248 can include integrated audio input/output devices 880, 886 and/or an audio jack for interconnecting an external speaker 880 or microphone 886. For example, an integrated speaker 880 and an integrated microphone 886 can be provided, to support near talk, voice commands, spoken information exchange, and/or speaker phone operations.

Among other things, the system 800 may include devices that are part of the vehicle 104 and/or part of a device 212, 248 that is associated with the vehicle 104. For instance, these devices may be configured to capture images, display images, capture sound, and present sound. Optionally, the system 800 may include at least one of image sensors/cameras 878, display devices 882, audio input devices/microphones 886, and audio output devices/speakers 880. The cameras 878 can be included for capturing still and/or video images. Alternatively or in addition, image sensors 878 can include a scanner or code reader. An image sensor/camera 878 can include or be associated with additional elements, such as a flash or other light source. In some cases, the display device 882 may include an audio input device and/or an audio output device in addition to providing video functions. For instance, the display device 882 may be a console, monitor, a tablet computing device, and/or some other mobile computing device.

Figure 8B:
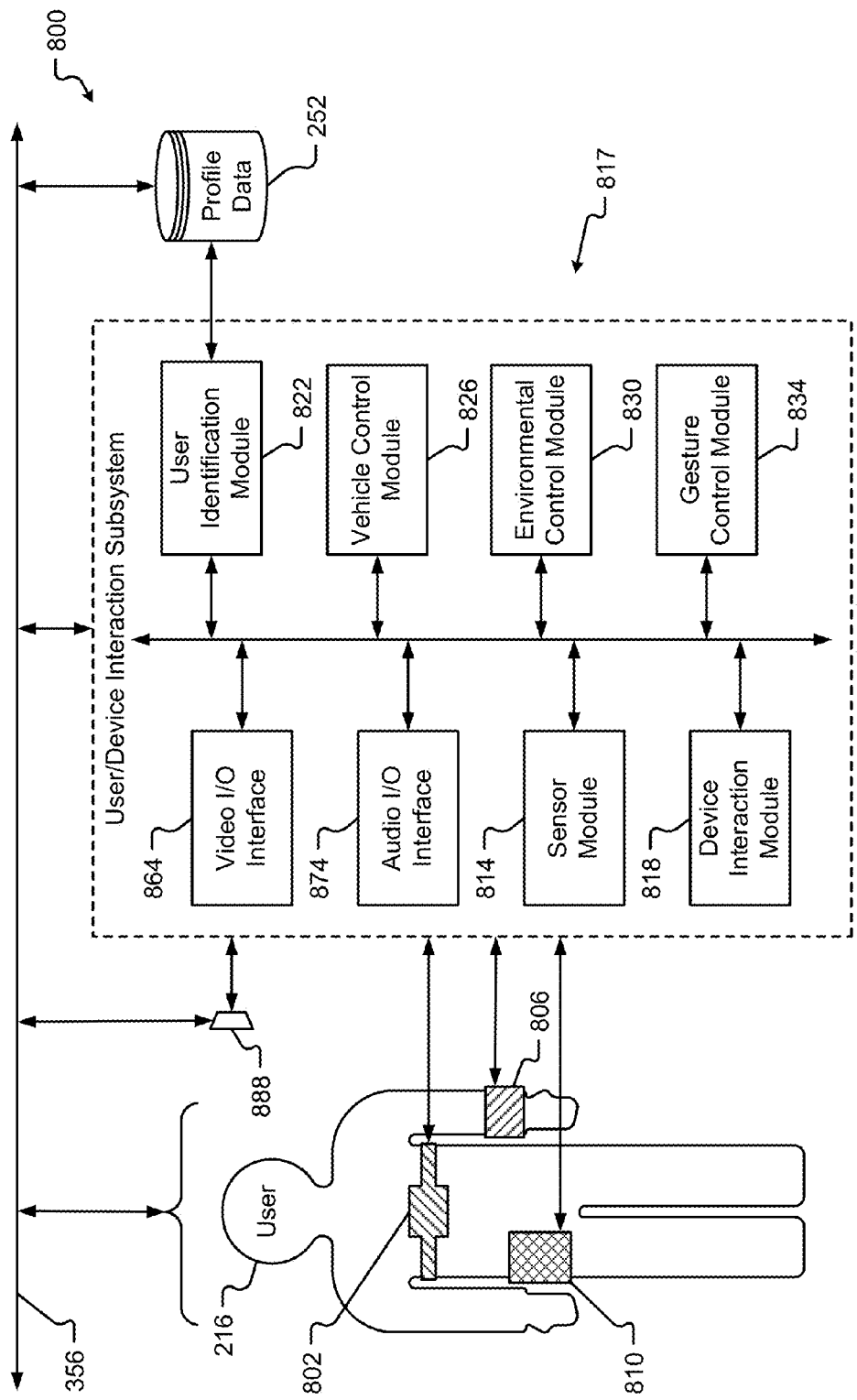
FIG. 8B is a block diagram of an embodiment of a user and device interaction subsystem for a vehicle.

FIG. 8B is a block diagram of an embodiment of a user/device interaction subsystem 817 in a vehicle system 800. The user/device interaction subsystem 817 may comprise hardware and/or software that conduct various operations for or with the vehicle 104. For instance, the user/device interaction subsystem 817 may include at least one user interaction subsystem 332 and device interaction subsystem 352 as previously described. These operations may include, but are not limited to, providing information to the user 216, receiving input from the user 216, and controlling the functions or operation of the vehicle 104, etc. Among other things, the user/device interaction subsystem 817 may include a computing system operable to conduct the operations as described herein.

Optionally, the user/device interaction subsystem 817 can include one or more of the components and modules provided herein. For instance, the user/device interaction subsystem 817 can include one or more of a video input/output interface 864, an audio input/output interface 874, a sensor module 814, a device interaction module 818, a user identification module 822, a vehicle control module 826, an environmental control module 830, and a gesture control module 834. The user/device interaction subsystem 817 may be in communication with other devices, modules, and components of the system 800 via the communications channel 356.

The user/device interaction subsystem 817 may be configured to receive input from a user 216 and/or device via one or more components of the system. By way of example, a user 216 may provide input to the user/device interaction subsystem 817 via wearable devices 802, 806, 810, video input (e.g., via at least one image sensor/camera 878, etc.) audio input (e.g., via the microphone, audio input source, etc.), gestures (e.g., via at least one image sensor 878, motion sensor 888, etc.), device input (e.g., via a device 212, 248 associated with the user, etc.), combinations thereof, and the like.

The wearable devices 802, 806, 810 can include heart rate monitors, blood pressure monitors, glucose monitors, pedometers, movement sensors, wearable computers, and the like. Examples of wearable computers may be worn by a user 216 and configured to measure user activity, determine energy spent based on the measured activity, track user sleep habits, determine user oxygen levels, monitor heart rate, provide alarm functions, and more. It is anticipated that the wearable devices 802, 806, 810 can communicate with the user/device interaction subsystem 817 via wireless communications channels or direct connection (e.g., where the device docks, or connects, with a USB port or similar interface of the vehicle 104).

A sensor module 814 may be configured to receive and/or interpret input provided by one or more sensors in the vehicle 104. In some cases, the sensors may be associated with one or more user devices (e.g., wearable devices 802, 806, 810, smart phones 212, mobile computing devices 212, 248, and the like). Optionally, the sensors may be associated with the vehicle 104, as described in conjunction with FIGS. 6A-7B.

The device interaction module 818 may communicate with the various devices as provided herein. Optionally, the device interaction module 818 can provide content, information, data, and/or media associated with the various subsystems of the vehicle system 800 to one or more devices 212, 248, 802, 806, 810, 882, etc. Additionally or alternatively, the device interaction module 818 may receive content, information, data, and/or media associated with the various devices provided herein.

The user identification module 822 may be configured to identify a user 216 associated with the vehicle 104. The identification may be based on user profile information that is stored in profile data 252. For instance, the user identification module 822 may receive characteristic information about a user 216 via a device, a camera, and/or some other input. The received characteristics may be compared to data stored in the profile data 252. Where the characteristics match, the user 216 is identified. As can be appreciated, where the characteristics do not match a user profile, the user identification module 822 may communicate with other subsystems in the vehicle 104 to obtain and/or record profile information about the user 216. This information may be stored in a memory and/or the profile data storage 252.

The vehicle control module 826 may be configured to control settings, features, and/or the functionality of a vehicle 104. In some cases, the vehicle control module 826 can communicate with the vehicle control system 204 to control critical functions (e.g., driving system controls, braking, accelerating, etc.) and/or noncritical functions (e.g., driving signals, indicator/hazard lights, mirror controls, window actuation, etc.) based at least partially on user/device input received by the user/device interaction subsystem 817.

The environmental control module 830 may be configured to control settings, features, and/or other conditions associated with the environment, especially the interior environment, of a vehicle 104. Optionally, the environmental control module 830 may communicate with the climate control system (e.g. changing cabin temperatures, fan speeds, air direction, etc.), oxygen and/or air quality control system (e.g., increase/decrease oxygen in the environment, etc.), interior lighting (e.g., changing intensity of lighting, color of lighting, etc.), an occupant seating system 648 (e.g., adjusting seat position, firmness, height, etc.), steering wheel 640 (e.g., position adjustment, etc.), infotainment/entertainment system (e.g., adjust volume levels, display intensity adjustment, change content, etc.), and/or other systems associated with the vehicle environment. Additionally or alternatively, these systems can provide input, set-points, and/or responses, to the environmental control module 830. As can be appreciated, the environmental control module 830 may control the environment based at least partially on user/device input received by the user/device interaction subsystem 817.

The gesture control module 834 is configured to interpret gestures provided by a user 216 in the vehicle 104. Optionally, the gesture control module 834 may provide control signals to one or more of the vehicle systems 300 disclosed herein. For example, a user 216 may provide gestures to control the environment, critical and/or noncritical vehicle functions, the infotainment system, communications, networking, and more. Optionally, gestures may be provided by a user 216 and detected via one or more of the sensors as described in conjunction with FIGS. 6B-7A. As another example, one or more motion sensors 888 may receive gesture input from a user 216 and provide the gesture input to the gesture control module 834. Continuing this example, the gesture input is interpreted by the gesture control module 834. This interpretation may include comparing the gesture input to gestures stored in a memory. The gestures stored in memory may include one or more functions and/or controls mapped to specific gestures. When a match is determined between the detected gesture input and the stored gesture information, the gesture control module 834 can provide a control signal to any of the systems/subsystems as disclosed herein.

Figure 8C:
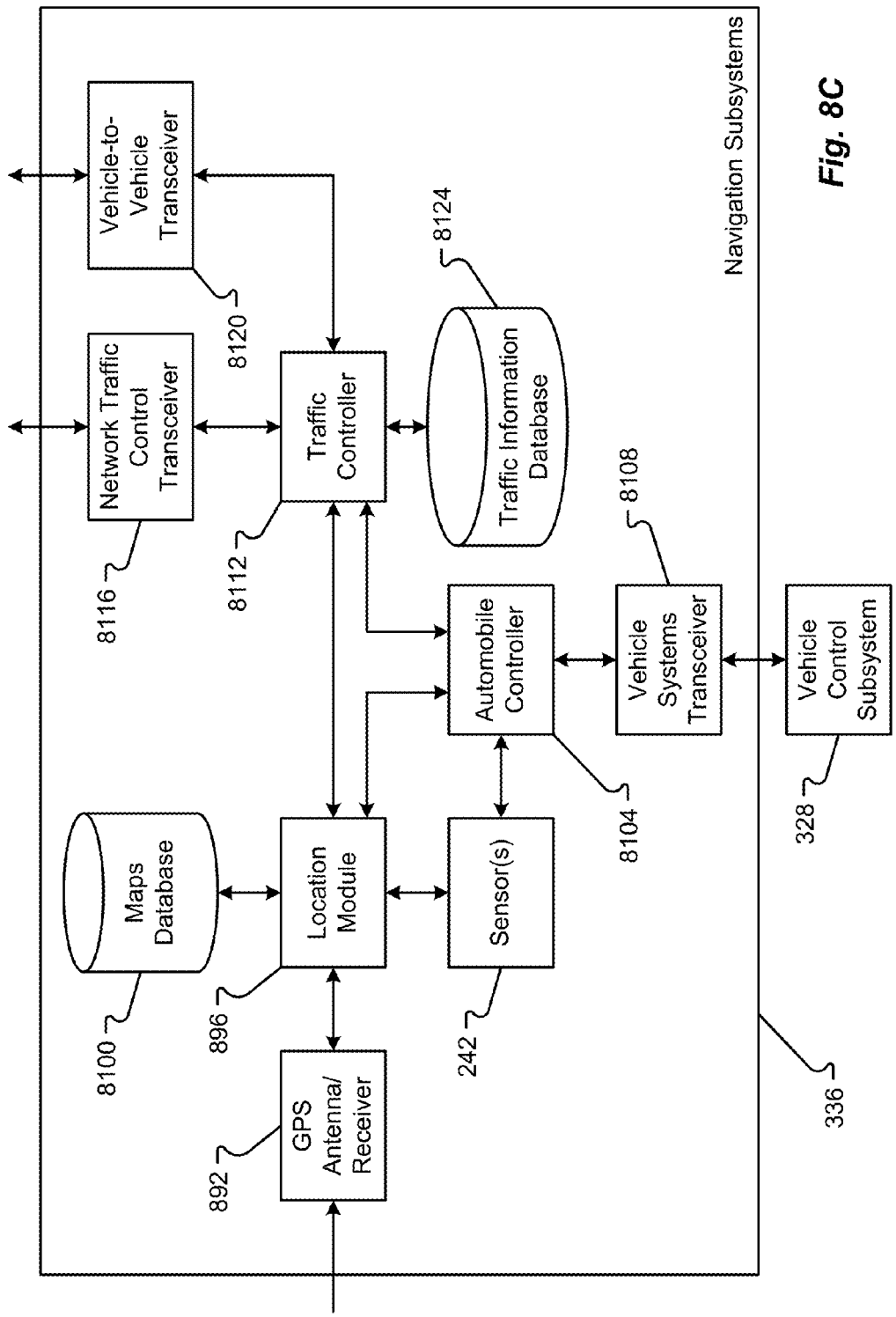
FIG. 8C is a block diagram of an embodiment of a Navigation subsystem for a vehicle.

FIG. 8C illustrates a GPS/Navigation subsystem(s) 336. The Navigation subsystem(s) 336 can be any present or future-built navigation system that may use location data, for example, from the Global Positioning System (GPS), to provide navigation information or control the vehicle 104. The Navigation subsystem(s) 336 can include several components or modules, such as, one or more of, but not limited to, a GPS Antenna/receiver 892, a location module 896, a maps database 8100, an automobile controller 8104, a vehicle systems transceiver 8108, a traffic controller 8112, a network traffic transceiver 8116, a vehicle-to-vehicle transceiver 8120, a traffic information database 8124, etc. Generally, the several components or modules 892-8124 may be hardware, software, firmware, computer readable media, or combinations thereof.

A GPS Antenna/receiver 892 can be any antenna, GPS puck, and/or receiver capable of receiving signals from a GPS satellite or other navigation system, as mentioned hereinbefore. The signals may be demodulated, converted, interpreted, etc. by the GPS Antenna/receiver 892 and provided to the location module 896. Thus, the GPS Antenna/receiver 892 may convert the time signals from the GPS system and provide a location (e.g., coordinates on a map) to the location module 896. Alternatively, the location module 896 can interpret the time signals into coordinates or other location information.

The location module 896 can be the controller of the satellite navigation system designed for use in automobiles. The location module 896 can acquire position data, as from the GPS Antenna/receiver 892, to locate the user or vehicle 104 on a road in the unit's map database 8100. Using the road database 8100, the location module 896 can give directions to other locations along roads also in the database 8100. When a GPS signal is not available, the location module 896 may apply dead reckoning to estimate distance data from sensors 242 including one or more of, but not limited to, a speed sensor attached to the drive train of the vehicle 104, a gyroscope, an accelerometer, etc. GPS signal loss and/or multipath can occur due to urban canyons, tunnels, and other obstructions. Additionally or alternatively, the location module 896 may use known locations of Wi-Fi hotspots, cell tower data, etc. to determine the position of the vehicle 104, such as by using time difference of arrival (TDOA) and/or frequency difference of arrival (FDOA) techniques.

The maps database 8100 can include any hardware and/or software to store information about maps, geographical information system information, location information, etc. The maps database 8100 can include any data definition or other structure to store the information. Generally, the maps database 8100 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The map database contents can be produced or updated by a server connected through a wireless system in communication with the Internet, even as the vehicle 104 is driven along existing streets, yielding an up-to-date map.

An automobile controller 8104 can be any hardware and/or software that can receive instructions from the location module 896 or the traffic controller 8112 and operate the vehicle 104. The automobile controller 8104 receives this information and data from the sensors 242 to operate the vehicle 104 without driver input. Thus, the automobile controller 8104 can drive the vehicle 104 along a route provided by the location module 896. The route may be adjusted by information sent from the traffic controller 8112. Discrete and real-time driving can occur with data from the sensors 242. To operate the vehicle 104, the automobile controller 8104 can communicate with a vehicle systems transceiver 8108.

The vehicle systems transceiver 8108 can be any present or future-developed device that can comprise a transmitter and/or a receiver, which may be combined and can share common circuitry or a single housing. The vehicle systems transceiver 8108 may communicate or instruct one or more of the vehicle control subsystems 328. For example, the vehicle systems transceiver 8108 may send steering commands, as received from the automobile controller 8104, to an electronic steering system, to adjust the steering of the vehicle 100 in real time. The automobile controller 8104 can determine the effect of the commands based on received sensor data 242 and can adjust the commands as need be. The vehicle systems transceiver 8108 can also communicate with the braking system, the engine and drive train to speed or slow the car, the signals (e.g., turn signals and brake lights), the headlights, the windshield wipers, etc. Any of these communications may occur over the components or function as described in conjunction with FIG. 4.

A traffic controller 8112 can be any hardware and/or software that can communicate with an automated traffic system and adjust the function of the vehicle 104 based on instructions from the automated traffic system. An automated traffic system is a system that manages the traffic in a given area. This automated traffic system can instruct cars to drive in certain lanes, instruct cars to raise or lower their speed, instruct a car to change their route of travel, instruct cars to communicate with other cars, etc. To perform these functions, the traffic controller 8112 may register the vehicle 104 with the automated traffic system and then provide other information including the route of travel. The automated traffic system can return registration information and any required instructions. The communications between the automated traffic system and the traffic controller 8112 may be received and sent through a network traffic transceiver 8116.

The network traffic transceiver 8116 can be any present or future-developed device that can comprise a transmitter and/or a receiver, which may be combined and can share common circuitry or a single housing. The network traffic transceiver 8116 may communicate with the automated traffic system using any known or future-developed, protocol, standard, frequency, bandwidth range, etc. The network traffic transceiver 8116 enables the sending of information between the traffic controller 8112 and the automated traffic system.

The traffic controller 8112 can also communicate with another vehicle, which may be in physical proximity (i.e., within range of a wireless signal), using the vehicle-to-vehicle transceiver 8120. As with the network traffic transceiver 8116, the vehicle-to-vehicle transceiver 8120 can be any present or future-developed device that can comprise a transmitter and/or a receiver, which may be combined and can share common circuitry or a single housing. Generally, the vehicle-to-vehicle transceiver 8120 enables communication between the vehicle 104 and any other vehicle. These communications allow the vehicle 104 to receive traffic or safety information, control or be controlled by another vehicle, establish an alternative communication path to communicate with the automated traffic system, establish a node including two or more vehicle that can function as a unit, etc. The vehicle-to-vehicle transceiver 8120 may communicate with the other vehicles using any known or future-developed, protocol standard, frequency, bandwidth range, etc.

The traffic controller 8112 can control functions of the automobile controller 8104 and communicate with the location module 896. The location module 896 can provide current location information and route information that the traffic controller 8112 may then provide to the automated traffic system. The traffic controller 8112 may receive route adjustments from the automated traffic system that are then sent to the location module 896 to change the route. Further, the traffic controller 8112 can also send driving instructions to the automobile controller 8104 to change the driving characteristics of the vehicle 104. For example, the traffic controller 8112 can instruct the automobile controller 8104 to accelerate or decelerate to a different speed, change lanes, or perform another driving maneuver. The traffic controller 8112 can also manage vehicle-to-vehicle communications and store information about the communications or other information in the traffic information database 8124.

The traffic information database 8124 can be any type of database, such as relational, hierarchical, object-oriented, and/or the like. The traffic information database 8124 may reside on a storage medium local to (and/or resident in) the vehicle control system 204 or in the vehicle 104. The traffic information database 8124 may be adapted to store, update, and retrieve information about communications with other vehicles or any active instructions from the automated traffic system. This information may be used by the traffic controller 8112 to instruct or adjust the performance of driving maneuvers.

Figure 9:
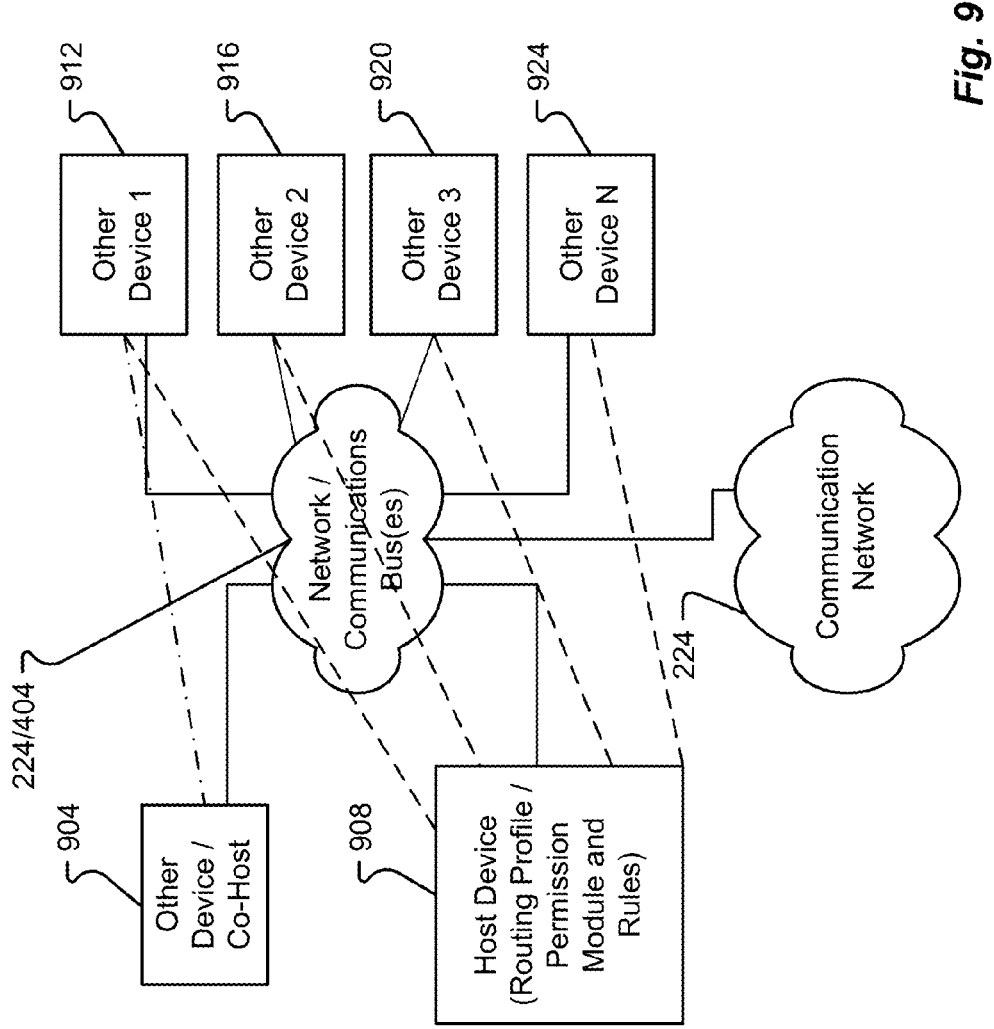
FIG. 9 is a block diagram of an embodiment of a communications subsystem for a vehicle.

FIG. 9 illustrates an optional communications architecture where, the host device 908 may include one more routing profiles, permission modules, and rules that control how communications within the vehicle 104 are to occur. This communications architecture can be used in conjunction with the routing tables, rules and permissions associated with access point 456 and optional firewall 484, or can be in lieu thereof. For example, the host device 908 acts as a mobile hot spot to one or more other devices within vehicle 104, such as, other device 1 912, other device 2 916, other device 3 920, and other device N 924. Optionally, one or more of the other devices 912 can communicate directly with the host device 908 which then provides Internet access to those devices 912 via the device 908. The host device 908 can act as a mobile hot spot for any one or more of the other devices 912, which may not need to communicate over the network/communications buses 224/404, but could instead connect directly to the host device 908 via, for example, NFC, Bluetooth®, WiFi, or the like. When the device 908 is acting as the host device, the device 908 can include one or more routing profiles, permissions, rules modules, and can also act as a firewall for the various inter and intra vehicle communications.

As will be appreciated, there could be alternative host devices, such as, host 904 which could also act as, for example, a co-host in association with device 908. Optionally, one or more of the routing profile, permission information, and rules could be shared between the co-host devices 904, 908, both of those devices being usable for Internet access for one or more of the other devices, 912-924. As will be appreciated, the other devices 912-924 need not necessarily connect to one or more of host device 908 and the other device 904 via a direct communications link, but could also interface with those devices 904, 908 utilizing the network/communications buses 224/404 associated with the vehicle 100. As previously discussed, one or more of the other devices can connect to the network/communications buses 224/404 utilizing the various networks and/or buses discussed herein which would therefore enable, for example, regulation of the various communications based on the Ethernet zone that the other device 912 is associated with.

An embodiment of one or more modules that may be associated with the vehicle control system 204 may be as shown in FIG. 10. The modules can include a communication subsystem interface 1008 in communication with an operating system 1004. The communications may pass through a firewall 1044. The firewall 1044 can be any software that can control the incoming and outgoing communications by analyzing the data packets and determining whether the packets should be allowed through the firewall, based on applied rule set. A firewall 1044 can establish a "barrier" between a trusted, secure internal network and another network (e.g., the Internet) that is not assumed to be secure and trusted.

In some situations, the firewall 1044 may establish security zones that are implemented by running system services and/or applications in restricted user groups and accounts. A set of configuration files and callbacks may then be linked to an IP table firewall. The IP table firewall can be configured to notify a custom filter application at any of the layers of the Ethernet packet. The different users/group rights to access the system may include: system users, which may have exclusive right over all device firewall rules and running software; a big-brother user, which may have access to on board device (OBD) control data and may be able to communicate with the vehicle subsystem 328 and may be able to alter the parameters in the vehicle control system 204; a dealer user, which can have rights to read OBD data for diagnostics and repairs; a dashboard user, which can have rights to launch dashboard applications and/or authenticate guest users and change their permissions to trusted/friend/family, and can read but cannot write into OBD diagnostic data; a world wide web (WWW) data user, which can have HTTP rights to respond to HTTP requests (the HTTP requests also can target different user data, but may be filtered by default user accounts); a guest user, which may have no rights; a family/friend user, which may have rights to play media from the media subsystem 348 and/or to stream media to the media subsystem 348.

The operating system 1004 can be a collection of software that manages computer hardware resources and provides common services for applications and other programs. The operating system 1004 may schedule time-sharing for efficient use of the system. For hardware functions, such as input, output, and memory allocation, the operating system 1004 can act as an intermediary between applications or programs and the computer hardware. Examples of operating systems that may be deployed as operating system 1004 include Android, BSD, iOS, Linux, OS X, QNX, Microsoft Windows, Windows Phone, IBM z/OS, etc.

The operating system 1004 can include one or more sub-modules. For example, a desktop manager 1012 can manage one or more graphical user interfaces (GUI) in a desktop environment. Desktop GUIs can help the user to easily access and edit files. A command-line interface (CLI) may be used if full control over the operating system (OS) 1004 is required. The desktop manager 1012 is described further hereinafter.

A kernel 1028 can be a computer program that manages input/output requests from software and translates them into data processing instructions for the processor 304 and other components of the vehicle control system 204. The kernel 1028 is the fundamental component of the operating system 1004 that can execute many of the functions associated with the OS 1004.

The kernel 1028 can include other software functions, including, but not limited to, driver(s) 1056, communication software 1052, and/or Internet Protocol software 1048. A driver 1056 can be any computer program that operates or controls a particular type of device that is attached to a vehicle control system 204. A driver 1056 can communicate with the device through the bus 356 or communications subsystem 1008 to which the hardware connects. When a calling program invokes a routine in the driver 1056, the driver 1056 may issue one or more commands to the device. Once the device sends data back to the driver 1056, the driver 1056 may invoke routines in the original calling program. Drivers can be hardware-dependent and operating-system-specific. Driver(s) 1056 can provide the interrupt handling required for any necessary asynchronous time-dependent hardware interface.

The IP module 1048 can conduct any IP addressing, which may include the assignment of IP addresses and associated parameters to host interfaces. The address space may include networks and sub-networks. The IP module 1048 can perform the designation of network or routing prefixes and may conduct IP routing, which transports packets across network boundaries. Thus, the IP module 1048 may perform all functions required for IP multicast operations.

The communications module 1052 may conduct all functions for communicating over other systems or using other protocols not serviced by the IP module 1048. Thus, the communications module 1052 can manage multicast operations over other busses or networks not serviced by the IP module 1048. Further, the communications module 1052 may perform or manage communications to one or more devices, systems, data stores, services, etc. that are in communication with the vehicle control system 204 or other sub-systems through the firewall 1044. Thus, the communications module 1052 can conduct communications through the communication subsystem interface 1008.

A file system 1016 may be any data handling software that can control how data is stored and retrieved. The file system 1016 can separate the stored data into individual pieces, and giving each piece a name, can easily separate and identify the pieces of data. Each piece of data may be considered a "file". The file system 1016 can construct data structure and logic rules used to manage the information and the identifiers for the information. The structure and logic rules can be considered a "file system."

A device discovery daemon 1020 may be a computer program that runs as a background process that can discover new devices that connect with the network 356 or communication subsystem 1008 or devices that disconnect from the network 356 or communication subsystem 1008. The device discovery daemon 1020 can ping the network 356 (the local subnet) when the vehicle 104 starts, when a vehicle door opens or closes, or upon the occurrence of other events. Additionally or alternatively, the device discovery daemon 1020 may force Bluetooth®, USB, and/or wireless detection. For each device that responds to the ping, the device discovery daemon 1020 can populate the system data 208 with device information and capabilities, using any of one or more protocols, including one or more of, but not limited to, IPv6 Hop-by-Hop Option (HOPOPT), Internet Control Message Protocol (ICMP), Internet Group Management Protocol (IGMP), Gateway-to-Gateway Protocol (GGP), Internet Protocol (IP), Internet Stream Protocol (ST), Transmission Control Protocol (TCP), Exterior Gateway Protocol (EGP), CHAOS, User Datagram Protocol (UDP), etc.

For example, the device discovery daemon 1020 can determine device capabilities based on the opened ports the device exposes. If a camera exposes port 80, then the device discovery daemon 1020 can determine that the camera is using a Hypertext Transfer Protocol (HTTP). Alternatively, if a device is supporting Universal Plug and Play (UPnP), the system data 208 can include more information, for example, a camera control universal resource locator (URL), a camera zoom URL, etc. When a scan stops, the device discovery daemon 1020 can trigger a dashboard refresh to ensure the user interface reflects the new devices on the desktop.

A desktop manager 1012 may be a computer program that manages the user interface of the vehicle control system 204. The desktop environment may be designed to be customizable and allow the definition of the desktop configuration look-and-feel for a wide range of appliances or devices from computer desktops, mobile devices, computer tablets, etc. Launcher(s), panels, desktop areas, the desktop background, notifications, panes, etc., can be configured from a dashboard configuration file managed by the desktop manager 1012. The graphical elements in which the desktop manager 1012 controls can include launchers, the desktop, notification bars, etc.

The desktop may be an area of the display where the applications are running. The desktop can have a custom background. Further, the desktop may be divided into two or more areas. For example, the desktop may be divided into an upper half of a display and a lower half of the display. Each application can be configured to run in a portion of the desktop. Extended settings can be added to the desktop configuration file, such that, some objects may be displayed over the whole desktop or in custom size out of the context of the divided areas.

The notification bar may be a part of a bar display system, which may provide notifications by displaying, for example, icons and/or pop-up windows that may be associated with sound notifications. The notification mechanism can be designed for separate plug-ins, which run in separate processes and may subscribe to a system Intelligent Input Bus (IBUS)/D-BUS event service. The icons on the notifications bar can be accompanied with application short-cuts to associated applications, for example, a Bluetooth® manager, a USB manager, radio volume and or tone control, a security firewall, etc.

The desktop manager 1012 may include a windows manager 1032, an application launcher 1036, and/or a panel launcher 1040. Each of these components can control a different aspect of the user interface. The desktop manager 1012 can use a root window to create panels that can include functionality for one or more of, but not limited to: launching applications, managing applications, providing notifications, etc.

The windows manager 1032 may be software that controls the placement and appearance of windows within a graphical user interface presented to the user. Generally, the windows manager 1032 can provide the desktop environment used by the vehicle control system 204. The windows manager 1032 can communicate with the kernel 1028 to interface with the graphical system that provides the user interface(s) and supports the graphics hardware, pointing devices, keyboard, touch-sensitive screens, etc. The windows manager 1032 may be a tiling window manager (i.e., a window manager with an organization of the screen into mutually non-overlapping frames, as opposed to a coordinate-based stacking of overlapping objects (windows) that attempts to fully emulate the desktop metaphor). The windows manager 1032 may read and store configuration files, in the system data 208, which can control the position of the application windows at precise positions.

An application manager 1036 can control the function of any application over the lifetime of the process. The process or application can be launched from a panel launcher 1040 or from a remote console. The application manager 1036 can intercept the process name and may take appropriate action to manage that process. If the process is not running, the application manager 1036 can load the process and may bring the process to a foreground in a display. The application manager 1036 may also notify the windows manager 1032 to bring the associated window(s) to a top of a window stack for the display. When a process starts from a shell or a notification out of the context of the desktop, the application manager 1036 can scan files to match the process name with the entry name provided. When a match is found, the application manager 1036 can configure the process according to a settings file.

In some situations, the application manager 1036 may restrict an application as singleton (i.e., restricts the instantiation of a class to one object). If an application is already running and the application manager 1036 is asked to run the application again, the application manager 1036 can bring the running process to a foreground on a display. There can be a notification event exchange between the windows manager 1032 and the application manager 1036 for activating the appropriate window for the foreground process. Once an application is launched, the application may not be terminated or killed. The application can be sent to the background, except, possibly, for some applications (e.g., media player, Bluetooth®, notifications, etc.), which may be given a lowest process priority.

The panel launcher 1040 can be a widget configured to be placed along a portion of the display. The panel launcher 1040 may be built from desktop files from a desktop folder. The desktop folder location can be configured by a configuration file stored in system data 208. The panel launcher 1040 can allow for the launching or executing of applications or processes by receiving inputs from a user interface to launch programs.

A desktop plugin 1024 may be a software component that allows for customization of the desktop or software interface through the initiation of plug-in applications.

One or more gestures used to interface with the vehicle control system 204 may be as described in conjunction with FIG. 11A through 11K. FIGS. 11A through 11H depict various graphical representations of gesture inputs that may be recognized by the devices 212, 248. The gestures may be performed not only by a user's body part, such as a digit, but also by other devices, such as a stylus, that may be sensed by the contact sensing portion(s) of a screen associated with the device 212, 248. In general, gestures are interpreted differently, based on where the gestures are performed (either directly on a display or in a gesture capture region). For example, gestures in a display may be directed to a desktop or application, and gestures in a gesture capture region may be interpreted as for the system.

With reference to FIGS. 11A-11H, a first type of gesture, a touch gesture 1120, is substantially stationary on a portion (e.g., a screen, a display, etc.) of a device 212, 248 for a selected length of time. A circle 1128 represents a touch or other contact type received at particular location of a contact sensing portion of the screen. The circle 1128 may include a border 1132, the thickness of which indicates a length of time that the contact is held substantially stationary at the contact location. For instance, a tap 1120 (or short press) has a thinner border 1132A than the border 1132B for a long press 1124 (or for a normal press). The long press 1124 may involve a contact that remains substantially stationary on the screen for longer time period than that of a tap 1120. As will be appreciated, differently defined gestures may be registered depending upon the length of time that the touch remains stationary prior to contact cessation or movement on the screen.

Figure 11A:
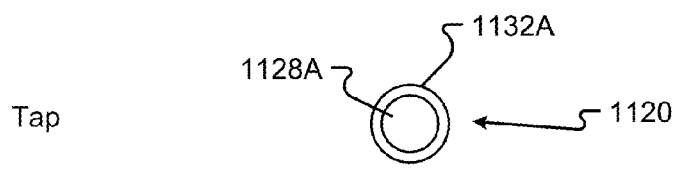
FIG. 11A is a graphical representation of an embodiment of a gesture that a user may perform to provide input to a vehicle control system.
Figure 11B:
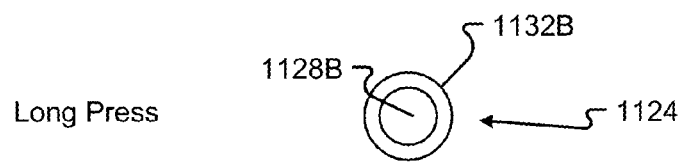
FIG. 11B is a graphical representation of an embodiment of a gesture that a user may perform to provide input to a vehicle control system.
Figure 11C:
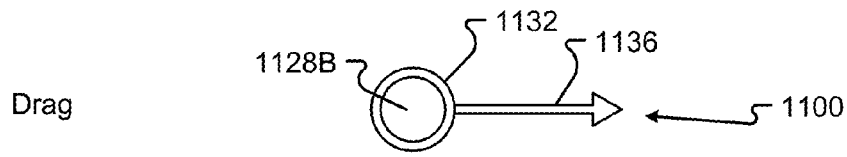
FIG. 11C is a graphical representation of an embodiment of a gesture that a user may perform to provide input to a vehicle control system.

With reference to FIG. 11C, a drag gesture 1100 on the screen is an initial contact (represented by circle 1128) with contact movement 1136 in a selected direction. The initial contact 1128 may remain stationary on the screen for a certain amount of time represented by the border 1132. The drag gesture typically requires the user to contact an icon, window, or other displayed image at a first location followed by movement of the contact in a drag direction to a new second location desired for the selected displayed image. The contact movement need not be in a straight line but have any path of movement so long as the contact is substantially continuous from the first to the second locations.

Figure 11D:
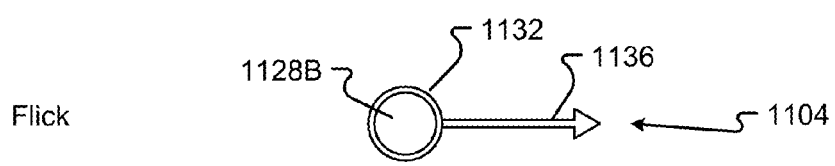
FIG. 11D is a graphical representation of an embodiment of a gesture that a user may perform to provide input to a vehicle control system.

With reference to FIG. 11D, a flick gesture 1104 on the screen is an initial contact (represented by circle 1128) with truncated contact movement 1136 (relative to a drag gesture) in a selected direction. A flick may have a higher exit velocity for the last movement in the gesture compared to the drag gesture. The flick gesture can, for instance, be a finger snap following initial contact. Compared to a drag gesture, a flick gesture generally does not require continual contact with the screen from the first location of a displayed image to a predetermined second location. The contacted displayed image is moved by the flick gesture in the direction of the flick gesture to the predetermined second location. Although both gestures commonly can move a displayed image from a first location to a second location, the temporal duration and distance of travel of the contact on the screen is generally less for a flick than for a drag gesture.

Figure 11E:
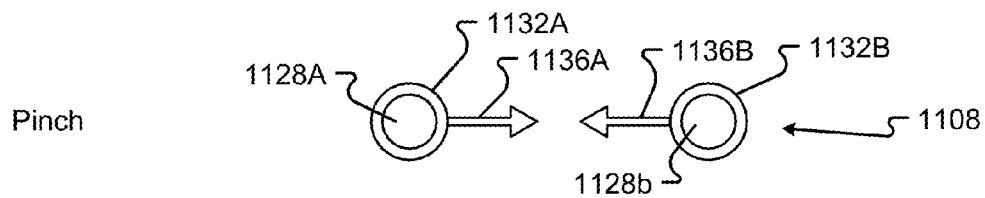
FIG. 11E is a graphical representation of an embodiment of a gesture that a user may perform to provide input to a vehicle control system.

With reference to FIG. 11E, a pinch gesture 1108 on the screen is depicted. The pinch gesture 1108 may be initiated by a first contact 1128A to the screen by, for example, a first digit and a second contact 1128B to the screen by, for example, a second digit. The first and second contacts 1128A,B may be detected by a common contact sensing portion of a common screen, by different contact sensing portions of a common screen, or by different contact sensing portions of different screens. The first contact 1128A is held for a first amount of time, as represented by the border 1132A, and the second contact 1128B is held for a second amount of time, as represented by the border 1132B. The first and second amounts of time are generally substantially the same, and the first and second contacts 1128A,B generally occur substantially simultaneously. The first and second contacts 1128A,B generally also include corresponding first and second contact movements 1136A,B, respectively. The first and second contact movements 1136A,B are generally in opposing directions. Stated another way, the first contact movement 1136A is towards the second contact 1136B, and the second contact movement 1136B is towards the first contact 1136A. More simply stated, the pinch gesture 1108 may be accomplished by a user's digits touching the screen in a pinching motion.

Figure 11F:
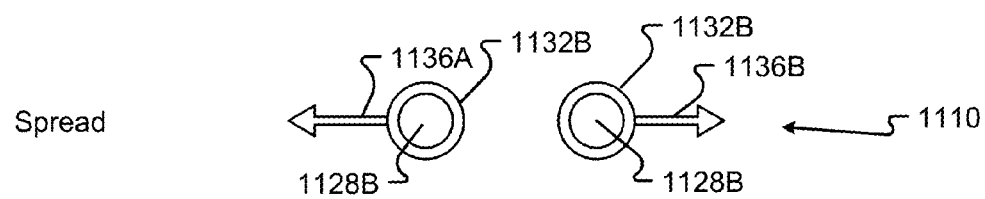
FIG. 11F is a graphical representation of an embodiment of a gesture that a user may perform to provide input to a vehicle control system.

With reference to FIG. 11F, a spread gesture 1110 on the screen is depicted. The spread gesture 1110 may be initiated by a first contact 1128A to the screen by, for example, a first digit, and a second contact 1128B to the screen by, for example, a second digit. The first and second contacts 1128A,B may be detected by a common contact sensing portion of a common screen, by different contact sensing portions of a common screen, or by different contact sensing portions of different screens. The first contact 1128A is held for a first amount of time, as represented by the border 1132A, and the second contact 1128B is held for a second amount of time, as represented by the border 1132B. The first and second amounts of time are generally substantially the same, and the first and second contacts 1128A,B generally occur substantially simultaneously. The first and second contacts 1128A,B generally also include corresponding first and second contact movements 1136A,B, respectively. The first and second contact movements 1136A,B are generally in an opposing direction. Stated another way, the first and second contact movements 1136A,B are away from the first and second contacts 1128A,B. More simply stated, the spread gesture 1110 may be accomplished by a user's digits touching the screen in a spreading motion.

Figure 11G:
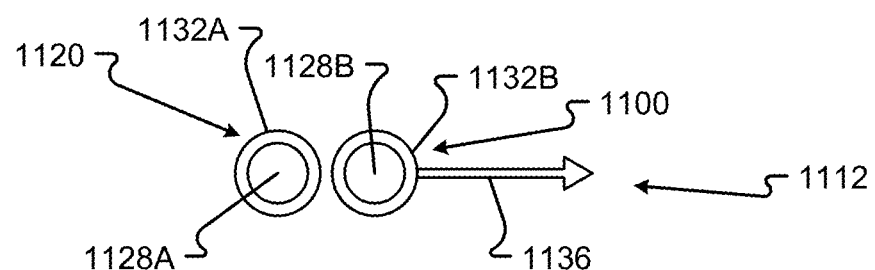
FIG. 11G is a graphical representation of an embodiment of a gesture that a user may perform to provide input to a vehicle control system.
Figure 11H:
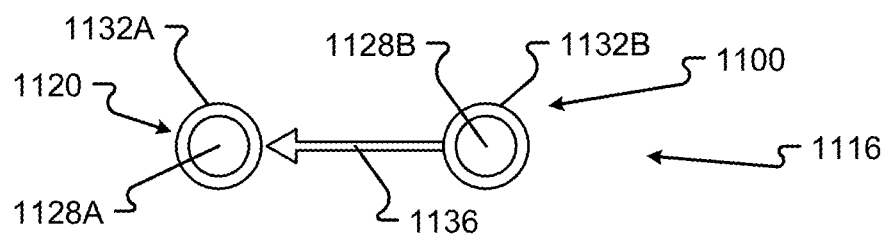
FIG. 11H is a graphical representation of an embodiment of a gesture that a user may perform to provide input to a vehicle control system.

The above gestures may be combined in any manner, such as those shown by FIGS. 11G and 11H, to produce a determined functional result. For example, in FIG. 11G a tap gesture 1120 is combined with a drag or flick gesture 1112 in a direction away from the tap gesture 1120. In FIG. 11H, a tap gesture 1120 is combined with a drag or flick gesture 1116 in a direction towards the tap gesture 1120.

The functional result of receiving a gesture can vary depending on a number of factors, including a state of the vehicle 104, display, or screen of a device, a context associated with the gesture, or sensed location of the gesture, etc. The state of the vehicle 104 commonly refers to one or more of a configuration of the vehicle 104, a display orientation, and user and other inputs received by the vehicle 104. Context commonly refers to one or more of the particular application(s) selected by the gesture and the portion(s) of the application currently executing, whether the application is a single- or multi-screen application, and whether the application is a multi-screen application displaying one or more windows. A sensed location of the gesture commonly refers to whether the sensed set(s) of gesture location coordinates are on a touch sensitive display or a gesture capture region of a device 212, 248, whether the sensed set(s) of gesture location coordinates are associated with a common or different display, or screen, or device 212, 248, and/or what portion of the gesture capture region contains the sensed set(s) of gesture location coordinates.

A tap, when received by a touch sensitive display of a device 212, 248, can be used, for instance, to select an icon to initiate or terminate execution of a corresponding application, to maximize or minimize a window, to reorder windows in a stack, and/or to provide user input such as by keyboard display or other displayed image. A drag, when received by a touch sensitive display of a device 212, 248, can be used, for instance, to relocate an icon or window to a desired location within a display, to reorder a stack on a display, or to span both displays (such that the selected window occupies a portion of each display simultaneously). A flick, when received by a touch sensitive display of a device 212, 248 or a gesture capture region, can be used to relocate a window from a first display to a second display or to span both displays (such that the selected window occupies a portion of each display simultaneously). Unlike the drag gesture, however, the flick gesture is generally not used to move the displayed image to a specific user-selected location but to a default location that is not configurable by the user.

The pinch gesture, when received by a touch sensitive display or a gesture capture region of a device 212, 248, can be used to minimize or otherwise increase the displayed area or size of a window (typically when received entirely by a common display), to switch windows displayed at the top of the stack on each display to the top of the stack of the other display (typically when received by different displays or screens), or to display an application manager (a "pop-up window" that displays the windows in the stack). The spread gesture, when received by a touch sensitive display or a gesture capture region of a device 212, 248, can be used to maximize or otherwise decrease the displayed area or size of a window, to switch windows displayed at the top of the stack on each display to the top of the stack of the other display (typically when received by different displays or screens), or to display an application manager (typically when received by an off-screen gesture capture region on the same or different screens).

The combined gestures of FIG. 11G, when received by a common display capture region in a common display or screen of a device 212, 248, can be used to hold a first window location constant for a display receiving the gesture while reordering a second window location to include a window in the display receiving the gesture. The combined gestures of FIG. 11H, when received by different display capture regions in a common display or screen of a device 212, 248 or in different displays or screens of one more devices 212, 248, can be used to hold a first window location for a display receiving the tap part of the gesture while reordering a second window location to include a window in the display receiving the flick or drag gesture. Although specific gestures and gesture capture regions in the preceding examples have been associated with corresponding sets of functional results, it is to be appreciated that these associations can be redefined in any manner to produce differing associations between gestures and/or gesture capture regions and/or functional results.

Figure 11I:
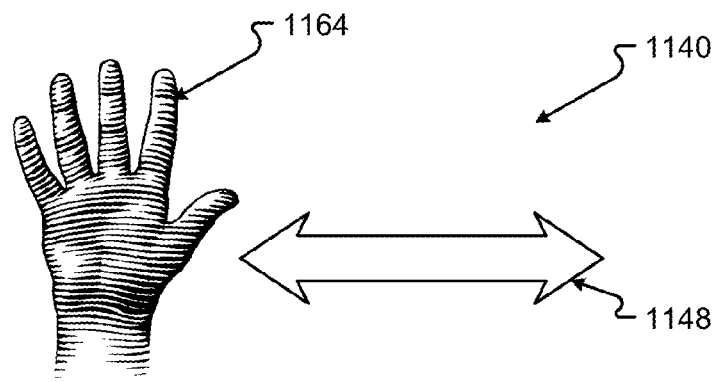
FIG. 11I is a graphical representation of an embodiment of a gesture that a user may perform to provide input to a vehicle control system.
Figure 11J:
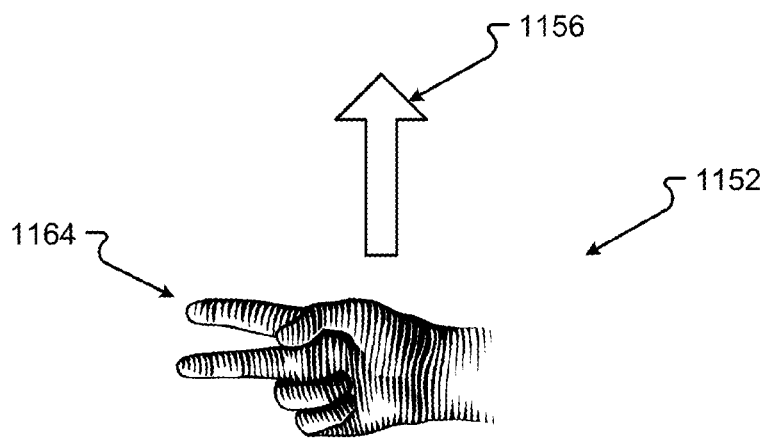
FIG. 11J is a graphical representation of an embodiment of a gesture that a user may perform to provide input to a vehicle control system.
Figure 11K:
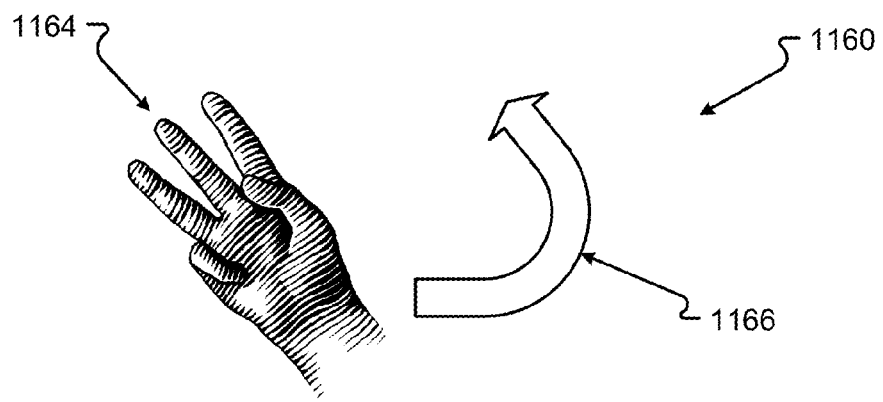
FIG. 11K is a graphical representation of an embodiment of a gesture that a user may perform to provide input to a vehicle control system.

Gestures that may be completed in three-dimensional space and not on a touch sensitive screen or gesture capture region of a device 212, 248 may be as shown in FIGS. 11I-11K. The gestures may be completed in an area where a sensor, such as an optical sensor, infrared sensor, or other type of sensor, may detect the gesture. For example, the gesture 1140 in FIG. 11I may be executed by a person when the person opens their hand 1164 and moves their hand in a back and forth direction 1148 as a gesture 1140 to complete some function with the vehicle 104. For example gesture 1140 may change the station of the radio in the vehicle 104. The sensors 242 may both determine the configuration of the hand 1164 and the vector of the movement. The vector and hand configuration can be interpreted to mean certain things to the vehicle control system 204 and produce different results.

In another example of a gesture 1152 in FIG. 11J, a user may configure their hand 1164 to extend two fingers and move the hand 1164 in an up and down operation 1156. This gesture 1152 may control the volume of the radio or some other function. For instance, this gesture 1152 may be configured to place the vehicle in a "valet" mode to, among other things, restrict access to certain features associated with the vehicle. Again, the sensors 242 may determine how the person has configured their hand 1164, and the vector of the movement. In another example of a gesture 1160 shown in FIG. 11K, a user may extend their middle three fingers at an angle that is substantially 45° for vertical from straight vertical and circle the hand in a counter-clockwise motion 1166. This gesture 1160 may cause the automobile to change the heat setting or do some other function. As can be understood by one skilled in the art, the configurations of the hand and the types of movement are variable. Thus, the user may configure the hand 1164 in any way imaginable and may also move that hand 1164 in any direction with any vector in three-dimensional space.

The gestures 1140, 1152, 1160, as shown in FIGS. 11I-11K, may occur in a predetermined volume of space within the vehicle 104. For example, a sensor may be configured to identify such gestures 1140, 1152, 1160 between the front passenger's and front driver's seats over a console area within the passenger compartment of the vehicle 104. The gestures 1140, 1152, 1160 may be made within area 1 508A between zones A 512A and B 512B. However, there may be other areas 508 where a user may use certain gestures, where sensors 242 may be able to determine a certain function is desired. Gestures that may be similar but used in different areas within the vehicle 104 may cause different functions to be performed. For example, the gesture 1140 in FIG. 11I, if used in zone E 512E, may change the heat provided in zone E 512E, but may change the station of a radio if used in zone A 512A and/or zone B 512B. Further, the gestures may be made with other body parts or, for example, different expressions of a person's face and may be used to control functions in the vehicle 104. Also, the user may use two hands in some circumstances or do other types of physical movements that can cause different reactions in the vehicle 104.

FIGS. 12A-12D show various embodiments of a data structure 1200 to store different settings. The data structure 1200 may include one or more of data files or data objects 1204, 1250, 1270, 1280. Thus, the data structure 1200 may represent different types of databases or data storage, for example, object-oriented data bases, flat file data structures, relational database, or other types of data storage arrangements. Embodiments of the data structure 1200 disclosed herein may be separate, combined, and/or distributed. As indicated in FIGS. 12A-12D, there may be more or fewer portions in the data structure 1200, as represented by ellipses 1244. Further, there may be more or fewer files in the data structure 1200, as represented by ellipses 1248.

Figure 12A:
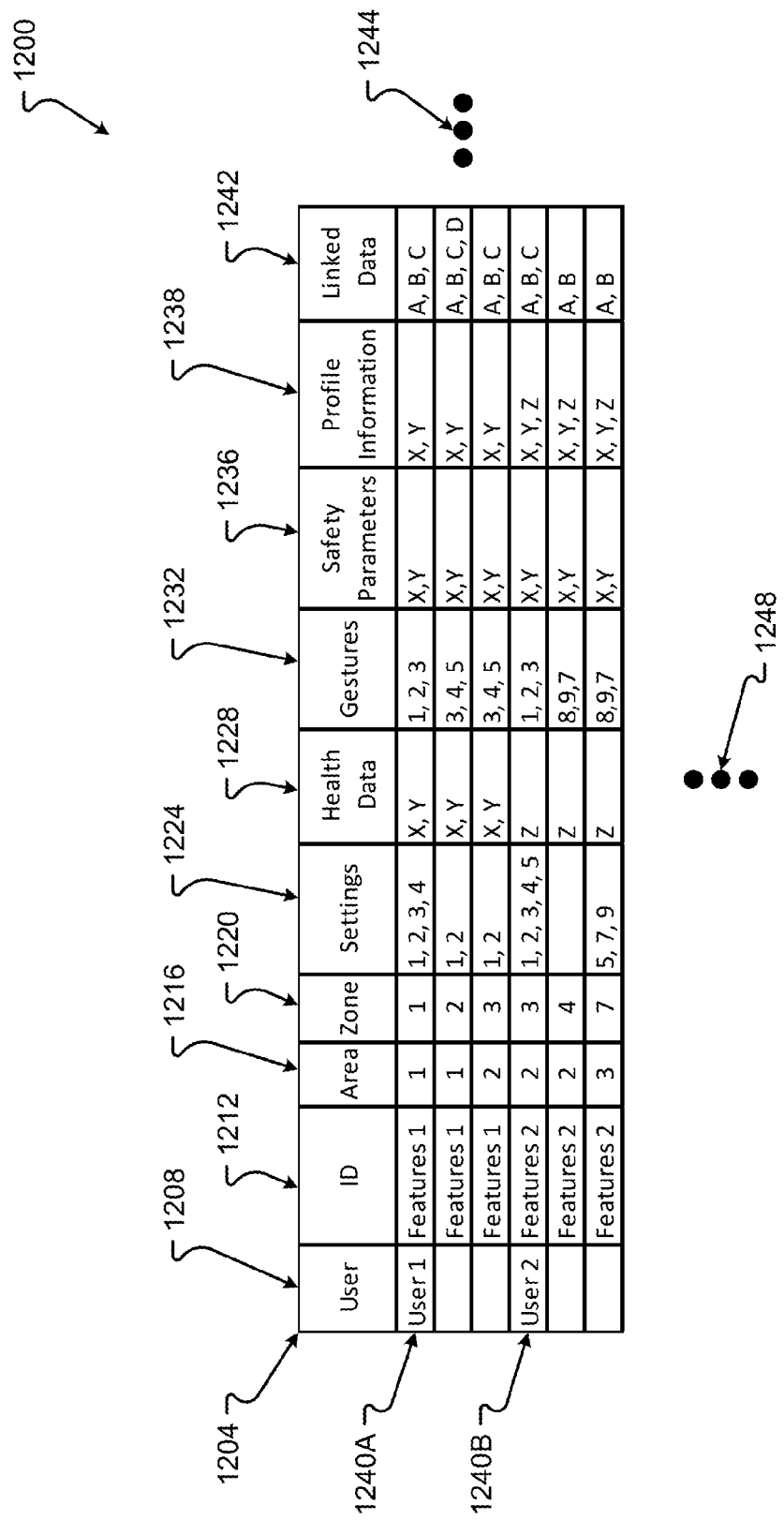
FIG. 12A is a diagram of an embodiment of a data structure for storing information about a user of a vehicle.

Referring to FIG. 12A, a first data structure is shown. The data file 1204 may include several portions 1208-1242 representing different types of data. Each of these types of data may be associated with a user, as shown in portion 1208.

There may be one or more user records 1240 and associated data stored within the data file 1204. As provided herein, the user can be any person that uses or rides within the vehicle or conveyance 104. The user may be identified in portion 1212. For the vehicle 104, the user may include a set of one or more features that may identify the user. These features may be the physical characteristics of the person that may be identified by facial recognition or some other type of system. In other situations, the user may provide a unique code to the vehicle control system 204 or provide some other type of data that allows the vehicle control system 204 to identify the user. The features or characteristics of the user are then stored in portion 1212.

Each user, identified in portion 1208, may have a different set of settings for each area 508 and/or each zone 512 within the vehicle 104. Thus, each set of settings may also be associated with a predetermined zone 512 or area 508. The zone 512 is stored in portion 1220, and the area 508 is stored in portion 1216.

One or more settings may be stored in portion 1224. These settings 1224 may be the configurations of different functions within the vehicle 104 that are specified by or for that user. For example, the settings 1224 may be the position of a seat, the position of a steering wheel, the position of accelerator and/or brake pedals, positions of mirrors, a heating/cooling setting, a radio setting, a cruise control setting, or some other type of setting associated with the vehicle 104. Further, in vehicles adapted to have a configurable console or a configurable dash or heads-up display, the settings 1224 may also provide for how that heads-up display, dash, or console are configured for this particular user.

Each setting 1224 may be associated with a different area 508 or zone 512. Thus, there may be more settings 1224 for when the user is the driver and in zone A 512A, 512A, of area 1, 508A. However, there may be similar settings 1224 among the different zones 512 or areas 508 as shown in portion 1224. For example, the heating or radio settings for the user may be similar in every zone 512.

The sensors 242 within the vehicle 104 may be able to either obtain or track health data in portion 1228. Health data 1228 may include any type of physical characteristic associated with the user. For example, a heart rate, a blood pressure, a temperature, or other types of heath data may be obtained and stored in portion 1228. The user may have this health data tracked over a period of time to allow for statistical analysis of the user's health while operating the vehicle 104. In this way, if some function of the user's health deviates from a norm (e.g., a baseline measurement, average measurements taken over time, and the like), the vehicle 104 may be able to determine there is a problem with the person and react to that data.

One or more gestures may be stored in portion 1232. Thus, the gestures used and described in conjunction FIG. 11A through 11K may be configurable. These gestures may be determined or created by the user and stored in portion 1132. A user may have different gestures for each zone 512 or area 508 within the vehicle. The gestures that do certain things while driving may do other things while in a different area 508 of the vehicle 104. Thus, the user may use a first set of gestures while driving and a second set while a passenger. Further, one or more users may share gestures as shown in portion 1232. Each driver may have a common set of gestures that they use in zone A 512A, 512A. Each of these gestures may be determined or captured and then stored with their characteristics (e.g., vector, position of gesture, etc.) in portion 1232.

One or more sets of safety parameters may be stored in portion 1236. Safety parameters 1236 may be common operating characteristics for this driver/passenger or for all drivers/passengers that if deviated from may determine there is a problem with the driver/passenger or the vehicle 104. For example, a certain route may be taken repeatedly and an average speed or mean speed may be determined. If the mean speed deviates by some number of standard deviations, a problem with the vehicle 104 or the user may be determined. In another example, the health characteristics or driving experience of the user may be determined. If the user drives in a certain position where their head occupies a certain portion of three-dimensional space within the vehicle 104, the vehicle control system 204 may determine that the safety parameter includes the users face or head being within this certain portion of the vehicle interior space. If the user's head deviates from that interior space for some amount of time, the vehicle control system 204 can determine that something is wrong with the driver and change the function or operation of the vehicle 104 to assist the driver. This may happen, for example, when a user falls asleep at the wheel. If the user's head droops and no longer occupies a certain three dimensional space, the vehicle control system 204 can determine that the driver has fallen asleep and may take control of the operation of the vehicle 204 and the automobile controller 8104 may steer the vehicle 204 to the side of the road. In other examples, if the user's reaction time is too slow or some other safety parameter is not nominal, the vehicle control system 204 may determine that the user is inebriated or having some other medical problem. The vehicle control system 204 may then assume control of the vehicle to ensure that the driver is safe.

Information corresponding to a user and/or a user profile may be stored in the profile information portion 1238. For example, the profile information 1238 may include data relating to at least one of current data, historical data, a user preference, user habit, user routine, observation, location data (e.g., programmed and/or requested destinations, locations of parking, routes traveled, average driving time, etc.), social media connections, contacts, brand recognition (e.g., determined via one or more sensors associated with the vehicle 104, a device 212, 248, etc.), audible recording data, text data, email data, political affiliation, preferred retail locations/sites (e.g., physical locations, web-based locations, etc.), recent purchases, behavior associated with the aforementioned data, and the like. The data in the profile information portion 1238 may be stored in one or more of the data structures 1200 provided herein. As can be appreciated, these one or more data structures may be stored in one or more memory locations. Examples of various memory locations are described in conjunction with FIG. 2.

One or more additional data fields may be stored in the linked data portion 1242 as data and/or locations of data. The linked data 1242 may include at least one of pointers, addresses, location identification, data source information, and other information corresponding to additional data associated with the data structure 1200. Optionally, the linked data portion 1242 may refer to data stored outside of a particular data structure 1200. For example, the linked data portion 1242 may include a link/locator to the external data. Continuing this example, the link/locator may be resolved (e.g., via one or more of the methods and/or systems provided herein, etc.) to access the data stored outside of the data structure 1200. Additionally or alternatively, the linked data portion 1242 may include information configured to link the data objects 1204 to other data files or data objects 1250, 1270, 1280. For instance, the data object 1204 relating to a user may be linked to at least one of a device data object 1250, a vehicle system data object 1270, and a vehicle data object 1280, to name a few.

Figure 12B:
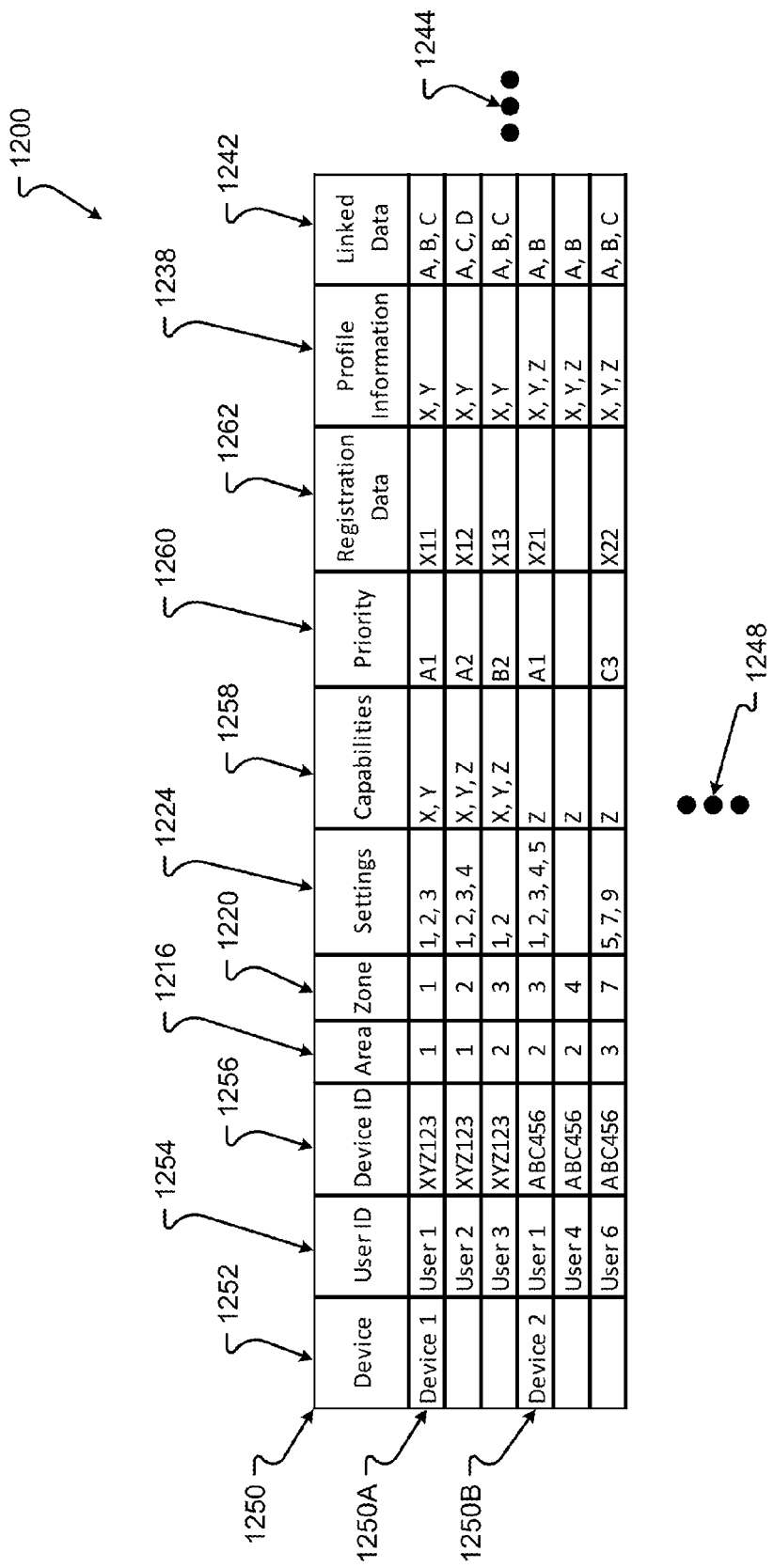
FIG. 12B is a diagram of an embodiment of a data structure for storing information about a device associated with or in a vehicle.

An embodiment of a data structure 1200 to store information associated with one or more devices is shown in FIG. 12B. The data file 1250 may include several portions 1216-1262 representing different types of data. Each of these types of data may be associated with a device, as shown in portion 1252.

There may be one or more device records 1250 and associated data stored within the data file 1250. As provided herein, the device may be any device that is associated with the vehicle 104. For example, a device may be associated with a vehicle 104 when that device is physically located within the interior space 108 of the vehicle 104. As another example, a device may be associated with a vehicle 104 when the device registers with the vehicle 104. Registration may include pairing the device with the vehicle 104 and/or one or more of the vehicle systems (e.g., as provided in FIG. 3). In some cases, the registration of a device with a vehicle 104 may be performed manually and/or automatically. An example of automatic registration may include detecting, via one or more of the vehicle systems, that a device is inside the vehicle 104. Upon detecting that the device is inside the vehicle 104, the vehicle system may identify the device and determine whether the device is or should be registered. Registration may be performed outside of a vehicle 104 via providing a unique code to the vehicle 104 and/or at least one of the vehicle systems.

The device may be identified in portion 1256. Among other things, the device identification may be based on the hardware associated with the device (e.g., Media Access Control (MAC) address, Burned-In Address (BIA), Ethernet Hardware Address (EHA), physical address, hardware address, and the like).

Optionally, a device may be associated with one or more users. For example, a tablet and/or graphical user interface (GUI) associated with the vehicle 104 may be used by multiple members of a family. For instance, the GUI may be located in a particular area 508 and/or zone 512 of the vehicle 104. Continuing this example, when a family member is located in the particular area 508 and/or zone 512, the device may include various settings, features, priorities, capabilities, and the like, based on an identification of the family member. The user may be identified in portion 1254. For the device, the user identification portion 1254 may include a set of one or more features that may identify a particular user. These features may be the physical characteristics of the person that may be identified by facial recognition, or some other type of system, associated with the device and/or the vehicle 104. Optionally, the user may provide a unique code to the device, or provide some other type of data, that allows the device to identify the user. The features or characteristics of the user are then stored in portion 1254.

Each device identified in the device identification portion 1256 may have a different set of settings for each area 508 and/or each zone 512, and/or each user of the device. Thus, each set of settings may also be associated with a predetermined zone 512, area 508, and/or user. The zone 512 is stored in portion 1220 and the area 508 is stored in portion 1216.

One or more settings may be stored in portion 1224. These settings 1224 may be similar and/or identical to those previously described. Further, the settings 1224 may also provide for how a device is configured for a particular user. Each setting 1224 may be associated with a different area 508 or zone 512. Thus, there may be more restrictive settings 1224 (e.g., restricted multimedia, texting, limited access to device functions, and the like) for the device when the user is the driver and in zone A 512A, 512A, of area 1, 508A. However, when the user is in another zone 512 or area 508, for example, where the user is not operating a vehicle 104, the settings 1224 may provide unrestricted access to one or more features of the device (e.g., allowing texting, multimedia, etc.).

Optionally, the capabilities of a device may be stored in portion 1258. Examples of device capabilities may include, but are not limited to, a communications ability (e.g., via wireless network, EDGE, 3G, 4G, LTE, wired, Bluetooth®, Near Field Communications (NFC), Infrared (IR), etc.), hardware associated with the device (e.g., cameras, gyroscopes, accelerometers, touch interface, processor, memory, display, etc.), software (e.g., installed, available, revision, release date, etc.), firmware (e.g., type, revision, etc.), operating system, system status, and the like. Optionally, the various capabilities associated with a device may be controlled by one or more of the vehicle systems provided herein. Among other things, this control allows the vehicle 104 to leverage the power and features of various devices to collect, transmit, and/or receive data.

One or more priorities may be stored in portion 1260. The priority may correspond to a value, or combination of values, configured to determine how a device interacts with the vehicle 104 and/or its various systems. The priority may be based on a location of the device (e.g., as stored in portions 1216, 1220). A default priority can be associated with each area 508 and/or zone 512 of a vehicle 104. For example, the default priority associated with a device found in zone 1 512A of area 1 508A (e.g., a vehicle operator position) may be set higher than an (or the highest of any) alternative zone 512 or area 508 of the vehicle 104. Continuing this example, the vehicle 104 may determine that, although other devices are found in the vehicle, the device, having the highest priority, controls features associated with the vehicle 104. These features may include vehicle control features, critical and/or non-critical systems, communications, and the like. Additionally or alternatively, the priority may be based on a particular user associated with the device. Optionally, the priority may be used to determine which device will control a particular signal in the event of a conflict.

Registration data may be stored in portion 1262. As described above, when a particular device registers with a vehicle 104, data related to the registration may be stored in the registration data portion 1262. Such data may include, but is not limited to, registration information, registration codes, initial registration time, expiration of registration, registration timers, and the like. Optionally, one or more systems of the vehicle 104 may refer to the registration data portion 1262 to determine whether a device has been previously registered with the vehicle 104. As shown in FIG. 12B, User 4 of Device 2 has not been registered. In this case, the registration data field 1262, for this user, may be empty, contain a null value, or other information/indication that there is no current registration information associated with the user.

Additionally or alternatively, the data structure 1200 may include a profile information portion 1238 and/or a linked data portion 1242. Although the profile information portion 1238 and/or the linked data portion 1242 may include different information from that described above, it should be appreciated that the portions 1238, 1242 may be similar, or identical, to those as previously disclosed.

Figure 12C:
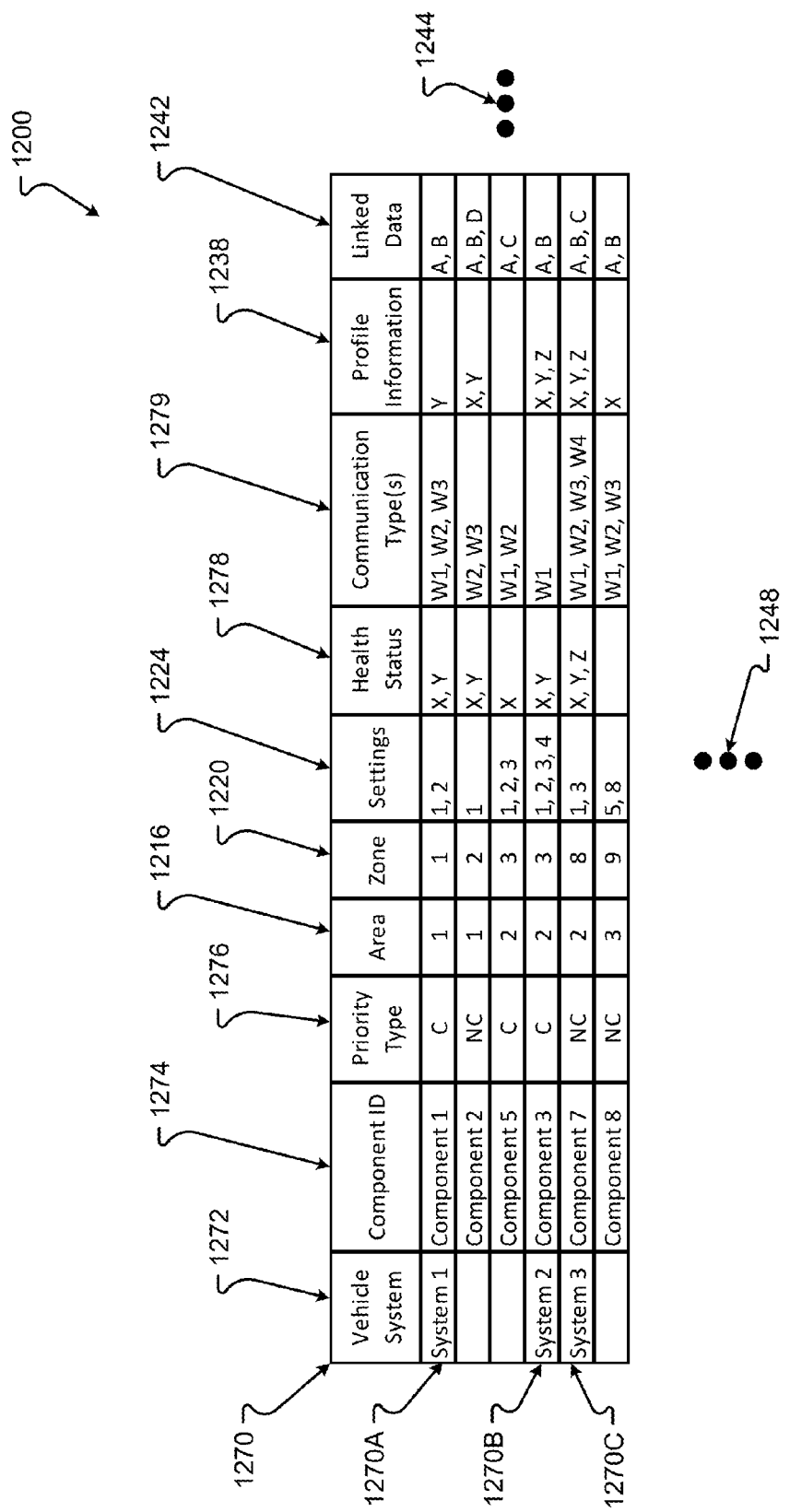
FIG. 12C is a diagram of an embodiment of a data structure for storing information about a system of a vehicle.

An embodiment of a data structure 1200 to store information associated with one or more vehicle systems is shown in FIG. 12C. The data file 1270 may include several portions 1216-1279 representing different types of data. Each of these types of data may be associated with a vehicle system, as shown in portion 1272.

There may be one or more system records 1270 and associated data stored within the data file 1270. As provided herein, the vehicle systems may be any system and/or subsystem that is associated with the vehicle 104. Examples of various systems are described in conjunction with FIG. 3 and other related figures (e.g., systems 324-352, etc.). One example of a system associated with the vehicle 104 is the vehicle control system 204. Other systems may include communications subsystems 344, vehicle subsystems 328, and media subsystems 348, to name a few. It should be appreciated that the various systems may be associated with the interior space 108 and/or the exterior of the vehicle 104.

Each system may include one or more components. The components may be identified in portion 1274. Identification of the one or more components may be based on hardware associated with the component. This identification may include hardware addresses similar to those described in conjunction with the devices of FIG. 12B. Additionally or alternatively, a component can be identified by one or more signals sent via the component. Such signals may include an Internet Protocol (IP), or similar, address as part of the signal. Optionally, the signal may identify the component sending the signal via one or more of a header, a footer, a payload, and/or an identifier associated with the signal (e.g., a packet of a signal, etc.).

Each system and/or component may include priority type information in portion 1276. Among other things, the priority type information stored in portion 1276 may be used by the various methods and systems provided herein to differentiate between critical and non-critical systems. Non-limiting examples of critical systems may correspond to those systems used to control the vehicle 104, such as, steering control, engine control, throttle control, braking control, and/or navigation informational control (e.g., speed measurement, fuel measurement, etc.) Non-critical systems may include other systems that are not directly related to the control of the vehicle 104. By way of example, non-critical systems may include media presentation, wireless communications, comfort settings systems (e.g., climate control, seat position, seat warmers, etc.), and the like. Although examples of critical and/or non-critical systems are provided above, it should be appreciated that the priority type of a system may change (e.g., from critical to non-critical, from non-critical to critical, etc.) depending on the scenario. For instance, although the interior climate control system may be classified as a non-critical system at a first point in time, it may be subsequently classified as a critical system when a temperature inside/outside of the vehicle 104 is measured at a dangerous level (e.g., sub-zero Fahrenheit, greater than 90-degrees Fahrenheit, etc.). As such, the priority type may be associated with temperature conditions, air quality, times of the day, condition of the vehicle 104, and the like.

Each system may be associated with a particular area 508 and/or zone 512 of a vehicle 104. Among other things, the location of a system may be used to assess a state of the system and/or provide how the system interacts with one or more users of the vehicle 104. As can be appreciated each system may have a different set of settings for each area 508 and/or each zone 512, and/or each user of the system. Thus, each set of settings may also be associated with a predetermined zone 512, area 508, system, and/or user. The zone 512 is stored in portion 1220 and the area 508 is stored in portion 1216.

One or more settings may be stored in portion 1224. These settings 1224 may be similar and/or identical to those previously described. Further, the settings 1224 may also provide for how a system is configured for a particular user. Each setting 1224 may be associated with a different area 508 or zone 512. For instance, a climate control system may be associated with more than one area 508 and/or zone 512. As such, a first user seated in zone 1 512A of area 1 508A may store settings related to the climate control of that zone 512A that are different from other users and/or zones 512 of the vehicle 104. Optionally, the settings may not be dependent on a user. For instance, specific areas 508 and/or zones 512 of a vehicle 104 may include different, default, or the same settings based on the information stored in portion 1224.

The various systems and/or components may be able to obtain or track health status data of the systems and/or components in portion 1278. The health status 1278 may include any type of information related to a state of the systems. For instance, an operational condition, manufacturing date, update status, revision information, time in operation, fault status, state of damage detected, inaccurate data reporting, and other types of component/system health status data may be obtained and stored in portion 1278.

Each component and/or system may be configured to communicate with users, systems, servers, vehicles, third parties, and/or other endpoints via one or more communication type. At least one communication ability and/or type associated with a system may be stored in the communication type portion 1279. Optionally, the communication types contained in this portion 1279 may be ordered in a preferential order of communication types. For instance, a system may be configured to preferably communicate via a wired communication protocol over one or more wired communication channels (e.g., due to information transfer speeds, reliability, and the like). However, in this instance, if the one or more wired communication channels fail, the system may transfer information via an alternative communication protocol and channel (e.g., a wireless communication protocol and wireless communication channel, etc.). Among other things, the methods and systems provided herein may take advantage of the information stored in the communication type portion 1279 to open available communication channels in the event of a communication channel failure, listen on other ports for information transmitted from the systems, provide a reliability rating based on the number of redundant communication types for each component, and more. Optionally, a component or system may be restricted from communicating via a particular communication type (e.g., based on rules, traffic, critical/non-critical priority type, and the like). In this example, the component or system may be forced by the vehicle control system 204 to use an alternate communication type where available, cease communications, or store communications for later transfer.

Additionally or alternatively, the data structure 1200 may include a profile information portion 1238 and/or a linked data portion 1242. Although the profile information portion 1238 and/or the linked data portion 1242 may include different information from that described above, it should be appreciated that the portions 1238, 1242 may be similar, or identical, to those as previously disclosed.

Figure 12D:
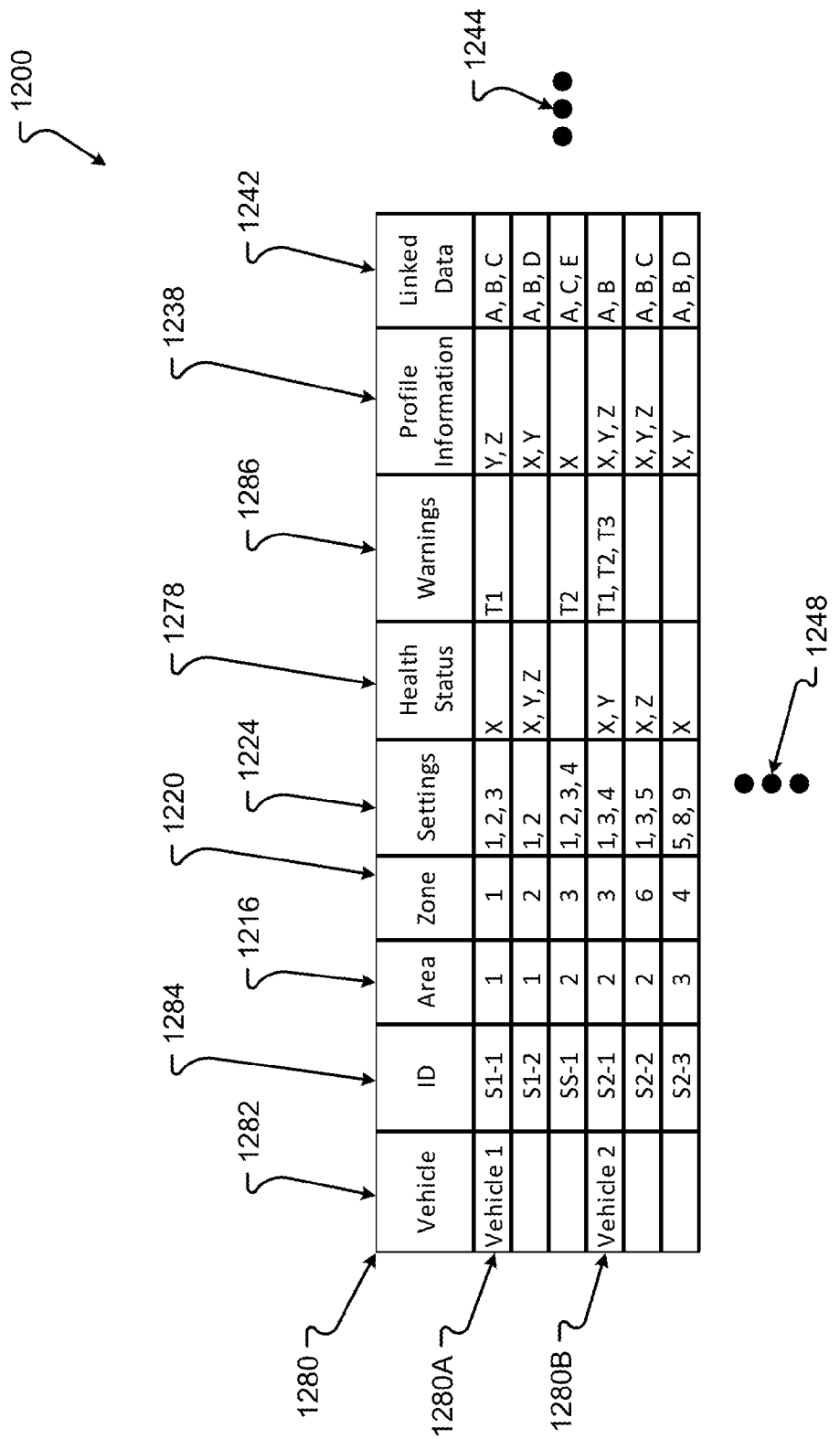
FIG. 12D is a diagram of an embodiment of a data structure for storing information about a vehicle.

Referring now to FIG. 12D, a data structure 1200 is shown optionally. The data file 1280 may include several portions 1216-1286 representing different types of data. Each of these types of data may be associated with a vehicle, as shown in portion 1282.

There may be one or more vehicle records 1280 and associated data stored within the data file 1282. As provided herein, the vehicle 104 can be any vehicle or conveyance 104 as provided herein. The vehicle 104 may be identified in portion 1282. Additionally or alternatively, the vehicle 104 may be identified by one or more systems and/or subsystems. The various systems of a vehicle 104 may be identified in portion 1284. For example, various features or characteristics of the vehicle 104 and/or its systems may be stored in portion 1284. Optionally, the vehicle 104 may be identified via a unique code or some other type of data that allows the vehicle 104 to be identified.

Each system may be associated with a particular area 508 and/or zone 512 of a vehicle 104. Among other things, the location of a system may be used to assess a state of the system and/or provide how the system interacts with one or more users of the vehicle 104. As can be appreciated each system may have a different set of settings for each area 508 and/or each zone 512, and/or each user of the system. Thus, each set of settings may also be associated with a predetermined zone 512, area 508, system, and/or user. The zone 512 is stored in portion 1220 and the area 508 is stored in portion 1216.

One or more settings may be stored in portion 1224. These settings 1224 may be similar and/or identical to those previously described. Further, the settings 1224 may also provide for how a vehicle and/or its systems are configured for one or more users. Each setting 1224 may be associated with a different area 508 or zone 512. Optionally, the settings may not be dependent on a particular user. For instance, specific areas 508 and/or zones 512 of a vehicle 104 may include different, default, or the same settings based on the information stored in portion 1224.

The various systems and/or components may be able to obtain or track health status data of the systems and/or components in portion 1278. The health status 1278 may include any type of information related to a state of the systems. For instance, an operational condition, manufacturing date, update status, revision information, time in operation, fault status, state of damage detected, inaccurate data reporting, and other types of component/system health status data may be obtained and stored in portion 1278.

One or more warnings may be stored in portion 1286. The warnings data 1286 may include warning generated by the vehicle 104, systems of the vehicle 104, manufacturer of the vehicle, federal agency, third party, and/or a user associated with the vehicle. For example, several components of the vehicle may provide health status information (e.g., stored in portion 1278) that, when considered together, may suggest that the vehicle 104 has suffered some type of damage and/or failure. Recognition of this damage and/or failure may be stored in the warnings data portion 1286. The data in portion 1286 may be communicated to one or more parties (e.g., a manufacturer, maintenance facility, user, etc.). In another example, a manufacturer may issue a recall notification for a specific vehicle 104, system of a vehicle 104, and/or a component of a vehicle 104. It is anticipated that the recall notification may be stored in the warning data field 1286. Continuing this example, the recall notification may then be communicated to the user of the vehicle 104 notifying the user of the recall issued by the manufacturer.

Additionally or alternatively, the data structure 1200 may include a profile information portion 1238 and/or a linked data portion 1242. Although the profile information portion 1238 and/or the linked data portion 1242 may include different information from that described above, it should be appreciated that the portions 1238, 1242 may be similar, or identical, to those as previously disclosed.

Figure 13:
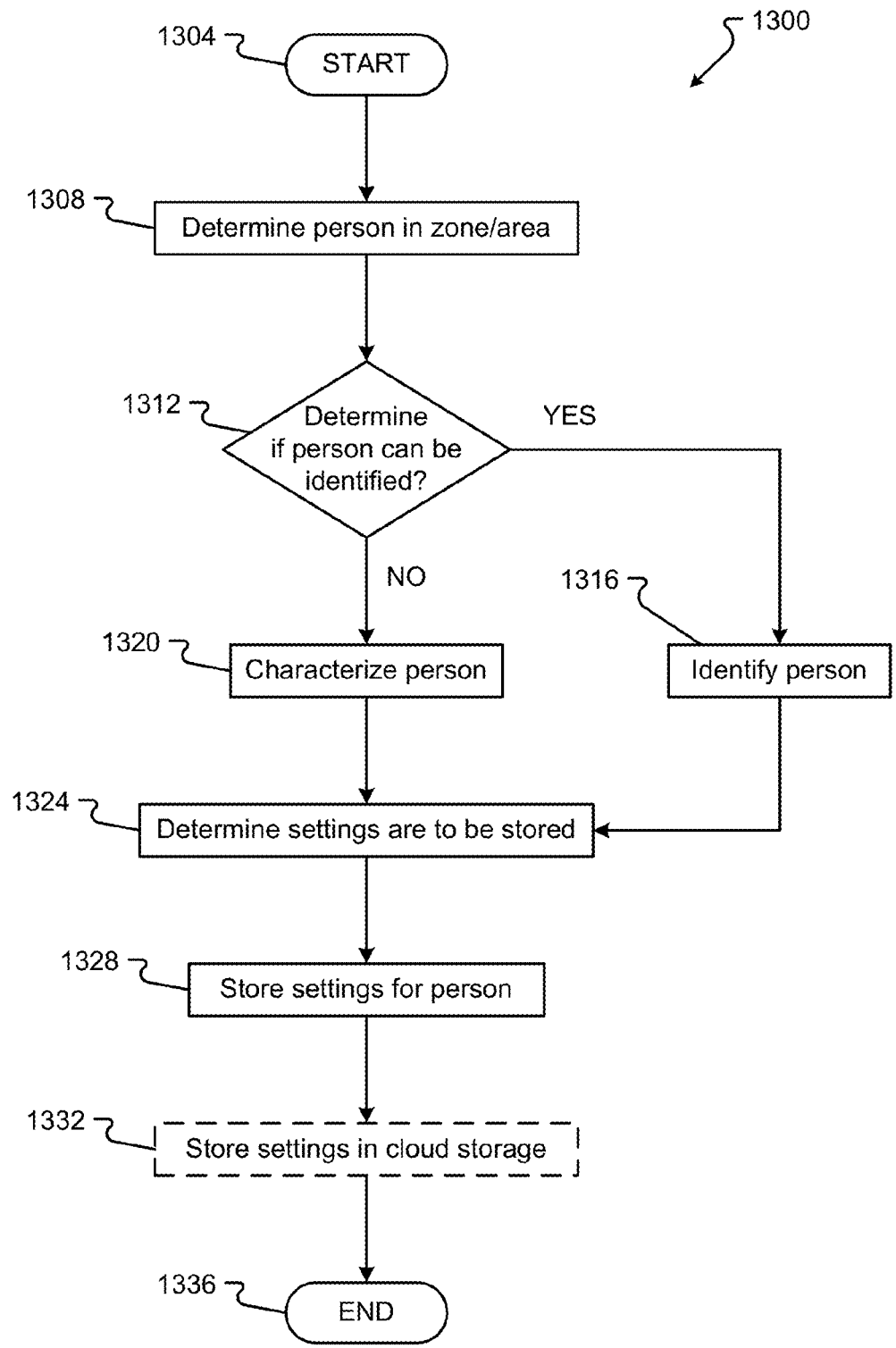
FIG. 13 is a flow or process diagram of a method for storing one or more settings associated with a user.

An embodiment of a method 1300 for storing settings for a user 216 associated with vehicle 104 is shown in FIG. 13. While a general order for the steps of the method 1300 is shown in FIG. 13, the method 1300 can include more or fewer steps or can arrange the order of the steps differently than those shown in FIG. 13. Generally, the method 1300 starts with a start operation 1304 and ends with an end operation 1336. The method 1300 can be executed as a set of computer-executable instructions executed by a computer system and encoded or stored on a computer readable medium. Hereinafter, the method 1300 shall be explained with reference to the systems, components, modules, software, data structures, user interfaces, etc. described in conjunction with FIGS. 1-12.

A person may enter the vehicle space 108. One or more sensors 242 may then identify that a person is sitting within the vehicle 104, in step 1308. For example, sensors 242 in a seat, may determine that some new amount of weight has been registered. The amount of weight may fall within predetermined parameters (e.g., over a threshold, in a specific range, etc.). This weight may then be determined to be a person by one or more optical or other sensors 242. The vehicle control system 204 may then determine that a person is in a certain zone 512 or area 508. For example, the sensors 242 may send signals to the vehicle controls system 204 that an event has occurred. This information may be sent to the vehicle control system processor 304 to determine the zone 512 and area 508 where the event occurred. Further, the vehicle control system 204 may then identify the person, in step 1312.

The vehicle control system 204 can receive the information from the sensors 242 and use that information to search the database 1200 that may be stored within the system data 208. The sensor data may be compared to ID characteristics 1212 to determine if the person has already been identified. The vehicle control system 204 may also send the characteristic data from the sensors to the communication network 224 to a server 228 to compare the sensor data to stored data 232 that may be stored in a cloud system. The person's features can be compared to stored features 1212 to determine if the person in the vehicle 104 can be identified.

If the person has been identified previously and their characteristics stored in portion 1212, the method 1300 proceeds YES to step 1316 where that person may be identified. In identifying a person, the information associated with that person 1240 may be retrieved and provided to the vehicle control system 204 for further action. If a person cannot be identified by finding their sensor characteristics in portion 1212, the method 1300 proceeds NO to step 1320. In step 1320, the vehicle control system 204, using an application, may create a new record in table 1200 for the user. This new record may store a user identifier and their characteristics 1212. It may also store the area 508 and zone 512 in data portions 1216 and 1220. The new record may then be capable of receiving new settings data for this particular user. In this way, the vehicle 104 can automatically identify or characterize a person so that settings may be established for the person in the vehicle 104.

The input module 312 may then determine if settings are to be stored, in step 1324. Settings might be any configuration of the vehicle 104 that may be associated with the user. The determination may be made after receiving a user input from the user. For example, the user may make a selection on a touch sensitive display indicating that settings currently made are to be stored. In other situations, a period of time may elapse after the user has made a configuration. After determining that the user is finished making changes to the settings, based on the length of the period of time since the setting was established, the vehicle control system 204 can save the setting. Thus, the vehicle control system 204 can make settings automatically based on reaching a steady state for settings for user.

The vehicle control system 204 may then store the settings for the person, in step 1328. The user interaction subsystem 332 can make a new entry for the user 1208 in data structure 1204. The new entry may be either a new user or a new settings listed in 1224. The settings may be stored based on the area 508 and zone 512. As explained previously, the settings can be any kind of configuration of the vehicle 104 that may be associated with the user in that area 508 and the zone 512.

The settings may also be stored in cloud storage, in step 1332. Thus, the vehicle control system 204 can send the new settings to the server 228 to be stored in storage 232. In this way, these new settings may be ported to other vehicles for the user. Further, the settings in storage system 232 may be retrieved, if local storage does not include the settings in storage system 208.

Additionally or alternatively, the settings may be stored in profile data 252. As provided herein, the profile data 252 may be associated with one or more devices 212, 248, servers 228, vehicle control systems 204, and the like. Optionally, the settings in profile data 252 may be retrieved in response to conditions. For instance, the settings may be retrieved from at least one source having the profile data if local storage does not include the settings in storage system 208. As another example, a user 216 may wish to transfer settings stored in profile data 252 to the system data 208. In any event, the retrieval and transfer of settings may be performed automatically via one or more devices 204, 212, 248, associated with the vehicle 104.

Figure 14:
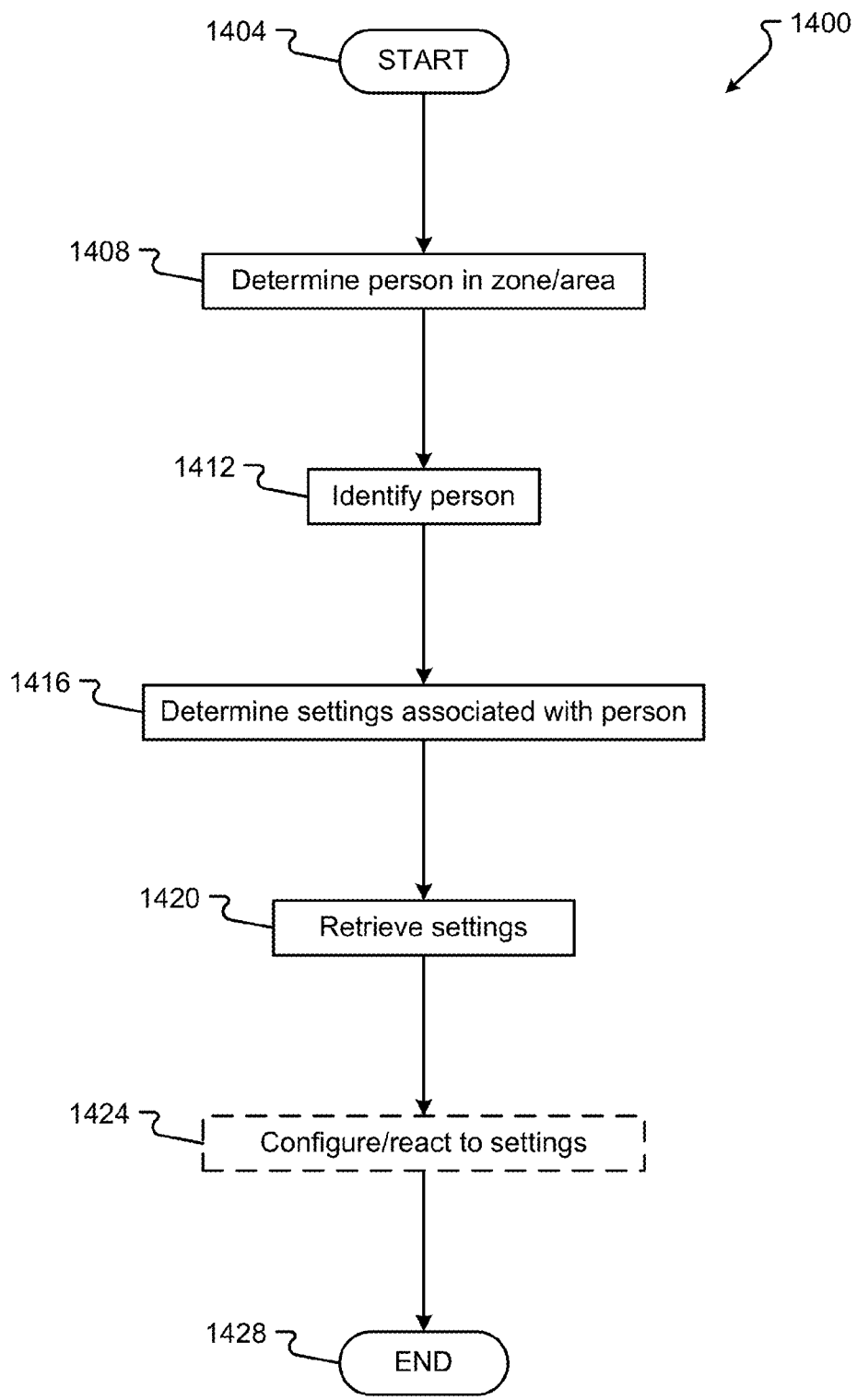
FIG. 14 is a flow or process diagram of a method for establishing one or more settings associated with a user.

An embodiment of a method 1400 to configure the vehicle 104 based on stored settings is shown in FIG. 14. A general order for the steps of the method 1400 is shown in FIG. 14. Generally, the method 1400 starts with a start operation 1404 and ends with an end operation 1428. The method 1400 can include more or fewer steps or can arrange the order of the steps differently than those shown in FIG. 14. The method 1400 can be executed as a set of computer-executable instructions executed by a computer system and encoded or stored on a computer readable medium. Hereinafter, the method 1400 shall be explained with reference to the systems, components, modules, software, data structures, user interfaces, etc. described in conjunction with FIGS. 1-13.

The vehicle control system 204 can determine if a person is in a zone 512 or area 508, in step 1408. This determination may be made by receiving data from one or more sensors 242. The vehicle 104 can use facial recognition, weight sensors, heat sensors, or other sensors to determine whether a person is occupying a certain zone 512.

Using the information from the sensors 242, the vehicle control system 204 can identify the person, in step 1412. The vehicle control system 204 can obtain characteristics for the user currently occupying the zone 512 and compare those characteristics to the identifying features in portion 1212 of data structure 1204. Thus, the settings in portion 1224 may be retrieved by identifying the correct zone 512, area 508, and characteristics for the user.

The vehicle control system 204 can first determine if there are settings associated with the identified person for that zone 512 and/or area 508, in step 1416. After identifying the user by matching characteristics with the features in portion 1212, the vehicle control system 204 can determine if there are settings for the user for the area 1216 and zone 1220 the user currently occupies. If there are settings, then the vehicle control system 204 can make the determination that there are settings in portion 1224, and the vehicle control system 204 may then read and retrieve those settings, in step 1420. The settings may be then used to configure or react to the presence of the user, in step 1424. Thus, these settings may be obtained to change the configuration of the vehicle 104, for example, how the position of the seats or mirrors are set, how the dash, console, or heads up display is configured, how the heat or cooling is configured, how the radio is configured, or how other different configurations are made.

Figure 15:
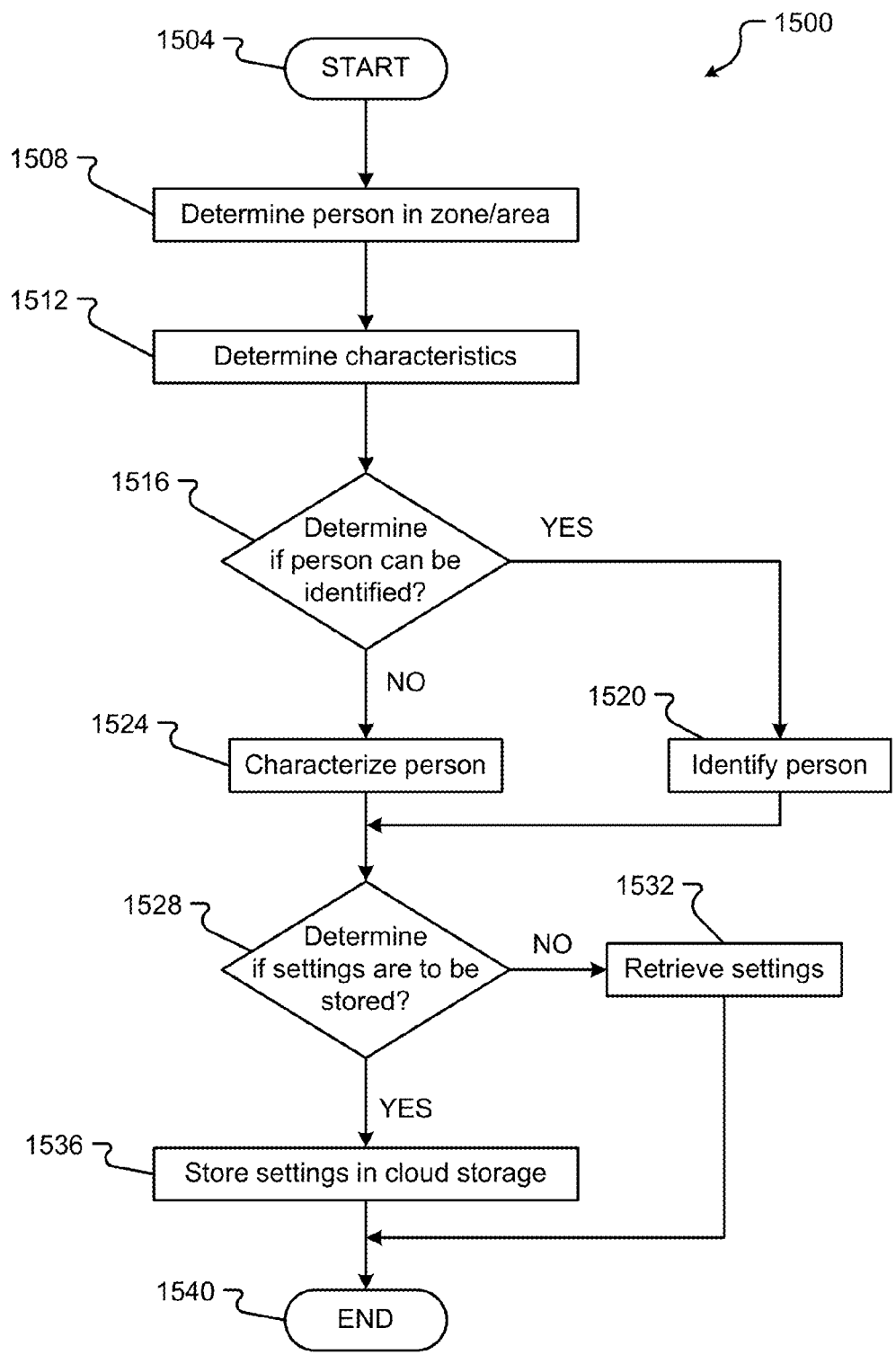
FIG. 15 is a flow or process diagram of a method for storing one or more settings associated with a user.

Embodiments of a method 1500 for storing settings in cloud storage are shown in FIG. 15. A general order for the steps of the method 1500 is shown in FIG. 15. Generally, the method 1500 starts with a start operation 1504 and ends with an end operation 1540. The method 1500 can include more or fewer steps or can arrange the order of the steps differently than those shown in FIG. 15. The method 1500 can be executed as a set of computer-executable instructions executed by a computer system and encoded or stored on a computer readable medium. Hereinafter, the method 1500 shall be explained with reference to the systems, components, modules, software, data structures, user interfaces, etc. described in conjunction with FIGS. 1-14.

The vehicle control system 204 can determine if a person is in a zone 512 or area 508, in step 1508. As explained previously, the vehicle control system 204 can receive vehicle sensor data from vehicle sensors 242 that show a person has occupied a zone 512 or an area 508 of the vehicle 104. Using the vehicle sensor data, the vehicle control system 204 can determine characteristics of the person, in step 1512. These characteristics are compared to the features in portion 1212 of the data structure 1204. From this comparison, the vehicle control system 204 can determine if the person is identified within the data structure 1204, in step 1516. If there is a comparison and the person can be identified, the method 1500 proceeds YES to step 1520. However, if the person cannot be identified, the method 1500 proceeds NO, to step 1524.

In step 1520, the person is identified in portion 1208 by the successful comparison of the characteristics and the features. It should be noted that there may be a degree of variability between the characteristics and the features in portion 1212. Thus, the comparison may not be an exact comparison but may use methods known in the art to make a statistically significant comparison between the characteristics received from the sensors 242 and the features stored in portion 1212. In step 1524, the characteristics received from sensors 242 are used to characterize the person. In this way, the received characteristics may be used as an ID, in portion 1212, for a new entry for a new user in portion 1208.

The user may make one or more settings for the vehicle 104. The vehicle control system 204 may determine if the settings are to be stored, in step 1528. If the settings are to be stored, the method 1500 proceeds YES to step 1536. If the settings are not to be stored or if there are no settings to be stored, the method 1500 proceeds NO to step 1532. In step 1532, the vehicle control system 204 can retrieve the settings in the portion 1224 of the data structure 1204. Retrieval of the settings may be as described in conjunction with FIG. 14. If settings are to be stored, the vehicle control system 204 can send those settings to server 228 to be stored in data storage 232, in step 1536. Data storage 232 acts as cloud storage that can be used to retrieve information on the settings from other vehicles or from other sources. Thus, the cloud storage 232 allows for permanent and more robust storage of user preferences for the settings of the vehicle 104.

Figure 16:
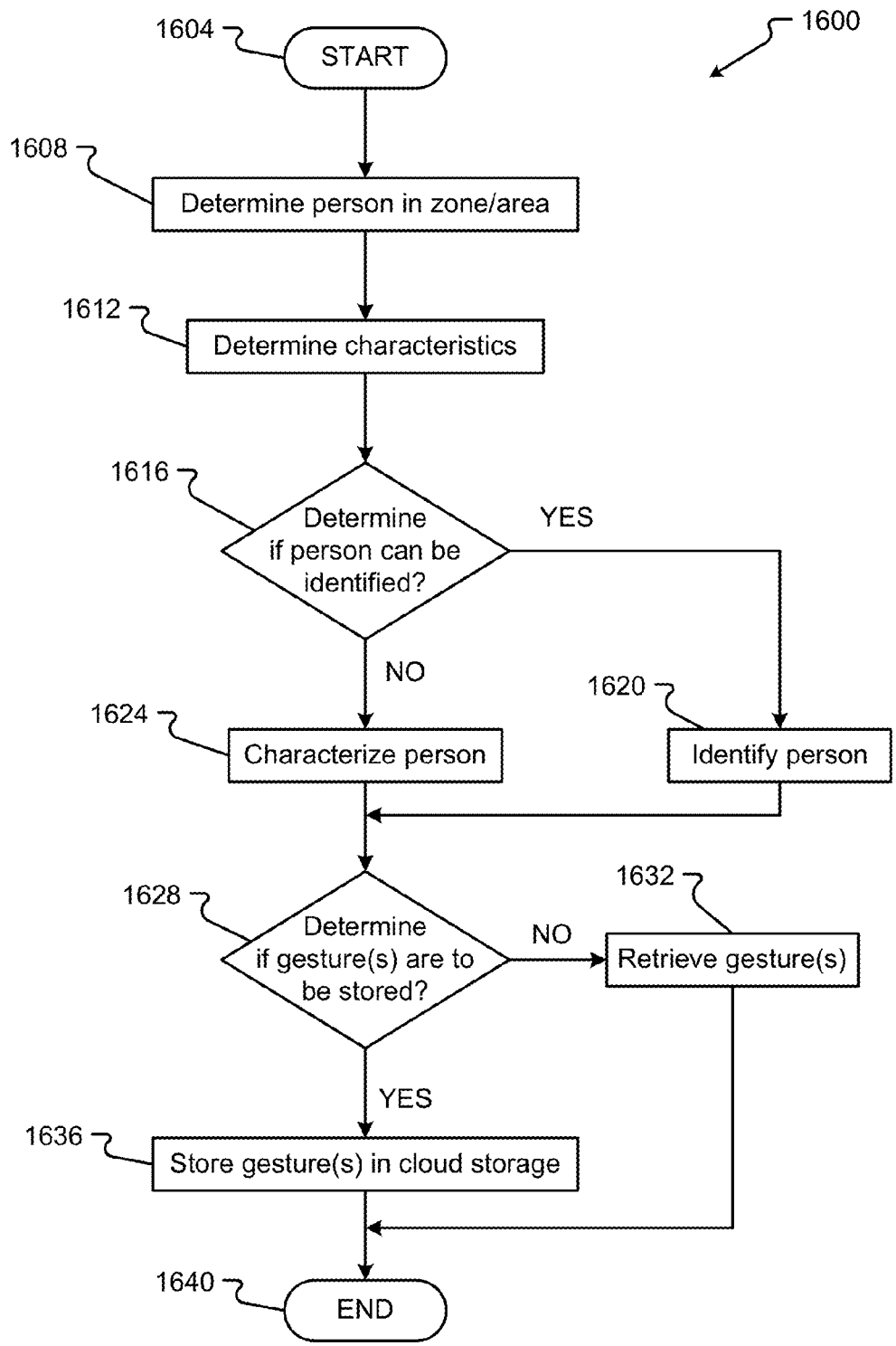
FIG. 16 is a flow or process diagram of a method for storing one or more gestures associated with a user.

An embodiment of a method 1600 for storing gestures associated with the user is shown in FIG. 16. A general order for the steps of the method 1600 is shown in FIG. 16. Generally, the method 1600 starts with a start operation 1604 and ends with an end operation 1640. The method 1600 can include more or fewer steps or can arrange the order of the steps differently than those shown in FIG. 16. The method 1600 can be executed as a set of computer-executable instructions executed by a computer system and encoded or stored on a computer readable medium. Hereinafter, the method 1600 shall be explained with reference to the systems, components, modules, software, data structures, user interfaces, etc. described in conjunction with FIGS. 1-15.

Vehicle control system 204 may receive sensor data from sensors 242 to determine a person is occupying a zone 512 in an area 508 of the vehicle 104, in step 1608. The sensor data may provide characteristics for the person, in step 1612. The vehicle control system 204 may then use the characteristics to determine if the person can be identified, in step 1616. The vehicle control system 204 may compare the characteristics to the features in portion 1212 for the people having been recognized and having data associated therewith. If a comparison is made between the characteristics and the features in portion 1212, the person can be identified, and the method 1600 proceeds YES to step 1620. If there is no comparison, the method 1600 may proceed NO to step 1624. In step 1620, the person may be identified by the vehicle control system 204. Thus, the person's features and associated data record 1240 may be determined and the user identified in portion 1208. If the person is not identified, the vehicle control system 204 can characterize the person in step 1624 by establishing a new record in data structure 1204 using the characteristics, received from the sensors 242, for the features in portion 1212.

Thereinafter, the vehicle control system 204 may determine if gestures are to be stored and associated with the user, in step 1628. The vehicle control system 204 may receive user input on a touch sensitive display or some other type of gesture capture region which acknowledges that the user wishes to store one or more gestures. Thus, the user may create their own gestures such as those described in conjunction with FIGS. 11A-11K. These gestures may then be characterized and stored in data structure 1204. If there are gestures to be stored, the method 1600 proceeds YES to step 1636. If gestures are not to be stored the method 1600 may proceed NO to step 1632.

In step 1632, the vehicle control system 204 can retrieve current gestures from portion 1232, which are associated with user 1240. These gestures may be used then to configure how the vehicle 104 will react if a gesture is received. If gestures are to be stored, the vehicle control system 204 may store characteristics, in step 1636, as received from sensor 242 or from one more user interface inputs. These characteristics may then be used to create the stored gestures 1232, in data structure 1204. The characteristics may include what the gesture looks like or appears and also what affect the gesture should have. This information may then be used to change the configuration or operation of the vehicle 104 based on the gesture if it is received at a later time.

Figure 17:
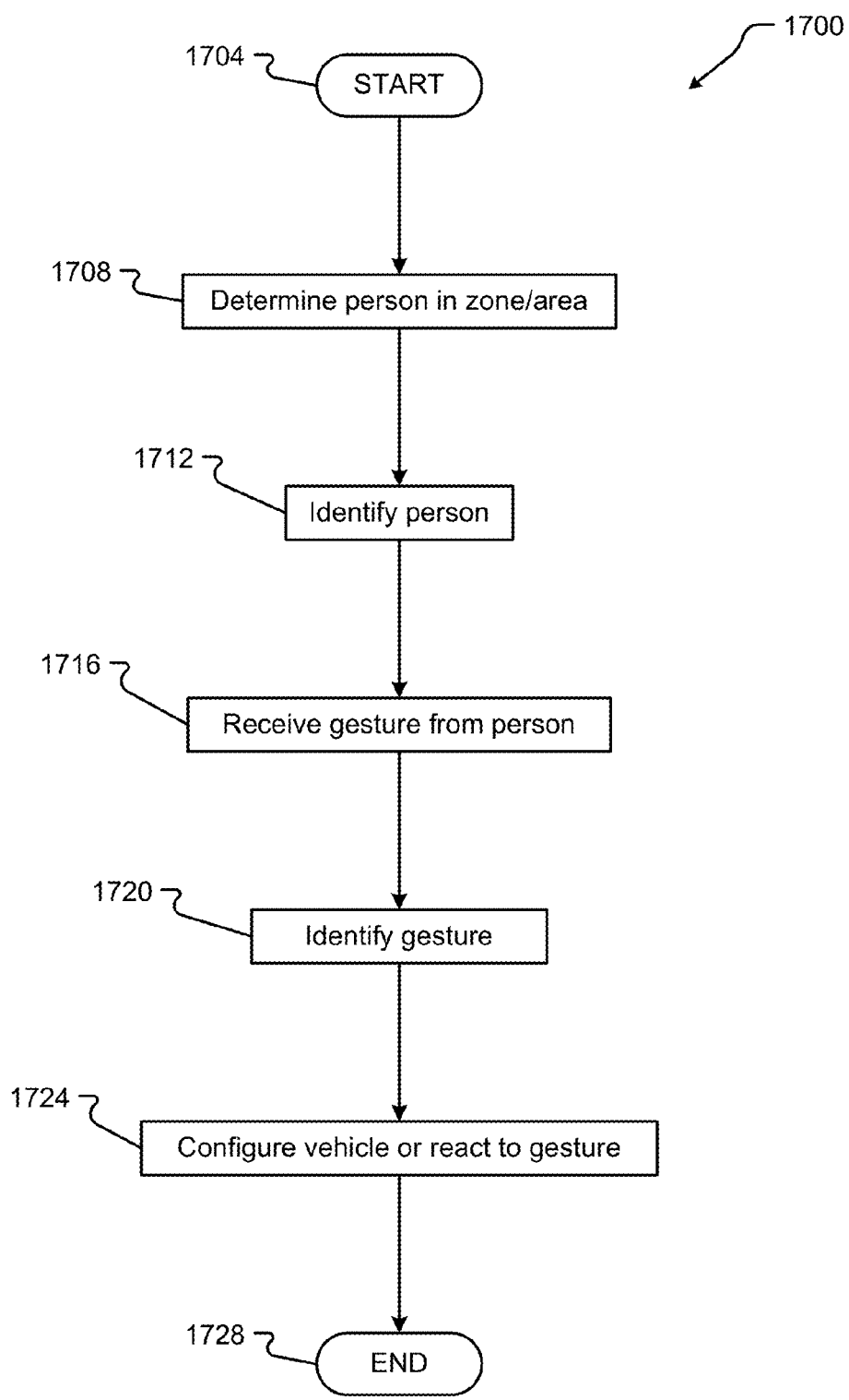
FIG. 17 is a flow or process diagram of a method for reacting to a gesture performed by a user.

An embodiment of a method 1700 for receiving a gesture and configuring the vehicle 104 based on the gesture may be as provided in FIG. 17. A general order for the steps of the method 1700 is shown in FIG. 17. Generally, the method 1700 starts with a start operation 1704 and ends with an end operation 1728. The method 1700 can include more or fewer steps or can arrange the order of the steps differently than those shown in FIG. 17. The method 1700 can be executed as a set of computer-executable instructions executed by a computer system and encoded or stored on a computer readable medium. Hereinafter, the method 1700 shall be explained with reference to the systems, components, modules, software, data structures, user interfaces, etc. described in conjunction with FIGS. 1-16.

A vehicle control system 204 can receive sensor data from vehicle sensors 242. The vehicle sensor data can be used by the vehicle control system 204 to determine that a person is in a zone 512 or area 508, in step 1708. The vehicle sensor data may then be used to compare against feature characteristics 1212 to identify a person, in step 1712. The vehicle control system 204 thereinafter may receive a gesture, in step 1716. The gesture may be perceived by vehicle sensors 242 or received in a gesture capture region. The gesture may be as described in conjunction with FIGS. 11A-11K. Upon receiving the gesture, the vehicle control system 204 can compare the gesture to gesture characteristics in portion 1232, in step 1720. The comparison may be made so that a statistically significant correlation between the sensor data or gesture data and the gesture characteristic 1232 is made. Upon identifying the gesture, the vehicle control system 204 can configure the vehicle 104 and/or react to the gesture, in step 1724. The configuration or reaction to the gesture may be as prescribed in the gesture characteristic 1232.

Figure 18:
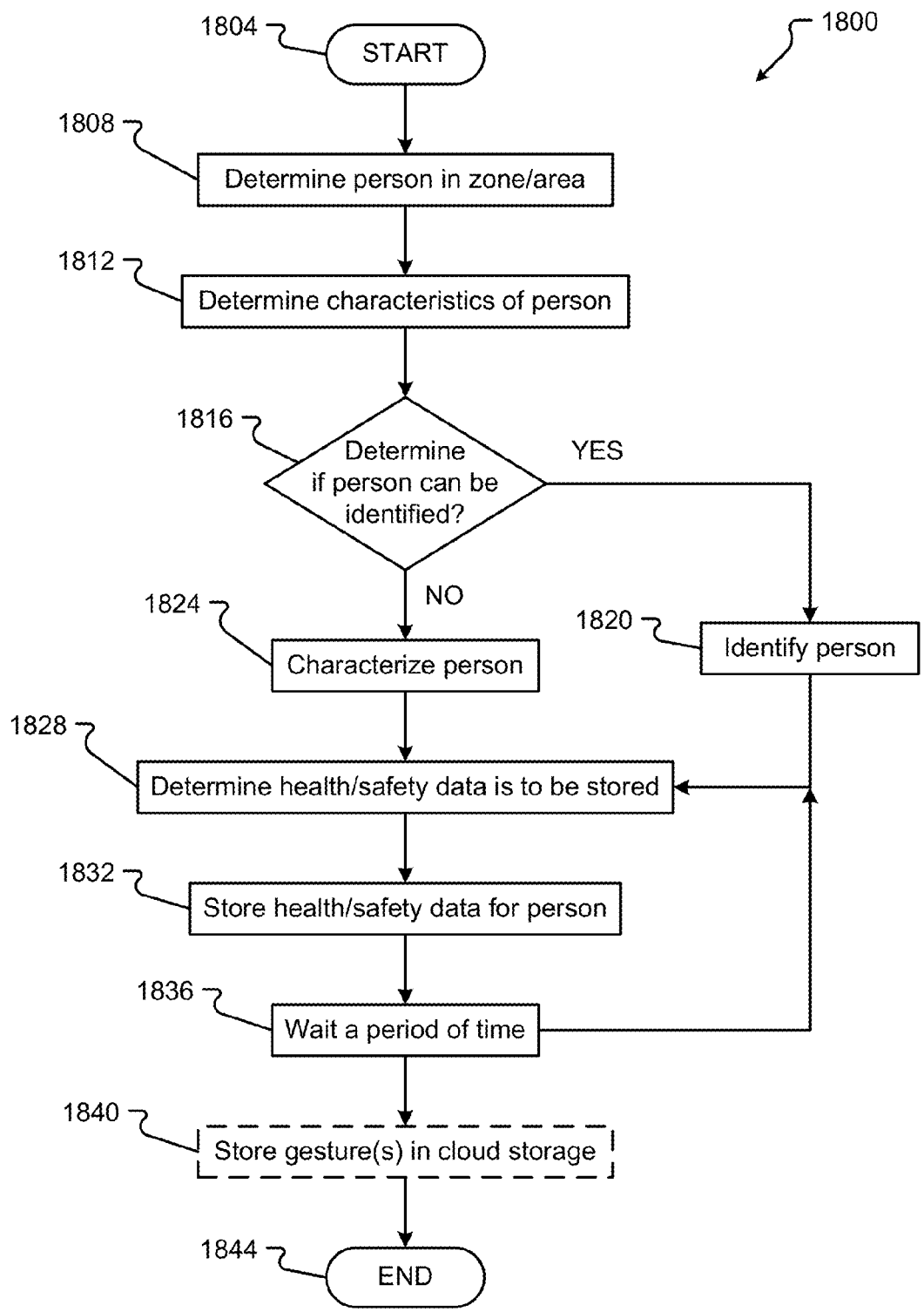
FIG. 18 is a flow or process diagram of a method for storing health data associated with a user.

An embodiment of a method 1800 for storing health data may be as shown in FIG. 18. A general order for the steps of the method 1800 is shown in FIG. 18. Generally, the method 1800 starts with a start operation 1804 and ends with an end operation 1844. The method 1800 can include more or fewer steps or can arrange the order of the steps differently than those shown in FIG. 18. The method 1800 can be executed as a set of computer-executable instructions executed by a computer system and encoded or stored on a computer readable medium. Hereinafter, the method 1800 shall be explained with reference to the systems, components, modules, software, data structures, user interfaces, etc. described in conjunction with FIGS. 1-17.

Vehicle control system 204 can receive sensor data from sensors 242. The sensor data may be used to determine that a person is in a zone 512 or area 508, in step 1808. The sensor data may then be used to determine characteristics of the person, in step 1812. From the characteristics, the vehicle control system 204 can determine if a person may be identified in data structure 1204, in step 1816. If it is determined that the person can be identified in step 1816, the method 1800 proceeds YES to step 1820. If the person cannot be identified, the method 1800 proceeds NO to step 1824. A person may be identified by matching the characteristics of a person from the sensor data to the features shown in portion 1212. If these comparisons are statistically significant, the person may be identified in portion 1208, in step 1820. However, if the person is not identified in portion 1208, the vehicle control system 204 can characterize the person using the vehicle sensor data, in step 1824. In this way, the vehicle control system 204 can create a new record for a new user in data structure 1204.

Thereinafter, the vehicle control system 204 may receive health and/or safety data from the vehicle sensors 242, in step 1828. The vehicle control system 204 can determine if the health or safety data is to be stored, in step 1832. The determination is made as to whether or not there is sufficient health data or safety parameters, in portion 1228 and 1236, to provide a reasonable baseline data pattern for the user 1240. If there is data to be received and stored, the vehicle control system 204 can store the data for the person in portions 1228 and 1236 of the data structure 1204, in step 1832.

The vehicle control system 204 may then wait a period of time, in step 1836. The period of time may be any amount of time from seconds to minutes to days. Thereinafter, the vehicle control system 204 can receive new data from vehicle sensors 242, in step 1828. Thus, the vehicle control system 204 can receive data periodically and update or continue to refine the health data and safety parameters in data structure 1204. Thereinafter, the vehicle control system 204 may optionally store the health and safety data in cloud storage 232 by sending it through the communication network 224 to the server 228, in step 1840.

Figure 19:
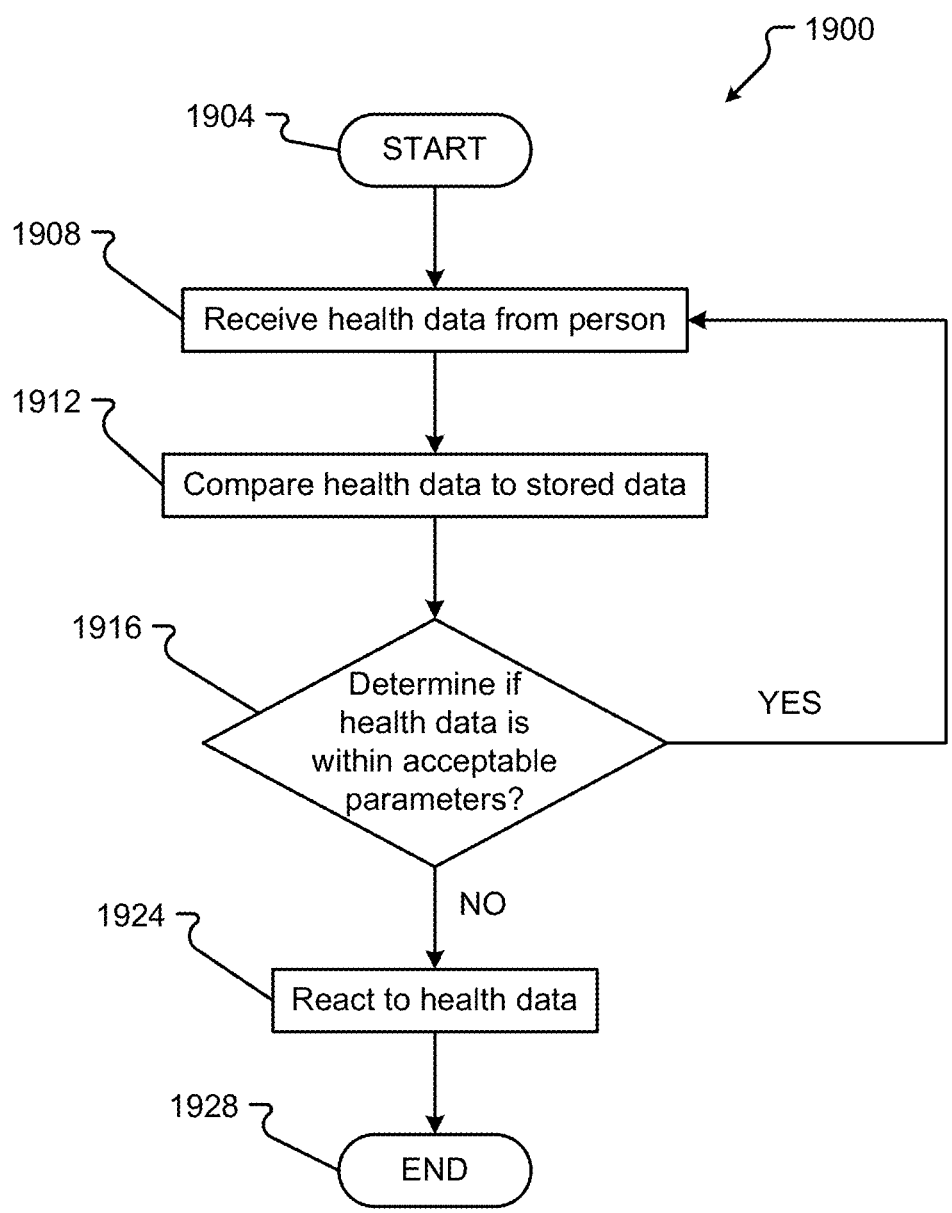
FIG. 19 is a flow or process diagram of a method for reacting to a gesture performed by a user.

An embodiment of a method 1900 for monitoring the health of a user may be as shown in FIG. 19. A general order for the steps of the method 1900 is shown in FIG. 19. Generally, the method 1900 starts with a start operation 1904 and ends with an end operation 1928. The method 1900 can include more or fewer steps or can arrange the order of the steps differently than those shown in FIG. 19. The method 1900 can be executed as a set of computer-executable instructions executed by a computer system and encoded or stored on a computer readable medium. Hereinafter, the method 1900 shall be explained with reference to the systems, components, modules, software, data structures, user interfaces, etc. described in conjunction with FIGS. 1-18.

The vehicle control system 204 can receive health data from sensors 242. The health data may be received in step 1908. The vehicle control system 204 may then compare the received health data to stored health parameters in portion 1228 or portion 1236, in step 1912. The comparison may check if there is statistically significant separation or disagreement between the received health data and the stored health data. Thus, the vehicle control system 204 can make a health comparison of the user based on a baseline of health data previously stored. A statistically significant comparison may include determining if there are any parameters more than three standard deviations from the average or norm, any parameter that is increasing or decreasing over a period of eight different measurements, a measurement that is more than two standard deviations from the norm more than three measurements consecutively, or other types of statistical comparisons.

If the vehicle control system 204 determines that measured health parameter does deviate from the norm, the vehicle control system 204 can determine whether the health data is within acceptable limits, in step 1916. If the health data is within acceptable limits, the method 1900 proceeds YES back to receiving new health data, in step 1908. In this way, the health data is periodically or continually monitored to ensure that the driver is in a healthy state and able to operate the vehicle. If the health data is not within acceptable parameters, the method 1900 may proceed NO to step 1924 where the vehicle control system 204 may react to the change in the health data. The reaction may include any measure to provide for the safety of the user, such as stopping the vehicle, beginning to drive the vehicle, driving the vehicle to a new location, such as a hospital, waking the driver with an alarm or other noise, or performing some other function that may help maintain the health or safety of the user.

The health data received may be a reaction from the driver. For example, the driver may call for help or ask the vehicle for assistance. For example, the driver or passenger may say that they are having a medical emergency and ask the car to perform some function to help. The function to help may include driving the person to a hospital or stopping the car and calling for emergency assistance.

Providing Home Automation Information Via Communication with a Vehicle

Figure 20A:
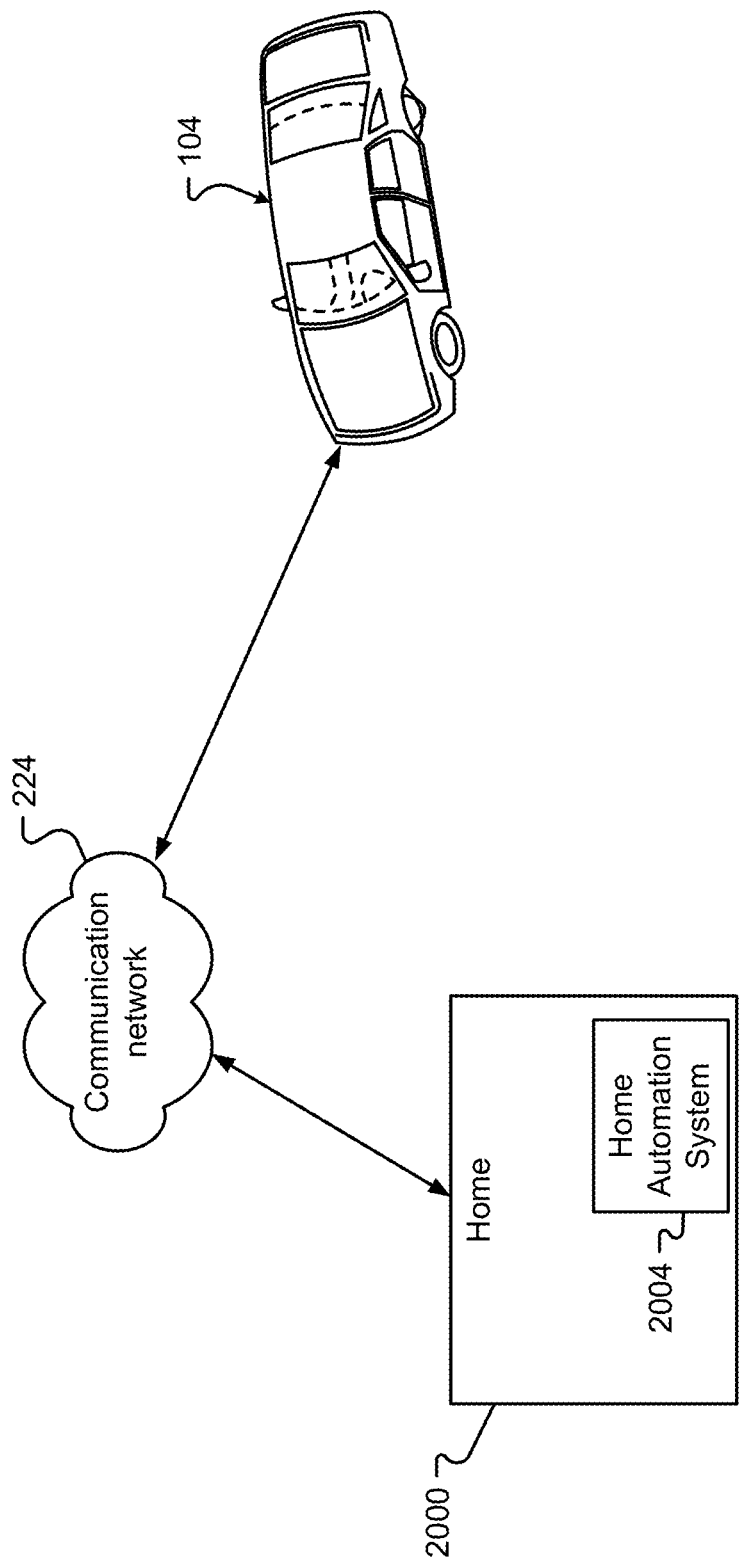
FIG. 20A depicts an embodiment of a vehicle control system interacting with a home automation system.

FIG. 20A illustrates the vehicle control system 204 synchronizing with a home automation system 2004 of a home 2000. The synchronization can occur at one or more scheduled or preset times, when the vehicle 104 is a predetermined distance from the home (whether the vehicle is returning or departing from the home), or upon demand when requested by the user 216 or by an occupant of the home 2000 using the home automation system 2004. For example, the vehicle 104 may synchronize with the home automation system 2004 when the vehicle 104 returns to or enters a specific area (e.g., a parking area, a garage, car port, designated space, region from the home, range from the home, distance from a wireless access point, etc.). The synchronization may be based on location data generated from one or more of the navigation subsystem 336, GPS (or equivalent), Wi-Fi access point, communication tower locations (such as a cell tower), Internet access point, detected position, and combinations thereof. The location data may be collected by a device associated with the vehicle 104 such as on-board sensors 242, equipment, user devices 212, 248, including information obtained from device sensors 720 associated with devices 212, 248 in the vehicle 104. The synchronization can also occur when the vehicle departs the home. Further, the synchronization may be initiated by either the home automation system 2004 or the VCS 204 based on the occurrence of one or more events.

Figure 20B:
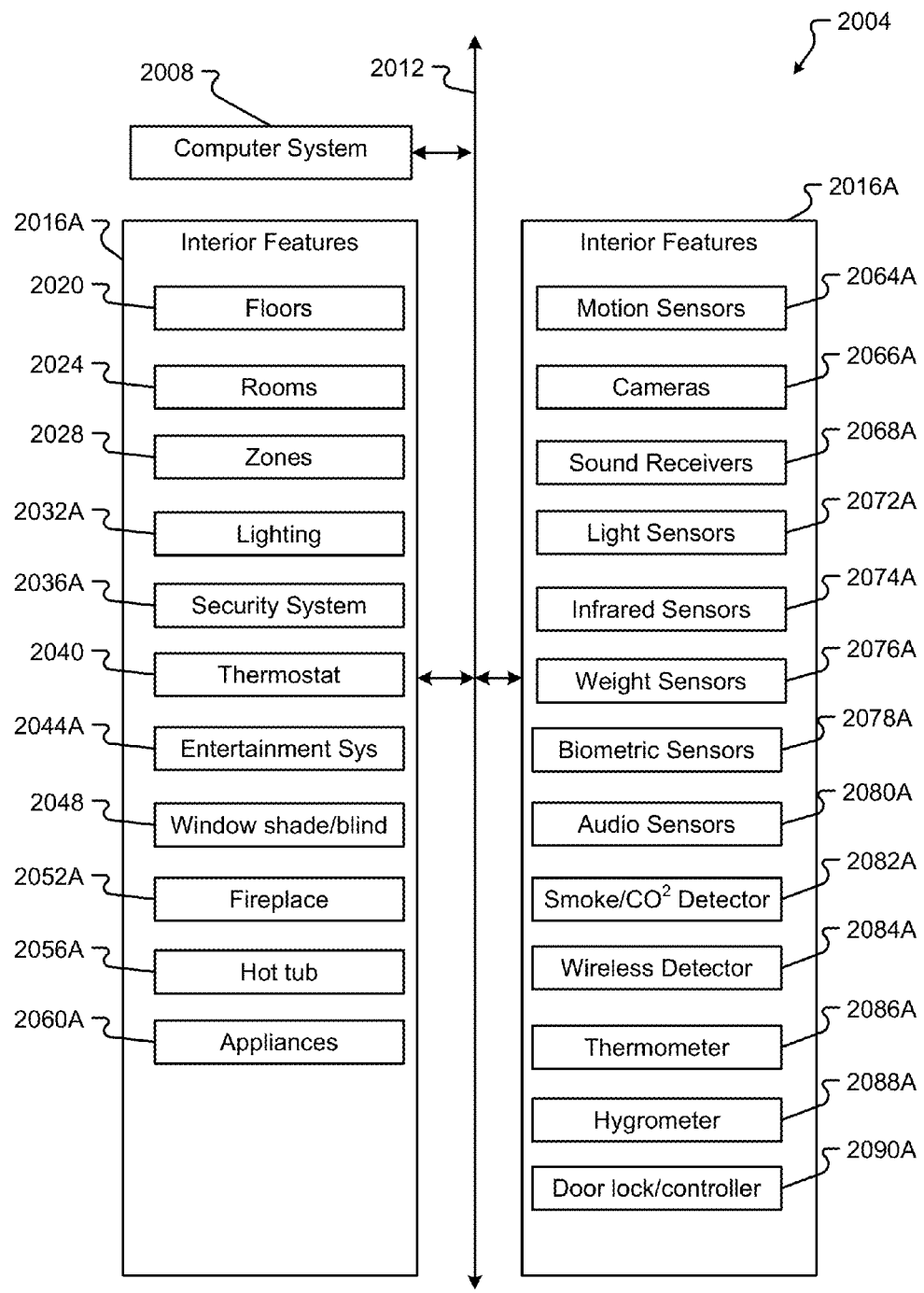
FIG. 20B is a first block diagram of an embodiment a home automation system.
Figure 20C:
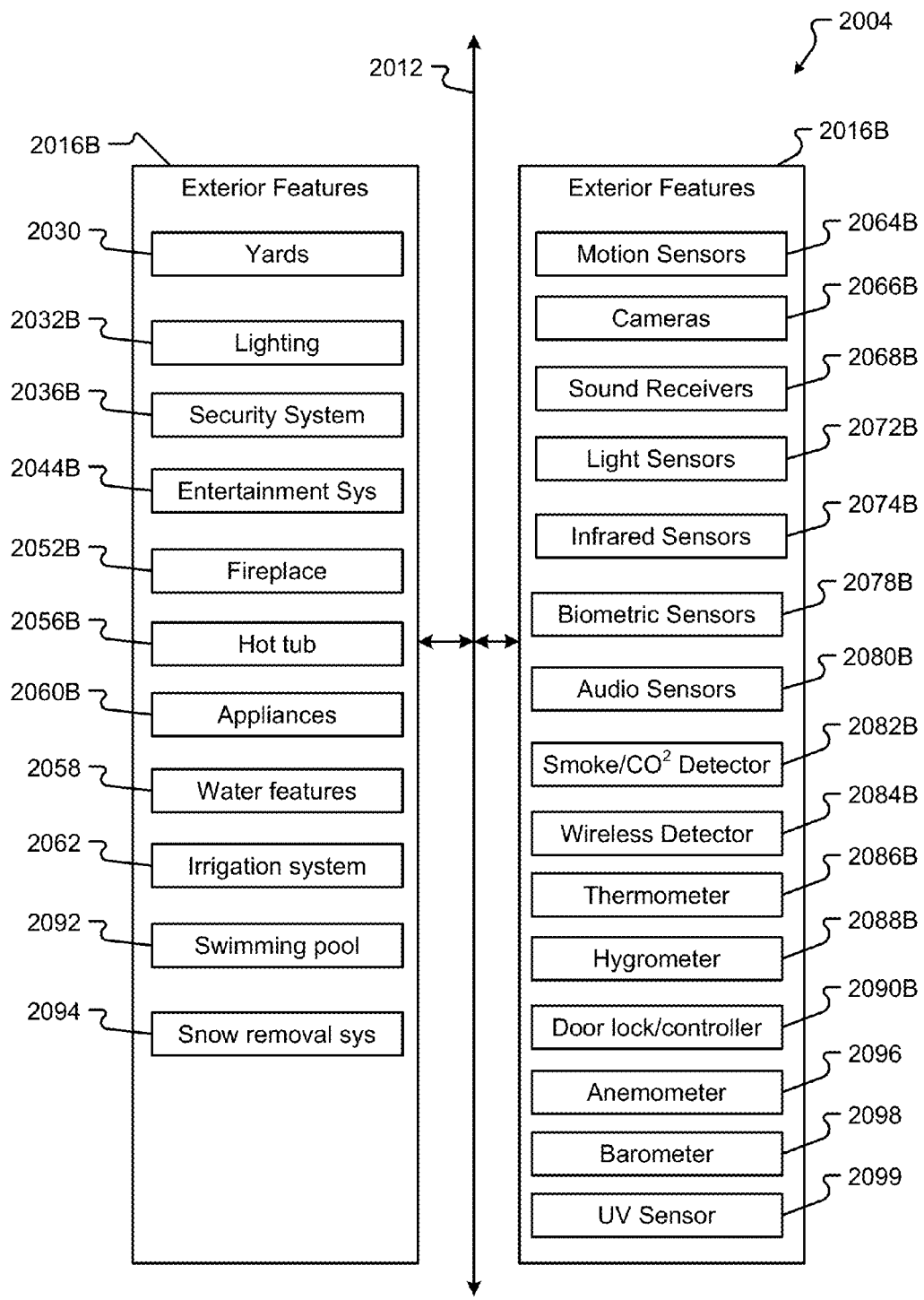
FIG. 20C is a second block diagram of an embodiment a home automation system.

FIGS. 20B and 20C illustrate an exemplary home automation system 2004. The vehicle control system (VCS) 204 can connect to the home automation system 2004 and send information and commands to the home automation system. The VCS 204 can also receive information the home automation system 2004. The home automation system 2004 includes a computer system 2008, described in FIG. 21A, below, and interior 2016A and exterior 2016B features. The interior 2016A and exterior 2016B features communicate with the computer system 2008 by a network or bus 2012. This communication bus 2012 may be bidirectional and perform data communications using any known or future-developed standard or protocol. An example of the communication bus 2012 may be as described in conjunction bus 356 and with FIG. 4.

The interior features 2016A are illustrated in FIG. 20B and may be located by a position in a floor 2020 and/or room 2024 of a home. Interior features 2016A can also be located by a position in one or more zones 2028, such as public areas (including hallways, stairs, etc.) and utility areas (for example, furnace rooms, utilities rooms, and the like).

The home automation system 2004 is operable to control and receive information from lighting 2032A, security systems 2036A, thermostats 2040 controlling heating and cooling systems, and home entertainment systems 2044A including one or more televisions, cable and/or satellite receivers, digital video recorders, turners, digital media players, amplifiers, speakers, and game systems. The home automation system 2004 is further operable to control and receive information from automatic shades and blinds 2048 for windows, gas fireplaces 2052A, hot tubs 2056A, and appliances 2060A such as refrigerators, washers, and dryers.

Sensors transmit data to the home automation system 2004 through the bus 2012. The sensors include one or more motion sensors 2064A, cameras 2066A (including video cameras and/or still image cameras), sound receivers 2068A, light sensors 2072A, infrared sensors 2074A, weight sensors 2076 positioned in the floors, biometric sensors 2078A to identify and record characteristics associated with an occupant or guest, audio sensors 2080A configured to receive and respond to audio inputs and voice commands from occupants and present audio messages to occupants with one or more dedicated speakers, smoke and CO2 detectors 2082A, wireless signal detectors 2084A operable to detect and locate WiFi, Bluetooth, and/or other signals from devices, thermometers 2086A, and hygrometers 2088A to measure humidity levels. The door and window sensors and lock controllers 2090A may also provide information to and be controlled by the home automation system 2004. For example, the door and window sensors 2090A can provide signals when a door or window is opened, closed, and/or moved.

The exterior features 2016B of the home automation system 2004 include lighting 2032B, security systems 2036B, entertainment systems 2044B, fireplaces 2052B, hot tubs 2056B, and appliances 2060B. One or more exterior sensors may provide data to the home automation system 2004, including motion sensors 2064B, cameras 2066B (including video cameras and/or still image cameras), sound receivers 2068B, light sensors 2072B, infrared sensors 2074B, biometric sensors 2078B, audio sensors 2080B, smoke and CO2 detectors 2082B, wireless signal detectors 2084B, thermometers 2086B, hygrometers 2088B, and door and lock sensors and controllers 2090B. The home automation system may be further operable to control water features 2058 such as fountains, irrigation systems 2062, swimming pool systems 2092 including retractable swimming pool covers and a swimming pool thermostat, and snow and ice melting systems 2094 including heating elements under driveways and/or sidewalks to melt snow or ice. The exterior features 2016B may be located in yards 2030, such as a front yard, a back yard, and one or more side yards. The home automation system may further include an anemometer 2096 to measure wind speed, a barometer 2098, and a UV level sensor 2099.

Figure 21A:
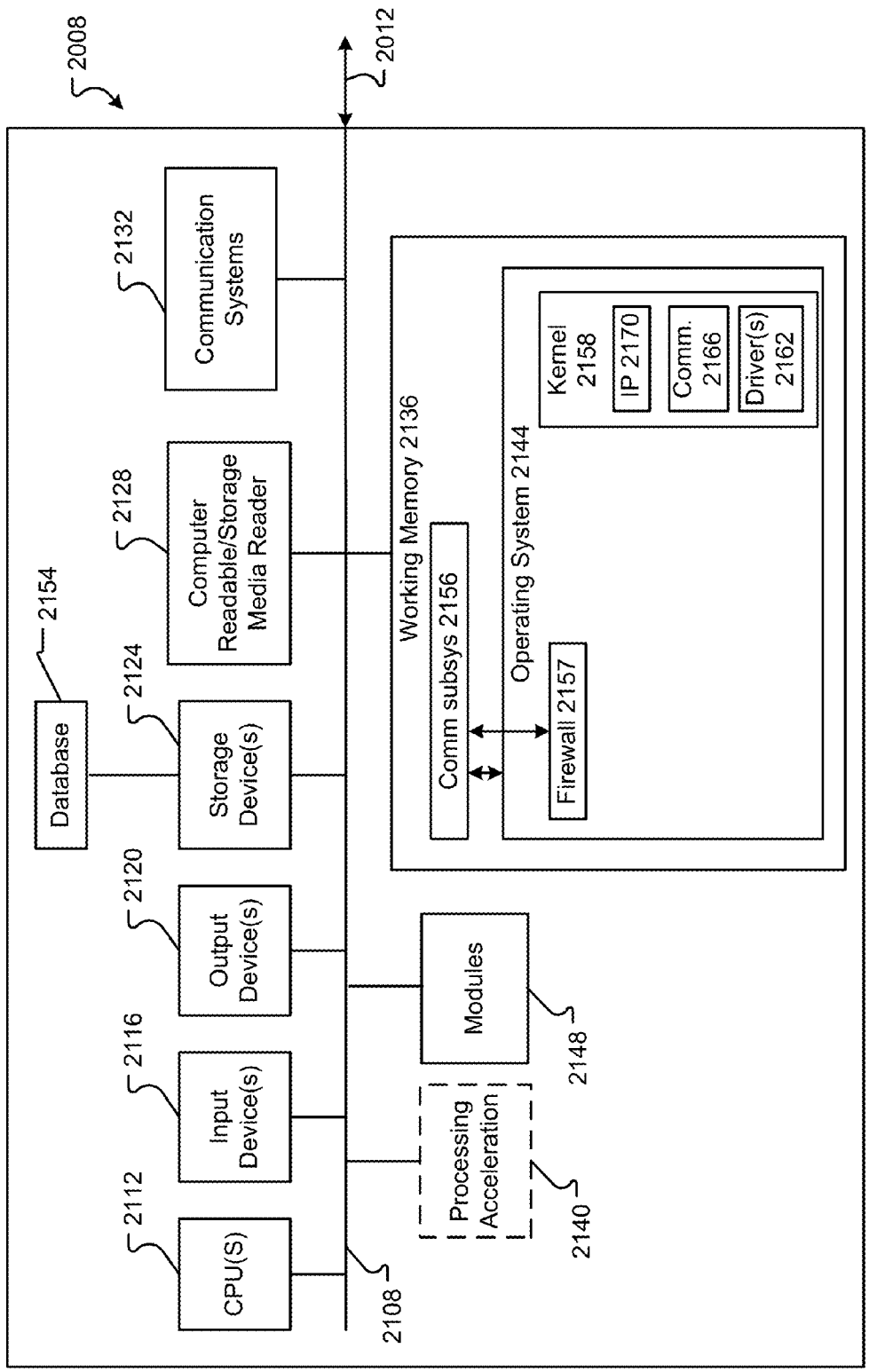
FIG. 21A is a block diagram of an embodiment of a computer system of a home automation system.

Additionally or alternatively, the home automation system 2004 includes a computer system 2008 as described in conjunction with FIG. 21A. The computer system 2008 is shown comprising hardware elements that may be electrically coupled via a bus 2108. The hardware elements may include one or more central processing units (CPUs) 2112. The CPU 2112 may comprise a general purpose programmable processor or controller for executing application programming or instructions related to the home automation system 2004. The CPU 2112 may include multiple processor cores, and/or implement multiple virtual processors. Optionally, the CPU 2112 may include multiple physical processors. By way of example, the CPU 2112 may comprise a specially configured application specific integrated circuit (ASIC) or other integrated circuit, a digital signal processor, a controller, a hardwired electronic or logic circuit, a programmable logic device or gate array, a special purpose computer, or the like. The CPU 2112 generally functions to run programming code or instructions implementing various functions of home automation system 2004.

The computer system 2008 may also include one or more input devices 2116 (e.g., a mouse, a keyboard, etc.); one or more output devices 2120 (e.g., a peripheral display device, a printer, etc.); and one or more storage devices 2124. By way of example, storage device(s) 2124 may be disk drives, optical storage devices, solid-state storage devices, such as a random access memory ("RAM") and/or a read-only memory ("ROM"), which can be programmable, flash-updateable, and/or the like. One or more databases 2154 may reside in the storage device 2124. The database 2154 may be a relational database, and the storage device 2124 may be adapted to store, update, and retrieve data in response to specifically-formatted commands. The storage device 2124 may also perform data management functions for any flat file, object oriented, or other type of database 2154 or data store. The database 2154 may store settings for the features of the home automation system 2004 and information about and characteristics of occupants and guests of the home, include one or more preferred setting of an occupant or guest. The database may also store health parameters and identifying characteristics that serve to identify an occupant.

The computer system 2008 may additionally include a computer-readable storage media reader 2128; a communications system 2132 (e.g., a modem, a network card (wireless or wired), an infra-red communication device, etc.); and working memory 2136, which may include RAM and ROM devices as described above. The computer system 2008 optionally includes a processing acceleration unit 2140, which can include a DSP, a special-purpose processor and/or the like.

The computer-readable storage media reader 2128 can further be connected to a computer-readable storage medium, together (and, optionally, in combination with storage device(s) 2124) comprehensively representing remote, local, fixed, and/or removable storage devices plus storage media for temporarily and/or more permanently containing computer-readable information. The communications system 2132 may permit data to be exchanged with any other computer system, including the vehicle control system 204. The home automation system 2004 may communicate with, send data to, send alerts to, receive data from, and receive commands from the vehicle control system 204 with or through the communication network 224 using the communication system 2132. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

The computer system 2008 can include one or more sub-modules 2148, such as program code implementing the components and software of the home automation system 2004 described herein. The sub-modules are described in more detail in FIG. 21B, below.

The computer system 2008 also comprises modules, shown as being currently located within a working memory 2136. The modules can include an operating system 2144 in communication with a communication subsystem interface 2156. The communication may pass through firewall 2157 that, similar to firewall 1044, can be any software that can control the incoming and outgoing communications by analyzing the data packets and determining whether the packets should be allowed through the firewall, based on applied rule set. The firewall 2157 can establish a "barrier" between a trusted, secure internal network and another network (e.g., the Internet) that is not assumed to be secure and trusted.

The operating system 2144 can be the same as or similar to operating system 1004 described in conjunction with FIG. 10. Operating system 2144 may schedule time-sharing for efficient use of the system. The operating system can act as an intermediary between applications or programs and the computer hardware for hardware functions, such as input, output, and memory allocation. Examples of operating systems that may be deployed as operating system 2144 include Android, BSD, iOS, Linux, OS X, QNX, Microsoft Windows, Windows Phone, IBM z/OS, etc.

A kernel 2158 can be a computer program that manages input/output requests from software and translates them into data processing instructions for the processor 2112 and other components of the computer system 2008. The kernel 2158 is the fundamental component of the operating system 2144 that can execute many of the functions associated with the OS 2144.

The kernel 2158 can include other software functions, including, but not limited to, driver(s) 2162, communication software 2166, and/or Internet Protocol software 2170. A driver 2162 can be any computer program that operates or controls a particular type of device or feature 2016 that is connected to and/or in communication with the home automation system 2004. A driver 2162 can communicate with the device through the bus 2112 or communications subsystem 2156 to which the hardware connects. When a calling program invokes a routine in the driver 2162, the driver 2162 may issue one or more commands to the device. Once the device sends data back to the driver 2162, the driver may invoke routines in the original calling program. Drivers can be hardware-dependent and operating-system-specific. Driver(s) 2162 can provide the interrupt handling required for any necessary asynchronous time-dependent hardware interface.

The IP module 2170 can conduct any IP addressing, which may include the assignment of IP addresses and associated parameters to host interfaces. The address space may include networks and sub-networks. The IP module 2170 can perform the designation of network or routing prefixes and may conduct IP routing, which transports packets across network boundaries. Thus, the IP module 2170 may perform all functions required for IP multicast operations.

The communications module 2166 may conduct all functions for communicating over other systems or using other protocols not serviced by the IP module 2170. Thus, the communications module 2166 can manage multicast operations over other busses or networks not serviced by the IP module 2170. Further, the communications module 2166 may perform or manage communications to one or more devices, systems, data stores, services, etc. that are in communication with the home automation system 2004 or other subsystems through the firewall 2157. Thus, the communications module 2166 can conduct communications through the communication subsystem interface 2156.

The operating system 2144 may also include a file system (not illustrated) the same as or similar to file system 1016. The file system may be any data handling software that can control how data is stored and retrieved. The file system can separate the stored data into individual pieces, and giving each piece a name, can easily separate and identify the pieces of data. Each piece of data may be considered a "file." The file system can construct data structure and logic rules used to manage the information and the identifiers for the information. The structure and logic rules can be considered a "file system."

Additionally or alternatively, the operating system 2144 may further include a device discovery daemon similar to device discovery daemon 1020 described above. The device discovery daemon may be a computer program that runs as a background process that can discover new devices that connect with the network 2012 or communication subsystem 2156 or devices that disconnect from the network 2012 or communication subsystem 2156. The device discovery daemon can ping the network 2012 at preset times, one a schedule determined by a user, randomly, or upon the occurrence of other events. Additionally or alternatively, the device discovery daemon 1020 may force Bluetooth®, USB, and/or wireless detection. For each device that responds to the ping, the device discovery daemon can populate the system data 2124, 2154 with device information and capabilities, using any of one or more protocols, including one or more of, but not limited to, IPv6 Hop-by-Hop Option (HOPOPT), Internet Control Message Protocol (ICMP), Internet Group Management Protocol (IGMP), Gateway-to-Gateway Protocol (GGP), Internet Protocol (IP), Internet Stream Protocol (ST), Transmission Control Protocol (TCP), Exterior Gateway Protocol (EGP), CHAOS, User Datagram Protocol (UDP), etc.

The operating system 2144 may also include a desktop manager including a windows manager, an application manager, and a panel launcher as described above in conjunction with FIG. 10. It should be appreciated that the computer system 2008 optionally has numerous variations from that described above. For example, customized hardware might also be used and/or particular elements might be implemented in hardware, software (including portable software, such as applets), or both. Further, connection to other computing devices such as network input/output devices may be employed.

Figure 21B:
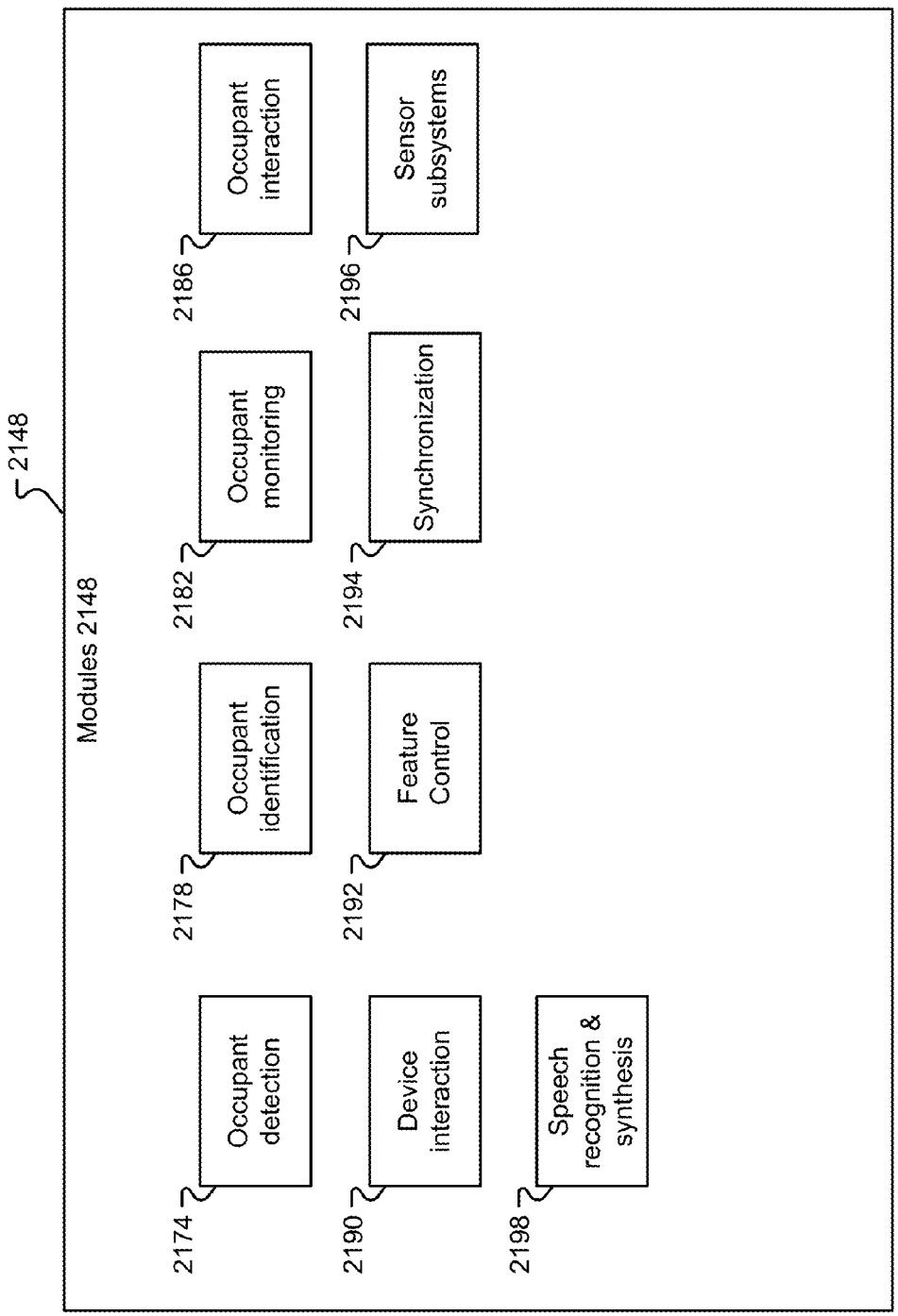
FIG. 21B is a block diagram of an exemplary embodiment of additional modules of the computer system of a home automation system.

Referring now to FIG. 21B, an exemplary embodiment of additional or optional modules 2148 of the computer system 2008 are illustrated. In addition to all previously described components, the operating system 2144 optionally includes one or more of occupant detection module 2174, an occupant identification module 2178, an occupant monitoring module 2182, an occupant interaction module 2186, a device interaction module 2190, a feature control module 2192, a synchronization module 2194, a sensor subsystems module 2196, and a speech recognition and synthesis module 2198. Examples of the modules 2174-2198 may be as described further herein and are described in more detail below.

The occupant detection module 2174 can use information from one or more sensors of the home automation system to determine an occupant is in the home. The occupant identification module 2178 can be similar to or the same as the user identification module 822 described above.

The occupant monitoring module 2182 can receive information from sensors within the home as well as information from other modules 2148 of the computer system to monitor the location, actions, and health of occupants within the home. The occupant monitoring module 2182 can employ method 1900 to monitor the health of occupants within the home.

The occupant interaction module 2186 can be as described in conjunction with the user interaction system 332. The device interaction module 2190 can be as described in conjunction with the user/device interaction subsystem 817 of FIG. 8B. The feature control module 2192 can control the function of and receive information from all interior 2016A and exterior 2016B of the home automation system. The synchronization module 2194 sends and receives information from one or more communication devices 212, 248 and vehicle controls system 204. The speech recognition and synthesis module 2198 may be as described in conjunction with the speech synthesis module 820 and includes a speech or voice recognition capability.

The occupant detection module 2174 may determine, using information from one or more of the interior or exterior sensors 2064-2080 of the sensor subsystems module 2196, that one or more people are in the home. For example, the occupant detection module 2174 may determine whether or not the home is occupied using sensors within the home such as motion sensors 2064A, audio sensors 2068A, 2080A, sensors that detect a position and/or movement of doors or windows 2090A, pressure sensors 2076A within or beneath floors or carpets, biometric monitors 2078A, and video cameras 2066A. Occupants within the home may also be detected by sensors 2084A that detect radio frequency signals transmitted by electronic devices carried by the occupant, such as WiFi signals, Bluetooth signals, and other telecommunication signals detected by one or more wireless signal sensors 2084A located throughout the house. Occupancy of the home may also be determined by an occupant's use of components, such as a home entertainment system 2044, appliances 2060 (such as detecting a refrigerator door opening and closing or detecting a faucet being turned on and/or off), or when an occupant logs on to a computer system or local area network.

The occupant identification module 2178 can identify occupants within the home using face recognition, voice recognition, and other biometric systems by comparing the detected characteristics to the characteristics of known occupants stored in database 2154. As may be appreciated, to identify an occupant, the occupant identification module 2178 may collect recognition information from the occupant in the home. Recognition information may be collected from one or more of sites, sources, sensors 2016-2080, and may include receiving user profile data 252 and vehicle user 216 data from the VCS 204 and/or from a communication device 212, 248 associated with the occupant. The collection of recognition information may include recording information via one or more sensors (e.g., vehicle sensors 242, non-vehicle sensors 236, etc.).

Facial recognition information may include facial features, and information about facial features, that can identify the occupant. For instance, the facial features can include measurement information that defines a position and/or arrangement of the facial features. In some cases, one or more sensors may be used to determine a measurement between at least one of the facial features of the occupant. Typical facial features can include, but are not limited to, at least one eye, eyebrow, nose, nostril, cavity, socket, tooth, bone, mouth, lip, chin, ear, hairline, forehead, facial hair, mole, birthmark, scar, and/or other distinguishing mark associated with the face of the occupant.

Voice recognition information may comprise collecting and analyzing acoustic features of the occupant's voice. Acoustic patterns of the occupant's voice, such as voice pitch, tone, speech style, speech pattern, word choices, volume, and the like. The recognition information can be stored in a memory, such as database 2154, and may include pointers to a memory. These pointers can be stored in one or more other memory locations.

Using face recognition and voice recognition to identify the occupant may include comparing identified facial recognition information and voice recognition information associated with the occupant with one or more identification characteristics stored in a memory. The one or more identification characteristics can be stored in a memory of a social networking site, facial recognition data memory, profile data memory 252, database 2154, and/or any other memory location. When the at least some of the identified facial features and identified voice features match at least one identification characteristic stored in the memory, a successful match, or recognition, may be determined. The more identified features that match the identification characteristics, the more successful the recognition. In other words, both facial recognition and voice recognition may be associated with a confidence level, or accuracy rating. This rating may be based on the number of features that are determined to match.

The occupant identification module 2178 may also identify an occupant when the occupant accesses the computer system or local area network, when a device 212, 248 associated with a known person is activated within the house or accesses the local area network, by associating the occupant with one or more wearable devices 802, 806, 810 identified in the home, by the presence of a device 212 associated with a user that is present in the home, or by querying an unidentified occupant and receiving an input from the occupant, for example, by receiving a voice input by the audio sensors 2080A. An unidentified occupant can be further classified as a guest, including a known guest or an unknown guest, or as an intruder.

The occupant detection module 2174 and/or the occupant monitoring module 2182 can determine a number of occupants at the home, a location of the occupants within the home by monitoring the movement of the occupant with one or more sensors 2064-2080, a health status of the occupants, and a length of time each occupant has been in the home. The occupant interaction module 2186 may assign an estimated departure time to an occupant. The estimated departure time can be entered into the home automation system 2004 by a departing occupant, or be determined based on a schedule of the occupant stored in an electronic device that is connected to the network 2012 or a schedule on a device that is otherwise accessible by the computer system 2008 of the home automation system 2004.

The health status of the occupants can include a determination that the occupant is asleep or awake, or that the occupant is experiencing a health crisis based on information received from sensors 2064-2080 and data from one or more wearable devices 802, 806, 810. Wearable devices include, but are not limited to, devices that can monitor and transmit one or more of a heart rate, a body temperature, a respiration rate, a blood oxygen level, a blood pressure level, a sleep pattern, health monitors, health and/or activity sensors, a glucose level, diabetes sensors, specialized health sensors, and the like. The wearable devices may at least one of detect, record, and track resting heart rate, maximum heart rate, aerobic heart rate, or in general, any biometric information associated with the occupant. The wearable devices may also be an alert device that may be activated by the occupant to send a preplanned emergency message to a monitoring service using communication network 224.

When the occupant monitoring module 2182 determines an occupant is experiencing the health crisis, the home automation system 2004 can send an alert to the vehicle control system 204 and/or a device 212, 248 of a user. The alert module 2348 (discussed below) of the VCS 204 can present the alert to a user within the vehicle. By way of example, the occupant monitoring module 2182 can determine that an occupant located in a room 2024 is sleeping by a lack of motion in combination with a heart rate and breath rate received from a wearable device 802-810 and/or a biometric sensor 2078 that is associated with a sleeping person. The wearable device 802-810 can send information about the occupant by a signal received by the wireless signal receiver 2084A of the home automation system.

In another example, the occupant monitoring module 2182 can determine that an occupant is experiencing a health crisis based on the lack of motion in an unexpected location for sleeping combined with a heart rate, respiration rate, a temperature, and/or other vital signs that are not consistent with a person sleeping. Therefore, an occupant motionless for a predetermined amount of time on the floor of a hallway or at the bottom of a flight of stairs can be identified as experiencing a health crisis.

The determination that the motionless occupant is experiencing a health crisis can also be based on sounds detected by the sound receivers 2068 and audio sensors 2080. The speech recognition and synthesis module 2198 includes a speech recognition program that can receive and/or interpret audible signals from the audio sensors 2080A and sound receiver 2068A. The speech recognition and synthesis module 2198 can interpret sounds from occupants in the home and send information about the sounds to the occupant monitoring module 2182. For example, an occupant may be breathing heavier than a level established as a baseline associated with profile information for that occupant stored in database 2154. The heavy breathing may be detected by sensors 2068, 2080 (or other device, including wearable devices 802, 806, 810) which may cause a response by the occupant monitoring module 2182. Additionally or alternatively, an occupant and/or other individual may express some oral statement that indicates a physiological state. For example, the occupant and/or other individual may state "I think I am having a heart attack." The statement of the occupant can be interpreted by speech recognition and synthesis module 2198 and the occupant interaction module 2186 can determine an action by comparing the statement to a plurality of phrases in database 2154.

Similar to detecting and interpreting a gesture as described above in conjunction with FIG. 11, the speech recognition and synthesis module 2198 can interpret the occupant's speech. In one example, the occupant's speech could be slurred compared to the occupant's normal speech patterns stored in database 2154. The slurred speech can be detected by the sound receivers 2068 based on a comparison of information about the occupant in database 2154 and cause the occupant monitoring module 2182 to determine that the occupant is experiencing a health crisis. In another example, the speech recognition and synthesis module 2198 may detect fear or anxiety in the occupant's spoken words. Fear, anxiety, and the like may be determined at least partially based on content, tone, context, historical data, other measurements taken, and the like. The occupant interaction module 2186 may query the occupant when the speech recognition and synthesis module 2198 detects fear, anxiety, and the like in the occupant's spoken words to determine the status of the occupant.

An occupant may establish one or more preset "code words" or "voice commands" in database 2154 to initiate various actions or levels of emergency response by the home automation system 2004. When an occupant uses one of these stored code words or voice commands, the speech recognition and synthesis module 2198 receives the input and the occupant monitoring module 2182 can then determine an appropriate response. If the occupant has not established preset commands, or if the occupant uses a voice command not stored in database 2154, the occupant monitoring module 2182 may compare the statement with one or more statements or voice commands in database 2154 to determine how to respond. For example, a user may make statements like "I am tired" or "I am feeling pain" and in turn, the occupant monitoring module 2182 may interpret the information and may use the occupant interaction module 2186 and the speech recognition and synthesis module 2198 to present a message to the occupant, such as "Do you need assistance" or the like and request a response from the occupant. The message from the occupant interaction module 2186 can be selected from a plurality of pre-planned messages in database 2154. If the occupant interaction module 2186 does not receive a response to this message from the occupant, the occupant monitoring module 2182 may determine that the occupant is experiencing a health crisis and can send an alert to the vehicle control system 204 and/or a device 212, 248 of a user. The alert can be a pre-planned alert selected by the home automation system from a plurality of preplanned alerts in database 2154.

In another example, a call for help determined to originate from the occupant can cause the occupant interaction module 2186 to determine that the occupant is experiencing a health crisis. Alternatively, the occupant interaction module 2186 may determine a motionless occupant is experiencing a health crisis based on a loud noise (for example, a noise greater than a certain decibel level) detected by the sound receivers 2068 in proximity to the stairs combined with a lack of motion and a lack of speech from the occupant for a predetermined period of time. Floor weight sensors 2076 may also detect a weight above a predetermined amount in proximity to the stairs without a movement of the weight. The predetermined period of time may be set by a user for different locations and different occupants. Thus, a lack of motion or speech for more than 5 minutes by an occupant in a utility area, a closet, bathroom, basement, hallway, or in proximity to stairs could be set to trigger the occupant interaction module 2186 to determine a health crisis is occurring. In addition or alternatively, a lack of motion or speech for greater than 10 hours for an occupant anywhere within the home may be set to cause the occupant interaction module 2186 to determine the health crisis is occurring. After determining that the occupant is experiencing the health crisis, the occupant interaction module 2186 can send an alert to the vehicle automation system and/or a device 212, 248 of a user.

For an identified occupant, the occupant monitoring module 2182 may also retrieve an age or health status of the occupant from database 2154 as well as preferences of the occupant to determine the health status of the occupant. Thus, a first identified occupant with a health problem or mobility limitation recorded in database 2154 may be determined to be experiencing a health crisis if the first identified occupant is located by the occupant monitoring module 2182 at the bottom of a flight of stairs. Alternatively or in addition, the occupant monitoring module 2182 may determine a health crisis is occurring for an occupant based on a mental condition of the first identified occupant recorded in database 2154. If the occupant monitoring module 2182 determines that the first identified occupant with a diminished mental capacity, such as dementia, recorded in database 2154 is in a utility room or mechanical room in the basement, the occupant monitoring module 2182 may determine that the first identified occupant is experiencing a health crisis. Continuing this example, when the occupant monitoring module 2182 determines that the first identified occupant is leaving the home with an unidentified person, the occupant monitoring module 2182 may determine that the first identified occupant is experiencing a health crisis or emergency and can send an alert to the vehicle control system 204 and/or a device 212, 248 of a user.

In contrast, a second identified occupant whose health status is recorded as healthy in database 2154 and with a preference to sleep in bedroom two recorded in database 2154 may be identified as sleeping when motionless in bedroom two if the heart rate, respiration rate, and temperature of the second identified occupant do not otherwise indicate a health emergency compared to information stored in database 2154. However, if the second identified occupant is motionless in a basement utility room for more than a determined amount of time, for example 10 minutes, the occupant monitoring module 2182 may determine that the second identified occupant is experiencing a health crisis. Further, if the occupant monitoring module 2182 detects other occupants within the home but the occupant identification module 2178 cannot identify one or more of the other occupants, the occupant monitoring module 2182 may determine that the second identified occupant in the basement utility room is experiencing an emergency, such as a home invasion or the like, and the occupant monitoring module 2182 can send an alert to a device 212, 248 of a user and/or the vehicle control system 204.

The occupant monitoring module 2182 can use the synchronization module 2194 to send data to the vehicle control system 204 and/or a device 212, 248 of a user about occupants in the home and status of the occupants. For example, if an unidentified person or a guest is detected within the home, the occupant monitoring module 2182 can send an alert to a device 212, 248 and/or the vehicle control system 204 to notify the user 216. The occupant monitoring module 2182 can also cause the synchronization module 2194 to send an alert to device 212, 248 and/or VCS 204 when the occupant monitoring module 2182 determines an occupant is experiencing a health emergency. Further, an alert may be sent to the VCS 204 and/or device 212, 248 when an expected departure time is assigned to an occupant. The alert may be an audible message produced by speech synthesis module 820 and transmitted through speakers 880 to user, for example "Tom is experiencing a health emergency at home," and may be selected from a plurality of alerts in database 2154.

A user 216 of the vehicle 104 can communicate with occupants in the home using the vehicle control system 204. For example, if the occupant monitoring module 2182 sends an alert to the vehicle control system 204 and/or device 212, 248 after determining that an occupant is experiencing a health emergency or after assigning an expected departure time to an occupant, the user 216 in the vehicle 104 may want to communicate with the occupant. If the occupant is not carrying a device 212, 248, the vehicle control system 204 can contact the home automation system using communication network 224 and communication system 2132 of computer 2008. After the vehicle control system 204 establishes the contact, the user 216 can transmit audible messages received by microphones 886 in the vehicle 104 that are then transmitted by the vehicle control system 204 to the home automation system 2004 using network 224. Additionally or alternatively, the device 212, 248 can connect to the home automation system and send a message of the user to the home automation system. The home automation system 2004 can then use one or more speakers of the entertainment system 2048 and/or the audio sensors 2080 to transmit the audible message of the user to the occupant using the occupant interaction module 2190. For example, the user in the vehicle can ask "Tom, are you all right" which is received by microphones 886, transmitted by vehicle control system 204 to the home automation system 2004, and presented by speakers of speech recognition and synthesis module 2198 to the occupant in the home. If the occupant makes an audio response to the message, such as "Janie, I need help," the microphones of the audio sensors 2080 or sound receivers 2068 can receive and record the response, and the speech recognition and synthesis module can retransmit the recorded response to the vehicle control system 204 which can replay the recorded response to the user 216 using speakers 880, "Janie, I need help."

The synchronization module 2194 can send information over communication network 224 to the home automation module 2304 (discussed below) of the vehicle control system 204 about the state of the home 2000 during synchronization. The information can include whether or not the home is occupied, number of occupants in the home, the floor and the room in which the occupant is located, the identities of the occupants, a time each occupant entered the home, an estimated departure time of an occupant, and the status of the occupants (such as the health status, whether the occupant is asleep or awake, etc). The information can also include the state of features of the home automation system, such as settings, current conditions of the features (whether they are running, active, inactive, turned-off). The synchronization module can also send information and readings from one or more sensors of the home automation system. This information may be in addition to alerts sent by the home automation system 2004 as described below in conjunction with FIG. 22. The information may be relayed to the vehicle and/or the user's mobile device 212, 248 to inform the user of the condition. The synchronization module 2194 can also send data to the vehicle control system 204 to provide a status of features connected to and/or controlled by the feature control module 2192 home automation system 2004. The synchronization module 2194 may also receive information from the home automation module 2304 such as the location of the vehicle 104, the destination of the vehicle, the number and identity of users within the vehicle, and an estimated time of arrival of the vehicle at the home.

A user 216 may determine to adjust trip timing based on information provided by the home automation system 2004 to the vehicle control system 204. For example, a user may be driving home after spending time at work, and while driving the user may decide that an errand needs to be run. In this case, the user may wish to know if anyone is at the home before adding a waypoint into the navigation system as discussed below in conjunction with FIG. 29A. If occupants are in the home 2000 (e.g., waiting for the user), the user may wish to postpone the errand until a different time. Or if an occupant will be departing the home 2000 soon based on the estimated departure data, the user 216 may choose a faster route home and cancel a waypoint. Additionally or alternatively, the user in the vehicle 104 may use the contact established between the vehicle control system 204 and the home automation system 2004 to send a message to the departing occupant in the home. For example, the user can create a text or audio message using the vehicle control system 204. The vehicle control system can send the message to the home automation system 2004 which can present the message to the departing occupant using speakers of the home entertainment system and/or the audio sensors 2080.

Additionally or alternatively, users in the vehicle 104 and occupants in the home 2000 can establish a connection between the vehicle 104 and the home automation system 2004 using communication network 224 to communicate with each other. For example, a user 216 may be travelling in the vehicle 104 and receive an alert from the vehicle environment monitoring module 2324 of vehicle control system 204 (described below) that a tornado is in close proximity to the user and/or the user's home 2000 (or learn of some other emergency). The user may wish to know whether occupants are at the home 2000. The user can direct the vehicle control system to synchronize or establish a connection with the synchronization module 2194 of the home automation system 2004 to learn the location and status of occupants within the home. The user can then determine if occupants within the home are safe, and if necessary can use the connection between vehicle control system 204 and the home automation system 2004 to communicate with the occupants to warn them of the tornado or other emergency.

The user 216 in the vehicle 104 can direct the vehicle control system 204 to establish contact with the home automation system. After the contact is established, the user 216 can transmit audible messages received by microphones 886 in the vehicle 104 that are then transmitted by the vehicle control system 204 using network 224 to the home automation system 2004, which can then use one or more speakers of the speech recognition and synthesis module 2198 to transmit the audible message of the user to the occupant. For example, the user in the vehicle can ask "Tom, there is a tornado near the home" which is received by microphones 886, transmitted by vehicle control system 204 to the home automation system 2004, and presented by speakers of speech recognition and synthesis module 2198 to the occupant in the home.

Figure 22:
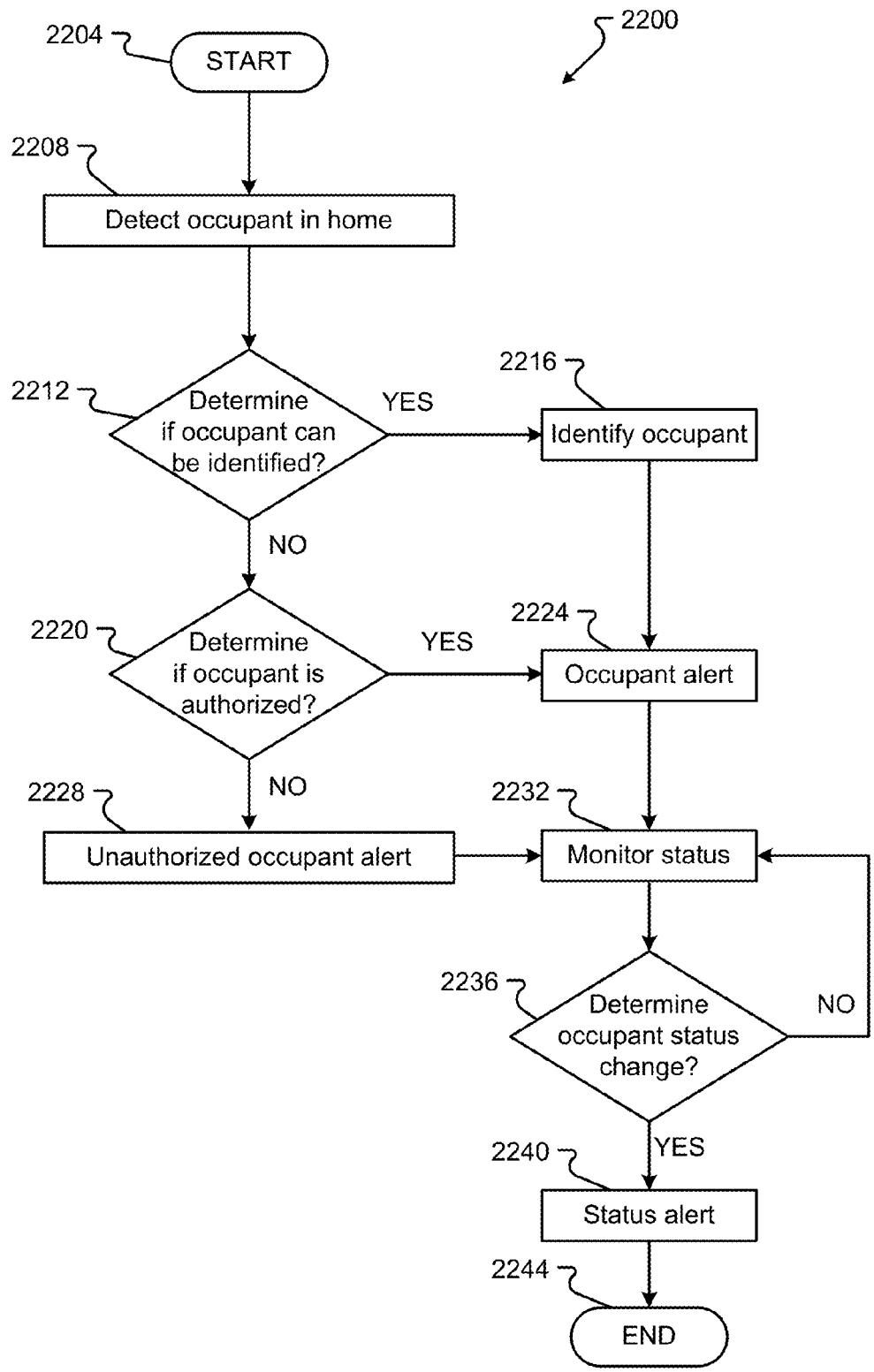
FIG. 22 is a flow or process diagram of a method for detecting and identifying an occupant of a home by a home automation system.

An embodiment of a method 2200 for detecting occupants in a home, monitoring their status, and sending alerts to a user is shown in FIG. 22. While a general order for the steps of the method 2200 is shown in FIG. 22, the method 2200 can include more or fewer steps or can arrange the order of the steps differently than those shown in FIG. 22. Generally, the method 2200 starts with a start operation 2204 and ends with an end operation 2244. The method 2200 can be executed as a set of computer-executable instructions executed by a computer system and encoded or stored on a computer readable medium. Hereinafter, the method 2200 shall be explained with reference to the systems, components, modules, software, data structures, user interfaces, etc. described in conjunction with FIGS. 1-21.

An occupant may enter the home. One or more sensors 2064-2080, 2090 of the home automation system 2004 may detect the occupant in the home, in step 2208, and provide data to the occupant detection module 2174. For example, a door sensor 2090 may detect an exterior or interior door opening. One or more wireless signal sensors 2084A may detect and locate a signal from a mobile device 212, 248 or a wearable device 802-810. Weight sensors 2076 in a floor may determine that some new amount of weight has been registered. The amount of weight may fall within predetermined parameters (e.g., over a threshold, in a specific range, etc.). This weight may then be determined to be an occupant by one or more optical or other sensors 2064, 2066. The occupant detection module 2174 may then determine that the occupant is located on a certain floor 2020 or room 2024.

The occupant identification module 2178 may then identify the occupant, in step 2212, by receiving information from the sensors 2064-2080, 2090 and comparing that information to information in the database 2154 of known occupants in the computer system 2008. The sensor data may be compared to characteristics of known occupants to determine if the occupant has already been identified. In identifying an occupant, the information associated with that occupant may be retrieved from the database 2154 of the computer system 2008 and provided to the occupant identification module 2178. The occupant's features can be compared to stored features in the database 2154 to determine if the occupant in the home can be identified. In addition or alternatively, the occupant identification module 2178 may identify an occupant by the occupant's use of a communication device 212, 248, by wearable device 802-810, by the occupant logging into a network 2012 within the home, or by querying the occupant and receiving a correct response to the query.

If the occupant can be identified, the method 2200 proceeds YES to step 2216 where that occupant is identified. If an occupant cannot be identified, the method 2200 proceeds NO to step 2220. In step 2220, the occupant identification module 2178 may determine if the occupant is authorized to be in the home. The occupant identification module 2178 may classify an occupant as a guest if an identified occupant is in the home and authorizes the new occupant to be in the home. When the occupant identification module 2178 cannot identify an occupant, the occupant identification module 2178 can present a query to an identified occupant. The identified occupant could then provide authority for the unrecognized occupant to be in the home, and the occupant identification module 2178 classifies the occupant as a guest.

If the occupant identification module 2178 classifies the occupant as a guest, the characteristics of the guest may be entered into the database 2154 of the computer system 2008 and used to identify the guest if the guest returns to the home at a future time. When the occupant identification module 2178 classifies the occupant as a guest, the method 2200 proceeds YES to step 2224 and the occupant identification module 2178 sends an occupant alert to the vehicle control system 204 and/or device 212, 248. The alert module 2348 (discussed below) of the VCS 204 can present the alert to a user within the vehicle. The occupant alert can include the identity of the occupant and/or the status of the occupant (such as an authorized guest) as well as the time the occupant arrived at the house. Further, the occupant alert can include a picture of the occupant taken by one or more of the interior or exterior camera 2066 and may also include a recording of the occupant's voice recorded by one or more audio sensors 2080. The picture and/or the voice recording may be included in the alert for all occupants. Optionally, the user can enter a setting in the user's profile to have the occupant identification module 2178 send the picture and/or voice recording only for guest occupants and/or unidentified occupants. Additionally or alternatively, when the user receives an occupant alert, the user can request a picture and/or voice recording of the occupant. In response to the request, the occupant identification module 2178 will send a picture and/or voice recording to the user.

If the occupant is a guest, the occupant alert can further include the name of the identified occupant who provided authority for the unrecognized occupant to be in the home. To send the alert, the occupant identification module 2178 can use synchronization module 2194 and the communication system 2132 of the computer system 2008 to establish a connection to the vehicle control system 204 using network 224. After establishing the connection, the synchronization module 2194 can send and receive information to and from the vehicle control system. When the VCS 204 receives the occupant alert, the VCS presents the occupant alert to a user in the vehicle 104 as an audio and/or text message.

If the occupant cannot be identified and is not classified as a guest, the method 2200 proceeds NO to step 2228 and an unauthorized occupant alert is sent to the VCS 204. The unauthorized occupant alert can include information such as when the unauthorized occupant entered the home, how the unauthorized occupant entered the home, and where the unauthorized occupant is located within the home. When the VCS 204 receives the unauthorized occupant alert, the VCS presents the alert to a user in the vehicle 104 as an audio and/or text message. The alert can be presented on one or more of displays 212, 248, 882, 2804, 2812, and 2816.

The occupant monitoring module 2182 monitors the status of both authorized and unauthorized occupants in step 2232. The occupant monitoring module 2182 can determine a status change of an occupant change in step 2236. If the occupant monitoring module 2182 determines that an occupant's status has changed, the method proceeds YES to step 2240 and the occupant monitoring module 2182 sends a status change alert to the alert module 2348 of the vehicle control system 204. For example, as described above, the occupant monitoring module 2182 can monitor the movement and/or lack of movement of an occupant using sensors 2064-2080, 2090 and information from wearable device 802-810 and may determine that an occupant is experiencing a health crisis. If the occupant monitoring module 2182 an occupant is experiencing a health crisis, the method 2200 proceeds YES to step 2240 and a status change alert is sent to the vehicle control system 204 to notify the user that the occupant is experiencing a health crisis.

In a further example, if the occupant monitoring module 2182 determines 2236 that an occupant's status has changed to departing, the method 2200 proceeds YES to step 2240 and an status change alert is sent to the vehicle control system 204 to notify the user that the occupant is leaving. The occupant monitoring module 2182 can determine that an occupant is departing based on a known occupant's schedule, for example by detecting an appointment in a calendar associated with the known occupant, or by the occupant entering a departure time into the computer system 2008 of the home automation system 2004. The status change alert can include an estimated departure time of the occupant.

The occupant monitoring module 2182 may also determine 2236 that an occupant has left the home using one or more sensors 2064-2080, 2090 and/or by an absence of a signal from devices 212, 248 by wearable device 802-810. For example, the occupant monitoring module 2182 may determine an occupant has left the home by detecting movement of the occupant with an interior motion sensor 2064A followed by detecting opening movement of an exterior door sensor 2090B, and additional movement by an exterior motion sensor 2064B. If the occupant monitoring module 2182 determines that an occupant has departed the home, the method 2200 proceeds YES to step 2240 and a status change alert is sent to the vehicle control system 204 and/or device 212, 248 to notify the user that the occupant has left the home.

The occupant monitoring module 2182 can also send status change alerts upon determining 2236 that an occupant has gone to sleep or awakes, that an occupant is experiencing a health crisis, that an occupant is preparing to leave the home, and/or when other events occur such as when an occupant enters a room or zone that the occupant is not authorized to enter. For example, an authorized guest may be allowed to access all rooms 2024 designated as public zones 2028, but the system may determine that an authorized guest's status has changed to unauthorized if the guest enters a utility room or a master bedroom. If the authorized guest's status changes to unauthorized, the method proceeds YES to 2240 and a status change alert is sent to the vehicle control system 204. When the VCS 204 receives the status alert, the alert module 2348 presents the alert to a user in the vehicle 104 as an audio and/or text message.

All alerts 2224, 2228, and 2240 can be sent to both the VCS 204 and/or devices 212, 248. Further, all alerts can be selected by the home automation system 2004 from a plurality of pre-planned alerts stored in database 2154. Additionally or alternatively, all alerts include one or more of an audio component and a text component. The alert module 2348 presents the occupant alert 2224, the unauthorized occupant alert 2228, and the status alert 2240 to the user in the vehicle 104 when each alert is received. Additionally or alternatively, the alert can be sent to one or more devices 212, 248.

Figure 23:
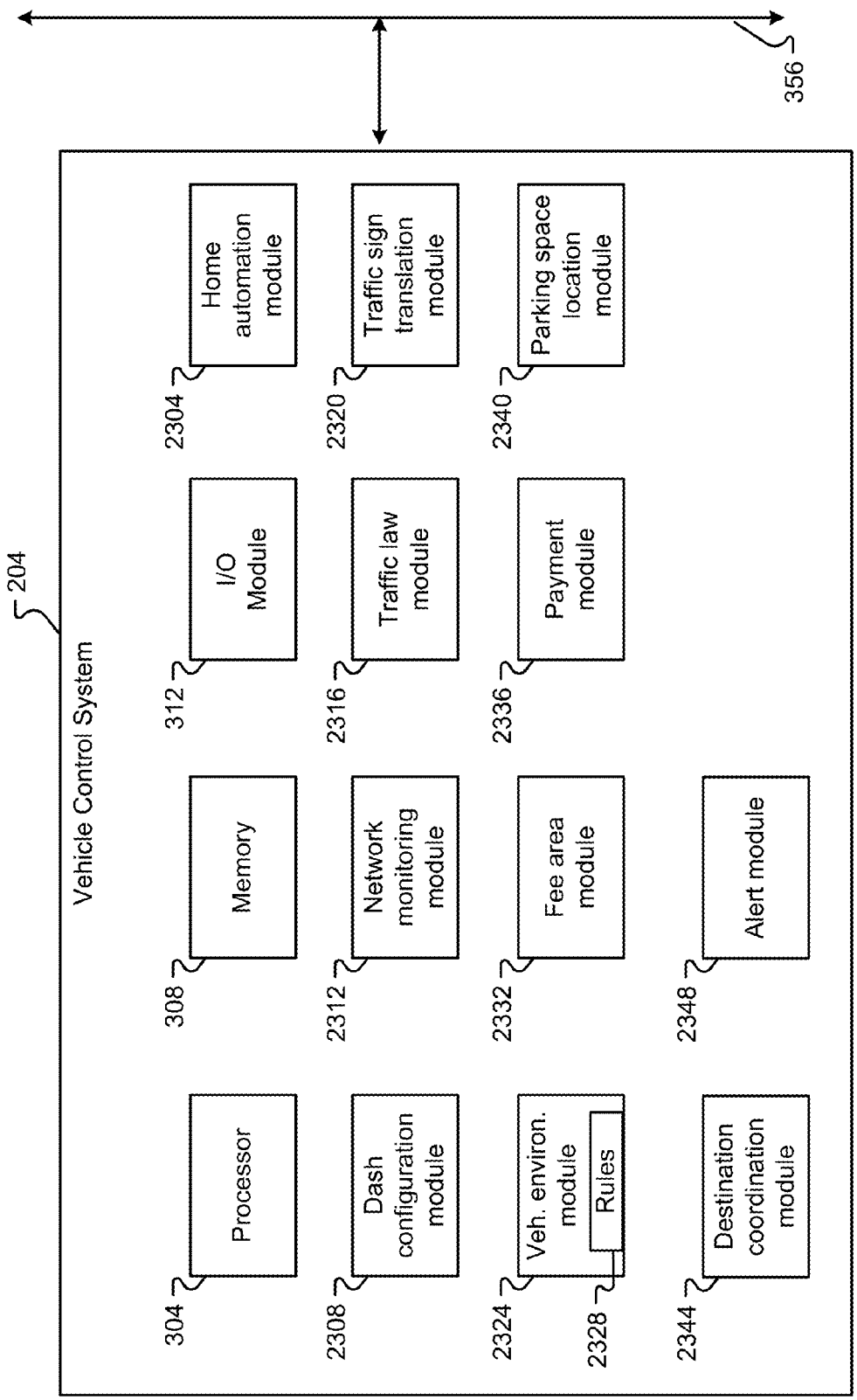
FIG. 23 is a block diagram of an exemplary embodiment of additional modules of a vehicle control system.

FIG. 23 illustrates an exemplary embodiment and includes additional optional modules of the vehicle control system 204. In addition to all previously described components, the VCS 204 optionally includes a home automation module 2304, a dash display configuration module 2308, a communication network monitoring module 2312, a traffic law module 2316, a traffic sign translation module 2320, a vehicle environment monitoring module 2324 which may include a rules module 2328, a fee area module 2332, a payment module 2336, a parking module 2340, a destination coordination module 2344, and an alert module 2348.

The alert module 2348 can automatically generate and provide alerts to users. Additionally, the alert module 2348 can retrieve a plurality of pre-planned alerts from system data 208 and/or the server 228. The alerts can include audio messages using speech synthesis unit 820 and speakers 880. Text alerts and video alerts may be presented on one or more displays 212, 248, 882, 2804, 2812, and 2816. Additionally or alternatively, alerts can be accompanied by haptic feedback, such as vibrating the steering wheel, a seat, and/or some other surface within the vehicle, or by tugging or vibrating a seat belt. The user can select settings for alerts, including limiting certain alerts, a language for audio and text alerts, a volume of alerts, a display for alerts, and turning certain alerts. The user's alert settings can be saved in portion 1224 of data structure 1200.

The alert module 2348 can time alerts and send alerts so that they do not distract a driver. The alert module 2348 can receive information from facial recognition and other sensors that may indicate the number of tasks the driver is performing, an attentiveness of the driver, and if the driver is over-tasked or task saturated. If the driver is reaching a task saturation level, the alert module may delay sending an alert, or, if other users are in the vehicle, present the alert to the other user to avoid causing the driver to become distracted. For example, alerts can be assigned an importance ranking Less important alerts may be delayed and presented to a driver during a safe driving situation, such as when the vehicle is being driven below a certain speed, stopped, or when traffic congestion is low. More important alerts can be presented with less of a delay or no delay depending on the state of the driver (such as if the driver is performing only a few activities, many activities, or is already task saturated).

The alert module 2348 can send any or all alerts to a communication device 212, 248 located outside of the vehicle. For example, an owner 216 of the vehicle 104 may create a setting to receive all alerts, or certain alerts, of the alert module 2348 whether or not the owner is in the vehicle. The alerts may be one or more of a text message, a Tweet, a phone call, and an email. In this manner, the owner 216 can receive alerts related to use of the vehicle, and the state or location of the vehicle, when the vehicle is operated by any other driver. The driver can be a guest, a rentor, a valet, a vehicle technician, an employee, a family member, and the like. The owner can further specific which type of alert, a format for an alert (text message, voice message by a phone call, an email), a communication device to receive the alert (a smart phone, an email account, or multiple communication devices and accounts), alerts for particular drivers (such as a particular family member or a particular employee), or alerts for certain classes of drivers (such as all employees, all employees under a certain rank (such as beginning drivers) or age (such as drivers under 25 years old), children, valets, and any other class or type of driver). The alert module 2348 can send pictures from one or more interior or exterior cameras with the alert.

The home automation module 2304 can be used to send and receive information to home automation system 2004. For example, the home automation module 2304 can send commands to control settings on one or more home automation features.

The dash display and HUD of the vehicle 104 can be automatically reconfigured by the dash display configuration module 2308 based on the location of the vehicle. The dash display configuration module 2308 can also reconfigure the dash display and HUD by rearranging instruments, removing instruments, and increasing the size of instruments to decrease driver distraction and increase driver attention in some vehicle environments. Communication network performance and availability can be monitored and evaluated by the communication network monitoring module (CNMM) 2312. The CNMM 2312 can also automatically select a new communication network if there is a gap in network coverage or if the performance of a communication network falls below a predetermined level or is insufficient for a current or anticipated communication requirement.

The traffic law module 2316 can monitor traffic laws applicable in the area where the vehicle is located. Additionally, the traffic law module 2316 can use the alert module 2348 to provide alerts to the driver when traffic laws change as the vehicle moves from a first area to a second area. Traffic signs written in a language a driver or other occupants of a vehicle do not understand may be imaged by vehicle cameras and other sensors. The signs can then be translated by the traffic sign translation module 2320. The traffic sign translation module 2320 can then use the speech synthesis module 820 and or one or more vehicle displays to present the message of the sign to the driver in a language the driver understands.

The operating environment of the vehicle is monitored by the vehicle environment monitoring module (VEMM) 2324. The VEMM 2324 can use the rules module 2328 to determine one of a predefined operating environment exists and assess the severity level of the operating environment. The VEMM 2324 can then determine a response which can include providing an alert to the driver by the alert module 2348 and activating or controlling one or more vehicle features or functions.

When the vehicle approaches a fee area, such as a toll road, HOV lane, park, and/or a ferry boat, the fee area module 2332 can retrieve rules associated with the fee area and determine the fee associated with entering or using the fee area. If should be understood that a fee area may be any area or location in which a fee is required or assessed. Thus, a fee area may be temporary, such as a lane of a road that may require a fee on certain days, at certain times of a day, or when certain events occur (such as a certain number of vehicles being present in the lane or a certain level of congestion on a road associated with the lane).

The fee area module can determine if an alternate route may be used to reach a destination of the vehicle. If an alternate route is available, the fee area module 2332 can determine a cost of using the alternate route. The alert module 2348 can then provide an alert to the driver that includes information about the fee area, the cost of entering or using the fee area, and, if available, information about an alternate route and the cost of using the alternate route. A user can enter settings to limit or prohibit the use of one or more fee areas by one or more drivers of the vehicle. For example, an owner of the vehicle could save a setting to always allow the use of a fee area, to allow the use of certain types of fee areas, prohibit the use of all fee areas, prohibit the use of certain fee areas, allow use of one or more fee areas by one or more drivers, prohibit the use of one or more fee areas by one or more drivers, allow the use of one or more fee areas if the fee is less than a certain amount, and/or prohibit the use of one or more fee areas if the fee is greater than a certain amount.

The parking module 2340 can locate and reserve a parking space based on user defined requirements. For example, the parking module 2340 can connect to one or more servers operated by parking providers to determine if the servers have suitable parking space available based on the user's requirements. The parking module 2340 can provide a list of suitable parking spaces to the user for selection. After parking in a parking space that requires payment, the parking module 2340 can monitor time remaining before expiration of the parking term. At a predetermined time, the alert module 2348 can send an alert to the user that the parking term is about to expire.

Fees associated with fee areas and parking spaces can be automatically paid by the payment module 2336. A user can create a payment profile that can include one or more payment types that can be used by the payment module 2336 to complete payment transactions. For example, the payment profile can include a credit card number, a debit card number, a bank account number, and/or any other type of payment and/or information required to complete transactions. The user can authorize, or prohibit, other users to use the payment profile. For example, a vehicle owner can create a payment profile and authorize all vehicle operators, such as employees, to use the payment profile to pay for fees and parking. In another example, a user can authorize family members to use the payment profile. The user can prohibit certain other users from using the payment profile for certain transactions or all transactions and fees. The user can also enter settings in profile data 252 to prevent or authorize the payment module 2336 to pay fees for unidentified drivers. The payment module 2336 can create accounts with a fee area entity or a parking entity to complete a payment transaction. The payment module 2336 can also download and run applications provided by fee area entities and parking entities to complete a payment transaction. Further, when entering a fee area or payment required parking area, the user can use a payment type identified in the payment profile or enter a new payment type into the payment module 2336. The payment module 2336 can establish encrypted connections with servers by any method known to those of skill in the art. For example, security keys can be exchanged between the driver, the payment module 2336, and a server the payment module connects to. The encryption may be cryptographically asymmetric in nature (e.g., private and public keys). In one example, the user may maintain a private key on a mobile device 212, 248, and a public key may be provided by the vehicle 104. In another example, the user may maintain the private key on the mobile device 212, 248, and the private key may be provided by the vehicle 104. Other embodiments may use a private key on the mobile device 212, 248 and a private key provided by the vehicle and/or a public key on the mobile device 212, 248 and a public key provided by the vehicle. In yet another embodiment, the exchange of keys may be facilitated via a certified trusted authority, similar to a Certificate Authority (CA).

Vehicle Location-Based Home Automation Triggers

Figure 24:
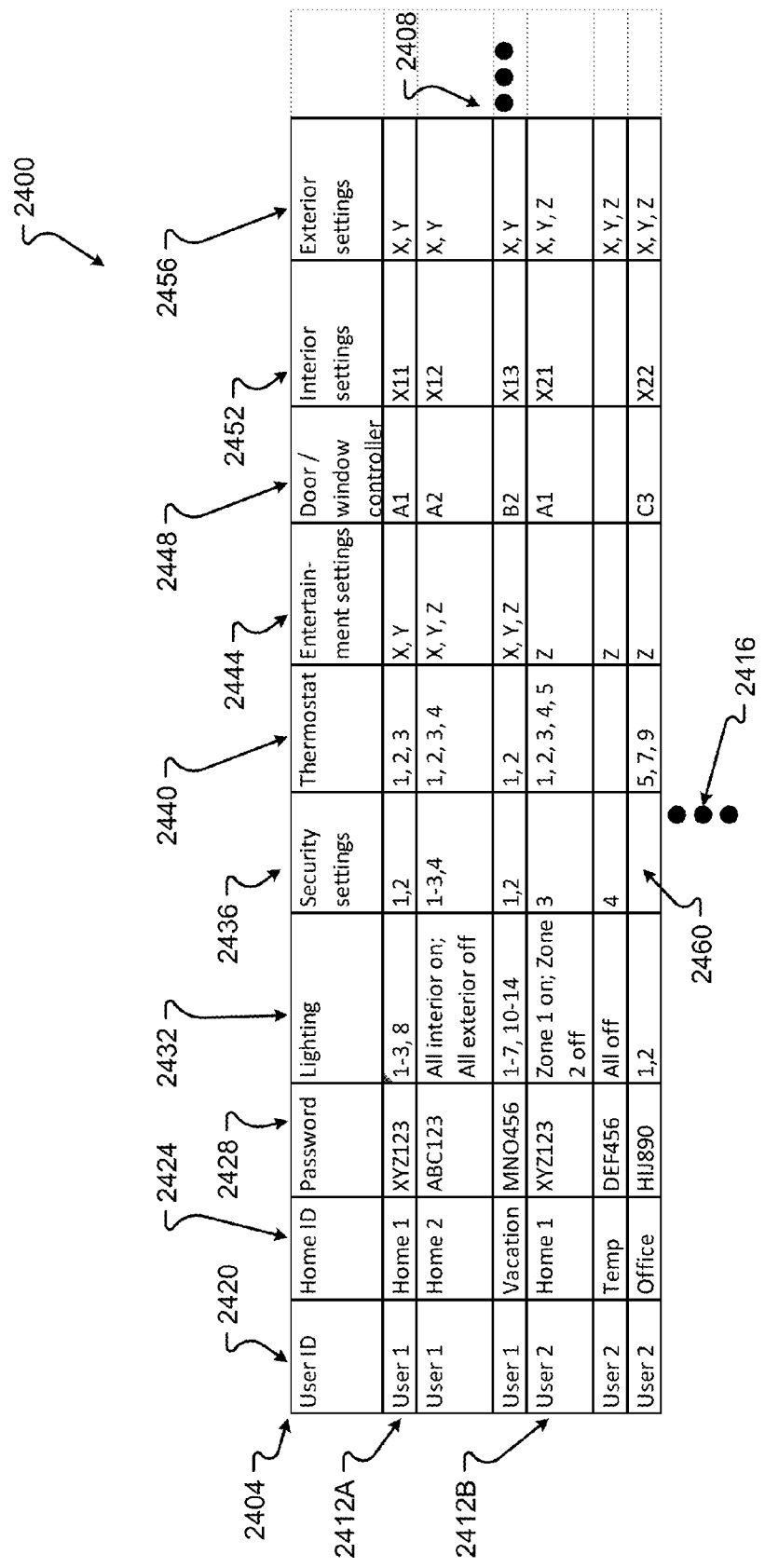
FIG. 24 is a diagram of an embodiment of a data structure for storing settings for features of a home automation system.

Referring now to FIG. 24, an embodiment of a data structure 2400 to store settings for features of one or more home automation systems 2004 that the user can control with the vehicle control system 204 is illustrated. The user 216 can enter settings to activate, deactivate, or modify any of the features of the home automation system 2004 when the vehicle departs from or returns to the home 2000. The settings can be sent to the server 228 to be stored in storage 232.

Based on the location of the vehicle 104, or the vehicle departing from, or returning to, the home 2000, settings associated with the home automation system 2004 may be activated and/or deactivated by the home automation module 2304. For example, at a certain distance from the home 2000 or at a predetermined amount of time before the vehicle 104 is predicted to arrive at the home 2000, the home automation module 2304 may use communication network 224 to send a command to the home automation system 2004 to set appropriate levels of lighting 2032, change a thermostat 2040 setting, and/or activate/deactivate or change settings of other devices or features controlled by the home automation system 2004.

The user 216 may override or cancel a setting directing the home automation module 2304 to change home automation system 2004 settings based on the status of occupants of the home 2000. Thus, if the user 216 is returning home 2000 and, during synchronization between the VCS and the home automation system 2004, the home automation system reports that an identified occupant is sleeping on a coach in the family room, the user may cancel a setting for the home automation module 2304 to command to the home automation system 2004 to turn on lights 2032A or the entertainment system 2044A in the family room to avoid waking the sleeping identified occupant.

The data structure 2400 may include one or more of data files or data objects 2404. Thus, the data structure 2400 may represent different types of databases or data storage, for example, object-oriented data-bases, flat file data structures, relational database, or other types of data storage arrangements. Embodiments of the data structure 2400 disclosed herein may be separate, combined, and/or distributed. As indicated in FIG. 24, there may be more or fewer portions in the data structure 2400, as represented by ellipses 2408. Further, there may be more or fewer files or records 2412 in the data structure 2400 to store data for more users, as represented by ellipses 2416.

The data file 2404 may include several portions 2420-2456 representing different types of data. Each of these types of data may be associated with a user. As provided herein, the user can be one or more people that uses or rides within the vehicle 104. The user may be identified in portion 2420 and there may be more than one user, as indicated by 2412A, 2412B, identified in data structure 2400.

One or more locations identified as a home 2000 can be identified in portion 2424. One or more locations with a home automation system 2004 that the user can control can be identified in portion 2424. For example, the home 2000 can be, but is not limited to, one or more of an apartment, a detached house, a condominium, an office, and/or a temporary location (such as a hotel room). A temporary location may also be a home or dwelling with a home automation system 2004 for which the user has temporary control. Thus, each user 216 may have one or more locations identified in portion 2424 which the user can control using the vehicle control system 204 and the home automation module 2304.

The user may provide a unique code or password that can be identified in portion 2428 that allows the home automation module 2304 to access, communication with, receive information from, and send commands to each home automation system 2004 identified in portion 2424. The code of portion 2428 may be one or more of a globally unique identifier, a numeric identifier, and an alphanumeric identifier.

Each user 2412A, 2412B identified in portion 2420 may enter different settings for each component 2432-2456 of each home automation system 2004 the user controls. Settings for interior and exterior lights 2032A, 2032B are identified in portion 2432. Settings for the security system 2036A, 2036B are identified in portion 2436. Settings for thermostats 2040 are identified in portion 2440. Portion 2444 identifies settings for the home entertainment systems 2044A, 2044B. Settings for door and window controllers 2090A, 2090B are identified in portion 2448. Other interior settings (such as for a hot tub 2056A, etc.) are identified in portion 2452 and other exterior settings (such as for irrigation systems 2062, water features 2058, and snow/ice melt features 2094) may be entered in portion 2456.

Further, the user may enter alternate settings for actions to be performed by the home automation module 2304 when arriving at or near the home, when departing the home, when the home is empty, and/or when the home is occupied. For example, the user can enter a setting directing the home automation module 2304 not to send commands to the home automation system 2004 when arriving at or departing from a home that is occupied. Thus, the components of the home automation system 2004 would not be changed by the home automation module 2304 when the home is occupied. However, a user can enter settings in data structure 2400 to change the settings for one or more individual components 2432-2456 when arriving at or departing from an occupied home.

Lighting settings, identified in portion 2432, may include instructions to turn on or off, or adjust the level of, one or more interior and/or exterior lights 2032A, 2032B upon arrival or departure from the home. Further, the lighting settings 2432 can include a setting to turn on or off lights 2032A, 2032B within a particular zone, floor, or room of the home 2000 upon arriving or departing the home. Thus, when the vehicle 104 returns to the home 2000, lights on the main floor of a multi-level home can be turned on without turning on the lights in a basement or an upper floor. Further, the user 216 can enter a lighting setting 2432 to turn on or off lights 2032A, 2032B within a portion of a zone, such as an entryway light or hallway.

The lighting settings 2432 may also include instructions to turn on/or off the one or more interior and/or exterior lights 2032A, 2032B based on a time of the day or an outside light level. For example, different interior and exterior lights may be selected to turn on when an arrival time of the vehicle 104 is during a period of daylight compared to lights that will be turned on or off when the arrival time is during a period of darkness. In addition, the lighting settings 2432 may also include instructions that certain lights will be turned on/or off when the arrival time is a particular time. For example, if the arrival time is after 11:00 PM or before 6:00 AM, the user may only want exterior lights turned on to avoid waking sleeping occupants in the home. The user can specify any desired time limitation or setting for the lights.

Further, lighting settings 2432 can include instructions to activate or deactivate lights when it is dark at the home, or when the light levels at the home are above and/or below a certain level. Thus, the home automation module 2304 may determine, based on light level information provided by the exterior light sensor 2072B of the home automation system 2004, that it is dark at the home 2000, or that the light level is below a predetermined level. After making the determination, the home automation module 2304 can send commands to activate or deactivate lights 2032A, 2032B according to the instructions stored in the lighting settings portion 2432 of data file 2400.

The lighting settings 2432 can also include instructions to turn lights on or off when the vehicle leaves the home 2000. The lighting settings 2432 may also include options to change which lights are turned on or off if the home 2000 is occupied when the vehicle 104 departs or is returning to the home.

Thus, when the vehicle is departing the home 2000, the vehicle control system 204 may synchronize with the home automation system 2004 and determine that the home 2000 is occupied based on data from interior motion detectors 2064A, 2064B or other sensors. After determining that the home is occupied, the home automation module 2304 can determine if there are lighting settings 2432 entered by the user 216 defining lighting settings when the vehicle 104 departs an occupied home. If there are no lighting settings 2432 for departing an occupied home, the lighting settings 2432 may be determined after receiving a user input from the user. For example, the user may make a selection on a touch sensitive display, a gesture, or an oral command indicating that the one or more of the lighting settings 2432 should be executed or not executed for when departing an occupied home. If the user provides lighting settings when departing the occupied home 2000, the home automation module 2304 can then send a command to the home automation system 2004 to turn on or off the lights selected by the user.

The home automation module 2304 may then determine if the lighting settings 2432 for departing the occupied home 2000 should be saved in data structure 2400. The determination may be made after receiving a user input from the user. For example, the user may make a selection on a touch sensitive display indicating that the lighting settings 2432 currently made are to be stored. In other situations, a period of time may elapse after the user has made a configuration. After determining that the user is finished making changes to the settings, based on the length of the period of time since the setting was established, the vehicle control system 204 can save the setting.

The lighting settings 2432 can include when the commands to implement the lighting settings 2432 should be sent by the home automation module 2304 to the home automation system 2004. Thus, a user 216 can include instructions in the lighting settings 2432 directing the home automation module 2304 to send the commands to implement the light settings when the vehicle 104 is a certain distance from the home or estimated to be a certain number of minutes from the home. For example, the user could enter a setting to implement the lighting settings when the vehicle is within 10 miles, 5 miles, 2 miles, 1 mile, or some other user defined distance from the home. Additionally or alternatively, the user can enter a setting to implement the lighting settings when the vehicle is estimated to be 10 minutes, 5 minutes, 2 minutes, 1 minute, or some other user defined time from the home.

The instructions can also direct the home automation module 2304 to implement the lighting settings 2432 when departing the home and the vehicle has traveled a predetermined distance from the home (such as 10 miles, 5 miles, 2 miles, or 1 mile) or has been gone from the home more than a predetermined period of time (for example, 10 minutes, 5 minutes, 2 minutes, 1 minute). Further, the instructions can specify that certain lights turn on or off sooner or later than other lights. For example, the user may enter lighting settings 2432 so that exterior lights 2032B turn on sooner than interior lights 2032A when the user is returning home in the vehicle 104. Continuing this example, interior lights 2032A may be set to turn on only when the vehicle 104 pulls into a garage or drives onto a driveway associated with the home 2000.

One or more security settings 2436 may be used to configure a security system 2036 when the vehicle 104 is returning to or departing from the home 2000. The security settings 2436 may also be used to change settings of individual components of the security system 2036. For example, when leaving a home 2000, the home automation module 2304 may send a command to the home automation system 2004 to direct the security system 2036A to trigger an alarm when motions sensors 2064A within the home 2000 detect movement. The security settings 2436 may also change the settings of door alarms from a delayed setting to an instant alarm setting when the user 216 leaves the home 2000. Optionally, the security settings 2436 may also include a password or pin required to change settings and/or turn on or off the security system 2036. When returning home 2000, the home automation module 2304 may send a command to the home automation system 2004 to deactivate one or more features of the security system 2036. Similar to the lighting settings 2432, the security settings 2436 may include instructions to activate or deactivate the security system 2036 or individual components thereof at different times or distances from the house 2000. For example, the user may enter a security setting 2436 to deactivate a garage door alarm only when the vehicle 104 is within 50 feet of the house. However, these are only example times and distances and a user can specify other distances or times for the home automation module 2304 to send commands to the home automation system 2004 to implement the security settings 2436 or lighting settings 2432.

One or more sets of settings for thermostats 2040 can be stored in portion 2440. The thermostat settings 2440 can include instructions to change one or more settings of a thermostat 2040 in the home 2000 when the vehicle 104 is returning to or departing from the home. For example, the thermostat setting 2440 can store instructions for the home automation module 2304 to send a command to change the thermostat 2040 to an away setting when vehicle 104 leaves the home 2000. The away setting may include setting the thermostat to a temperature to heat or cool the home 2000 to a particular temperature to save energy when the home, or a portion of the home, is unoccupied. Thus, the away setting can include setting the thermostat 2040 to heat the home to 60° F. or cool the home to 85° F.

When the vehicle is returning to the home 2000, the home automation module 2304 can access the thermostat settings 2440 and send a command to change the thermostat 2040 to an occupied setting. The occupied setting may include setting the thermostat 2040 to heat the home to 70° F. or cool the home to 75° F., or any other temperature set by a user. The thermostat setting 2440 may further include a setting to change the thermostat from the away setting to the occupied setting when the car 104 is at a particular distance from the home or a period of time before the predicted arrival of the vehicle 104 at the home to enable the environmental controls to achieve the desired temperature before the user arrives at the home. Therefore, the user 216 can enter a thermostat setting 2440 so that the home automation module 2304 sends the command to change the thermostat 2040 to the occupied setting when the vehicle 104 is 30 minutes or 10 miles from the home 2000 so that the heater or air conditioner has time to heat or cool the home 2000 to the desired temperature. In another example, the home automation module 2304 can determine when to send a command to change the thermostat based on the current temperature of the home and the estimate amount of time it will take to heat or cool the home to the temperature specified in the thermostat setting 2440.

Additionally or alternatively, the thermostat setting 2440 may be configured to set the thermostat 2040 of the home 2000 to match the climate control system or the environmental control module 830 of the vehicle 104. As an example, if the thermostat setting 2440 for the thermostat 2040 includes cooling the home to 75° F. but the environmental control module 830 of the vehicle 104 is set to 73° F., the home automation module 2304 can send a command to change the thermostat 2040 of the home to 73° F. Optionally, when the temperatures saved in the thermostat setting 2440 are different than the temperature of the environmental control module 830, the home automation module 2304 may determine which temperature to use. The determination may be made after receiving a user input from the user 216. For example, the user 216 may make a selection on a touch sensitive display, a hand gesture, or an oral command that the thermostat 2040 of the home 2000 should be set to the current setting of the environmental control module 830. Continuing this example, the user 216 may instead provide an input that the thermostat setting 2440 should be implemented by the home automation module 2304 rather than the temperature setting of the environmental control module 830.

The user 216 can also enter thermostat settings 2440 for environmental factures, such as a UV level detected by UV sensor 2099, an exterior temperature recorded by thermometer 2086B, a wind speed recorded by anemometer 2096, and humidity levels detected both inside and outside of the home by hygrometers 2088A, 2088B that may be used by the home automation module 2304 to adjust the thermostat 2040 of the home. For example, if the vehicle 104 is returning to the home 2000 and the thermostat setting 2440 includes a setting to cool the home to 75° F., but the vehicle control system 204 synchronizes with the home automation system 2004 and determines that an exterior thermometer 2086B reports the temperature at the home is 90° F., the home automation module 2304 may determine that the thermostat 2040 setting of 75° F. is too high. Continuing this example, the home automation module 2304 may send a command to reset the thermostat 2040 to 72° F. to cool the home. Optionally, the home automation module 2304 may use the user/device interaction subsystem 352 to receive input from the user 216 confirming the determination to cool the home to 72° F. rather than the thermostat setting 2440 of 75° F. If the user confirms the determination, the home automation module 2304 can send the command to set the thermostat 2040 to cool the home to 72° F. In the alternative, if the user does not confirm the determination, the home automation module 2304 can send a command to set the thermostat 2040 to 75° F. of thermostat setting 2440 or some other temperature specified by the user 216.

The home automation module 2304 may also determine that a temperature is too low based on current conditions at the home. For example, if the external thermometer 2086B indicates the exterior temperature is 25° F., the home automation module 2304 may determine that the thermostat setting 2440 of 70° F. is too low. The home automation module 2304 may then determine that the thermostat 2040 should be set to 75° F. and send a command to change the thermostat to 75° F. with or without input from the user 216. The determination may be made in conjunction with profile data and settings of the user saved in data structure 1200. Optionally, the user 216 can enter a temperature to increase or decrease the setting of the thermostat 2040 and the home automation module 2304 will send a command to the home automation system to change the thermostat 2040 to the temperature entered by the user 216.

Further, sensors 242 within the vehicle 104 may be able to determine the temperature of the user 216. Thus, if the home automation module 2304 determines that the user 216 has a temperature that is elevated compared to health data in portion 1218 of data structure 1200, the home automation module 2304 may send a command to lower the thermostat 2040 to cool the home below a temperature stored in portion 2440. The home automation module 2304 can make this determination after considering the user's schedule or location recently visited by the user. For example, if the user has just completed an exercise class on the user's calendar, or if the user is leaving a location identified as a gym, running track, swimming pool, or fitness center, and the user's temperature is elevated, the home automation module 2304 may determine that the thermostat setting stored in portion 2440 is too high and the home automation module 2304 may send a command to lower the temperature setting of the thermostat of the home location 2000.

In another example, the home automation module 2304 may also determine that the user is cold by comparing the user's temperature to health data in portion 1228. The home automation module 2304 can then send a command to the home automation system 2004 to raise the thermostat 2040 to heat the home above a temperature stored in portion 2440.

Settings for humidity levels can also be entered by the user 216 to adjust the thermostat 2040 of the home 2000. For example, during hot days, if the exterior hygrometer 2088B detects the humidity outside the home is above a preset amount, the home automation module 2304 can send a command to decrease the thermostat setting to cool the home 2000 to a lower temperature, for example 70° F. The thermostat settings 2440 may also include settings for other environmental controls within the home, such as a humidifier and/or a de-humidifier that can be controlled by the home automation module 2304 by sending commands to the home automation system 2004. If an interior hygrometer 2088A indicates the interior humidity of the home 2000 is above a pre-set amount, the home automation module 2304 can send a command to activate a dehumidifier in the home. If the humidity level in the home is below a pre-set amount, the home automation module 2304 may send a command to turn on a humidifier in the home 2000.

The thermostat setting 2440 can also include settings to control the thermostat 2040 if the home is occupied or unoccupied when the car 104 departs or returns to the home 2000. Thus, the thermostat setting 2440 can include instructions to leave the thermostat 2040 in a home setting if the home 2000 is occupied when the car 104 departs. For a home automation system 2004 in a home 2000 with multiple floors 2020 and zones 2028, the thermostat setting 2440 can include instructions to change the thermostat in one or more zones 2028, floors 2020, and/or one or more rooms 2024. In this case, the thermostat setting 2440 can include instructions to change the thermostat 2040 in one or more of the zones or rooms. Further, the thermostat setting 2440 can specify a thermostat setting for each of the one or more zones if the zone is occupied or unoccupied. For example, in a home with multiple zones, the thermostat setting can include instructions to change the thermostat 2040 for an unoccupied zone from an away setting to a home setting but not change the thermostat 2040 for other occupied zones within the home 2000. Thus, if a first bedroom and family room are occupied and a thermostat 2040 is set to a home setting for those rooms, but a second bedroom associated with the user has a thermostat 2040 set to an away temperature, the home automation module 2304 can send a command directing the home automation system to change the second bedroom thermostat 2040 to a home temperature setting.

The home automation module 2304 can send commands to change the thermostat 2040 setting earlier or later based on a current temperature within the home. For example, during the synchronization with the home automation system 2004 (discussed above in conjunction with FIG. 20A), the vehicle control system 204 can receive the current temperature of the home 2000 recorded by an internal thermometer 2086A. If the current temperature is within a preset amount of the home setting of the thermostat setting 2440, the home automation module 2304 can delay sending the command to change the thermostat 2040 to the home setting. Thus, if the thermostat setting 2440 includes instructions to change the thermostat 2040 to the home setting to cool the home to 73° F. when the vehicle 104 is 45 minutes from the home 2000 and the home automation module 2304 determines that the current temperature of the home 2000 is 75° F., the home automation module 2304 may instead send the command to change the thermostat 2040 to the home setting when the vehicle 104 is 15 minutes from the home. The home automation system 2004 can also send an estimated amount of time it will take to heat or cool the home 2000 to reach the thermostat setting 2440 to the vehicle control system 204 during the synchronization. The home automation module 2304 can use the estimated amount of time to heat or cool the home to determine to send a command to change the thermostat 2040 at an early enough time for the temperature inside the home to reach the desired setting.

Although various temperatures, distances, and times are provided to describe the settings of the data structure 2400, it is expressly contemplated that the times, distances, and temperatures of the thermostat setting 2440 can be varied by a user and still comport with the scope and spirit of the present disclosure.

Settings for one or more entertainment systems 2044 may be stored in portion 2444 of the data structure 2400. The entertainment settings 2444 can include instructions to turn an entertainment system 2044 on or off when the vehicle 104 arrives or departs from the home. Additionally or alternatively, a user can enter instructions in the entertainment settings 2444 portion to control individual components of the entertainment system 2044, such as the volume, tuning to a channel or program, and/or different operating zones within the home. In addition, the entertainment settings 2444 can include instructions to duplicate a setting of the infotainment system 870 of the vehicle 104.

The home automation module 2304 may use the entertainment setting 2444 to provide continuous entertainment or media access for the user 216 during transitions from the vehicle 104 to the home 2000 or from the home to the vehicle 104. For example, if a user 216 is returning to the home 2000 and the infotainment system 870 is presenting a soccer match or other program over speakers 880 and one or more of displays 212, 248, 882, 2804, 2812, and 2816, when the vehicle 104 arrives at the home, the home automation module 2304 can send a command to the home automation system 2004 to tune a TV or audio system to the same soccer match or other program.

Settings for door and window controllers 2090A, 2090B may be entered in portion 2448 of data structure 2400. Thus, a user 216 can enter settings 2448 for the home automation module 2304 to send commands to the home automation system to lock or unlock one or more doors of the home 2000 when the vehicle 104 departs from or arrives at the home. The user 216 may also enter settings for other interior 2452 and/or exterior 2456 features of the home automation system 2004. For example, the user may provide a setting in portion 2456 to turn off an irrigation system 2062 around a driveway or walkway to prevent the vehicle 104 or user 216 from getting wet when the vehicle 104 returns to the house 2000. The exterior settings 2456 may also include settings to activate or deactivate exterior water features 2058, such as fountains, to activate or deactivate an ice or snow melting system 2094 associated with a sidewalk or driveway, and to extend or retract a swimming pool cover 2092. The interior settings 2452 may include settings to turn on a hot tub 2056A, and to raise or lower blinds and shades 2048.

Additionally or in the alternative, when there are multiple users 2412A, 2412B in the vehicle 104 with settings for one or more components 2432-2456 stored in the data structure 2400, the home automation module 2304 can send commands to the home automation system 2004 to implement each of the users' settings. Thus, the home automation module 2304 can send a command to the home entertainment system of home 1 to turn on a TV in the family room for a first user 2412A identified as a driver in Zone A 512A and to set the thermostat 2040 to the home setting as specified in the entertainment setting 2444 and thermostat setting 2440 for the first user 2412A. In addition, a second user 2412B identified as a passenger in Zone E 512E may have stored a different thermostat setting 2440 and entertainment setting 2444 for bedroom 3 of home 1. The home automation module 2304 can send the second user's entertainment settings 2444 and thermostat setting 2440 for bedroom 3 to the home automation system 2004 of home 1.

Some home automation systems 2004 may not have all of the components represented by portions 2432, 2436, 2440, 2444, 2448, 2452, and 2456 or the user may not have authority to control one or more of the components. For example, the office 2424 of User 2 2412B does not include a security system 2436, or the user does not have authority to control the security system, and therefore portion 2460 of data structure 2400 is empty.

The settings in data structure 2400 can all be sent to the home automation system 2004 at the same time. However, a user 216 can also specify in data structure 2400 that certain settings can be sent to the home automation system at different times or proximities to the home 2000. Thus, the home automation module 2304 can send one or more commands to the home automation system 2004 at one or more times.

Figure 25:
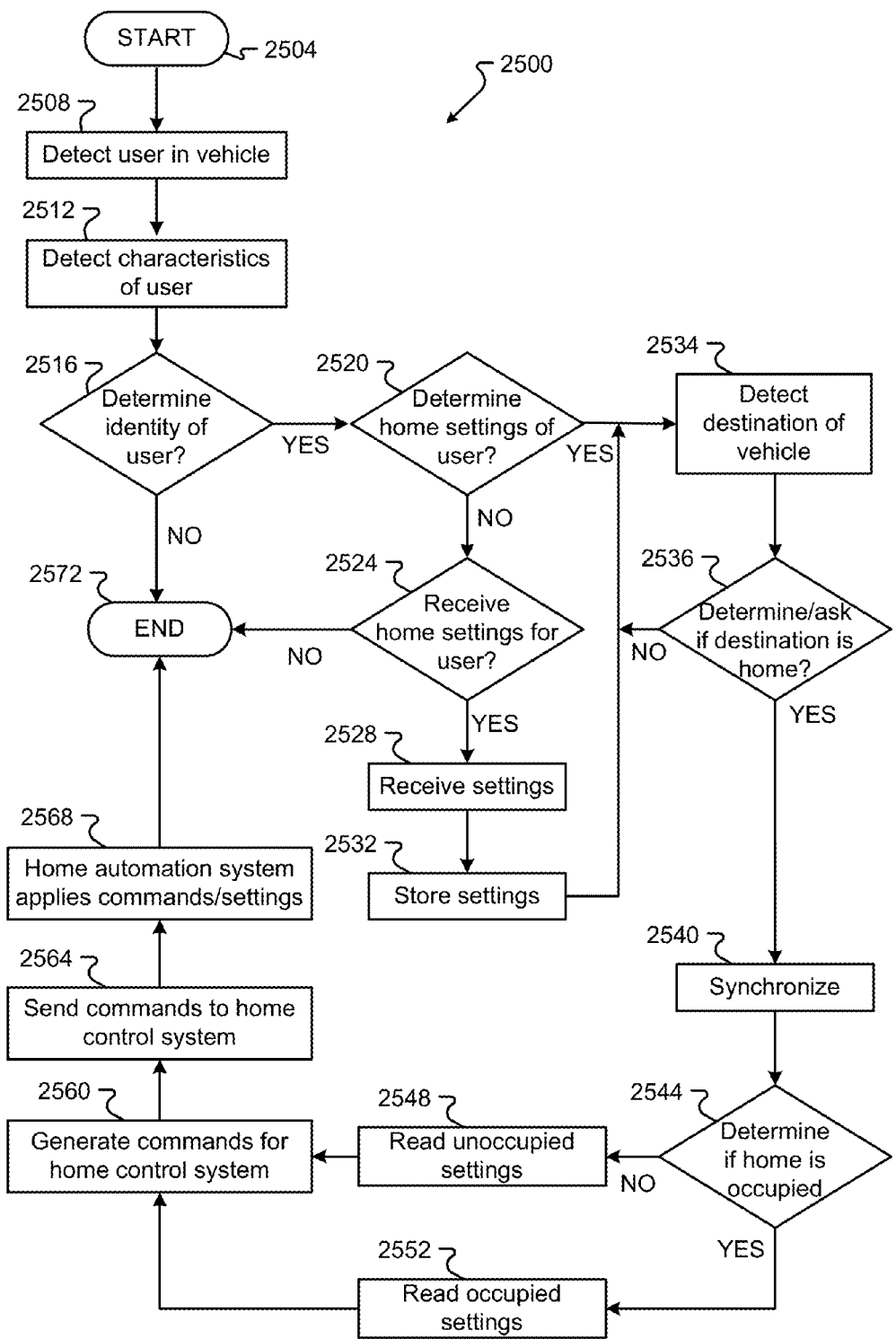
FIG. 25 is a flow or process diagram of a method for changing settings of a home automation system when a vehicle returns to a home.

An embodiment of a method 2500 for changing settings of a home automation system 2004 by home automation module 2304 when the vehicle 104 returns to a home is shown in FIG. 25. While a general order for the steps of the method 2500 is shown in FIG. 25, the method 2500 can include more or fewer steps or can arrange the order of the steps differently than those shown in FIG. 25. Generally, the method 2500 starts with a start operation 2504 and ends with an end operation 2572. The method 2500 can be executed as a set of computer-executable instructions executed by a computer system and encoded or stored on a computer readable medium. Hereinafter, the method 2500 shall be explained with reference to the systems, components, modules, software, data structures, user interfaces, etc. described in conjunction with FIGS. 1-24.

The vehicle control system 204 can determine if a user is in a zone 512 or area 508 of the vehicle 104 in step 2508. This determination may be made by receiving data from one or more sensors 242 and as described in FIGS. 13-18, above. The vehicle control system 204 can use facial recognition, weight sensors, heat sensors, or other sensors to detect the characteristics of the user in step 2512. Using the information from the sensors 242, the vehicle control system 204 can determine the identity of the user in step 2516 by comparing the characteristics to the identifying features in portion 1212 of data structure 1204. In addition or alternatively, the identity of the user can be determined when the user enters a password, uses some other form of authentication or when a user correctly responds to a query from the vehicle control system 204. If the user cannot be identified, the method 2500 proceeds NO to END, step 2572.

If in step 2516 the user can be identified by matching characteristics with the features in portion 1212 of data structure 1200, the method 2500 proceeds YES to step 2520 and the home automation module 2304 determines if there are home automation system 2004 settings stored in data structure 2400 for the identified user. The home automation module 2304 can check storage system 208 for settings. If there are no settings in storage system 208 for the user, the home automation module 2304 can also check cloud storage, for example, server 228 and storage 232 and/or profile data 252, for home automation system settings for the user. If there are home settings stored for the user, the method 2500 proceeds YES to step 2534.

If in step 2520 the home automation module determines there are no home automation system 2004 settings stored for the identified user, the method 2500 proceeds NO to 2524. The input module 312 can determine if the user wants to enter settings for a home automation system 2004 into data structure 2400. The determination may be made after receiving a user input from the user. For example, the user may make a selection on a touch sensitive display, an oral command, or a hand gesture indicating that one or more settings 2432-2456 of a home automation system are to be activated, deactivated, and/or changed.

If the home automation module 2304 determines, in step 2524, that the user does not want to enter settings for a home automation system, the method proceeds NO to END, step 2572. If the home automation module 2304 determines, in step 2524, that the user wants to enter settings for a home automation system 2004, the method 2500 proceeds YES to step 2528 where the user 216 enters the settings for one or more components of a home automation system 2004 for one or more home locations 2424. The VCS 204, using an application, may create a new record in data structure 2400 for the user. This new record may store settings for one or more features of a home automation system for the user. The new record may then be capable of receiving new settings data for this particular user.

After the user is finished entering the settings, the VCS 204 can store the settings, step 2532, for the user 216 in data structure 2400. The VCS 204 may save the settings after receiving a user input from the user. For example, the user may make a selection on a touch sensitive display, a gesture, or an oral command indicating that settings currently made are to be stored. In other situations, a period of time may elapse after the user has made a configuration. After determining that the user is finished making changes to the settings, based on the length of the period of time since the setting was established, the VCS 204 can save the setting. Thus, the VCS 204 can store settings automatically based on reaching a steady state for settings for user. To store the home automation system settings for the user, the user interaction subsystem 332 can make a new entry for the user 2420 in data structure 2400. The new entry may be either a new user or a new setting for one or more homes 2424 or one or more features of a home 2428-2456. As explained previously, the settings can be any kind of a home automation system that may be associated with the user for arrival at a home 2000. Additionally or alternatively, the settings may be stored in cloud storage. The VCS 204 can send the new settings to server 228 to be stored in storage 232. The settings may also be stored in profile data 252. In this way, the settings may be ported to other vehicles for the user and retrieved from the cloud if local storage does not include settings in storage system 208. After storing the settings for the user, method 2500 proceeds to step 2534.

If at step 2520 the home automation module 2304 determines there are home automation system 2004 settings associated with the identified user, the method 2500 proceeds YES step 2534.

In step 2534, the home automation module 2304 monitors the position of the vehicle and can detect a destination of the vehicle 104. For example, the home automation module 2304 can use information from the location module 896 of the navigation subsystem 336 to detect the destination of the vehicle. The location data may be collected by a device associated with a vehicle such as on-board sensors, equipment, user devices, etc.

The destination may also be determined by the vehicle 104 based on a proximity of the vehicle 104 to one or more home locations 2424 saved by the user 216 in data structure 2400. The home automation module 2304 may also determine the destination when the user sets a destination using the destination input field 2952B (discussed below in conjunction with FIG. 29A). After detecting a destination of the vehicle 104, method 2500 proceeds to step 2536.

In step 2536, the home automation module 2304 can determine if the destination is a home location 2424 of the user. The home automation module 2304 can compare the destination to one or more home locations 2424 saved in data structure 2400 for the user. The home automation module 2304 may also determine the destination is a home location by comparing the route being driven by the user to profile data 252 of the user stored in location 1238 of data structure 1200. The home automation module 2304 can also determine if the destination of the vehicle is a home location based on location data generated from one or more of GPS device, Wi-Fi access point (for example, a Wi-Fi signal associated with the home), communication tower location (such as a cellular transmission tower near the home), Internet access point, detected position, and combinations thereof. In addition or alternatively, the user 216 may enter a home location as the destination of the vehicle 104 into a navigation system 336.

Moreover, in addition or in the alternative, the destination may be identified in conjunction with a query to the user. The home automation module 2304 can query and ask the user 216 to confirm that the destination is a home 2424 location. The query can be used to confirm the destination when the vehicle 104 is near a home location 2424 but the destination cannot be determined by the home automation module 2304. For example, if the vehicle is near home location "home 1" of user 1 2412A, but stops at a nearby home or some other nearby location, the home automation module 2304 may send the query to determine if the destination is home location "home 1." The query can be generated by the home automation module 2304 using the speech synthesis module 820 such as an audible message "Janie, are you driving to home 1?" The message of the query can be selected by the home automation module 2304 from a plurality of pre-planned queries stored in system data 208.

If, in step 2536, the home automation module 2304 determines the destination is not a home location 2424, the method 2500 loops NO back to step 2534 and the vehicle control system monitors the location of the vehicle 104. If the destination is determined to be a home location 2424, the method 2500 proceeds YES to step 2540 and the home automation module 2304 can synchronize with the home automation system 2004 and retrieve information from, and send information to, the home automation system 2004. The home automation system 2004 can send information about the state of features of the home automation system. For example, the information can include, but is not limited to current state and settings of interior and exterior features 2016A, 2016B, a number of occupants in the home (or example, 0, 1, 2, 3, etc.), and the status and locations of the occupants.

Using the information received from the home automation system 2004, the home automation module 2304 can determine if the home location 2424 is occupied in step 2544. If the home is not occupied, the method 2500 continues NO to step 2548 and the home automation module 2304 may then read and retrieve the home automation system 2004 settings in data structure 2400 for the user and the home location 2424. If the home is occupied, the method 2500 continues YES to step 2552 and the home automation module 2304 reads and retrieves the alternate settings for an occupied home from data structure 2400.

In step 2560, the home automation module 2304 generates commands to send to the home automation system 2004 and determines when to send the commands to the home automation system 2004. The home automation module 2304 can determine when to send the commands based on settings saved by the user in data structure 2400. Additionally or alternatively, the home automation module 2304 can determine when to send the commands based on one or more of the settings in data structure 2400. For example, if a thermostat setting 2440 includes setting the thermostat 2040 to 72° F. and during synchronization 2540 the home automation system 2004 indicates the current interior temperature of the home is 78° F. Continuing this example, the light setting 2432 may include turning on an interior light 2032A. The home automation module 2304 may determine it will take 25 minutes to cool the home to 72° F. and send a first command to the home automation system when the vehicle 104 is estimate to be 25 minutes from the home. Further, the home automation module 2304 can send a second command directing the home automation system to activate the interior light 2032A when the vehicle arrives at the home. Optionally, the home automation system 2004 may provide the estimate of 25 minutes to the home automation module 2304 during synchronization.

The method 2500 can be used by the home automation module 2304 to activate settings of a home automation system 2004 for more than one identified user in the vehicle 104 travelling to a home location 2424. Thus, in step 2560 the home automation module 2304 can prepare (or generate) and determine when to send commands to the home automation system 2004 to activate or deactivate components of the home automation system for multiple identified users within the vehicle 104. If there is a conflict between the home automation settings 2004 of two or more identified users for one or more of the components of the home automation system 2004, the home automation module 2304 may determine which users' home automation settings in data structure 2400 to send based on the priority stored in portion 1260 of data structure 1200. The priority stored in portion 1260 may stipulate which user's home automation settings have priority in the event of a conflict. Still further, when there is a conflict between a first vehicle occupant identified as a driver located in the driver's seat (zone A 512A of area 1 508A) and second vehicle occupant identified as a passenger located in any of zone B 512B through zone N 512N, the home automation settings of the driver may have priority over the home automation settings of the other identified user. Alternatively or in addition, the home automation module 2304 may resolve a conflict between settings of two identified users based on an input received from one or more of identified user. For example, when a third vehicle occupant is a first passenger located in zone C 512C and a fourth vehicle occupant is a second passenger located in zone E 512E, the home automation module 2304 can send a query to the first and second passengers. The query can ask the first and second passengers whose home automation settings have priority and request that the passengers select one of the first passenger or the second passenger. Optionally, the home automation module 2304 can send the query to the driver and request that the driver assign a priority to the first and second passengers and/or select one of the first and second passengers to have priority.

After generating the commands and determining when to send the commands in step 2560, the method 2500 proceeds to 2564 and the home automation module 2304 sends one or more commands to the home automation system 2004 at one or more times to configure components according to the settings and/or alternate settings for the arrival of the one or more identified users. A first set of commands can be sent by the home automation module 2304 to the home automation system 2004 at a first time for one or more components and a second set of commands can be sent at a second time for one or more other components.

The home automation system 2004 receives the commands from the home automation module 2304 and the microprocessor 2112 executes the commands in step 2568. The home automation system can activate, deactivate, and/or change settings of one or more features of the home automation system based on the commands received from the home automation module 2304. After applying the commands received from the home automation module 2304, the home automation system can send updated state information to the home automation module 2304. The updated state information can include, but is not limited to, settings of one or more features activated, deactivated, and/or changed based on the commands received from the home automation module 2304 applied by the home automation system 2004. Method 2500 then proceeds to END 2572.

Figure 26:
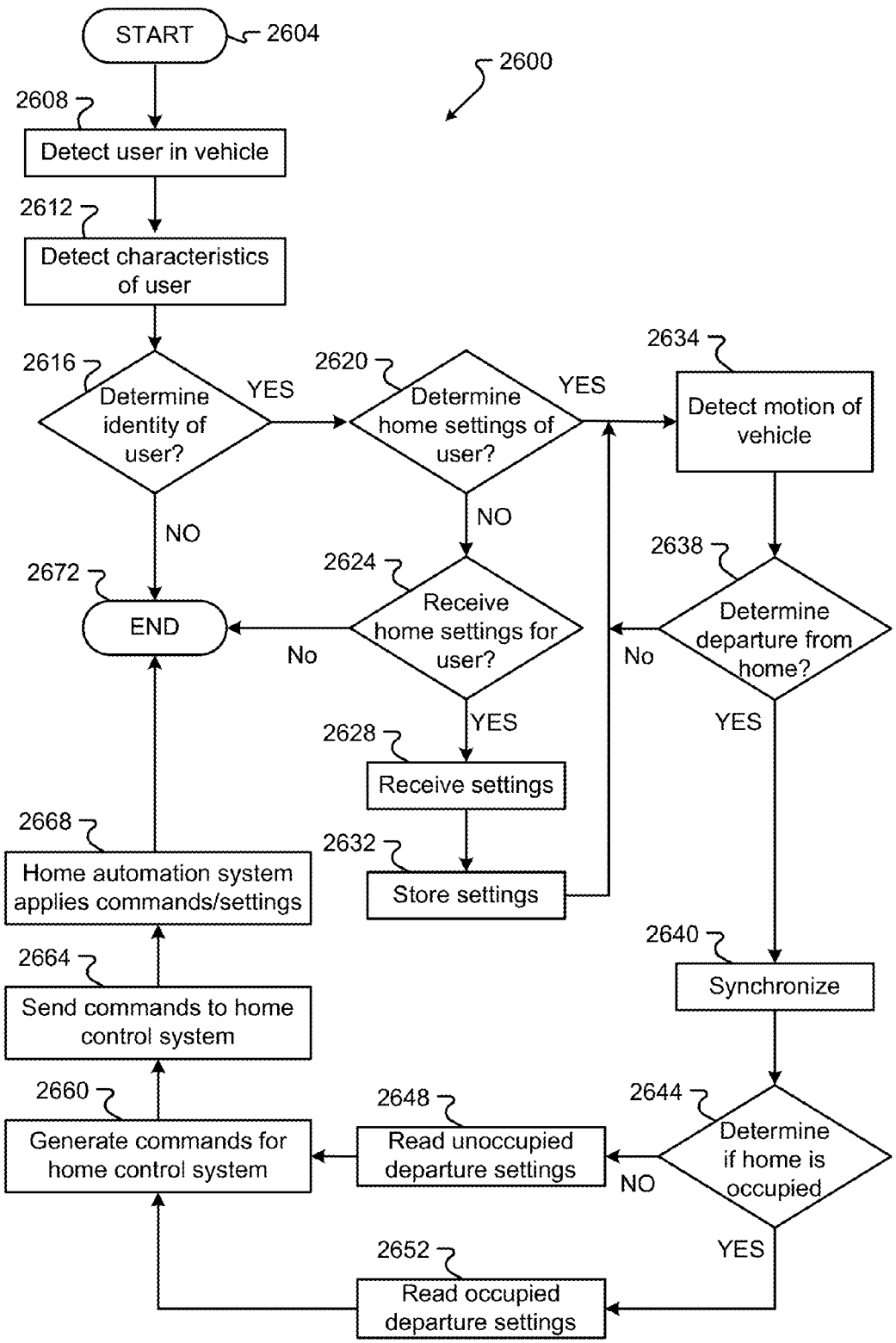
FIG. 26 is a flow or process diagram of a method for changing settings of a home automation system when a vehicle departs from a home.

An embodiment of a method 2600 for changing settings of a home automation system 2004 by the home automation module 2304 when the vehicle 104 departs a home is shown in FIG. 26. While a general order for the steps of the method 2600 is shown in FIG. 26, the method 2600 can include more or fewer steps or can arrange the order of the steps differently than those shown in FIG. 26. Generally, the method 2600 starts with a start operation 2604 and ends with an end operation 2672. The method 2600 can be executed as a set of computer-executable instructions executed by a computer system and encoded or stored on a computer readable medium. Hereinafter, the method 2600 shall be explained with reference to the systems, components, modules, software, data structures, user interfaces, etc. described in conjunction with FIGS. 1-25.

The VCS 204 can determine if a user is in a zone 512 or area 508 of the vehicle 104 in step 2608. This determination may be made by receiving data from one or more sensors 242. The vehicle 104 can use facial recognition, weight sensors, heat sensors, or other sensors to detect the characteristics of the user in step 2612. Using the information from the sensors 242, the VCS 204 can determine the identity of the user in step 2616 by comparing the characteristics to the identifying features in portion 1212 of data structure 1204. In addition or alternatively, the identity of the user can be determined when the user enters a password, uses some other form of authentication, or when a user correctly responds to a query from the VCS 204. If the user cannot be identified, the method 2600 proceeds NO to end, step 2672.

If in step 2616 the user can be identified by matching characteristics with the features in portion 1212 of data structure 1200, the method 2600 proceeds YES to step 2620 and the home automation module 2304 determines if there are departure settings for the home automation system 2004 stored in data structure 2400 for the identified user. If there are departure settings stored for the user, the method 2600 proceeds YES to step 2634.

If in step 2620 the vehicle control system determines there are no departure settings for the home automation system 2004 stored for the identified user, the method 2600 proceeds NO to 2624. The input module 312 can determine if the user wants to enter departure settings for a home automation system 2004 into data structure 2400. The determination may be made after receiving a user input from the user. For example, the user may make a selection on a touch sensitive display, an oral command, or a hand gesture indicating that one or more settings 2432-2456 of a home automation system are to be activated and/or deactivated when the vehicle departs the home.

If the home automation module 2304 determines, in step 2624, that the user does not want to enter settings for a home automation system, the method proceeds NO to end, step 2672. If the home automation module 2304 determines, in step 2624, that the user wants to enter departure settings for a home automation system 2004, the method 2600 proceeds YES to step 2628 where the user 216 enters the settings for one or more components of a home automation system 2004 for one or more home locations 2424. The VCS 204, using an application, may create a new record in data structure 2400 for the user. This new record may store settings for one or more features of a home automation system for the user. The new record may then be capable of receiving new settings data for this particular user.

After the user is finished entering the settings, the VCS 204 can store the settings, step 2632, for the user 216 in data structure 2400. The VCS 204 may save the settings after receiving a user input from the user. For example, the user may make a selection on a touch sensitive display, a gesture, or an oral command indicating that settings currently made are to be stored. In other situations, a period of time may elapse after the user has made a configuration. After determining that the user is finished making changes to the settings, based on the length of the period of time since the setting was established, the VCS 204 can save the setting. Thus, the VCS 204 can store settings automatically based on reaching a steady state for settings for user. To store the home automation system settings for the user, the user interaction subsystem 332 can make a new entry for the user 2420 in data structure 2400. The new entry may be either a new user or a new setting for one or more homes 2424 or one or more features of a home 2428-2456. As explained previously, the settings can be for controlling any kind of a home automation system that may be associated with the user for arrival at a home 2000. Additionally or alternatively, the settings may be stored in cloud storage. The VCS 204 can send the new settings to server 228 to be stored in storage 232. The settings may also be stored in profile data 252. In this way, the settings may be ported to other vehicles for the user and retrieved from the cloud if local storage does not include settings in storage system 208. After storing the settings for the user, method 2600 can then proceed to step 2634.

If at step 2620 the home automation module 2304 determines there are departure settings for the home automation system 2004 associated with the identified user, the method 2600 proceeds YES to 2634.

The home automation module 2304 can detect that the vehicle 104 is in motion, in step 2634, using information from the navigation subsystem 348 and/or one or more sensors of the sensor subsystem 340. Additionally or alternatively, the home automation module 2304 can detect motion of the vehicle when the vehicle transmission is engaged.

The home automation module 2304 can determine that the vehicle is departing from a home location of the user in step 2638. The determination can be based on an initial location of the vehicle 104 in proximity to the home location of the user followed by moving a distance from the initial location. The distance may be preset (for example, 200 feet) or set by the user and saved in settings 1224 and or profile information 1238 of data structure 1200. Additionally or alternatively, the home automation module 2304 can determine that the vehicle is departing the home location when the user enters a destination into the navigation subsystem 336 that is different than the home location. Further, the home automation module 2304 can query the user to determine if the vehicle is departing the home location. For example, if the vehicle is running and moves, but only moves a short distance, the home automation module 2304 can generate a query using the speech synthesis module 820 to ask the user if the vehicle is departing the home location. The message of the query can be selected by the home automation module 2304 from a plurality of pre-planned queries stored system data 208. The query can include a request that the user confirm the vehicle is departing the home location. If the home automation module 2304 determines the vehicle is not departing the home location, method 2600 loops NO to step 2634. If the home automation module 2304 does determine the vehicle is departing the home location, method 2600 continues YES to step 2640.

In step 2640, the home automation module 2304 can synchronize with the home automation system 2004 of the home the vehicle 104 is departing from and retrieve information from and send information to the home automation system 2004. The home automation system can send information about the state of features of the home automation system, such as, but not limited to, the operating status of features and settings of features. The home automation system can also send information about occupants in the home, include the number of occupants, the location of occupants, and the status of occupants. Using the information received from the home automation system 2004, the method 2600 can determine if the home location 2424 is occupied in step 2644. If the home is not occupied, the method 2600 continues NO to step 2648 and the home automation module 2304 may then read and retrieve the home automation system 2004 settings in data structure 2400 for the user and the home location 2424. If the home is occupied, the method 2600 continues YES to step 2652 and the home automation module 2304 reads and retrieves the alternate settings for departing from an occupied home from data structure 2400.

In step 2660, the home automation module 2304 generates commands to send to the home automation system 2004 and determines when to send the commands to the home automation system 2004. The home automation module 2304 can determine when to send the commands based on settings saved by the user in data structure 2400. Additionally or alternatively, the home automation module 2304 can determine when to send the commands based on one or more of the settings in data structure 2400 as described above in conjunction with the description of method 2500.

The method 2600 can be used by the home automation module 2304 to change settings of a home automation system 2004 for more than one identified user in the vehicle 104 departing from a home location 2424. Thus, in step 2660 the home automation module 2304 can prepare and determine when to send commands to the home automation system 2004 to activate, deactivate, and/or change the settings of components of the home automation system for multiple identified users within the vehicle 104. If there is a conflict between the home automation settings 2004 of two or more identified users for one or more of the components of the home automation system 2004, the home automation module 2304 may determine which users' home automation settings in data structure 2400 to send based on the priority stored in portion 1260 of data structure 1200. The priority stored in portion 1260 may stipulate which user's home automation settings have priority in the event of a conflict. Still further, when there is a conflict between a first vehicle occupant identified as a driver located in the driver's seat (zone A 512A of area 1 508A) and second vehicle occupant identified as a passenger located in any of zone B 512B through zone N 512N, the home automation settings of the driver may have priority over the home automation settings of the other identified user. Alternatively or in addition, the home automation module 2304 may resolve a conflict between settings of two identified users based on an input received from one or more of identified user. For example, when a third vehicle occupant is a first passenger located in zone C 512C and a fourth vehicle occupant is a second passenger located in zone E 512E, the home automation module 2304 can send a query to the first and second passengers. The query can ask the first and second passengers whose home automation settings have priority and request that the passengers select one of the first passenger or the second passenger. Optionally, the home automation module 2304 can send the query to the driver and request that the driver select one of the first and second passengers to have priority.

After generating the commands and determining when to send the commands in step 2660, the method 2600 proceeds to 2664 and the home automation module 2304 sends one or more commands to the home automation system 2004 at one or more times to configure components according to the settings and/or alternate settings for the departure of the one or more identified users from the home. A first set of commands can be sent by the home automation module 2304 to the home automation system 2004 at a first time for one or more components and a second set of commands can be sent at a second time for one or more other components.

The home automation system 2004 receives the commands from the home automation module 2304 and the processor 2112 executes the commands in step 2668. The home automation can activate, deactivate, and/or change settings of one or more features of the home automation system based on the commands received from the home automation module 2304. After applying the commands received from the home automation module 2304, the home automation system can send updated state information to the home automation module 2304. The updated state information can include, but is not limited to, settings of one or more features activated, deactivated, and/or changed based on the commands received from the home automation module 2304 applied by the home automation system 2004. Method 2600 then proceeds to END 2672.

Configurable Dash Display Based on Detected Location and Preferences

Figure 27:
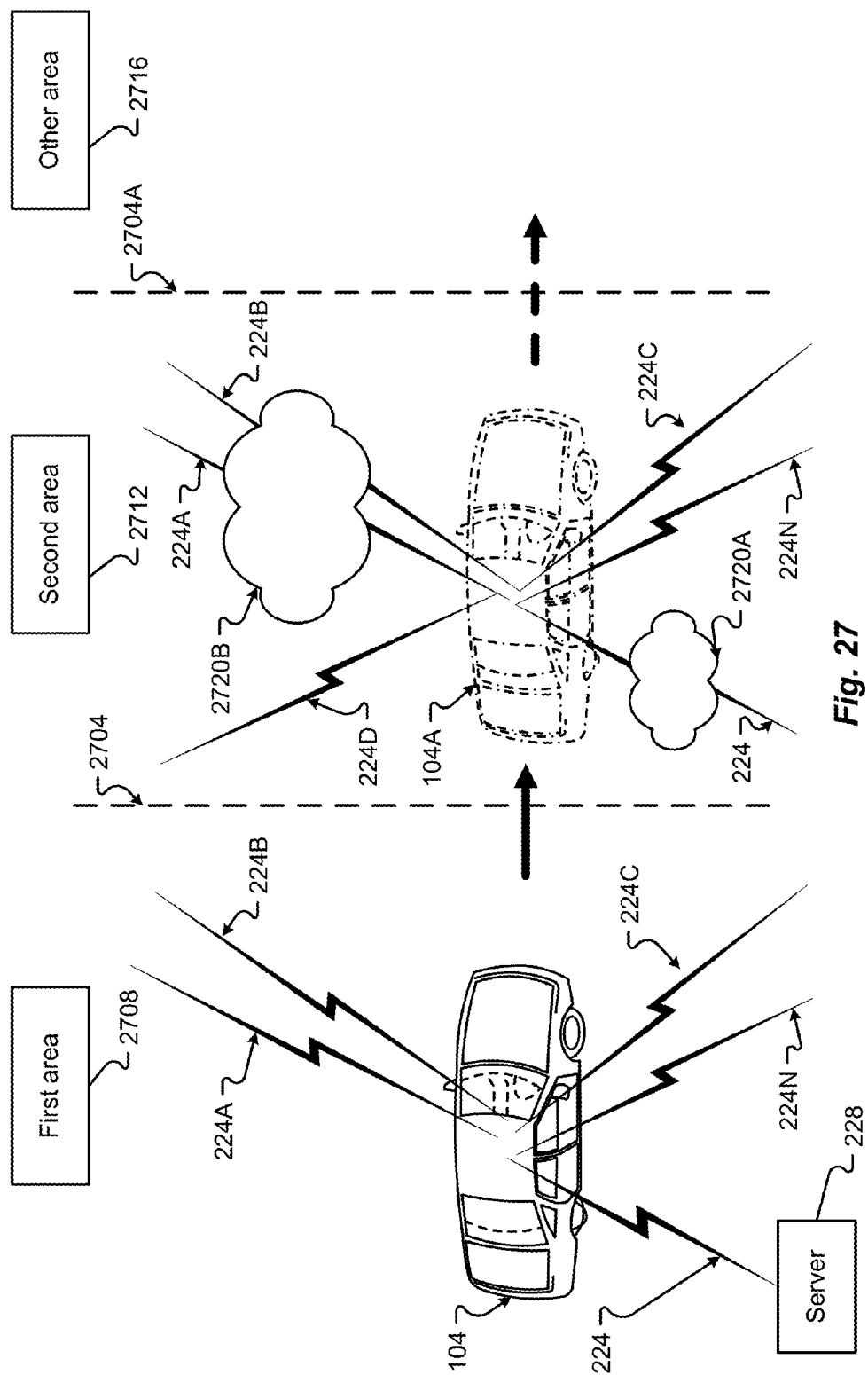
FIG. 27 depicts an embodiment of a vehicle control system detecting a border as a vehicle moves from a first area to a second area.

As illustrated in FIG. 27, the vehicle 104 may be driven across a border between two countries, such as the U.S. and Canada, or areas within one country (from California to Arizona) where different units of measurement, protocols, driving rules, languages, currencies, and/or voice and data networks are used. The VCS 204 may determine that the vehicle 104 is approaching a border 2704 between a first area 2708 and a second area 2712 based on information provided by the location module 896 of the navigation subsystem 336 or by data provided by location signals (e.g., roadside signals, border signals, international crossing signals, etc.). The location of the vehicle 104 may also be determined from the location-based features available on a user's mobile device 212, 248 that is registered with the VCS 204, or other location-aware device (such as a portable GPS module or a portable navigation module). Information from the GPS/navigation subsystem 336 may also be used by the VCS 204 to determine that the vehicle has moved from the first area to the second area. The VCS 204 may also determine that the vehicle will enter the second area 2712 based on a destination entered into the navigation subsystem 336 using input field 2952B, discussed below, by the user. When the vehicle 104 is in the second area, shown in dashed outline 104A in FIG. 27, the VCS 204 can also determine when the vehicle is approaching a second border 2704A to another area 2716.

After determining that the vehicle is approaching the border 2704 of second area 2712 or that the vehicle's destination is within the second area, the VCS 204 can determine if different driving rules apply or if different instruments must be displayed in the second area using the traffic law module 2316. For example, the traffic law module 2316 may determine that within a specific jurisdiction, the second area 2712, certain instruments or gauges must be shown at all times, and/or certain units displayed on instruments displayed by a dash display 2804 and a heads-up display (HUD) 2816, which are described below in conjunction with FIGS. 28-29, and which can be configured and/or reconfigured automatically by the dash configuration module 2308. The traffic law module 2316 can receive updated information about local rules of the second area from a server 228 in communication with the Internet by using communication network 224 even as the vehicle 104 approaching the border between the first area and the second area.

If different driving or traffic rules and/or instruments are required in the second area, the alert module 2348 can provide alerts to the user. Additionally or alternatively, the dash configuration module 2308 can automatically reconfigure the instruments displayed by the dash display 2804 and HUD 2816 to comply with the rules and requirements of the second area. Instruments and information such as readouts, indicators, gauges, and the like can be selected and displayed in the dash display console displays, and a heads-up display by the dash configuration module 2308 automatically when necessary to comply with laws and regulations of the second area. The scale of the displayed instruments can also be configured by the vehicle control system to comply with local requirements. For example, a simulated analog speedometer may be reconfigured to read miles-per-hour or kilometers-per-hour as required. The user can modify the display of a required instrument, if allowed by the traffic law module 2316, but cannot remove it from display if the instrument is required to be displayed in the second area. Thus, a user can move the display location of a required instrument or change the size of the required instrument. In addition, a user may change a maximum value displayed by a simulated-analog instrument, for example by setting a maximum value displayed on a speedometer to a lower number (e.g., 75 mph) as the top speed displayed thereby increasing the accuracy of measurement output for lower speeds. Further, the user could change the display of a required instrument from analog to digital if allowed by the requirements of the second area as determined by the traffic law module 2316. However, the user cannot hide or cause the vehicle control system to cease displaying an instrument required to be displayed in the second area.

A user may also customize the dash display 2804 and a heads-up display 2816 and save the settings in portion 1224 and/or 1238 of data structure 1200. If the user has saved settings for displays 2804, 2816, when the vehicle returns to the first area, the dash configuration module 2308 can access the saved settings 1224, 1238 and return the displays 2804, 2816, to the user's preset configuration.

The traffic law module 2316 may also determine that a traffic law, such as a speed limit, has changed as the vehicle 104 is travelling from a first area to a second area. The determination may be based on information provided to the traffic law module 2316 by the GPS/navigation subsystem 336 and the maps database 8100. If laws or driving rules will change in the second area, the alert module 2348 can automatically provide an alert with information about traffic laws, speed limits, usage of communication devices, right-turn-on-red, and another information that applies within the second area.

For example, while in the first area 2708 with a speed limit of 55 MPH, the traffic law module 2316 may determine that the speed limit of a second area 2712 will decrease to 35 MPH. Additionally or alternatively, the vehicle control system may determine a speed limit decrease when the traffic sign translation module 2320, described in more detail below, captures an image of a traffic sign and recognizes the text of the traffic sign. Continuing this example, after determining the speed limit decrease in the second area, the vehicle control system may determine that the vehicle has not slowed down and is travelling 60 MPH in the second area based on the wheel state sensor 660 and/or information from the navigation subsystem 336. The alert module 2348 may provide an alert to the user to warn the user of the speed limit change. The alert may be a warning stored in portion 1286 of data structure 1200. The traffic law module 2316 may also determine that the speed limit decrease is due to a time based-change, such as the vehicle 104 entering a school zone during a period of time when a school zone speed limit is in effect. The traffic law module 2316 can make this determination using information provided by the maps database 8100 and/or by the traffic sign translation module 2320 capturing and interpreting an image of a flashing school zone sign. After determining a school zone speed limit is in effect, the VCS 204 may take control of the vehicle 104 with the automobile controller 8104 and slow the vehicle 104 to the school zone speed limit.

The traffic law module 2316 can also monitoring the position of the vehicle on a road to determine if the driver is complying with the traffic laws and rules of the second area. The traffic law module 2316 can receive one or more signals sent from a plurality of sensors associated with the vehicle and interpret the signals based on rules that define a plurality of signal conditions corresponding to the plurality of emergency events to determine that one of a plurality of emergency events has occurred. When an emergency event has occurred, the alert module 2348 can automatically an emergency alert on the instrument display. The emergency event can be one or more of one of the vehicle travelling in a wrong direction in a lane of a road (for example, when the first area requires driving on the right side of the road and the second area requires driving on the left side of the road), the vehicle travelling in a wrong lane of the road (for example, a lane reserved for car-pooling, high occupancy vehicles, and the like), the vehicle travelling in a restricted lane of the road (such as a lane reserved for mass transit vehicle, a lane reserved for government vehicles, a lane reserved for police and/or emergency vehicles), and the vehicle travelling too fast.

The communication network monitoring module 2312 may also determine that communication rates for use of network 224 will change or have changed as the vehicle travels from a first area 2708 to a second area 2712 or an other area 2716. As described below, the communication network monitoring module 2312 is able to select, based on predetermined or pre-configured rules or current user input, an optimal wireless communication network from a plurality of wireless communication networks. The selection can be based on a myriad of factors other than, or in addition to, communication network speed, including without limitation, current or anticipated user requirements, network reliability, network performance, and data transmission cost. For example, when the vehicle 104 crosses an international boarder 2704 (e.g., from the U.S. to Canada), voice and data roaming rates may increase and/or be altered by the provider of communication network 224 to international rates and may also include additional charges for local taxes. In this example, borders 2704, 2704A may also represent an edge of a voice or data coverage area or a line where voice and/or data rates for use of a communication network will change. The communication network monitoring module 2312 can obtain information and analyze coverage areas, voice rates, and data rates for a plurality of communication networks 224, 224A, 224B, 224C . . . 224N. Each of the communication networks 224-224N can be associated with a different data communication modality or protocol and a different network provider. Additionally or alternatively, the communication network monitoring module 2312 can connect to communication network providers using network 224 and/or access data storage and/or servers 228 of the communication network providers to obtain up-to-date maps of coverage areas information on rate changes for voice and data services of communication networks 224-224N. The communication network monitoring module 2312 can also obtain notification of rate changes automatically provided by a plurality of communication network providers. For example, a network provider operating communication network 224D in the second area 2712 may provide rate and coverage information to the communication network monitoring module 2312 when the vehicle enters the second area.

The communication network monitoring module 2312 can determine the amount of the change of the communication rates between the first and second areas comparing rates in the first and second areas for the plurality of communication networks 224-224N. After determining the amount of the change, the communication network monitoring module 2312 can notify the user. The notification can include information about the change in communication rates such as in "per minute rates" or a change in "data rates" of usage in the second area. The notification may also include information of how to maximize voice and data usage (or how to minimize costs) by recommendations on SIM card purchases, or identifying how much is charged per minute upon making a call or for a unit of data (such as 1 Mb, 1 Gb, etc.). The communication network monitoring module 2312 may also include recommendations on other data plans and/or data providers 224A-224N that are available in the second area that the user can select.

The notification can be a graphical or textual user interface provided in one or more displays 212, 248, 882, 2804, 2812, and 2816. The graphical or textual user interface can include rate information for each of networks 224-224N and a rank order of the networks based on at least data transmission speed (e.g., actual, maximum, expected, average, media, mode, minimum, etc.) of the network and/or data transmission cost (e.g., actual, maximum, expected, average, median, mode, minimum, etc.) of networks 224-224N. The user can select other factors that the communication network monitoring module 2312 can use to select and/or recommend available networks, including network reliability, signal strength, connection success confidence values, current or anticipated user bandwidth requirements, network performance, network throughput, and/or network bandwidth. The user interface can be a side-by-side list of information for each available network 224-224N. The user can select a desired network 224-224N from the user interface and the VCS 204 will connect to the selected communication network. Additionally or alternatively, the communication network monitoring module 2312 can select and cause the VCS 204 to automatically connect to the highest ranked communication network.

Additionally or alternatively, as the vehicle 104 is travelling in a first area 2708 to a second area 2712, the communication network monitoring module 2312 can use the GPS/navigation subsystem 336, information from vehicle sensors 242 and non-vehicle sensors 236, the maps database 8100, and/or the communications module 1052 to determine possible degradations and/or interruptions 2720 in voice and/or data communication networks 224-224N based on user preferences, carrier settings, etc. The interruption 2720A in service can be a decrease in signal quality of the communication network 224 below a user defined or a preset level. The interruption 2720B can also be caused by natural features (mountains, valleys, dense vegetation) and/or by man-made features such as a tunnel that the vehicle is expected to enter based on the current route being driven and/or the vehicle's destination.

The communication network monitoring module 2312 monitor the vehicle's position compared to coverage areas of communication networks 224 . . . 224N. The communication network monitoring module 2312 can use the information provided by the maps database to determine when the vehicle will move into a second area with limited or no coverage provided by one or more voice and data providers and to select or recommend an alternate communication network 224C-224N.

Further, the communication network monitoring module 2312 can receive information from the communication module 1052 to determine the quality and availability of communication networks 224-224N. The communication network monitoring module 2312 can monitor and analyze communication network state information such as, but not limited to: (1) network speed (for example, maximum path speed, relative path speed, idle latency (packet round trip time), and delay); (2) current, anticipated, and/or guaranteed user requirements; (3) required bit rate; (4) communication network reliability (including jitter or packet loss, packet dropping probability, out-of-order delivery, and/or bit error rate); (5) network performance; (6) network bandwidth; (7) throughput; (8) data transmission cost (which may be indicated by CPU usage, compressed or uncompressed data size or quantity to be communicated over the network, user network access terms and conditions with the network operator, whether or not encryption is to be employed, number of hops from communication device to destination source note, and type of data to be communicated); (9) signal strength; and (10) connection success confidence values.

The communication network monitoring module 2312 can determine to select and change to a new communication network based on communication network state information provided by the communication module 1052 and by applying a predetermined set of rules. The rules could be default rules stored in memory 308 and/or rules configured by the user and stored in settings 1224 of data structure 1200. The selection and change can be made before or during execution of a transaction or communication of data involved with the transaction. The selection may be prompted in response to the communication network monitoring module 2312 detecting a degradation in service. The selection may also be prompted in response to a user action, such as: establishing a connection to a communication network; initiating an application or service (e.g., a voice and/or video communication, executing an application that requires duplexed or two-way communication through a communication network), a transaction (such as uploading or downloading (multi-) media content, user or destination or source node generated or originated information, software, or other data); and/or communication network consumptive activity (for example, an activity which requires the use of communication network resources over a certain period of time above a user specified communication network or machine coded threshold).

The communication network monitoring module 2312 can compare the communication network state information for each compatible, currently accessible communication network 224-224N with data transmission resource requirements for the transaction and/or the application or service executing the transaction and/or as determined by user preferences. After the comparing, the communication network monitoring module 2312, based on predetermined rules, determines if a compatible, currently accessible network 224-224N is sufficient to perform the activity in compliance with the requirements. The communication network monitoring module 2312 can also determine if any of the other compatible, currently accessible networks can satisfy one or more of the requirements. The requirements may be ranked hierarchically in order of importance, such that if the highest ranked requirement is satisfied by a compatible communication network but the second highest ranked requirement is not, the communication network may nonetheless be eligible for consideration by the user. As noted, the requirements typically involve one or more of data transmission speed required for adequate performance, communication network reliability required for adequate performance (e.g., video link, audio link, gaming, and the like), total communication network resources consumed or to be consumed by the transaction and/or the application or service executing the transaction, communication network performance, and communication network data usage cost per unit. Based on the results and the predetermined rules, the communication network monitoring module 2312 selects a suitable communication network from among the plurality of accessible and available communication networks 224-224N. A suitable communication network typically is one that can perform the activity with acceptable performance characteristics and/or under a certain cost budget and/or in compliance with one or more of the requirements.

The results can be an expected likelihood or probability or instance of one or more requirements being satisfied by a communication network within a determinate or indeterminate period of time, a side-by-side comparison of the current and/or expected performance of the current or possible communication network with the requirements with a cumulative compliance or non-compliance score being determined and assigned to each of the plurality of communication networks 224-224N, an expected performance of the current and each compatible communication network within a determinate or indeterminate period of time, the likelihood or probability of performing and completing the transaction successfully within a determinate or indeterminate period of time, the expected cost of the performance and/or completion of the activity within a determinate or indeterminate period of time, the expected cost per unit of time of the performance and/or completion of the transaction (where the transaction is indeterminate in length such as streaming audio and/or video, making a voice call, an e-commerce interaction, etc.), and the like.

The rules could be default and/or configured by the user. The rules can be threshold-based, with a score, rank, or likelihood or probability in excess of a selected threshold making the respective communication network 224-224N eligible for selection. The rules could use a composite scoring algorithm, with one or more requirements being given a higher weighting than other requirement(s). For example, one or more of data transmission speed, communication network reliability, and communication network data usage cost per unit than another of data transmission speed, network reliability, and network data usage cost per unit. When cost alone is prioritized, the communication network selected is that communication network which minimizes substantially (or relative to the other plurality of communication networks) the cost to the user of the communication of the data. When speed alone is prioritized, the communication network selected is that communication network which maximizes substantially (or relative to the other of the plurality of communication networks) the real or expected rate of communication (e.g., transmission, upload and/or download) of the data. When reliability alone is prioritized, the communication network selected is that communication network that maximizes substantially (or relative to the other plural communication networks) the quality of the data transmitted through the communication network and/or minimizes substantially the probability that some quantity of data is lost during transmission. By way of illustration, the communication network selected by the communication network monitoring module 2312 is that communication network that is most capable of complying with requirements of data transmission speed and communication network reliability while remaining within a certain cost budget or ceiling. The rules could be a cumulative rank based on simple compliance with each of the requirements, with the communication networks being ranked in order of compliance with the most to the least number of requirements.

Additionally or alternatively, the communication network monitoring module 2312 can present the user with the results of the comparison and give the user the option of continuing with the current communication network or selecting a new (compatible) communication network that more optimally satisfies one or more of the requirements. A graphical or textual user interface can be provided to the user, in one or more of displays 212, 248, 882, 2804, 2812, and 2816, which allows the user to choose to optimize or improve a communication network 224-224N. A graphical or textual cue as to which prioritized factors the user has selected from among the factors of data transmission speed, cost and reliability the user has selected can be displayed in the user interface. This information may be displayed in conjunction with performance metrics, such as data transmission speed (e.g., actual, maximum, expected, average, median, mode, minimum, etc.) of the communication network and/or the data transmission cost (e.g., actual, maximum, expected, average, median, mode, minimum, etc.) of the communication network. The communication network monitoring module 2312 can present this information side-by-side in the user interface presented in one or more of displays 212, 248, 882, 2804, 2812, and 2816. The user can add, remove, and/or change one or more network characteristics to be used in selecting a communication network.

The graphical or textual user interface can include display objects such as a network icon identifying, typically uniquely, a corresponding compatible communication network 224 and a plurality of first, second, . . . nth metrics providing communication network state information for the communication networks 224A-224N. The communication network state information can include, for example, data transmission speed (e.g., actual, maximum, expected, average, median, mode, minimum, etc.) of the communication network, the data transmission cost (e.g., actual, maximum, expected, average, median, mode, minimum, etc.) of the communication network, or the reliability of the communication network. The metrics may also be a comparative metric that compares a communication network parameter of the communication networks 224-224N against a corresponding requirement and/or that of another selected communication network, such as a currently selected communication network. The graphical or textual user interface may also include a "next network" icon that enables the user to toggle or move from one communication network to another communication network. The user can select an icon representing each of the communication networks 224-224N by a suitable gesture, keypad selection, or other input and the VCS 204 will connect to the communication network represented by the selected icon using the communication module 1052.

The communication network monitoring module 2312 can also use a current location from the navigation subsystem 336 of the vehicle 104 as a factor presented to the user to facilitate communication network selection by the user or when automatically selecting a suitable communication network. The location information can be compared against a prioritization list, or look up table, which ranks each of a plurality of communication networks 224-224N on the basis of each communication network's known and/or expected efficiency at the selected location. The communication network monitoring module 2312 can select a communication network in an area based in part on prior selections made by the user in a particular area. Thus, the communication network monitoring module 2312 can route communications from the vehicle 104 through the priority communication network selected based on the current location and look up table. As the user performs communication network-related activities, such as performing a transaction and/or executing a selected application or service executing the transaction and user requirements change, a second communication network can be selected using one of the algorithms discussed above.

Additionally or alternatively, the communication network monitoring module 2312 can select a communication network, which, based on communication network metric information received from the communication module 1052, has the highest throughput speed (weighted for integrity/loss) as a primary communication network for the vehicle 104. When the user initiates an activity which demands data throughput via a communication network, the primary communication network is used. The communication network monitoring module 2312 can display an icon or other graphical notification on one or more of displays 212, 248, 882, 2804, 2812, and 2816 that shows the nature or type or performance characteristics of the currently selected communication network. As discussed above, the currently selected communication network may be changed at any time based upon a change in one or more of vehicle location, a requirement of a selected transaction and/or application or service executing the transaction, a user requirement or preference, or a communication network performance characteristic of the currently selected communication network and/or in an alternate communication network (in response to network activity of third parties (e.g., network congestion level), resource consumption level by other users, resource malfunction, or other factor or condition altering such a performance characteristic (such as interference 2720). The communication network monitoring module 2312 can periodically or continually compare the performance characteristics of multiple communication networks 224-224N to select an optimal communication network for use as the currently selected communication network.

The communication network monitoring module 2312 can analyze a performance of communication networks 224-224N by many techniques. In one example, the communication network monitoring module 2312 periodically sends a packet through each of the available and accessible communication networks. Each of the communication networks is timed for data packet throughput speed and data packet integrity (loss). In another method, a "large" file is transferred from one system to another system using each available and accessible communication network and the time required to complete the transfer or copy of the file measured. The throughput is then calculated by dividing the file size by the time to get the throughput in megabits, kilobits, or bits per second. The results of such an exercise can result in the "goodput," which is typically less than the maximum theoretical data throughput. There are many overheads accounted for in goodput in addition to transmission overheads, including latency, TCP receive window size and system limitations, which means the calculated goodput does not reflect the maximum achievable throughput.

The communication network monitoring module 2312 can also measure communication network performance by using packet pinging, such as done by HTTPing. Further, performance of communication networks can also be measured using active and/or passive techniques. Active techniques (e.g. Iperf) are more intrusive but are arguably more accurate. Passive techniques (e.g. Pasinemda) are of less intrusive of communication network overhead and hence can run in the background. Some tools measure traffic by sniffing and others use SNMP, WMI or other local agents to measure bandwidth use on individual machines and routers. However, the latter generally do not detect the type of traffic, nor do they work for machines which are not running the necessary agent software, such as rogue machines on the network, or machines for which no compatible agent is available. In the latter case, inline appliances are preferred. These would generally "sit" between the LAN and the LAN's exit point, generally the WAN or Internet router, and all packets leaving and entering the network would go through them. In most cases the appliance would operate as a bridge on the network so that it is undetectable by users. Performance can also be modeled instead of measured; one example of this is using state transition diagrams to model queuing performance in a circuit-switched network. These diagrams allow the network planner to analyze how the network will perform in each state, ensuring that the network will be optimally designed. In other applications, the communication network monitoring module 2312 accesses information from local or remote storage regarding bandwidth consumption, bandwidth availability, network usage levels, current user admission control restrictions, usage scheduling restrictions, flow control restrictions, and the like for available communication networks 224-224N. Remote storage could, for example, be at an intermediate node, such as a gateway, router, server, firewall, wireless access point, base station, and/or other device.

The order in which communication networks 224-224N are tested or analyzed can be determined by many techniques. For example, the order may be determined using a current logical, virtual, or spatial location as determined by the navigation subsystem 336. The order may be determined based on historical relative performances of the various communication networks. The order may be determined based on the type and/or requirements of the transaction, application, or service to be executed or performed by the user. The order may be determined based on the type of data to be communicated over the communication network. The order may be determined based on data communication cost limitations set by the user. Other techniques for determining the order can also or alternatively be used.

Thus, before the vehicle 104 crosses a border 2704 of a state, country, or different data/voice network, the communication network monitoring module 2312 can select and/or recommend alternate communication networks 224-224N to provide seamless access to voice and/or data services to without interruption. For example, the communication network monitoring module 2312 can determine to change from one communication network 224 (e.g., voice/data, etc.) to another communication network 224N (e.g., WiFi, satellite, etc.) upon identifying possible outages, service issues, and/or roaming charges. The change of networks 224 can be performed automatically by the communication network monitoring module 2312 or may be performed after approval of the user.

In addition, when the vehicle is operated in a second area 2712 that uses a different language than the first area 2708, the traffic sign translation module 2320 can translate traffic signs and symbols into a language understood by a registered user 216. For example, if the vehicle is driven from the U.S. into Quebec or Mexico, the vehicle control system can determine that the road signs are in French in Quebec and in Spanish in Mexico using the maps database 8100. If the user does not understand French or Spanish, the traffic sign translation module 2320 can translate street signs into a language understood by the user.

For example, as the vehicle 104 approaches a border 2704 to a second area 2712, the VCS 204 can use information from the maps database 8100 to determine a second different language is used in the second area. The VCS can then check the profile information 1238 of data structure 1200 for the user to determine if the user has registered the second language of the second area. If the user has not registered the second language as a language the user understands, the VCS 204 can activate the traffic sign translation module 2320. The traffic sign translation module 2320 uses exterior cameras and/or other imaging sensors to image road signs. After a road sign is imaged, the traffic sign translation module 2320 performs text recognition and initiates a text reader (or other text-to-speech program) to recognize the text on the road sign. The text reader is a software application of the traffic sign translation module 2320 that identifies and interprets the text in the image of the road sign. Additionally or alternatively, the translation process may be provided via the processing power of the mobile device, via processing on the cloud, and combinations thereof.

The traffic sign translation module 2320 then translates the text of the road sign into the language the user 216 has registered in profile portion 1238 using the language database 836. After translating the text of the sign, the traffic sign translation module 2320 can transmit the translated text as an audible message using one or more of the speakers 880, or as text using one or more displays 212, 248, 882, 2804, 2812, and 2816. Optionally, a user can create a profile setting directing the traffic sign translation module 2320 to run and capture images of traffic signs and present the text of the traffic sign to the user regardless of the location of the vehicle. In this manner, the traffic sign translation module 2320 will present the text of traffic signs to a user even if the user understands the language of the traffic signs.

Figure 28A:
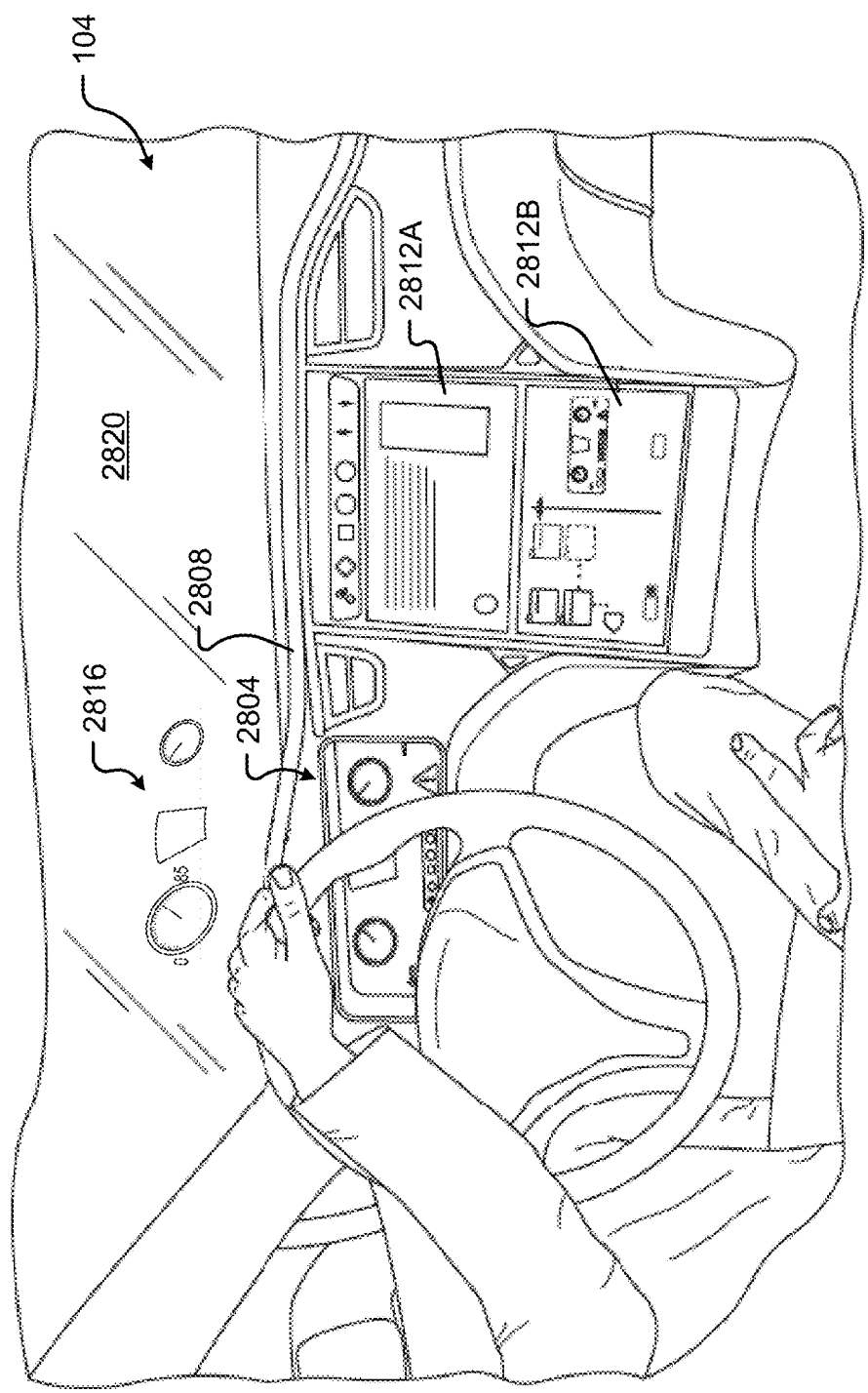
FIG. 28A depicts a first embodiment of configurable displays of a vehicle.

FIG. 28A depicts a first representation of a configurable dash display/instrument cluster 2804 of the user interface 324 in a general viewing area of a vehicle 104 in accordance with the present disclosure. Additionally or alternatively, the configurable dash display, or display 2804, spans across one or more displays. As depicted, the display 2804 optionally occupies a section of a vehicle dash 2808. The display 2804 can be located on or adjacent to the dash 2808 of a vehicle 104. It is an aspect of the present disclosure that the configurable dash display 2808 is optionally located such that one or more users associated with a vehicle 104 can interact with and/or observe the configurable dash display 2804. The display 2804 comprises at least a front screen, Graphical User Interface, and/or hardware switches or buttons which are described below in conjunction with FIGS. 29A-29B. The functions and information presented by the display 2804 are controlled by the video controller 840 and/or by the dash configuration module 2308.

It is anticipated that the display 2804 communicates with, and/or is operated independently of, one or more console displays 2812A, 2812B. Communication between the display 2804 and at least one additional console displays 2812A, 2812B is achieved through physical and/or wireless methods using bus 356. The display 2804 can optionally be re-configured by inputs, gestures, and/or voice commands by one or more users 216, and/or by use of console display 2812A, 2812B. Additionally or alternatively, the display can be re-configured by the dash configuration module 2308 of the VCS 204. For example, a user (e.g., a passenger) may wish to configure settings that are associated with the user while the vehicle is being operated by another. In this example, the user could safely arrange and/or configure a dash display for at least one of an operating condition and non-operating condition. The user may then save the configuration and/or arrangement in a memory location, such as 1224, associated with at least one user of the vehicle. In addition or alternatively, the dash configuration module 2308 can configure and/or re-configure the display 2804 after determining that the vehicle has entered a second area 2712 and different instruments or different units of measure should be presented in the display 2804.

The display 2804 also communicates with, and/or is operated independently of, one or more configurable heads-up dash displays (HUD) 2816 that can span across one or more wind-shields 2820, displays, surfaces, windows, glasses, and/or reflective medium of the vehicle 104. Communication between the display 2804, the least one console displays 2812A, 2812B, and the HUD 2816 is achieved through physical and/or wireless methods using bus 356. As depicted, the HUD 2816 occupies at least one area of a vehicle 104. The at least one area may be located on or adjacent to the dash 2804. It is an aspect of the present disclosure that the configurable HUD 2816 display is optionally located such that one or more individuals associated with a vehicle 104 can interact with and/or observe the configurable HUD 2816. The HUD 2816 comprises at least a screen, a projection unit, light-emitting unit, and Graphical User Interface, and/or hardware switches or buttons. The HUD 2816 employs various methods and light sources to display information, instruments, and present information and alerts generated by the alert module 2348 to one or more users, including but not limited to, projection, Cathode Ray Tube ("CRT"), Light Emitting Diode ("LED"), Liquid Crystal Display ("LCD"), Organic Light Emitting Diode ("OLED"), and the like. The HUD may be a hologram projected through the wind-shield 2820. The viewing distance of the HUD 2816 can be adjusted by the driver to compensate for the driver's vision (for example, the HUD can be projected further away from the driver if the driver is far sighted and closer if the driver is near sighted).

It is one aspect of the present disclosure that the instruments and information displayed by the HUD 2816 are configurable by a user using one or more touch inputs to the HUD 2816 and/or the at least one console display 2812A, 2812B, or by a gesture or voice command. For example, a user (e.g., a passenger) can configure settings that are associated with the user while the vehicle is being operated by another. In this example, the user can arrange and/or configure the HUD 2816 for at least one of an operating condition and non-operating condition. The user can then save the configuration and/or arrangement in portion 1238 of structure 1200. The dash configuration module 2308 can also automatically configure and reconfigure the HUD to comply with laws or regulations as required in an area where the vehicle 104 is operating.

The HUD 2816 may display applications in any number of configurations. This configurability includes the ability to alter the appearance and/or functionality of gages, change units of measurement of gages, and add or remove gages and display or warning areas and the like.

Figure 28B:
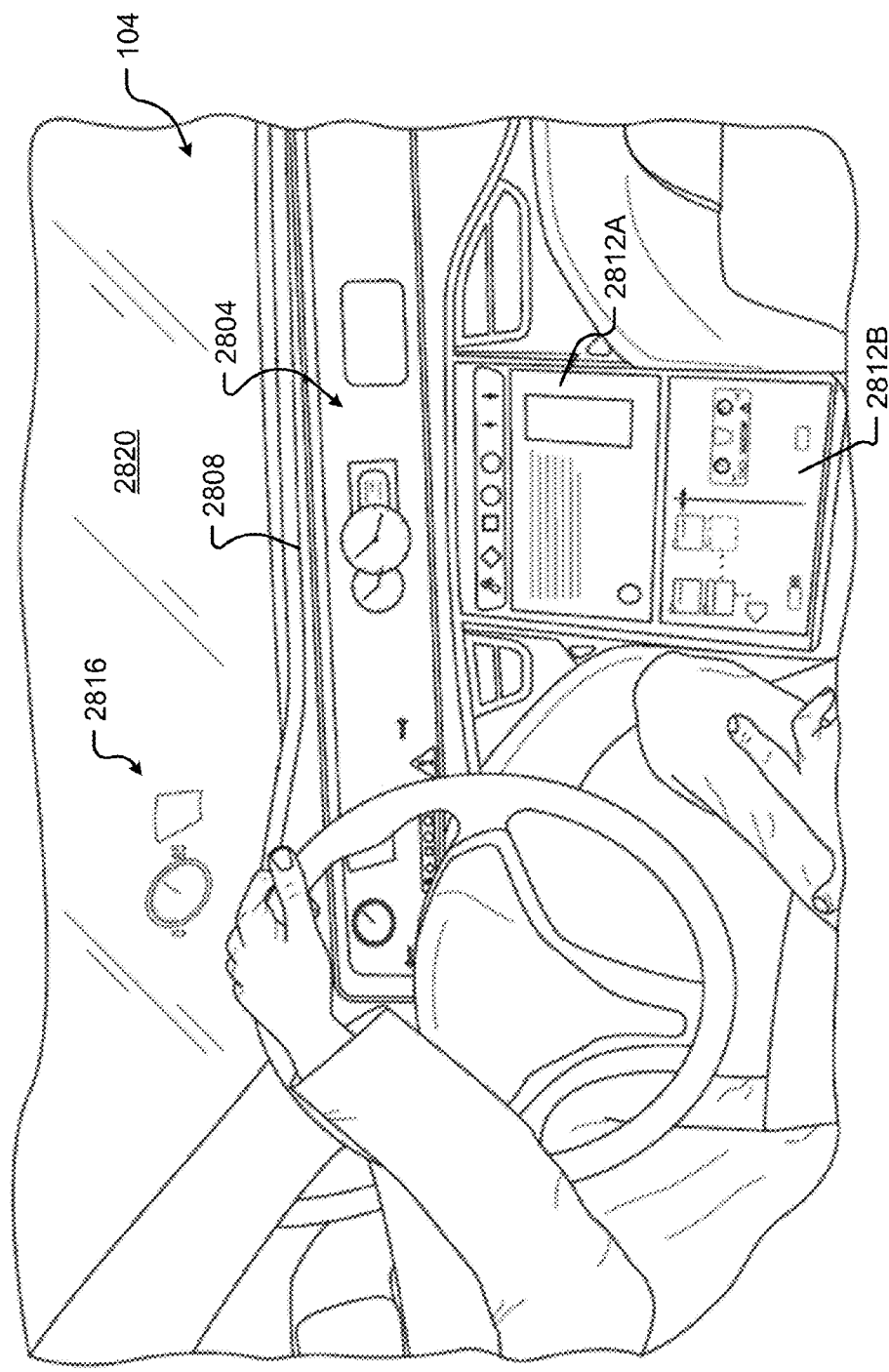
FIG. 28B depicts a second embodiment of configurable displays of a vehicle.

FIG. 28B depicts a second representation of a configurable dash display/instrument cluster 2804 in a general viewing area of a vehicle 104 in accordance with the present disclosure. In particular, FIG. 28B shows the display 2804 occupying a substantial portion of the vehicle dash 2808. It is an optional aspect of the present disclosure that the device occupies the entire space of the dash 2808. Additionally or alternatively, the display 2804 can be configured such that it is the dash 2808 of a vehicle. As depicted, the display 2804 may be accessible by one or more users (e.g., at least one operator, passenger, etc.). Input may be received at the display 2804 from one or more users and/or signals simultaneously. For example, while one user is adjusting controls and configurations of the display 2804 that are associated with one position of the vehicle, another user can manipulate controls and/or configurations associated with another position of the vehicle. The dash also includes one or more console displays 2812A, 2812B and a configurable HUD 2816.

Figure 28C:
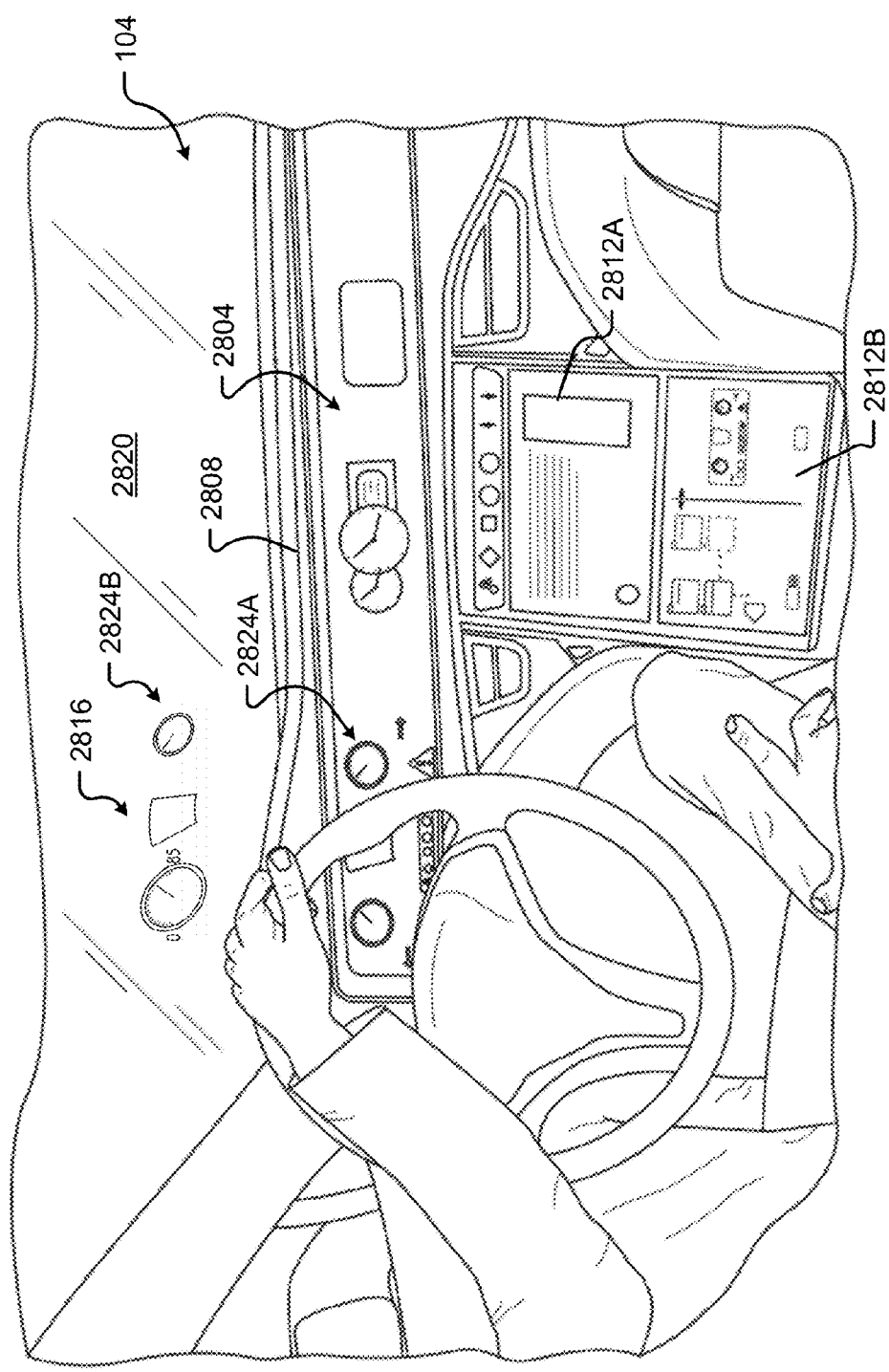
FIG. 28C depicts a third embodiment of configurable displays of a vehicle.

FIG. 28C illustrates the vehicle 104 of FIG. 28B after instrument 2824A has been added to display 2804 and instrument 2824B has been added to HUD 2816 by the dash configuration module 2308.

Figure 29A:
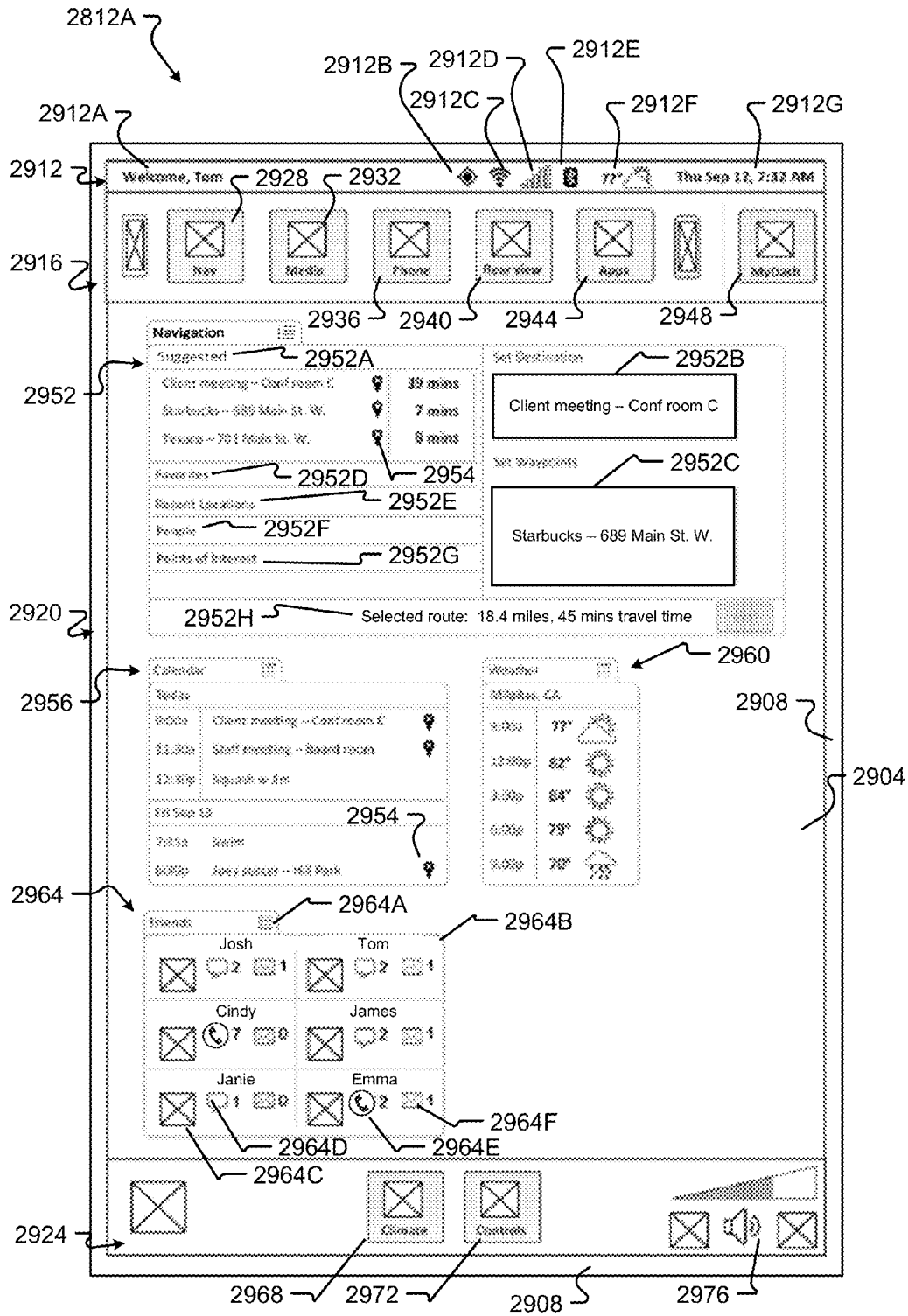
FIG. 29A depicts a first embodiment of a console display of a vehicle.
Figure 29B:
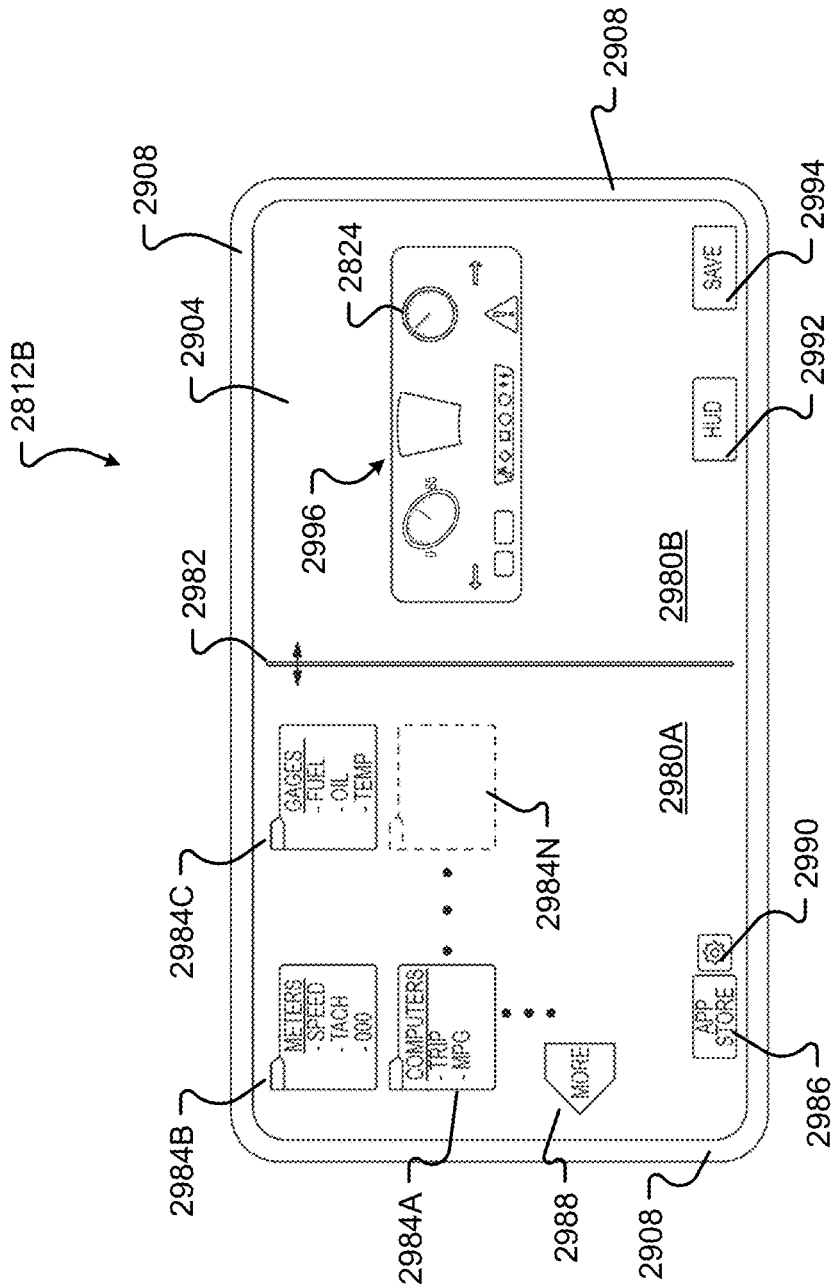
FIG. 29B depicts a second embodiment of a console display of a vehicle.

FIGS. 29A-29B depict representations of a graphical user interface ("GUI") of a configurable console display 2812. The icons, applications, and/or the presentation layout of the display 2812 may be modified via user input and/or automatically via the processor 304 of the dash configuration module 2308. When a user configures the display 2804 using console display 2812, the settings may be stored in one or more portions of data structure 1200, including settings 1224 and profile information 1238.

The configurable console display 2812 can include a number of devices that work separately or together with sensors 708 and the VCS 204 to provide various input/output functions to the user. The console display 2812 includes a touch sensitive display screen 2904. Optionally, the screen 2904 includes more than one display area. Additionally or alternatively, display 2812 may also include areas that receive input from a user without requiring the user to touch the display area of the screen. For example, the display 2812 may include at least one area configured to receive touch input via a gesture capture area 2908. This at least one gesture capture area 2908 is able to receive input by recognizing gestures made by a user. In comparison to the display screen 2904, the gesture capture area 2908 is commonly not capable of rendering a displayed image.

The console display 2812 optionally includes one or more physical and/or electrical features such as switches, buttons, cameras, ports, slots, inputs, outputs, and the like. These features may be located on one or more surfaces of the console display 2812. One or more of these features may optionally be located adjacent to the console display 2812. The console display 2812 may also communicate with and/or utilize one or more of these features that may be associated with other devices. For instance, the console display 2812 may communicate with another communication device (such as, at least one configurable vehicle console, smart device 212, 248, and/or other computer) that has been associated with the vehicle 104 or a user 216 to, among other things, utilize at least one feature of the other device. In this scenario, the console display 2812 may use the at least one other device as an extension to receive input and/or gather information.

The console display 2812 may include a plurality of physical control buttons, which can be configured for specific inputs and, in response to receiving an input, may provide one or more electrical signals to a specific input pin of a processor or Integrated Circuit (IC) in the console display 2812. For example, the control buttons can be configured to, in combination or alone, control a number of aspects of the console display 2812 and/or display 2904 and HUD 2816. Some non-limiting examples include overall system power, volume of alerts and audible messages, brightness of one or more instruments, selection of displayed items, orientation of instruments, size of instruments, units of display of instruments, analog/digital output of instruments, and initiation/termination of device functions. Optionally, instead of separate buttons, two buttons may be combined into a rocker button. This arrangement is useful in situations where the buttons are configured to control features such as volume or brightness. Optionally, a button may be configured to, in addition to or in lieu of controlling one function, control other aspects of console display 2812 and/or the display 2804 and HUD 2816. One or more of the buttons may be capable of supporting different user commands. By way of example, a normal press has a duration commonly of less than about 1 second and resembles a quick tap. A medium press has a duration commonly of 1 second or more but less than about 12 seconds. A long press has a duration commonly of about 12 seconds or more. The function of the buttons is normally specific to the application that is currently in focus on the console display 2812.

The console display 2812 can also include a card/memory slot and/or a port. The card/memory slot can be configured to accommodate different types of cards including a subscriber identity module (SIM) and/or other card based memory. The port may be an input/output (I/O port) that allows the console display 2812 to be connected to other peripheral devices, phone, keyboard, other display, and/or printing device. As can be appreciated, these are merely some examples and the console display 2812 optionally includes other slots and ports such as slots and ports for accommodating additional memory devices, facilitating firmware and/or software updates, and/or for connecting other peripheral devices.

A first representation of a graphical user interface (GUI) of console display 2812A is shown in FIG. 29A. The GUI includes an information bar 2912, and upper area 2916, a central area 2920, and a lower area 2924. The information bar 2912 may include one or more of, but is not limited to, a name of an identified driver 2912A, a satellite reception indicator 2912B, a WiFi connectivity and signal strength indicator 2912C, a voice and data connectivity and signal strength indicator 2912D, a Bluetooth signal indicator 2912E, a local weather indicator 2912F, and a date and time indicator 2912G.

The upper area 2916 generally includes one or more user selectable icons for applications. When selected by a user, the icons open, initiate, or recall the related application. The icons mare include, but are not limited to, a navigation icon 2928, a media icon 2932, a phone icon 2936, a rear view icon 2940, an other application icon 2944, and a "MyDash" icon 2948. When selected, the rear view icon 2940 can provide the driver with a display generated using data from one or more external IR sensors 740E, motion sensors 744E, cameras 760E, and/or biological sensors 754E. Selecting the MyDash icon 2948 provides the user with a display in which the user can select and configure instruments and gauges for display by the dash display 2804 and/or the HUD 2816. The MyDash icon 2948 may also be used to select one or more instruments and gauges to be displayed within the GUI of the console display 2812. The instruments and/or gauges that may be selected and configured using the MyDash icon include, but are not limited to, a speedometer, a tachometer, an odometer, one or more trip odometers, an oil pressure gauge, a coolant temperature gauge, an engine temperature gauge, a exhaust temperature gauge, a transmission temperature gauge, a brake temperature gauge, tire pressure gauges, a battery charge meter, an ammeter, a voltmeter, a manifold pressure gauge, and a fuel level gauge.

The central area 2920 includes configurable display areas that provide various types of information to the user. The central area can include a navigation area 2952, a calendar 2956, a weather display 2960, and a contacts or social networking display 2964. The arrangement and relative size of areas 2952, 2956, 2960, and 2964 can be modified by the user and the dash configuration module 2308. Additionally or alternatively, one or more of areas 2952, 2956, 2960, and 2964 may not be displayed.

The navigation area 2952 includes, but is not limited to, a suggested destination menu 2952A, a destination input field 2952B, a waypoints input field 2952C, a favorites menu 2952D, a recent location menu 2952E, a "people" or contacts menu 2952F, a points of interest menu 2952G, and a route information display area 2952H.

When selected, as illustrated in FIG. 29A, the suggested destination menu 2952A can display a drop down list of one or more suggested destinations determined by the VCS 204 using data of the user's preferences, likes, and habits stored in profile data 252. The suggested destination menu 2952A is illustrated in a maximized state. The VCS 204 can also generate the one or more suggested destinations using information from the calendar 2956 or a calendar application on a communication device 212, 248 of the user. For example, a calendar item with an associated location is shown ("Client meeting—conf room C") based on the user's schedule. Further, the suggested destinations may be determined by the VCS 204 using locations and schedules of one or more of the user's contacts, including contacts displayed in the contacts display 2964 and other contacts that may not be displayed in display 2964. For example, if the VCS 204 determines that the user's contact "James" has entered a destination of a Starbucks near the current location of the vehicle 104, the VCS 204 can display a suggested location of "Starbucks, 689 Main St. W., 7 mins." Further, the suggested destinations drop down list can include locations selected by the VCS 204 based on a state of the vehicle 104. For example, if the vehicle is running low on fuel, the VCS 204 can suggest a near-by fuel station, such as "Texaco—701 Main St. W." Additionally or alternatively, the VCS 204 can suggest a destination based on a destination of one or more of the user's contacts. Thus, the lists 2952A includes "smart" suggestions for destinations based on the user's preferences, likes, and schedule.

Although three suggested destinations are illustrated in the drop down list in FIG. 29A, it should be understood that the VCS 204 can determine more suggested destinations for display in the list. Further, when more suggested destinations are displayed, the drop down list can be resized to be larger and/or can be viewed by scrolling up and down the list. The user can set the display order of the suggested destination list. For example, scheduled meetings can be set to be displayed at the top of the list as illustrated in FIG. 29A. Additionally or alternatively, the suggested destination list can be temporally ordered with the closest destination at the top of the list, where the closest destination is determined by the estimated time to arrive at the location. Further, the user can set the suggested destination list to be ordered with the geographically nearest suggested location displayed at the top of the list.

The favorites menu 2952D is illustrated in FIG. 29A in a minimized state. When selected by a user, the favorites menu can display a drop down list in a manner similar to the suggested destination menu 2952A. When the favorites menu 2952D is selected, the VCS 204 may collapse the suggest drop down list 2952A and display it in a minimized state. Generally, only one drop down list of one of the suggested destination menu 2952A, favorites menu 2952D, recent location menu 2952E, and people menu 2952F can be displayed in the maximized state at one time. However, optionally the user can enter a setting to display one or more drop down lists of 2952A, 2952D, 2952E, and 2952F in the maximized state at one time. The user and/or the VCS 204 can resize elements of display 2812 as necessary if more than one drop down list is displayed in the maximized state.

The drop down list of the favorites menu 2952D can display one or more locations set as a favorite by the user and stored in data 252. For example, the user can set one or more home locations 2000, work locations, etc. as a favorite. The locations set as a favorite include address or location information, such as geographic coordinates or a street address. The list can be ordered in a manner set by the user. The favorites list can be ordered by a rating entered by the user, for example, the highest rated favorite can be displayed at the top of the list. Additionally or alternatively, the favorites list can be ordered with the most recently visited favorite location at the top of the list. Further, the favorites list can be ordered with the geographically nearest favorite location at the top of the list.

The recent location menu 2952E, illustrated in the minimized state, can be selected to provide a drop down list of a plurality of locations visited by the user within a time period set by the user. The recent location drop down list can be ordered by the number of times the location has been visited by the user. For example, locations most frequently visited by the user can be displayed at the top of the drop down list. Additionally or alternatively, the user can select some other order to display locations in the drop down list, such as a geographic proximity with closest locations displayed at the top of the drop down list.

The people menu 2952F, which is illustrated in the minimized state, provides a drop down list of the user's contacts that are within a predefined distance of the vehicle when in the maximized state. The predefined distance can be preset (such as 30 miles, 20 miles, 15 miles, or less than 10 miles). The user can also set the predefined distance to any desired distance and save the setting in profile data.

The VCS 204 can determine contacts to display in the drop down list from profile data 252 and/or contact lists stored in a device 212, 248 registered with the VCS 204. The contacts list can include an address or current geographic location of the contact. Additionally or alternatively, the drop down list can display social media contacts and or geosocial networking contacts of the user. For example, the drop down menu displayed when the people menu 2952F is selected can include a "contact" from the user's contacts in Linked-In™, Myspace™, Twitter™, YouTube™, DailyMotion™, Facebook™, Hotmail™, Yahoo Mail™, Gmail™, Second Life™ or any other social media or geosocial site to which the user subscribes or for which the user has an account.

A contact selected for display in the drop down list of menu 2952F by the VCS 204 from the user's social media and network contacts can include current address and location of the contact. For example, if contact "James" has enabled geosocial features of his profile, the VCS 204 can determine the James' current geographic location. Further, if James has entered a destination into his communication device, the VCS 204 can display James' destination address or geographic coordinates in drop down list 2952F by reading the destination from James' communication device. Further, James' communication device can send James' estimated time of arrival at the destination. Additionally or alternatively, the VCS 204 can determine an estimated arrival time for James at the destination based on James' current location provided by James' communication device. For example, the drop down menu of the people menu 2952F can display "James—going to Starbucks, 689 Main St. W., 15 mins." Thus, the VCS 204 has determined that contact James has entered a destination in his profile. Further, the VCS 204 estimates that James is 15 minutes from the destination based on James' current location. The drop down menu could also display "Cindy—going to Starbucks, 524 Main St. W., 27 mins."

The menu 2952G, illustrated in the minimized state, can provide a drop down list of locations selected by the VCS 204 as points of interest or potential interest to the user. The drop down list can include locations such as fuel stations, lodging, parking, entertainment, shopping, services, health care facilities, historic landmarks, and other similar sites.

The destination input field 2952B is a drop target field into which any location enabled object can be dragged and dropped. Location enabled objects include an associated address or geographic coordinates that may be read by the navigation subsystem 336 and have a "pin" indication 2954.

For example, a user can create a destination for the vehicle 104 by dragging a location displayed in one of the drop down lists displayed by menus 2952A, 2952D, 2952E, 2952F, and/or 2952G into the destination input field 2952B. As illustrated in FIG. 29A, the "Client meeting—Conf room C" from the suggested destination menu 2952A drop down list has been dragged and dropped into the destination field 2952B to set a destination for the vehicle 104. If a second location is dragged and dropped into field 2952A, the second location replaces the first location.

Another drop target field is provided by the waypoints input field 2952C and allows a driver to set a waypoint or second destination along a destination route previously entered in field 2952B. FIG. 29A illustrates the waypoint input field 2952C after destination "Starbucks—689 Main St. W." has been dragged from the suggested drop down list 2952A and dropped in the waypoint input field 2952C. Multiple locations can be entered into the waypoints field 2952C. The navigation subsystem 336 will select a route to the waypoints in the order displayed in field 2952C. For example, if multiple locations are displayed in field 2952C, the location at the top of the list will be the first waypoint and the second from the top will be the second waypoint, etc. The user can change the order of the waypoints by dragging and dropping a waypoint to another location in the field 2952C.

When the driver has entered a destination in field 2952B and one or more waypoints in field 2952C, the VCS 204 can display information about the selected route in display area 2952H. The information in display area 2952H is provided by the navigation subsystem 336 using the vehicle's current location obtained from the location module 896 and data in the maps database 8100. For example, as illustrated in FIG. 29A, the VCS has determined the route including destination "client meeting" and waypoint "Starbucks™" is "18.4 miles, 45 mins travel time."

The calendar 2956 can display a list of appointments for one or more selected days. The VCS 204 can determine appointments to display in the list using profile data 252 of the user and or calendars provided by one or more the driver's communication device 212, 248, and a calendar maintained in the driver's web-mail or social media account, such as Linked-In™, Myspace™, Twitter™, YouTube™, DailyMotion™, Facebook™, Hotmail™, Yahoo Mail™, Gmail™, and/or Second Life™. The list of appointments can be displayed in any order set by the driver and can be resized. More fields can be selected for display by the user for each appointment. For example, the calendar can display a list of attendee names, attendee contact information (such as phone numbers, email addresses, and the like), and comments (for example, the agenda, items to bring, strategy, or similar information). Additionally or alternatively, a driver or other user can select an appointment displayed in the calendar 2956 to display the list of attendee names, contact information, and comments. If a user has the geographic coordinates or street address of the location of appointment, indicated by "pin" indication 2954, the user can set the location of the appointment as a destination by dragging the appointment into the destination field 2952B. Further, the driver or other user can schedule a new appointment with the calendar display 2956.

Weather information is provided in display 2960. The weather information can be the current conditions detected by external vehicle sensors 708E. Additionally or alternatively, the weather information can be current and predicted weather for the current location of the vehicle 104 or for a location entered by the user. The current and predicted weather information can be obtained by the VCS 204 using communication network 224 to contact an external server or internet site that provides weather information. Further, display area 2960 can include information about the vehicle's environment determined by the vehicle environment module 2324 which is described in more detail below.

The contacts and social networking display 2964 can display messages received and/or sent by the user. The display 2964 can include a drop down menu 2964A of all of the driver's contacts selected from the user's profile data 252, devices 212, 248, and contacts obtained from one or more social media accounts, such as Linked-In™, Myspace™, Twitter™, YouTube™, DailyMotion™, Facebook™, Hotmail™, Yahoo Mail™, Gmail™, and/or Second Life™. For example, the drop down menu 2964A can include friends, family members, business contacts, and/or other user's that have been identified by the VCS 204 as operators and passengers in the vehicle 104. The user can select one or more contacts from menu 2964A to display in contact area 2964B. Additionally or alternatively, the VCS 204 may add a contact to the contact area 2964B when the driver receives a message from or sends a message to the contact. Thus, the contact area 2964B may optionally display a list of contacts most recently contacted. Optionally, the user can enter a setting to display contacts based on an activity level and the VCS 204 would display at the top of the list the contact who the driver has sent to, or received from, the most messages. The contract area 2964B can also display an image 2964C of the contact, and an indication of the number of text 2964D, voice 2964E, and electronic 2964F messages received from the contact.

Referring now to FIG. 29B, a second representation of a graphical user interface (GUI) of console display 2812B is shown after the user has selected the MyDash icon 2948 of the first GUI in display 2812A.

The GUI of console display 2812B can be used to reconfigure the instruments and gauges displayed in the configurable dash display 2804 and/or HUD 2816. The display 2812B has been separated into two different display areas represented as an application tray area 2980A and a configuration area 2980B. The sizes of areas 2980A, 2980B can be modified by dragging a tray handle 2982 left or right. As the tray area 2980A increases in size, the displayed applications may increase in size.

The application tray 2980A may be configured to provide access to available dash display applications 2984A, 2984B, 2984C. In addition, the application tray area 2980A may display dash display applications available from an application store and/or provide a link to an application store via one or more icons 2986. Whether applications have been installed, displayed, purchased, or are available for purchase via the application store icon 2986, the various status of an application may be indicated in the application tray area 2980A. For example, if an application is installed and displayed on the console display 2812, the application icon 2984 in the application tray 2980A may appear differently from other icons that are not installed and displayed. In other words, if the icons are displayed in color to illustrate one or more state, they may appear in black and white, or grayscale, to indicate one or more other states. Therefore, given the previous example, available applications may have full color application icons, whereas installed and displayed icons may have grayscale icons. It is anticipated that various states of at least one application icon may be illustrated using various colors, intensities, transparencies, glows, shadows, and the like. New vehicle applications may be purchased and/or managed via one or more application stores accessed using the communication network 224.

The application tray area 2980A may contain various items including but not limited to folders, menu structures, pictures, and/or other icons representative of one or more configurable dash display applications. The items displayed in the tray area 2980A may reside in at least one local memory and/or reside in at least one remote memory location (e.g., the cloud). Additional applications may be accessed, purchased, and/or sampled from at least one application store via the App Store icon 2986. Once at least one application is chosen, purchased, and/or downloaded, it may be accessible from any number of folders 2984A, 2984B, 2984C, . . . , 2984N and/or as an icon displayed to the GUI of the console display 2812B. Navigation through various menu structures and/or access to additional features may be made via one or more menu function icons 2988.

The tray area 2980A and/or the configuration area 2980B of the console display 2812B may include one or more user-activated buttons, including but not limited to, a preferences icon 2990, Heads-Up Display ("HUD") icon 2992, and a save icon 2994. The preferences icon 2990 may be used to alter the manner in which content is presented to the tray area 2980A. The HUD icon 2992 may be used to change the information and gauges displayed by the HUD 2816. The save icon 2994 may be used to save one or more of the configured dash display settings to data structure 1200. Each configuration may be associated with one or more users. The functions associated with the user-activated buttons may be accessed automatically and/or in response to at least one signal sent by a processor.

The configuration area 2980B of the GUI of the console display 2812B may contain various items including but not limited to folders, menu structures, pictures, and/or other icons representative of one or more configurable dash display applications. For example, the configuration area 2980B may show a configurable display screen 2996. This configurable display screen 2996 represents the arranged GUI and the gauges and instruments 2824 displayed by the dash display 2804 and/or the HUD 2816. The configurable display screen 2996 may be used to reconfigure and add or remove gauges and instruments 2824 from the display 2804 and/or the HUD 2816. Applications representing instruments in the tray area 2980A may be dragged and dropped into place on the configurable display screen 2996 of configuration area 2980B to add the selected functionality to the dash display 2804 and/or HUD 2816. Once positioned in the configurable display screen 2996 each gauge or instrument 2824 may be adjusted according to desired user specifications. For example, the position, size, color, intensity, scale, units of display, and language of display of an instrument 2824 may be adjusted by the user. Various configurations represented by the configuration display screen 2996 may be saved by initiating a save function through a save icon 2994.

Additionally or alternatively, the units of measurement displayed by a gauge or instrument may be modified and/or changed to display in a number of given measurement systems. For example, a user may purchase a vehicle in a metric measurement country, and as such, the vehicle may display Kilometers per hour (kph) on a simulated analog gauge application, possibly as a "default" or user-programmed setting. In the event that the user wishes to enter to an imperial measurement country, the simulated analog gauge application may be modified to display in miles per hour (mph).

Simulated analog gauges and other application may display any range of units in accordance with known and/or programmed measurement systems. The dash configuration module 2308 may automatically set scales and/or adjust instruments 2824 in response to a specific input. For instance, once the vehicle reaches a speed not displayed, or approaches the upper display limit, the scale may change to accommodate the new speeds. The alert module 2348 can generate an alert to indicate a change to the display of one or more applications and/or instruments 2824. Further, as discussed above, the dash configuration module 2308 may change gauges and instruments 2824 to display units used where the vehicle is located and to add gauges and instruments required in the location as determined by the traffic law module 2316.

The console display 2812B may receive data and inputs from a number of other components of the vehicle 104. For example, an audible command of a user may be received by the audio sensors 764 to reconfigure the display 2804. As can be appreciated, the description of the console display 2812 is made for illustrative purposes only and is not limited to the specific features shown in FIGS. 28A-29B and described above. The console display 2812 can include additional features, including one or more additional buttons, slots, display areas, shapes, and/or information and instruments. Additionally, the features described above may be located in different parts of the console display 2812 and still provide similar functionality. Therefore, FIGS. 28A-29B and the description provided above are non-limiting.

After entering the second area 2712, the dash configuration module 2308 may automatically change the appearance of one or more of a configurable display 2804 and/or heads-up display 2816 and any other vehicle features and/or controls to provide information to the user appropriate to the second area 2712. In the above example, upon entering Canada, the dash configuration module 2308 may automatically change the units of the displayed speed to kilometers-per-hour (KPH) instead of miles-per-hour (MPH). Specific gauge or instrument 2824 may be hidden, deleted, or programmed to hide/disappear after start-up or some other predetermined input(s); however, the dash configuration module 2308 may prevent certain gauge or instrument from being hidden/deleted. Preventing the hiding of gauge or instrument may depend on country, federal, state, local, or other laws and data stored in the traffic law module 2316 and updated with information from the server. For example, the dash configuration module 2308 may determine that in the second area certain gauges or instruments 2824 must be shown at all times.

In the event that a user has customized a dashboard, and the vehicle 104 crosses a defined legal boundary 2704 (like a state or country border) into the second area 2712 the current location of the vehicle will define the laws to which the vehicle and associated devices and capabilities must adhere. The original, and other, configuration preferences of the user may be stored in portions 1224, 1238 of data structure 1200. Once the vehicle 104 returns to the first area 2708 that allows the preset configuration preferences, the dash configuration module 2308 can access the stored preferences in portions 1224, 1238 for a user and may return the dashboard to the preset configuration. The specific geographical location laws can be preprogrammed into the traffic law module 2316 and/or retrieved from a communication device with which the vehicle communicates, whether the communication device is on-board or remotely located from the vehicle.

Additionally or alternatively, any of the changes to the display 2804 and/or HUD 2816 may be accompanied by an alert from the alert module 2348 and/or an information display to a user. As can be appreciated, travelling across different legal boundaries and/or geographical locations, where certain instruments may be required and consequently appear and disappear from a dashboard may cause confusion to a user. The dash configuration module 2308 can provide an indication to the user that a specific instrument is required in the given location and/or area. For example, the user may receive a notification from the one or more modules of the VCS 204 upon crossing a legal boundary 2704. Additionally or alternatively, instruments required and added to one or more of displays 2804 and 2816 can include an indication that the instrument is a required instrument in the area in which the vehicle 104 is located. For example, if the traffic law module 2316 determines the second area requires an odometer to be a part of the displays 2804 or 2816, the dash configuration module 2308 can display the odometer on the display 2804 and/or the HUD 2816 with a highlighted or otherwise emphasized "X" marker to identify the requirement and the jurisdiction. It should be understood that this is just one example and other signs or indications can be used to indicate to a user that an instrument is required to be displayed.

Capabilities of the display 2804, console display 2812, or HUD 2816 may be enabled or disabled based on vehicle location. For example, communication modes, such as texting, tweeting, email, calling and the like, may be enabled or disabled based on vehicle location as determined by the traffic law module 2316. Vehicle location may be mapped against applicable laws of a governmental entity, such as a city, municipality, county, province, state, country, and the like.

In some areas of the World (e.g., Africa), one country may drive on the left-hand side of the road, while another neighboring country may drive on the right-hand side. Upon approaching, or after passing, a border crossing 2704 from a first area 2708 to a second area 2712, this critical information may be presented to a driver via one or more of the display 2804, console display 2812, or HUD 2816. In addition, the alert module 2348 can generate and present an alert to warn the user if the traffic law module 2316 determines that the user is driving on the wrong side of the road. The alert can be an audible alert (i.e., "You are driving on the wrong side of the road"), haptic feedback (such as vibrating the steering wheel, tugging the driver's seatbelt, and/or vibrating the driver's seat) or a message in one or more of displays 212, 248, 882, 2804, 2812, and 2816. The alert can be retrieved from portion 1286 of data structure 1200. Alternately or in addition, the VCS 204 can activate the automobile controller 8104 to take control of the vehicle 104 from the user and steer the vehicle 204 to the correct side of the road.

Figure 30:
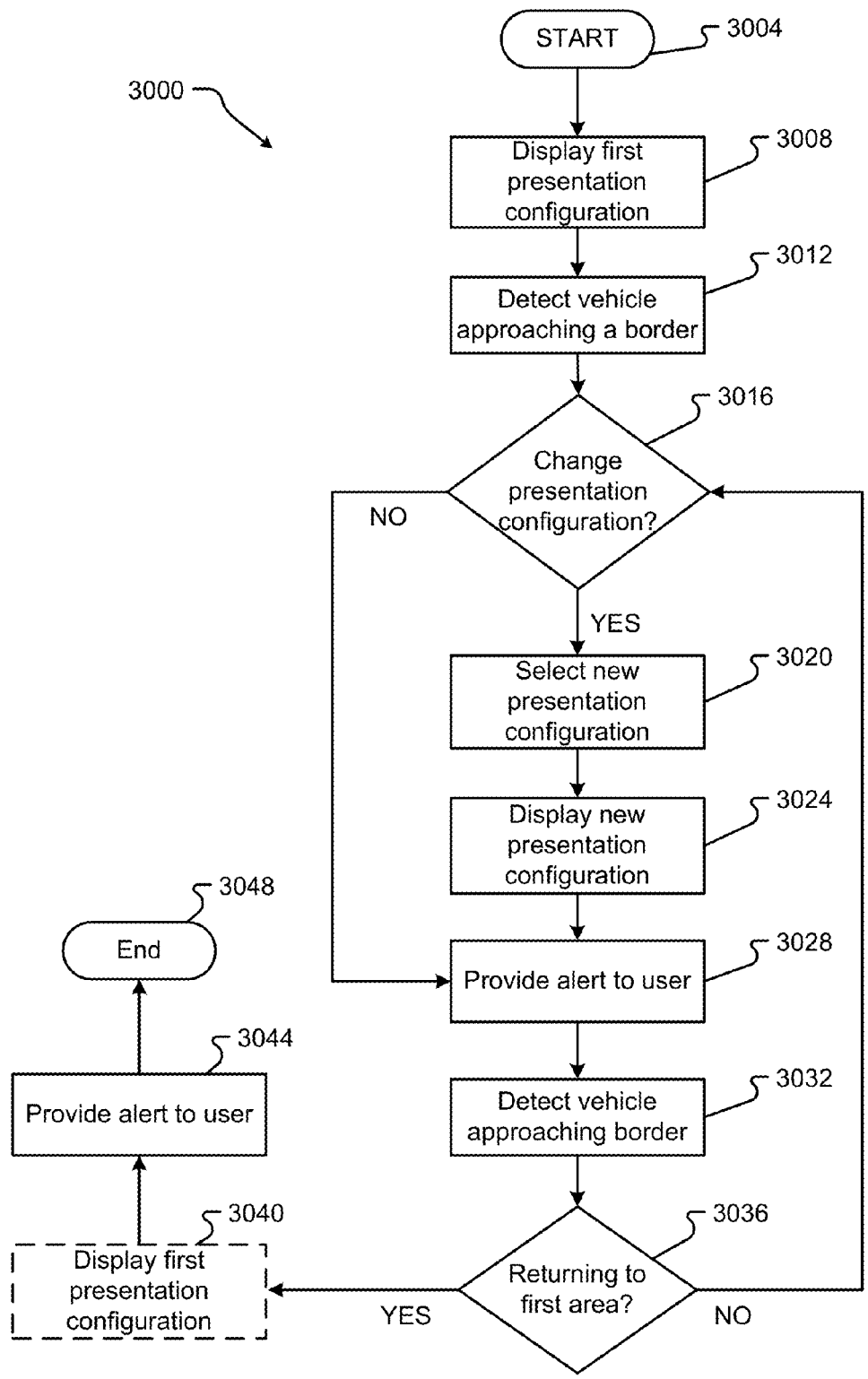
FIG. 30 is a flow or process diagram of a method of configuring a display of a vehicle based on a location of the vehicle.

Referring to FIG. 30, a flow diagram depicting a method 3000 for automatically configuring a configurable display 2804 and/or a HUD 2816 based on a location of the vehicle 104 is shown in accordance with embodiments of the present disclosure. While a general order for the steps of the method 3000 is shown in FIG. 30, the method 3000 can include more or fewer steps or can arrange the order of the steps differently than those shown in FIG. 30. Generally, the method 3000 starts with a start operation 3004 and ends with an end operation 3048. The method 3000 can be executed as a set of computer-executable instructions executed by a computer system and encoded or stored on a computer readable medium. Hereinafter, the method 3000 shall be explained with reference to the systems, components, modules, software, data structures, user interfaces, etc. described in conjunction with FIGS. 1-29.

The dash configuration module 2308 may be displaying one or more of the configurable dash display 2804 and/or the HUD 2816 with one or more instruments or gauges 2824 in a first presentation configuration while the vehicle is in the first area 2708 in step 3008. Method 3000 continues when the VCS 204 detects that the vehicle 104 is approaching a border 2704 of a second area 2712 (step 3012). The border 2704 can be any legal boundary separating legal jurisdictions of any type. For example, the border can be the boundary between two countries or a boundary between different legal jurisdictions within one country such as a state line, a county line, a city limit, a park boundary of an area administered by a Federal entity (such as a Federal park or Federal wilderness area), or an area administered by a tribal entity (such as a tribal reservation administered by tribal authorities). The traffic law module 2316 can detect that the vehicle is approaching the border 2704 using data from the location module 896 of the navigation subsystem 336 as described above and/or by information from one or more sensors of the vehicle. Additionally or alternatively, the traffic law module 2316 can detect that the vehicle will cross the border 2704 and enter the second area when a driver or other user of the vehicle 104 enters a destination (using destination input field 2952B) within the second area into the vehicle control system. After detecting that the vehicle is approaching the border 2704, the method 3000 proceeds to step 3016.

In step 3016, as the vehicle approaches the border 2704, the traffic law module 2316 can determine the traffic law and vehicle instrument requirements of the second area 2712. The traffic law module 2316 includes traffic laws, legal requirements, regulations, and motor vehicle requirements for a plurality of different areas and legal jurisdictions. The traffic law module can also include best practices, proficiency levels, and the like.

If necessary, the traffic law module 2316 can retrieve traffic laws and regulations for the second area from a server. The traffic law module 2316 can also determine if the second area 2712 uses different units of measure and if display of those units of measurement is required. After reviewing the traffic laws and regulations, vehicle instruments requirements, and units of measure of the second area, the traffic law module 2316 can determine if one or more of the displays 2804, 2816 need to be reconfigured to comply with laws or regulations of the second area 2712. If the displays 2804, 2816 do not need to be reconfigured in the second area 2712, method 3000 proceeds NO to step 3028 and the displays continue to display the first presentation configuration. If displays 2804, 2816 require reconfiguration, method 3000 proceeds YES to step 3020.

At step 3020, the dash configuration module 2308 selects one or more required instruments and/or gauges to display in a new presentation configuration on one or more of the displays 2804, 2816. The dash configuration module 2308 may also change the units of measure of the instruments and gauges displayed in the new presentation layout, for example from MPH to KPH. The new display presentation configuration may be selected by the dash configuration module 2308 based on information received from the traffic law module 2316. Additionally or alternatively, the new presentation configuration may be selected from a plurality of preconfigured dash configurations saved in system data 208, stored data 232, and/or the dash configuration module 2308 for a plurality of States, Countries, and/or areas.

When the vehicle 104A crosses the border 2704 into the second area 2712, the dash configuration module 2308 sends commands to the display controller 840 to reconfigure the displays 2804, 2816 in the new presentation layout in step 3024. Additionally, the dash configuration module 2308 can send commands to reconfigure one or more other displays 212, 248, 882, and/or 2812 if the traffic law module 2316 determines the reconfiguration is required in the second area. For example, FIG. 28B illustrates displays 2804, 2816 in a first presentation configuration. FIG. 28C illustrates displays 2804, 2816 in a second presentation configuration which includes instruments 2824A, 2824B selected for display by the dash configuration module 2308 to comply with traffic law and/or regulations of the second area as determined by the traffic law module 2316.

The alert module 2348 can generate and present an alert as the vehicle approaches or crosses the border 2704 in step 3028. The alert can be an audio message using a speaker 880 or a text or graphical message on one or more of displays 2804, 2812, 2816. Additionally or alternatively, the alert can be sent to a communication device 212, 248 or a computer system of a user that is not within the vehicle. For example, a first user who is a vehicle owner may create a profile setting to receive alerts associated with the vehicle crossing a border when the vehicle is driven by a second user. Continuing this example, the first user can request to receive the alerts when the vehicle driven by the second user crosses one or more types of border. Thus, the first user could receive the alert when the second user crosses a border comprising one or more of a city limit, a county line, a state line, an international border, a park boundary, a tribal boundary, and the like.

The alert can be retrieved from portion 1286 of data structure 1200. As will be appreciated, the alert can include information about the second area 2712 retrieved by the traffic law module 2316. The alert module 2348 can include information in the alert about traffic laws that are different in the second area and, if the traffic law module 2316 has identified instruments/gauges that are required in the second, information about the required instruments/gauges. Information about restrictions (such as limitations on the use of mobile devices 212, 248 by an operator of a vehicle, consumption of alcohol, etc.) and traffic laws (such as no right turn on a red traffic light) may also be included in the alert.

A user may drive the vehicle 104 from the first area 2708 to the second area 2712 and may turn off the vehicle 104 while in the second area 2712. Optionally, the alert module 2348 can repeat the alert every time the vehicle 104 is restarted as long as the vehicle remains in the second area. When the vehicle 104 is re-started, the traffic law module 2316 can recall from memory 308 and/or the navigation subsystem 336 that the vehicle is in the second area and that different traffic laws apply while the vehicle is operated in the second area 2712. The alert module 2348 can then repeat the alert to the user 216 to remind the user that different traffic laws apply within the second area 2712.

When, for example, in the first area 2708 vehicles are driven on the right side of a road and in the second area 2712 vehicles are driven on the left side of the road, the alert can include an audible warning to the driven. The alert can be retrieved from portion 1286 of data structure 1200 and/or from the traffic law module 2316. Alternatively or in addition, the alert module 2348 can repeat the warning if the traffic law module 2316 detects user 216 is driving on the wrong side of the road, for example after the user 216 makes a turn in the vehicle 104. The traffic law module 2316 can detect the vehicle is being driven on the wrong side of the road using information from external camera sensors 760E in conjunction with position data received from the navigation subsystem 336. If the user does not respond to the warning that the vehicle is being operated on the wrong side of the road, the vehicle control system can use the automobile controller 8104 to take control of the vehicle 104 from the user and steer the vehicle 204 to the correct side of the road or otherwise move the vehicle 104 to a safe location.

The method 3000 may continue by the traffic law module 2316 detecting the vehicle is approaching another border at step 3032. In step 3036, the traffic law module 2316 can determine if the vehicle is returning to the first area 2708 or approaching another area. If the vehicle 104 is not returning to the first area 2708, the method 3000 returns NO to step 3016. If the vehicle 104 is returning to the first area 2708, the method 3000 continues YES to optional step 3040.

In step 3040, the dash configuration module 2308 sends commands to the display controller 840 to reconfigure the displays 2804, 2816 in the first presentation configuration, if necessary, when the vehicle crosses the border 2704 and returns to the first area 2708. Thus, the dash configuration module 2308 can return the displays 2804, 2816 to the first presentation configuration illustrated in FIG. 28B. The method 3000 continues and the alert module 2348 presents an alert to the user that the vehicle is in the first area in step 3044. The method 3000 then proceeds to end 3048.

Figure 31:
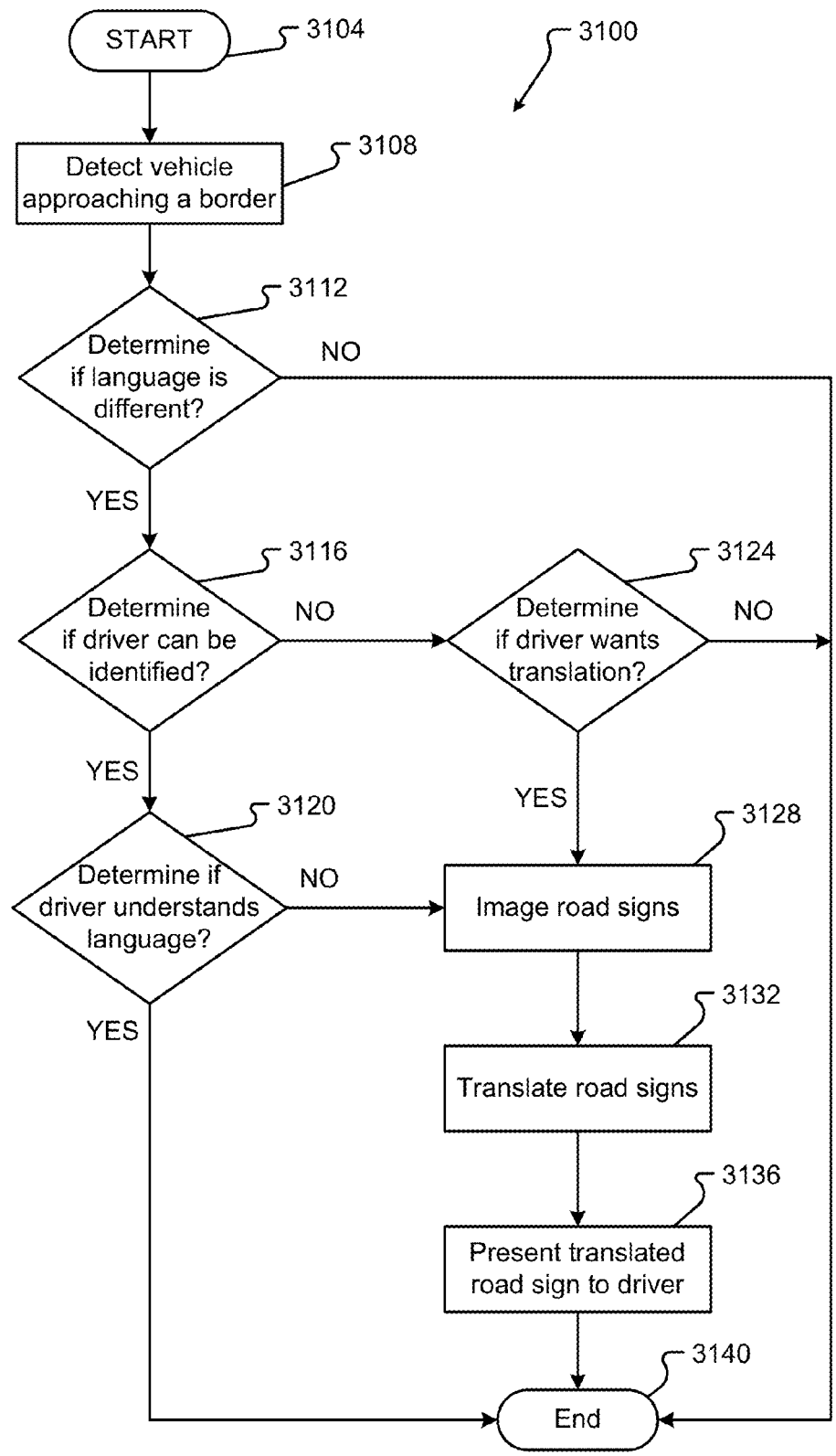
FIG. 31 is a flow or process diagram of a method of imaging and translating traffic signs.

Referring to FIG. 31, a flow diagram depicting a method 3100 for translating traffic signs by a traffic sign translation module 2320 is shown in accordance with embodiments of the present disclosure. While a general order for the steps of the method 3100 is shown in FIG. 31, the method 3100 can include more or fewer steps or can arrange the order of the steps differently than those shown in FIG. 31. Generally, the method 3100 starts with a start operation 3104 and ends with an end operation 3140. The method 3100 can be executed as a set of computer-executable instructions executed by a computer system and encoded or stored on a computer readable medium. Hereinafter, the method 3100 shall be explained with reference to the systems, components, modules, software, data structures, user interfaces, etc. described in conjunction with FIGS. 1-30.

At step 3108, the traffic law module 2316 detects that the vehicle 104 is approaching a border 2704 of a second area 2712. As described above, the border 2704 can be any legal boundary separating legal jurisdictions of any type. The traffic law module 2316 can detect that the vehicle is approaching the border 2704 using data from the location module 896 of the navigation subsystem 336 or when the driver or other user of the vehicle enters a destination within the second area into the navigation subsystem of the VCS 204. After detecting that the vehicle is approaching the border 2704, the method 3100 proceeds to step 3112. In addition or alternatively, step 3108 may be repeated when the vehicle is started within a second area.

In step 3112, as the vehicle approaches the border 2704, or when a vehicle is restarted within a second area, the traffic sign translation module 2320 can determine if the language of the second area is different than the language of the first area. The traffic sign translation module 2320 can determine the language used in the second area 2712 by reviewing information stored in memory. The traffic sign translation module 2320 includes information about the languages used in a plurality of different areas. If necessary, the traffic sign translation module 2320 can receive updated information from a server connected to the internet by using communication network 224. If the traffic sign translation module 2320 determines the language of the second area is the same as the language of the first area, method 3100 proceeds NO to END, step 3140. If the language of the second area is different than the language of the first area, method 3100 proceeds YES to step 3116. Optionally, step 3112 may be repeated every time the vehicle 104 is restarted while the vehicle is in the second area.

At step 3116, the VCS 204 can determine if the driver can be identified. The VCS 204 can identify the driver as described above in conjunction with FIGS. 13-18. For example, the vehicle control system can receive information from the sensors 242 and use that information to search the database 1200 that may be stored within system data 208. The sensor data may be compared to ID characteristics 1212 to determine if the driver has already been identified. If the driver has been previously identified, and their characteristics are stored in portion 1212, method 3100 proceeds YES to step 3120. If the driver has not been identified previous, method 3100 proceeds NO to step 3124.

At step 3120, the traffic sign translation module 2320 determines if the driver understands the language of the second area. The traffic sign translation module 2320 can receive profile information 1238 from data structure 1200 for the driver to determine if the driver has registered the second language of the second area as a language the driver understands. If the driver has registered and understands the language of the second area, method 3100 proceeds YES to END, step 3140. If the driver has not registered the language of the second area, method 3100 proceeds NO to step 3128.

In step 3124, the traffic sign translation module 2320 can determine if the unidentified driver wants the traffic sign translation module 2320 to translate traffic signs while the vehicle 104 is in the second area. For example, the alert module 2348 can generate and present an alert to the driver that the language of the second area is different than the language of the first area. The traffic sign translation module 2320 can ask the driver in an alert if the driver wants the traffic sign translation module 2320 to translate the traffic signs in the second area. The alert can be a text message presented by one or more of displays 212, 248, 882, 2804, 2812, and 2816, or an audible message presented by speakers 880. The alert can be retrieved from portion 1286 of data structure 1200 and/or from or generated by the traffic sign translation module 2320. If the driver indicates the traffic sign translation module 2320 should translate the traffic signs, method 3100 proceeds YES to step 3128. The indication can be one or more of a gesture input, and touch input to displays 212, 248, 882, 2804, 2812, or 2816, or a voice command. If the driver indicates that the traffic sign translation module 2320 should not translate the traffic signs, method 3100 proceeds NO to END, step 3140

In step 3128, the traffic sign translation module 2320 can use exterior cameras 760E and/or other sensors 708E to image road signs. The cameras 760E and sensors 708E can image traffic signs place along, beside or above a road on which the vehicle 104 is operating. After a road sign is imaged, the traffic sign translation module 2320 initiates character recognition and a text reader (or other text-to-speech program) to recognize the text on the road sign in step 3132. The text reader is a software application that attempts to identify and interpret the text in the image of the road sign. The text reader can translate the text of the road sign into the language the driver has registered in profile portion 1238 using the language database 836 or optionally, into the language of the first area. Additionally or alternatively, the traffic sign translation module 2320 can use one or more characteristics of a traffic sign to translate the sign. For example, traffic signs convey information to vehicle operators not only by their messages, but also by the color and shape of the sign. Certain signs have special shapes designed to allow quick recognition and response by a vehicle operator. For example, signs with a larger number of sides generally include a more critical message than signs with less sides. However, a user from a first area operating the vehicle in the second area may not be familiar with either the language or the standard shapes and colors of the signs in the second area. The traffic sign translation module 2320 can compare the shape and color of a traffic sign with the standard shapes and color of signs in the second area. The traffic sign translation module 2320 can use communication network 224 to connect to external databases, if necessary, to obtain updated information about traffic signs used in a plurality of different areas.

After translating the text of the sign, in step 3136 the traffic sign translation module 2320 can present the translated text of the road sign as an audible message using the speech synthesis module 820 and one or more of the speakers 880, or as text using one or more of the displays 212, 248, 882, 2804, 2812, or 2816. Optionally, if the vehicle ignition is shut down and then restarted in the second area the traffic sign translation module 2320 will repeat steps 3128-3136 as long as the vehicle remains in the second area.

Additionally or alternatively, a user can store a setting in portion 1224 of data structure 1200 to activate the traffic sign translation module 2320 whenever the user is operating the vehicle 104. Thus, even when the user understands the language of the area in which the vehicle is operating, the traffic sign translation module 2320 can image traffic signs and present the information to the user. This feature is useful in many situations, such as when a user is operating a vehicle in an unfamiliar location within the same area, during periods of low or diminished visibility, or when operating the vehicle in a congested urban environment with many traffic signs. The user can also set the traffic sign translation module 2320 to only provide information about certain traffic signs. Thus, the user could create a setting in portion 1224 directing the traffic sign translation module 2320 to only provide text or warnings of critical road signs, such as "stop," "yield," "school zone," "detour," but not provide the text or information from less important road signs such as mileage signs, street names, and the like.

Figure 32:
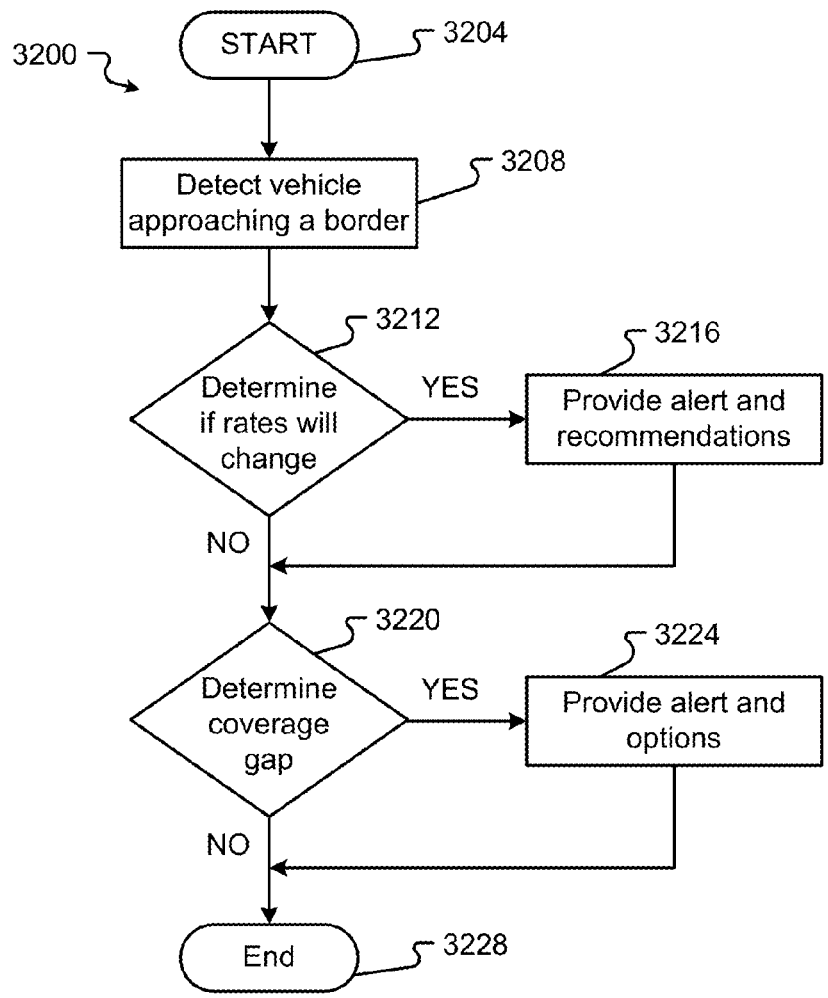
FIG. 32 is a flow or process diagram of a method of determining communication network rate changes and coverage gaps.

Referring to FIG. 32, a flow diagram depicting a method 3200 for determining communication network 224 rate changes and coverage gaps by the network monitoring module 2312 is shown in accordance with embodiments of the present disclosure. While a general order for the steps of the method 3200 is shown in FIG. 32, the method 3200 can include more or fewer steps or can arrange the order of the steps differently than those shown in FIG. 32. Generally, the method 3200 starts with a start operation 3204 and ends with an end operation 3228. The method 3200 can be executed as a set of computer-executable instructions executed by a computer system and encoded or stored on a computer readable medium. Hereinafter, the method 3200 shall be explained with reference to the systems, components, modules, software, data structures, user interfaces, etc. described in conjunction with FIGS. 1-31.

In step 3208 the network monitoring module 2312 detects that the vehicle 104 is approaching a border 2704 of a second area 2712. The border 2704 can be any boundary where data or voice rates of a communication network service provider will change and/or be disrupted or unavailable. For example, the border may represent an edge of a voice or data coverage area or a tunnel in which the service provider has not installed repeaters or antennas. In addition, the border 2704 can represent a border of a second area 2712 where a new communication network 224D, that is not available in the first area 2708, is accessible and available. The border 2704 may also be a border between two countries indicating that an international data/voice rate may apply when the vehicle is in the second area. The communication network monitoring module 2312 of the VCS 204 can review information about coverage areas, voice rates, and data rates based on the position of the vehicle determined by the location module 896. Additionally or alternatively, the network monitoring module 2312 can contact communication network providers of networks 224-224N using communication network 224 and/or access data storage and/or servers 228 of the communication network providers to obtain up-to-date maps of coverage areas and information on rate changes for communication networks 224-224N. The network monitoring module 2312 can detect that the vehicle is approaching the border 2704 using data from the location module 896 of the navigation subsystem 336 as described above. Additionally or alternatively, the network monitoring module 2312 can detect the border 2704 by receiving notification of rate changes or a coverage gap provided by the communication network providers. The data provider can send the alert to the vehicle after determining the location of the vehicle when the vehicle establishes a connection using communication network 224.

After detecting that the vehicle is approaching the border 2704, the method 3200 proceeds to step 3212 and the communication network monitoring module 2312 can determine if at least one of data and voice rates will change in the second area. The communication network monitoring module 2312 can determine the rate will change by comparing the communication rates between the first and second areas for a communication network 224. The communication network monitoring module 2312 can further determine if alternate communication networks 224A-224N are available in the second area. The communication network monitoring module 2312 uses the communication network 224 to access information about alternate data and voice providers in the second area. The information may be obtained from a server 228 or obtained from the communication network providers. The communication network monitoring module 2312 can also determine if a new communication network 224D available in the second area will provide better service or better rates. If the communication network monitoring module 2312 determines the rate will change in the second area, or that other communication networks provide better rates or better service in the second area, method 3200 proceeds YES to step 3216. If the rate or service will not change in the second area, method 3200 proceeds NO to step 3220.

In step 3216, the alert module 2348 can provide an alert to the user that communication network rates will change when the vehicle 104 enters the second area and provide recommendations for minimizing costs. The alert can include information about the change in communication rates such as in "per minute rates" or a change in "data rates" of usage in the second area. The recommendation may include information of how to maximize voice and data usage (or how to minimize costs) by providing recommendations on SIM cards that can be purchased, installed, and/or activated, and identifying the rate charged per unit of time for a voice call or to transmit a unit of data (such as 1 Mb, 1 Gb, etc.). If there are alternate communication networks available in the second area, the recommendation may also include comparisons of rates a plurality of communication networks 224C-224N that are available that the user can select. If the user selects an alternate communication network, the communication network monitoring module 2312 can instruct the communication module 1052 to terminate use of a currently accessed communication network and initiate use of the selected communication network.

At step 3220, the communication network monitoring module 2312 can determine if there is a coverage gap by measuring and analyzing communication network performance, by coverage maps provided by communication network providers, by alerts of coverage gaps or degradation provided by communication network provider, and/or receiving analysis of communication networks 224-224N from an external database. For example, during analysis of a current communication network 224, the communication network monitoring module 2312 can detect a deficient level of performance. The deficient level of performance can be determined by one or more selected factors of: (1) communication network speed, which can be indicated by maximum path speed, relative path speed, idle latency (packet round trip time), and delay; (2) current or anticipated or guaranteed user requirements; (3) required bit rate; (4) communication network reliability, which can be indicated by jitter or packet loss, packet dropping probability, out-of-order delivery, and/or bit error rate; (5) communication network performance; (6) communication network bandwidth; (7) throughput; (8) data transmission cost, which can be indicated by CPU usage, compressed or uncompressed data size or quantity to be communicated over the communication network, user communication network access terms and conditions with the communication network operator, whether or not encryption is to be employed, the number of hops from the vehicle 104 to destination or source node, and type of data to be communicated; and (9) exceeding or falling below (as appropriate) one or more suitable thresholds.

If necessary, the communication network monitoring module 2312 can collect and provide analysis information for each available communication network 224C-224N. The communication network monitoring module 2312 evaluates the communication networks as described above by known techniques to determine which communication networks are currently accessible by the vehicle 104. The communication network monitoring module 2312 then collects and determines communication network information, for each of the plurality of accessible, available communication networks 224C-224N, using one or more of the techniques described above.

Additionally or alternatively, the communication network monitoring module 2312 can determine a coverage gap or degradation exists by analyzing information collected on communication networks 224-224N. For example, the communication network monitoring module 2312 can determine currently available bandwidth and/or throughput for each available and accessible communication networks 224-224N when the vehicle is in the first area 2708. The communication network monitoring module 2312 can then determine likely bandwidth requirements for a currently user initiated application or other transaction. The communication network monitoring module 2312 can then compare the currently available bandwidth and/or throughput for networks 224-224N and determine that communication networks 224, 224A, 224B are not suitable communication networks based on the likely bandwidth and/or throughput requirements. Thus, the communication network monitoring module 2312 can determine that a coverage gap exists although communication networks 224-224B may be accessible. The communication network monitoring module 2312 can also consider, one or more other factors, in lieu of or addition to bandwidth and/or throughput requirement(s), to determine that a network gap or degradation exists (or will exist). Such requirement(s) include one or more of data transmission speed required for adequate performance, communication network reliability required for adequate performance (e.g., video link, audio link, etc.), total communication network resources consumed or to be consumed by the transaction and/or the application or service executing the transaction, communication network performance, and communication network data usage cost per unit. The communication network monitoring module 2312 can also, or alternatively, consider one or more of communication network speed, including without limitation current or anticipated or guaranteed user requirements, required bit rate, and data transmission cost.

In addition, the communication network monitoring module 2312 can determine if an alternate communication networks are available in the second area to bridge the gap in service and/or that meet communication requirements. For example, the communication network monitoring module 2312 can review communication network provider coverage maps of a plurality of communication networks 224-224N stored in the communication network monitoring module 2312. Additionally or alternatively, the communication network monitoring module 2312 may use one or more sensors 340 to determine alternate and accessible communication networks 224C-224N. For example, a wireless signal receiver may detect a WiFi access point that is available. Further, the communication network monitoring module 2312 may determine that a communication hotpoint provided by another vehicle is accessible. If the communication network monitoring module 2312 determines there is a coverage gap, method 3200 proceeds YES to step 3224. If there is no coverage gap, the method proceeds NO to END 3328.

In step 3224, the alert module 2348 can provide an alert to the user that the communication network monitoring module 2312 has detected a coverage gap and provide recommendations to the user. The alert can include information about the nature of the gap and may be an audible alert generated by the speech synthesis module 820. For example, the alert module 2348 can use the speech synthesis module and speakers 880 to provide an audible alert, such as "Loss of communication network ABC in 5 minutes while in the 'Tip O'Neal' tunnel." In addition, if the communication network monitoring module 2312 determined in step 3220 that alternate communication networks 224C-224N are accessible and available in the tunnel, the communication network monitoring module 2312 can make a recommendation to the user to switch to one of the alternate communication networks 224C-224N. For example, the recommendation could be "Communication network ABC is available in the 'Tip O'Neal' tunnel." If the user selects an alternate communication network 224N, the communication network monitoring module 2312 instructs the communication module 1052 to terminate use communication network 224 currently used in the first area 2708 and initiate use of the selected communication network 224N.

Alternatively, in step 3224, the communication network monitoring module 2312, based on analysis of communication networks and/or information provided by the communication network providers, and applying appropriate predetermined rules, can select, without user input, an alternate communication network 224N from among the plurality of compatible, accessible communication networks 224C-224N.

Additionally or alternatively, after the coverage gap ends, the communication network monitoring module 2312 can automatically switch back to the original network 224. Method 3300 can then proceed to END 3228.

Control of Vehicle Features Based on Weather and Location Data

Figure 33:
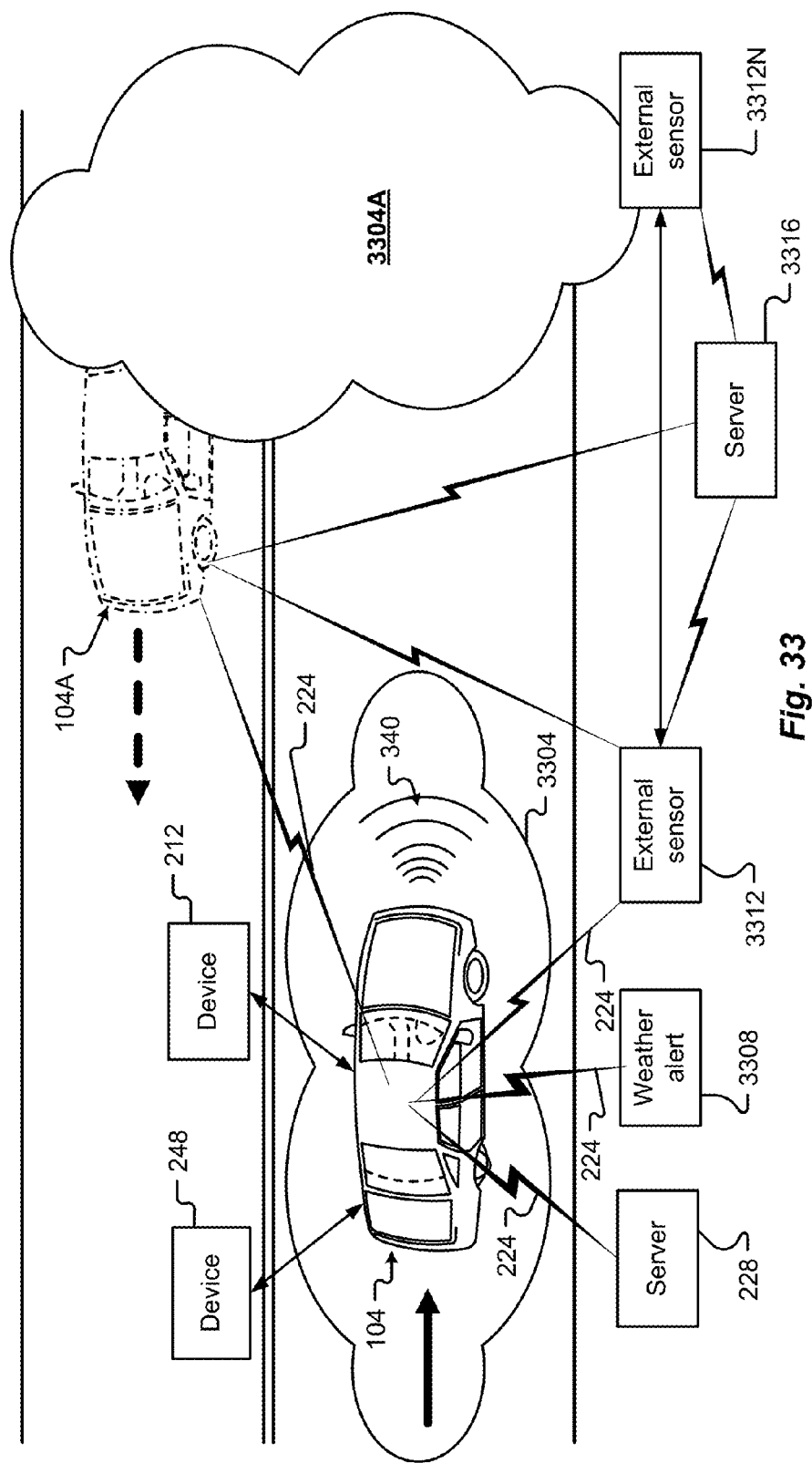
FIG. 33 depicts an embodiment of the operation of a vehicle environment monitoring module.

As illustrated in FIG. 33, the vehicle environment monitoring module (VEMM) 2324 can determine various operating environments 3304 in which the vehicle 104 is operating or will be operating. The operating environments can include low visibility (i.e., rain, fog, dust, smoke and/or snow), low traction (for example water, ice, snow, and/or loose material on the road surface), high temperature, low temperature, obstructed road (such as a vehicle stopped in the road), high wind environments, and/or other environments that may affect the vehicle or occupants within the vehicle. If the VEMM 2324 determines the operating environment of the vehicle meets predetermined rules, the VEMM 2324 can determine an appropriate response for the VCS 204 to perform. The VEMM 2324 can receive and analyze all available information from sensors of the sensor subsystem 340 as well as information from networks 224, communication devices 212, 248, and other vehicles 104A. The VEMM 2324 can monitor the operating environment when the vehicle is stationary or parked, and can operate when the vehicle ignition is off. Optionally, the VEMM 2324 can be a computer system as described above in conjunction with FIG. 21A.

The VEMM 2324 can include, but is not limited, a rules module 2328. The VEMM 2324 communicates with other components of the vehicle control environment 300 over the bus 356. The rules module 2328 can include default rules and/or rules configured by the user and may include instructions on detecting and assessing an environmental condition. The processor 304 can compare inputs received from sensors and other sources to the rules to determine if a predetermined operating environment exists and can then use the rules to classify the severity of the operating environment. The rules can be threshold based, with a score, rank, and/or likelihood or probability in excess of a selected threshold meaning an environmental condition exists. A composite scoring algorithm can be included in the rules, with one or more factors or requirements being given a higher weighting than other requirements. One or more of a coefficient of friction of the road, water on the road, ice on the road, temperature of the road surface, wind speed, visibility level, and/or road obstructions could be weighted higher than another of the coefficient of friction of the road, water on the road, ice on the road, temperature of the road surface, wind speed, visibility level, and/or road obstructions. Different sensors can receive a higher or lower importance by the rules when determining the presence of an environmental condition. For example, a humidity level may be considered less important than a visibility level. In one implementation, the rules may require the presence require input from two or more difference sensors before one of the operating environments is determined to exist. The rules may also require multiple different sensors to indicate the presence of certain operating environments. For example, a low temperature reading may not indicate the presence of ice on the road if a low humidity level is detected combined with a lack of wheel slip. In another implementation, the VEMM 2324 can determine an operating environment exists upon receiving input from only one sensor. For example, a low visibility operating environment may be determined with only input from one sensors, such as one of LIDAR and a camera.

The rules may also consider the number of sensors and type of sensor data when determining a severity level of an operating environment. For example, if only one sensor indicates water or ice on the road, but other sensors provide negative readings or information indicating there is no ice or water on the road, the rules may provide for determining a low traction environment exists, but classify the severity as low. If more sensors or certain higher rated sensors provide the indication of ice or water on the road, the severity level may be increased.

The rules module can include instructions which define responses for the VCS 204 to take based on the operating environment of the vehicle 104. Additionally or alternatively, the rules module 2328 can include instructions that cause the alert module 2348 to provide alerts to the user or take control of one or more vehicle functions.

The VEMM 2324 can evaluate the operating environment 3304 of the vehicle 104 using information from both vehicle sensors 242 and non-vehicle sensors 236 that are in communication with the vehicle 104. For example, the VEMM 2324 can receive and evaluate weather data from exterior sensors 708E, including but not limited to temperature 728E, moisture 732E, light 736, wind speed, and other sensors. The VEMM 2324 can also measure vehicle yaw and lateral acceleration of the vehicle and brake assist sensors to detect braking responsiveness which may indicate a condition of the road surface. The VEMM may also incorporate artificial intelligence, fuzzy logic, and the like, to provide learning and dynamic reasoning behavior to evaluate the operating environment in addition to the basic functionality discussed above.

The VEMM 2324 can use communication network 224 to access and receive weather information and road condition information from external networks connected to the internet. For example, the VEMM 2324 can launch and receive information from one or more weather applications provided by internet web sites (including, for example, WeatherBug, AccuWeather, Yahoo! Weather, the Weather Channel, Minutely by Ourcast, and applications from other sites), and/or traffic applications (i.e., Sigalert.com; Waze Social GPS, Maps and Traffic; Beat the Traffic Plus+; Mapquest; Google Maps; INRIX® Traffic Maps, Routes, and Alerts; iTraffic; PD Maps Worldwide Edition; Twitraffic; and the like).

The VEMM 2324 can also receive broadcast weather alerts from a weather agency 3308 (such as weather service emergency broadcasts by radio and television stations) by communication network 224, and/or information from communication devices 212, 248 of users within the vehicle 104. Further, the VEMM 2324 can automatically receive updated data for the maps database 8100 using network 224 to connect to server 228. Updated map data can include time specific updates including weather conditions and road conditions, including observations and data provided by a plurality of other vehicles 104A-104N. The VEMM 2324 can receive and evaluate the updated map data from the maps database 8100.

One or more of the sensors 242 of the sensor subsystem 340 may also provide data that the VEMM 2324 can use to evaluate the operating environment 3304 of the vehicle. For example, the wheel state sensor 660 can detect wheel slip which may indicate water, ice, snow, and/or loose objects on the road surface. The force sensor 768 can detect the force of wind on the vehicle and may indicate a dangerous cross-wind situation. One or more ranging sensors (e.g., radar, lidar, ladar, etc.) of the sensor subsystem 340 may detect decreased sensor range and/or signal characteristics caused by environmental conditions such as rain, fog, dust, smoke and/or snow. Light/photo sensors 736E may detect a diminished light level consistent with a low visibility environment. Further, the VEMM 2324 can process of images provided by external camera sensors 760E for data characteristic of low visibility.

Additionally or alternatively, the vehicle may receive information from other vehicles 104A using communication network 224 for vehicle-to-vehicle connections using Bluetooth®, WiFi, a near-field communications methods, or any other communication system or communication modality. For example, a second vehicle 104A travelling in the opposite direction may provide information from the second vehicle's sensors about the operating environment 3304A that the second vehicle 104A just left and that the vehicle 104 is travelling toward. The information can include the second vehicle's determination of the severity of the environmental condition 3304A.

Further, one or more non-vehicle sensors 236, such as external sensors 3312, can provide information that the VEMM 2324 can receive and evaluate. Sensors 3312 may be embedded in the road or be located around or adjacent to the road (such as on buildings, overpasses, posts, and signs). The sensors 3312 may provide information to the vehicle 104 using any communication network 224, including, but not limited Bluetooth®, WiFi, microwave, or an infrared communication system using any other communication system or communication modality. External sensors 3312 may indicate water or ice on the road and/or obstructions in the road. For example, the external sensors 3312 could provide information that a vehicle is stalled or traffic is stopped on the road in area 3304A. Further, a plurality of sensors 3312-3312N can be networked together and also communicate with a server 3316. The server 3316 may receive information from the sensors 3312-3312N as well as other vehicles 104A. Further, server 3316 may be operated by a governmental entity (such as a local road authority, city government, and the like) or a private entity (for example, a toll road authority, government contractor, and a private property owner among others). The server 3316 may receive information about operating environment 3304A and pass the information to sensor 3312 which can send the information to the vehicle 104 using any type of communication network 224, communication system, or communication modality. As will be appreciated, the server 3316 and/or the sensors 3312-3312N may include a computing system operable to conduct the operations as described above.

The VEMM 2324 evaluates the data received and can determine the existence of different types of operating environments, including but not limited to low traction, low visibility, high temperature, cold temperature, high winds, objects in road, etc.

After detecting at least one environmental condition, the VEMM 2324 can classify the severity of the environmental condition using the rules and/or templates stored in the rules module 2328. In one example, the severity can be divided into low, medium, and high. A low severity environmental condition may cause the VEMM 2324 to determine that the alert module 2348 should provide an alert to the driver and/or other users. The alert can include information about the type and severity of the environmental condition and recommended actions the driver can take to minimize risk. The alert can be retrieved from portion 1286 of data structure 1200 and/or produced or retrieved from the VEMM 2324.

The alerts can include, but are not limited to, one or more of a maximum safe speed to drive (i.e., "Maximum speed 45 MPH," "Maximum speed 35 MPH," "Maximum speed 20 MPH," "Maximum speed XX MPH," etc.), a recommended speed to drive (for example, "Recommended speed 45 MPH," "Recommended speed 35 MPH," "Recommended speed 20 MPG," "Recommended speed XX MPH," etc.), a fog warning (e.g., "Fog detected," "Fog detected: Visibility less than 100 feet," "Fog detected: Visibility less than 50 feet"), a low visibility warning (e.g., "Low visibility detected," "Visibility less than ¼ mile," "Visibility less than 1,000 feet," "Visibility less than 500 feet," "Visibility less than 100 feet," "Visibility less than 50 feet," "Visibility less than XX feet,"), an ice warning ("Warning, ice on road"), a snow warning ("Warning, snow detected," "Warning, snow on road"), a water on road warning (such as "Warning, water on road," "Warning, low water crossing flooded ahead," "Warning, flood area ahead"), an object in road warning ("Warning, object in road ahead," "Warning, loose objects on road," "Warning, vehicle stopped in road ahead," "Warning, road obstructed ahead," "Warning, road obstructed in 0.25 miles," "Warning, road obstructed in 500 feet," "Warning, road obstructed in 100 feet," "Warning, road obstructed in XXX feet,"), and/or a high wind warning (for example, "Warning, high winds," "Warning, high cross winds," "Warning, winds greater than 50 MPH," "Warning, winds greater than XX MPH,").

In one example, VEMM 2324 has three alert stages. In a first alert stage, the alerts provided by the alert module 2348 include audible and visual warnings to the user. If the first alert is ignored, the alert module 2348, in a second alert stage repeats the alert and provides haptic feedback. For example, the alert module 2348 may tug on a shoulder portion of the driver's seat belt and vibrate the steering wheel and/or the driver's seat as an additional warning to the driver to take action. In a third alert stage, if the driver has ignored the previous alerts, the VCS may take control of one or more vehicle functions and the alert module 2348 can provide an alert indicating the actions taken by the VCS.

A medium severity environmental condition may cause the VEMM 2324 to determine that the alert module 2348 should provide the alert as well controlling one or more vehicle functions, such as steering, throttle, vehicle lights, automated control systems, vehicle infotainment features, cruise control settings, changing the instruments displayed on the configurable dash display 2804 and/or the HUD 2816, etc. For example, the VCS 204 can change one or more controls of the vehicle to prevent the vehicle from travelling faster than a specific speed, apply brakes to slow the vehicle to a recommended speed, decrease steering wheel sensitivity to prevent rapid changes of direction, and/or change vehicle presentations (such as by activating the vehicles exterior lights and hazard lights and/or by increasing or decreasing tire pressure). Cruise control system settings may be adjusted to prevent rapid acceleration of the vehicle, to decrease the speed of the vehicle, and/or by adjusting how and when a set speed is maintained by the cruise control system. Further, the VCS may deactivate the cruise control system in some environmental conditions. The VCS can also activate one or more vehicle features, including air conditioning within the vehicle, heating within the vehicle, vehicle wind-shield wipers, head-lights, hazards lights, and/or fog lights.

In one approach, the VCS 204 can deactivate one or more infotainment features, such as by turning off movies, videos, and/or games within one or all areas of the vehicle, and/or by limiting the volume of the infotainment items playing within the vehicle. The VCS may use the dash configuration module 2308 to rearrange the dash display 2804 and/or the HUD 2816. For example, non-required instruments may be removed from the displays to prevent driver distraction and other instruments added. Additionally, instruments could be rearranged and resized to provide relevant information to the driver based on the environmental condition.

The VCS 204 may also limit use of communication devices within the vehicle to prevent distracting the driver, such as by preventing use of calendars, games, and social media functions of communications devices. For example, the VCS can restrict playing or use of multimedia, infotainment, or in general anything that could be envisioned as a potential distraction to the driver based on the environmental condition while allowing access to communications, weather, and location information within the vehicle. In another approach, the VCS can tighten the seat belts, adjust seat positions including rear seats (if installed), raise folded rear headrests (if installed), determine optimum inflation of variable pressure impact air bags based on user characteristics (weight, size, and sex based on interior sensor data and profile data of identified users), and close the sunroof and windows based on the type and severity of environmental condition.

As can be appreciated, the sensitivity associated with a steering wheel and/or other manual vehicle control systems may also be modified based on an environmental condition determined by VEMM 2324 and based on rules 2328. The VCS can change a brake system and/or accelerator system mode and/or function. The VCS may also adjust brake pedal and/or gas pedal movement range; that is, the vehicle control system can automatically adjust one or more of pedal stroke length, sensitivity, etc., based at least partially on the environmental condition.

In one case, the VCS can change settings of an automatic braking system of the vehicle to allow sufficient braking distance based on the environmental condition. For example, the VCS can use an automatic braking system profile selected to provide the best braking performance based on the environmental condition. In a low traction environment, the VCS may increase brake pulsing to prevent wheel lock and loss of traction. The VCS may also decrease brake pedal sensitivity in a low traction environment to prevent sudden application of the brakes and loss of traction. In an obstructed road environment, the VCS can pre-charge the brakes and increases the brake assist sensitivity to maximize driver braking performance.

In another case, the VCS may adjust or change the settings of the accelerator system. The VCS can increase or decrease the sensitivity of the gas pedal to prevent or allow rapid acceleration. For example, in a low traction environment, the VCS may prevent sudden acceleration to prevent loss of traction. Continuing this example, the VCS may prevent sudden deceleration when the driver's foot is rapidly removed from the gas pedal. In a low visibility environment, the VCS may limit vehicle acceleration to prevent collision with obscured and/or unseen objects in the road.

In a hot or cold environment, the VCS may modify the environmental controls within the vehicle. For example, if the VEMM 2324 determines the exterior temperature is about a certain level, the VCS may activate the air conditioner for the vehicle or decrease the thermostat settings to cool the interior of the vehicle. Alternately, if the VEMM 2324 determines the exterior temperature is below a certain level, the VCS can turn on the vehicles heater or increase the thermostat setting to warm the interior. In another example, the vehicle may be parked with the engine turned off. The VEMM 2324 may detect a temperature above the predetermined level that would indicate a high temperature environment. However, if no-one is within the vehicle, the VEMM 2324 may determine the high temperature environment does not exist.

In the same situation, if the VCS detects an occupant or animal in the vehicle, the VEMM 2324 may request information from additional sensors to determine the state of the vehicle. For example, the VEMM 2324 may request information from window position sensors to determine if the windows are up (closed) or rolled down (open). The VEMM 2324 may also request data from exterior light sensors and cameras to determine it is a sunny day and if the vehicle is parked in shade or in a sunny area. The VEMM 2324 may then determine that the environmental condition does exist and may increase the severity level to medium because an occupant or animal is in the vehicle. The VCS may then activate the vehicle's engine and turn on the air conditioner. In addition or alternatively, the VCS may lower the vehicle's windows. The alert module 2348 can also send an alert to a communication device 212, 248 located outside of the vehicle including information and high temperature condition and also indicating that an animal or person is in the vehicle. For example, if a user forgets that a child or pet is in the vehicle and the temperature within the vehicle is above a predetermined amount (for example, 85° F.), the VCS may automatically roll the windows at least partially open, activate the air conditioner, and the alert module 2348 may send an alert to a communication device 212, 248 of a user.

The VCS can also change a steering mode based on an environmental condition determined by the VEMM 2324, wherein changing the steering mode includes changing the responsiveness or other settings of a steering system. For example, for some environmental conditions, the VCS may reduce the sensitivity associated with movement of the steering wheel. In one case, the sensitivity may be changed by modifying the electrical output in response to receiving a certain mechanical angular movement of the steering wheel. For instance, an angular movement of 10 degrees at the steering wheel may be the minimum default angular movement to cause the wheels on a vehicle to begin to turn. When the VEMM 2324 detects a low traction environmental condition, this minimum default angular movement may be increased to 30 degrees by the VCS, as an example. Additionally, the VCS may ignore a steering wheel input beyond a certain angular amount based on the environmental condition and the vehicle's speed. Thus, the VCS may not allow a steering wheel input that would turn the vehicle's wheels more than 10 degrees in a low traction environment when the vehicle is travelling at greater than 45 MPG.

For other environmental conditions, the VCS may increase steering sensitivity. When the VEMM 2324 detects an obstructed road or objects in the road, the minimum default angular movement may be decreased to 5 degrees, as an example. Therefore, smaller movements (e.g., of 5 degrees applied at the wheel) will cause the vehicle to begin turning (similar to racing vehicles and/or high-end cars, etc.).

The VCS 204 may also change settings of automated vehicle response systems based on an environmental condition determined by the VEMM 2324. A collision avoidance system is an automobile safety system designed to reduce the severity of an accident. Also known as a precrash system, a forward collision warning system or a collision mitigating system, it uses vehicle sensors 340 such as radar, laser, lidar, and cameras to detect an imminent crash or an object or obstruction in the road. Once the detection is done, the automated vehicle response system either provides a warning to the driver when there is an imminent collision or takes action autonomously without any driver input (by braking or steering or both). If the driver does not appear to react quickly enough or does not react at all, the VCS intervenes to apply the brakes in an effort to avoid the crash.

In one approach, the collision avoidance system of the VCS works in multiple phases after detecting an impending accident or collision with a vehicle or object in the road. In a first phase, the collision avoidance system provides warning of the impending accident, while the hazard warning lights are activated, the side windows and sunroof are closed and the front seat belts are tensioned. In a second phase, the warning is followed by light braking, strong enough to obtain the driver's attention. In a third phase, the collision avoidance system initiates autonomous partial braking. In a fourth phase, the collision avoidance system decelerates the vehicle followed by automatic deceleration at full braking power, roughly half a second before the impending accident.

The VCS may modify the phases and settings for each phase, including skipping a phase, based on an environmental condition detected by the VEMM 2324. The settings can be, for instance: the time at which a warning of a potential collision is provided to the driver; the duration of the driver response or reaction time interval from when a warning of a collision is provided to the driver and until the initiation of automated braking; the braking force applied or deceleration of automated braking; and the time over which automated braking occurs. For example, in a low traction environment, the VCS may change the collision avoidance system may change the braking force or maximum deceleration applied by the automated braking. In a low visibility environment and/or a low fraction environment, the VCS may decrease the time to reach phase three and/or may skip one or more of the first, second, and/or third phases.

The VEMM 2324 can also determine that the VCS should activate other features based at least in part on the environmental condition. For example, in a low visibility condition, the VCS may activate the traffic sign translation module 2320 to provide the text of traffic signs to the user audibly or using one or more vehicle displays 212, 248, 882, 2804, 2812, and 2816. The VCS can also activate the automobile controller 8104 to take control of vehicle steering, velocity, and braking to bring the vehicle to a stop in a safe location.

For a high severity environmental condition the VEMM 2324 may determine that the alert module 2348 should provide the alert and also initiate the automobile controller 8104 to slow the vehicle and/or bring the vehicle to a stop in a safe location. Optionally, the driver can override the control actions of the VCS 204, for example, by turning off the VEMM 2324. Additionally or alternatively, the driver can enter settings in the profile data 252 changing the rules in rules module 2328. The driver can change the rules used to evaluate the severity of an environmental condition and/or change the rules for a response to an environmental condition and save the changes in profile data 252 and portion 1224 and/or 1238 of data structure 1200.

The rules module 2328 may include different severity levels for different environmental conditions. The severity level may also increase if more than one environmental condition exists. For example, the VEMM 2324 may increase the severity to high after determining medium severity low fraction and low severity low visibility environments exist. Additionally or alternatively, the severity level may be directly related to the velocity of the vehicle, so as velocity increases, the severity level increases. Further, the VEMM 2324 can change the severity level for an environmental condition based on actions or lack of action of the driver and by changes in the environmental condition.

By way of example, the VEMM 2324 may receive a weather alert 3308 broadcast including a flash flood warning in a particular area 3304A. The VEMM 2324 can receive the current location and destination of the vehicle 104 from the navigation subsystem 336 and determine the location of the flash flood area 3304A using the maps database 8100. If the route of the vehicle intersects the flash flood area 3304A, the VEMM 2324 may determine that an environmental condition exists, but may classify the severity as low based on rules 2328 because the vehicle 104A is not in the area 3304A of the flash flood. Using the information from the VEMM 2324, the alert module 2348 can provide an alert to the driver, such as "Flash flood area ahead." If the driver continues on the route toward the flash flood area 3304A, the VEMM 2324 can further review information in the maps database to determine if the current route includes any low water crossing areas. Further, the navigation subsystem 336 can determine if there is an alternate route available that does not cross a low water crossing in the flash flood area 3304A.

If the VEMM 2324 determines the current route of the vehicle will cross a low water crossing in the flash flood area, the VEMM 2324 can reclassify the severity as medium. The alert module 2348 can provide another alert to the driver which may be accompanied by haptic feedback, such as vibration of the steering wheel or the driver's seat and/or tugging the driver's seat belt. The alert can include an alternate route to the destination that does not cross a low water crossing within the flash flood area.

In another example, the VEMM 2324 can use the information from the ranging sensor and the other sensors 340 to determine a low visibility condition exists. The VEMM 2324 can then characterize the severity of the low visibility condition (such as a visibility of less than 25 feet, less than 100 feet, less than 1,000 feet, less than 0.25 mile, etc.) and determine a response using the rules module 2328. The VCS 204 can then implement the response.

For low severity low visibility condition, the alert module 2348 may provide the alert to the driver 216 indicating that the low visibility condition has been detected but visibility is still greater than a predetermined distance. In addition, the alert may recommend that the driver activate vehicle lights and hazard lights. The alert may further recommend the driver activate traffic sign translation module 2320.

If the low visibility condition is characterized as medium by the VEMM 2324, the alert module 2348 may send the alert with a recommendation to decrease the vehicle's velocity. For example, if visibility is less than 100 feet, the vehicle control system may provide an alert such as "Fog detected—slow down!" The VCS may automatically activate exterior vehicle lights (such as head lights, fog lights, and/or hazard lights) and the traffic sign translation module 2320.

Continuing this example, if the VEMM 2324 characterizes the low visibility condition as high, the alert module 2348 may provide one or more alerts and the VCS 204 may change the control systems (such as the throttle 620) to limit the vehicle's velocity. If the vehicle is already travelling above a velocity specified in the rules module 2328 for the detected visibility level, the VCS 204 may decrease the vehicle's velocity by activating the vehicle's braking system 636 using the automobile controller 8104.

Additionally or alternatively, one user can create or modify the rules in the rules module 2328 for one or more other users. For example, an adult user (e.g., a user with an age of greater than 18 years) could modify the rules of the rules module 2328 used by the VEMM 2324 to determine and classify the operating environment when a child user (e.g., a user under the age of 18 years old) is operating the vehicle 104. In this example, an adult could enter rules that would cause the VEMM 2324 to determine an environmental condition exists at a lower threshold and/or increase the severity of the environmental condition. An adult might enter rules that cause the VEMM 2324 limit and/or change one or more controls of the vehicle during an environmental condition for the child due to the child's inexperience or judgment. Further, some governmental agencies limit or prevent operation of motor vehicle by drivers under a certain age during periods of darkness. An adult user could enter rules in the rules database that would prevent an underage user from driving the vehicle during periods of darkness. The VEMM 2324 could determine the period of darkness exists by detecting light levels outside the vehicle with light sensor 736E, and/or by receiving weather information that includes the time of sunrise and sunset for the area 2708 in which the vehicle is located. Continuing this example, the rules module 2328 can include instructions for the alert module 2348 to provide alerts to an underage driver as darkness approaches (e.g., 30 minutes prior, 15 minutes prior, XX minutes prior, and the like) so the underage driver can safely move the vehicle to a location and turn-off or park the vehicle. The alert could be one or more messages, such as: "Sunset in 30 minutes," "Sunset in 15 minutes," "Sunset in 5 minutes," "Sunset in XX minutes," "Park the vehicle," "The control system will take control of the vehicle in XX minutes". Further, in this example, if an underage driver attempts to start a vehicle during a period of darkness, and the rules module 2328 includes rules to prevent underage users from operating the vehicle in darkness, the VCS 204 can prevent the operation of the vehicle by, for example, preventing the transmission from engaging.

Further, a user identified as the vehicle owner can modify the rules of the rules module 2328 for one or more other users of the vehicle, including users who are not identified (such as valets who temporarily operate the vehicle). For example, the owner could enter rules that cause the VEMM 2324 to limit or change vehicle functions in one or more vehicle environments or any or all other users of the vehicle. The owner could enter rules to prevent the vehicle from being operated in low traction environments, for example.

Additionally or alternatively, the alert module 2348 can send alerts of environmental conditions and the assessed severity of the environmental condition to a communication device 212, 248 of the user. Further, the alert can be sent to a communication device 212, 248 of a user whether or not the user is currently in the vehicle 104.

In one example, a first user could be located at home 2000 or in another vehicle while a second user is operating the vehicle 104. In another example, both the first user and the second user are in the vehicle 104 and the first user is a passenger and the second user is the operating the vehicle 104. When the VEMM 2324 determines an environmental condition exists, the alert module 2348 can provide an alert to both the second user and to the communication device 212, 248 of the first user as illustrated in FIG. 2. The alert to the first user can include the type of the environmental condition, the assessed severity of the environmental condition, the response of the VCS to the condition based on the rules in rules module 2328, and/or the response of the second user driving the vehicle. The alert can further include vehicle state information such as, but not limited to, the location of the vehicle from the navigation subsystem, the velocity and current gear from the vehicle subsystem module. The first user can review the information received in the alert from the alert module 2348 using communication device 212, 248. The first user can also use device 212, 248 to change the rules in the rules module 2328. If the first user changes the rules, the VEMM 2324 can re-evaluate the severity level of the environmental condition and take control of and/or modify one or more vehicle control systems to limit the second user's control of the vehicle. Additionally or alternatively, the first user can use device 212, 248 to activate the automobile controller 8104 to take control of the vehicle 104 and safely bring the vehicle 104 to a stop.

The VCS 204 can determine which of the first user and the second user has priority to control the vehicle using profile data 252 and/or information stored in portion 1260 of data structure 1200. Additionally or alternatively, the priority may be based on a family relationship between the first user and the second user. For example, the second user may be a child of the first user. Further, the priority may be based on a business relationship of the first and second users (e.g., the second user could be an employee of the first user). Still further, the first user may always have priority over a second user who is not identified. Thus, the first user could change one or more rules in the rules module when the second user is a valet, a guest, a friend, and the like.

Figure 34:
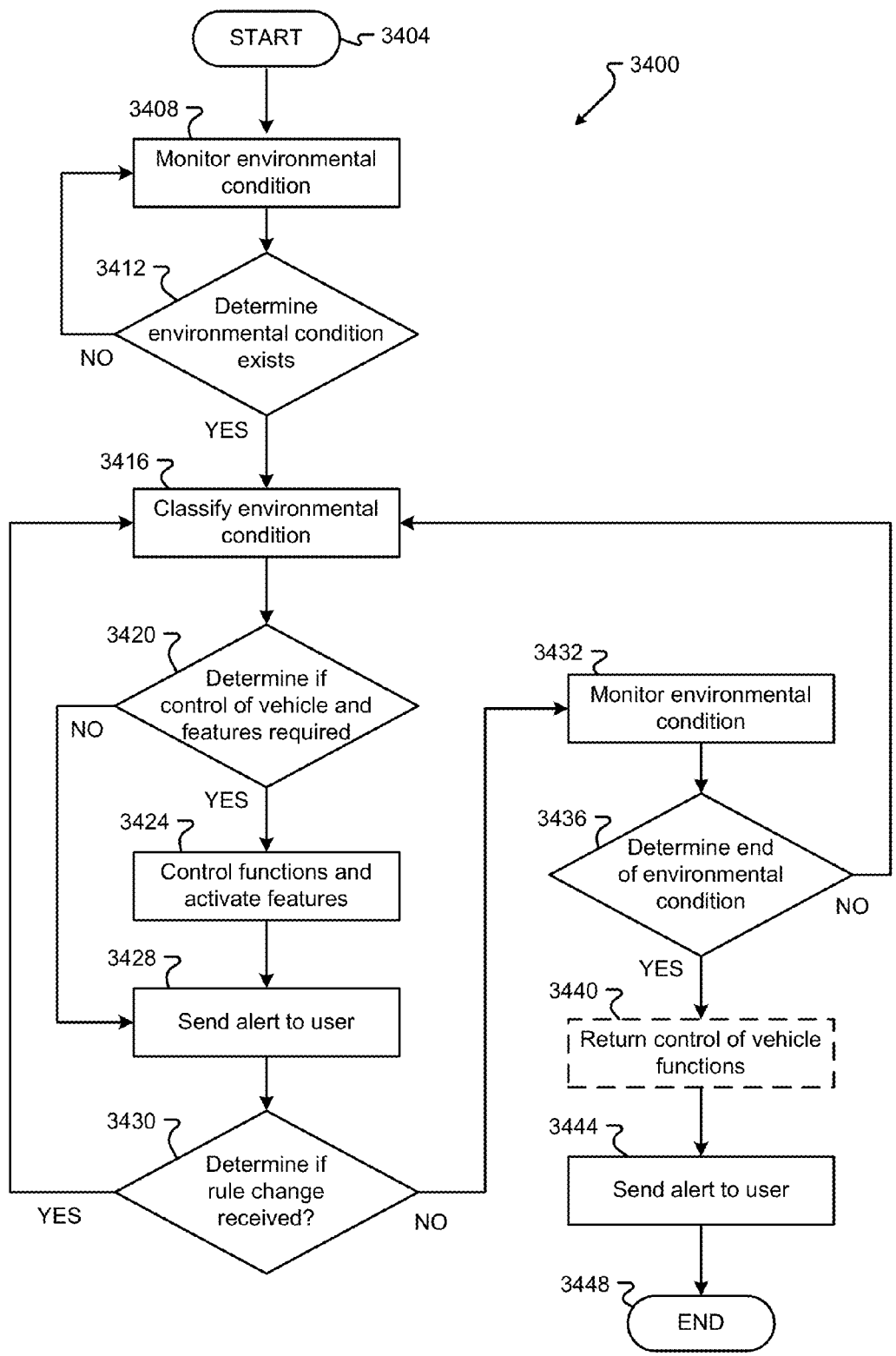
FIG. 34 is a flow or process diagram of a method of controlling vehicle features based on the operating environment of the vehicle.

Referring to FIG. 34, a flow diagram depicting a method 3400 for controlling vehicle features based on the operating environment of the vehicle is shown in accordance with embodiments of the present disclosure. While a general order for the steps of the method 3400 is shown in FIG. 34, the method 3400 can include more or fewer steps or can arrange the order of the steps differently than those shown in FIG. 34. Generally, the method 3400 starts with a start operation 3404 and ends with an end operation 3448. The method 3400 can be executed as a set of computer-executable instructions executed by a computer system and encoded or stored on a computer readable medium. Hereinafter, the method 3400 shall be explained with reference to the systems, components, modules, software, data structures, user interfaces, etc. described in conjunction with FIGS. 1-33.

In step 3408, the VEMM 2324 receives data from vehicle sensors, non-vehicle sensors, and other sources as described above and monitors the vehicle's operating environment. The VEMM 2324 can determine that an environmental condition 3304 exists, in step 3412, based on the information received and rules 2328. If the VEMM 2324 determines an environmental condition exists, method 3400 proceeds YES to step 3416. If the VEMM 2324 has not determined an environmental condition exists, method 3400 loops NO to step 3408 and the VEMM 2324 continues monitoring the environmental condition in which the vehicle is operating.

The VEMM 2324 classifies the severity of the environmental condition 3304 and determines a response in step 3416. The severity and the response are determined by the VEMM 2324 based on, but not limited to, the type of environmental condition, data about the environmental condition, the state of the vehicle (including the vehicle's location, velocity, and the state of features such as lights), actions of the driver, and rules in the rules module 2328. Step 3416 can repeat: if the environmental condition changes (deteriorates or improves), based on actions of the driver (such as: taking no action, speeding up instead of slowing down), and/or if the rules in rules module 2328 change.

The VEMM 2324 can determine if control of one or more vehicle functions and/or activation one of more features of the vehicle is required by the rules in step 3420. If VEMM 2324 determines that control of functions and activation of features is not required based on the severity of the environmental condition, method 3400 proceeds NO to step 3428. If the VEMM 2324 determines control of one or more vehicle functions and/or activation of one or more vehicle features is required, method 3400 proceeds YES to step 3424.

In step 3424, the VCS 204 sends commands to control the functions of the vehicle and/or to activate features identified by the VEMM 2324 in step 3420. For example, the VCS 204 can control functions such as the braking system to slow the vehicle and/or otherwise control braking such as by limiting sudden stops, the throttle to limit the maximum velocity of the vehicle, steering actuators to decrease steering wheel responsiveness to prohibit rapid direction changes, and/or activate the automobile controller 8104 to take control of the vehicle. The VEMM 2324 can also activate features such as tire pressure regulators to increase or decrease tire pressure, exterior vehicle lights, and/or the traffic sign imaging and translation feature. Optionally, the driver can override the control functions performed by the VCS 204 in step 3424.

Method 3400 proceeds to step 3428 and the alert module 2348 sends an alert. The alert can include a recommendation, such as "slow down" or a recommended maximum speed. In addition, the alert can include a recommended alternate route determined by VEMM 2324 using the navigation subsystem 336. The alternate route may be a route to avoid the environmental condition or to exit the area of the environmental condition. If the VEMM 2324 performed 3424, the alert can include information about one or more vehicle functions the VEMM 2324 is controlling and/or one or more features of the vehicle the VEMM 2324 has activated.

After alert module 2348 sends the alert and/or the recommendation, method 3400 proceeds to step 3430 and the VEMM 2324 can determine if the rules of the rules module 2328 have changed. For example, a first user not driving the vehicle 104 may change the rules using communication device 212, 248, while a second user is driving the vehicle. In another example, a first user who is a passenger in the vehicle can change the rules while the second user is driving using communication device 212, 248 or using user interaction subsystems 332. In step 3430, the VEMM 2324 can determine the priority between the first user and the second user as described above. If the VEMM 2324 determines the rules of the rules module have changed, method 3400 returns YES to step 3416 and the VEMM 2324 can classify the environmental condition. If the rules have not changed, method 3400 proceeds NO to step 3432.

The VEMM 2324 monitors the environmental condition in step 3432. In step 3436, the VEMM 2324 can determine if the environmental condition has ended based on the data received from sensors and other sources as described in steps 3408, 3412. If the environmental condition has not ended, method 3400 loops NO back to step 3416 and the VEMM 2324 can reevaluate the environmental condition and reclassify the environmental condition. If the VEMM 2324 determines the environmental condition has ended, method 3400 proceeds YES to optional step 3440 and the VEMM 2324 can return control of vehicle functions and features to the driver if step 3424 was performed. Method 3400 then continues to step 3444 and the alert module 2348 sends an alert that the environmental condition has ended and, if optional step 3440 was performed, that the VEMM 2324 has returned control of vehicle functions to the user. Method 3400 then proceeds to END 3448.

Automatic Payment of Fees Based on Vehicle Location and User Detection

Figure 35:
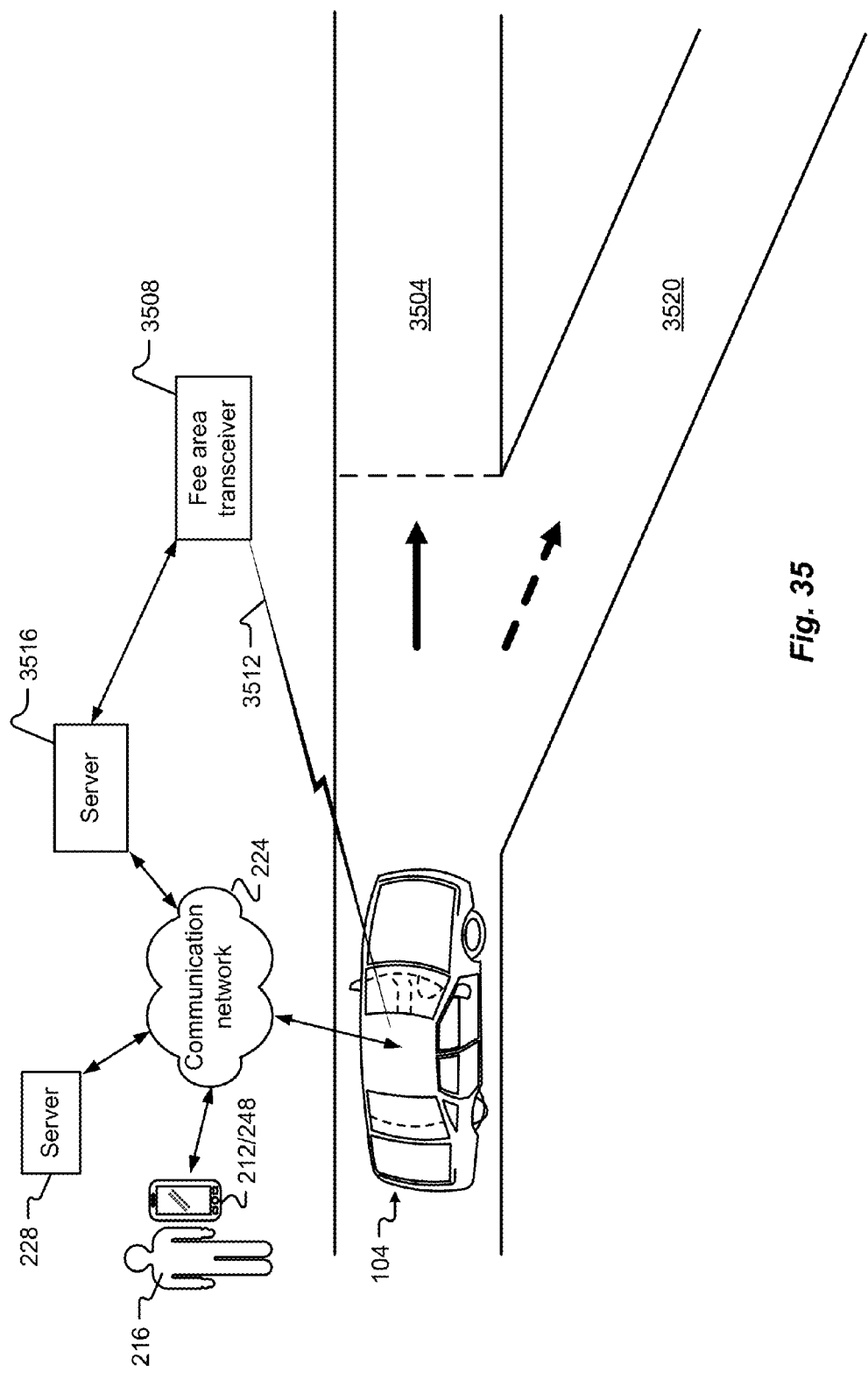
FIG. 35 depicts an embodiment of the operation of a fee area module.

Referring now to FIG. 35, the fee area module 2332 can determine that the vehicle 104 is travelling toward a fee area 3504, such as: a toll road; a high occupancy vehicle lane; a lane of a road that may require a fee on certain days, at certain times of a day, or when certain events occur (such as a certain number of vehicles being present in the lane or a certain level of congestion on a road associated with the lane); a ferry; a park (for example a State, Federal, or National Park and/or a privately owned park or recreation area), and the like. The fee area module 2332 can determine the presence of the fee area 3504 using the location module 896 and data in the maps database 8100 of the navigation subsystem 336. Additionally or alternatively, the fee area module 2332 can detect a signal 3512 of an electronic fee collection system transceiver 3508 with one or more sensors of the sensor subsystem 340 and/or the wireless signal receivers 653, 758. The signal 3512 can be any type of communication modality sent with or through a communication network. Although only one fee area transceiver is illustrated, it should be understood that a fee area may include a plurality of transceiver located at various locations in the fee area. For example, a fee area may include a transceiver at all entrances and exits from the fee area as well as at intervals along the fee area.

After detecting the presence of the fee area 3504, the fee area module 2332 can retrieve, receive, and/or evaluate rules associated with the fee area, such as rates, occupant requirements, time based rate changes, pollution pricing, and congestion pricing. The fee area module 2332 contains toll road rules, HOV lane rules, ferry boat rates and charges, and park entrance fees and requirements for a plurality of locations. Additionally or alternatively, the fee area module 2332 can also obtain updated fee area rules using network 224 to contact server 228. The transceiver 3508 can also transmit the rules to the vehicle 104 using connection 3512. Additionally or alternatively, the fee area module 2332 can use network 224 to contact a server 3516 associated with fee area 3504 to receive rules of the fee area. As will be appreciated, the server 3516 and/or the transceiver 3508 may include a computing system operable to conduct the operations as described above.

The fee area module 2332 can evaluate the rules of the fee area 3504 to determine the cost of driving in or entering the fee area. The fee area module 2332 can consider several factors to determine the cost. Some fee areas, such as toll roads, HOV lanes, parks, and ferries change variable rates based on the number of occupants in a vehicle and may charge no toll if a certain number of people are in the vehicle. The fee area module 2332 can use the number of occupants in the vehicle determined by the VCS 204 to calculate an occupant based charges. The fee area module 2332 can also consider the current time for toll/HOV lanes that charge rates that vary based on the time of the day. Further, the fee area module 2332 can determine different rates charged by a fee area for privately owned vehicles, commercial vehicles, and/or government vehicles. Additionally or alternatively, the fee area module 2332 can determine if discounts are available for the vehicle. For example, a discount may be available if the driver is a senior (i.e., over the age of 65, 70, or some other predetermined age), a handicapped driver, a frequent user, and the like. Discounts may also be available for fuel-efficient or electric the vehicles and if more than a certain number of people are in the vehicle.

Other fee areas charge a variable rate known as pollution pricing based on the size, weight, vehicle noise levels, number of axles, and/or emission levels of the vehicle. Using the rules of the fee area, the fee area module 2332 can determine the pollution pricing for vehicle 104. When the fee area is a ferry boat, the size, weight, and number of axels of the vehicle may be the only factors used to determine the fee. Additionally or alternatively, the fee for a ferry boat may also be determined at least in part on a type of cargo carried by a commercial vehicle.

In some areas, fee areas implement congestion pricing for zones of a city/region that are considered to be congested to try to reduce traffic in those zones. Congestion pricing plans may also be implemented that charge a higher rate for certain roads considered to be congested and charge a lower rate for other roads that are considered less congested. The fee associated by a congestion pricing plan may also vary based on a current number of vehicles on the road or congestion of the road. The fee area module 2332 can review the rules for congestion pricing for fee area to determine the charges for vehicle 104 and also determine if a less congested road with a lower toll can be used to reach the destination. The fee area module 2332 can also connect to a server to determine current fee area rules for congestion pricing plan that charges variable fees.

For fee areas that charge a rate based on a distance or period of time traveled in lane 3504, the fee area module 2332 can calculate a charge based on the destination of the vehicle and the distance or period of time the vehicle will travel in lane 3504 using information from the navigation subsystem 336.

Once the fee area module 2332 has determined the cost of using lane 3504 to reach the destination, the fee area module 2332 can determine a second cost associated with taking an alternate route and lane 3520 to the destination using default rules and/or rules configured by the user. The alternate or altered route may be presented to avoid the fee area 3504. For example, if the fee area is a lane that will charge at a certain time or due to a certain level of congestion on the road, the alternate route may consist of a different lane of the same road.

The fee area module 2332 can consider the length and time required to travel the alternate route and/or the distance of the second route compared to the current route. The time required to travel can be determined using current traffic information or historic travel times from the maps database 8100 (such as traffic accidents on the alternate route, expected speed of the route, volume of anticipated or current traffic on the route, or the like). Further, the fee area module 2332 could consider the type of roads (such as freeway, unpaved, residential, rural, urban, scenic, or other road type) required by the alternate route using information from the maps database. The fee area module 2332 can also consider other factors such as network available, rates, and signal strength of the alternate route determined by the communication network monitoring module 2312 and assign a cost based on the availability of communication networks along the alternate route. The fee area module 2332 can also consider the environment of the alternate route as determined by the VEMM 2324. The fee area module 2332 can also consider factors such as a scheduled meeting at the destination and a cost of being late to, or missing, the meeting.

The rules used by the fee area module 2332 could be threshold based with a score, rank, or likelihood or probability in excess of a selected threshold making the alternate route eligible for selection. For example, an alternate route that provides access to the destination could be eligible for selection. The rules could use a composite scoring algorithm with one or more requirements being given a higher weighting than other requirements. For example, one or more of time, distance, road type, network availability, and environment could be weighted higher than one or more of time, distance, road type, network availability, and environment. Further, the rules can specify that only one factor is to be considered by the VCS when determining an alternate route. When time alone is prioritized, the alternate route selected is that alternate route which minimizes substantially (or relative to the plural other alternate routes) the time required to reach the destination. When distance alone is prioritized, the alternate route selected is that alternate route which is the shortest route (relative to the plural other alternate routes) to the destination. When road type alone is prioritized, the alternate route selected is the route with roads of one type (freeway) or a route that does not include roads of one or more types (such as unpaved, residential, multi-land, single-lane) to reach the destination. When communication network alone is prioritized, the alternate route selected is that alternate route which provides the best communication network coverage (relative to the plural other alternate routes) or provides access to one or more particular communication networks. When the vehicle operating environment of a plurality of alternate routes alone is prioritized, the alternate route selected is that alternate route which provides the best vehicle operating environment or provides a route that does not include one or more selected environmental conditions (such as snow, ice, rain, fog, hail, or any other type of condition selected). By way of illustration, the alternate route is selected that is most capable of complying with requirements of time, distance, road type, communication network availability, and environmental condition within a certain cost budget or ceiling. The rules could be a cumulative rank based on simple compliance with each of the requirements, with a plurality of alternate routes being ranked in order of compliance with the most to the least number of requirements.

Although only one alternate lane 3520 is illustrated in FIG. 35, it should be understood that the fee area module 2332 can determine a second cost for any number of routes calculated by the navigation subsystem 336 to the destination.

If a driver does not want to use an alternate route, the driver can enter and save a setting in profile data, as discussed in conjunction with FIGS. 13-15, above, to indicate that the driver does not want to use an alternate to avoid a fee area. The setting can specify that the driver will pay a fee to enter all fee areas, or the setting may specify that some fee areas may be avoided, such as parks and ferries. Additionally or alternatively, the setting can include instructions to enter certain fee areas (such as toll roads) but not other fee areas (such as HOV lanes when the number of occupants in the vehicle is less than the minimum amount of occupants required to use the HOV lane without paying a penalty).

The alert module 2348 sends an alert when the fee area module 2332 determines the vehicle is approaching a fee area. The alert can include information about the fee area 3504, including information about the types of charges and any variable factors (congestion, time of day, pollution, number of vehicle occupants, distance traveled in lane, and/or time spent in lane) used to determine the cost of using or entering the fee area 3504. The alert can also include information about alternate routes and a recommended alternate route. For example, if a lane the vehicle is in will become a toll lane due to a time of the day or a congestion level of the road, the recommendation may provide, "Toll required for current lane, change lane to avoid toll."

If the fee area is an HOV lane or a toll road, the alert may identify to the driver that the vehicle is in the HOV or toll lane, notify the driver that they will be billed (or fined) a certain amount for driving in that lane, including any fine required if less than a required number of occupants are in the vehicle, and/or notify the driver that the payment module can automatically pay the fee required and administer any required penalty if less than the required number of occupants are in the vehicle.

As described above, the alert module 2348 can send the alert to a communication device 212, 248 of a user who is not in the vehicle. In this manner, the owner 216 can receive information about use of and entry into a fee area by a guest, an employee, a rentor, and/or a family member operating the vehicle 104.

The driver can select an alternate route from one or more alternate provided in the alert. For example, the driver can use a gesture, a voice command, or a touch on one or more displays 212, 248, 2804, 2812, and/or 2816 to select an alternate route. If the driver selects an alternate route, the navigation subsystem 336 provides directions to the alternate route.

Additionally or alternatively, the alert can include a query to the driver to determine if the driver wants the payment module 2336 to pay the fee associated with the fee including a request for input from the driver. If the driver wants the payment module 2336 to pay the fee, the payment module 2336 can determine a form of payment, such as a credit card, a debit card, a bank account, or an account associated with the fee area. If the driver has been identified as described above in FIG. 13-15, the payment module 2336 can use profile information of the driver to pay the fee. If the driver has not been identified, the VCS can identify the driver and retrieve payment information from the driver as described in FIGS. 13, 14, above. If the driver has been previously identified, the profile data 252 can be used to bill the identified driver. When the driver is not identified, the payment module 2336 can access an account associated with the owner of the vehicle to pay the fee. Optionally, the payment module 2336 can pay the fee without input from the driver.

The payment module 2336 can connect to the server 3516 associated with the fee area 3504 to pay the fee automatically. If the driver does not have an account with the entity (a government utility or contractor) operating the toll/HOV road 3504, the payment module 2336 can create an account for the user by connecting to server 3516. The connection can be through network 224 or through communication with transceiver 3508.

Additionally or alternatively, the fee area module 2332 can retrieve information about an electronic fee collection system used by the fee area entity from server 228 and/or data storage 232. The server 228 can store the signal characteristics for electronic fee collection system transponders (including toll transponders) used by a plurality of fee area operating entities. Further, the fee area module 2332 can receive transponder signal characteristics from the server 3516 associated with the fee area 3504. The payment module 2336 can use the retrieved information to communicate with the fee area transceiver 3508 to pay the required fee.

Additionally or alternatively, the payment module 2336 can also "declare" or report a state or condition of the vehicle that may change the fee. The payment module 2336 can include any penalties or discounts associated with the use of or entry into a fee area 3504. For example, a high occupancy vehicle (HOV) lane may have a variable fee based on a number of vehicle occupants (for example too few occupants), pollution, and/or congestion. The payment module 2336 can report the number of occupants determined to be in the car to decrease a toll that varies based on the number of occupants for an HOV lane. For example, the payment module 2336 can send a signal to fee area transponder 3508 or server 3516 associated with an HOV lane that indicates there are 1, 2, 3, 4, or more occupants in the vehicle 104.

In another example, the payment module 2336 can report the type of the vehicle (private, commercial, public) and pay the fee based on the type of vehicle. Further, the payment module 2336 can report any other type of discount used by the fee area module 2332 to determine a discount available to the vehicle, such as a senior driver discount, a handicapped driver discount, a frequent user discount, a fuel-efficient vehicle discount, and/or a certain number of people in the vehicle.

Additionally or alternatively, the fee area module 2332 can use connection 224 to served 228 to determine if the fee area entity operating the fee area 3504 has published an application ("app") that can be used to pay fees. For example, some fee area operators have created and published apps that allow drivers to automatically pay fees upon entering or exiting the fee area. In some cases, the apps communicate in real-time with a transaction processing system of the fee entity to identify and debit a payment account, bill a credit card or debit card, or debit a bank account of the driver, owner, or operator of the vehicle. The payment module 2336 can use an app of the fee area operating entity to automatically pay a fee area charge and/or penalty.

After paying the fee associated with the fee area, the payment module 2336 can receive confirmation and a receipt from the server 3516. Additionally, the server 3516 can grant the vehicle access to the fee area after receiving the payment. For example, for fee areas that include an access gate, the fee area transceiver 3508 can recognize that the access fee has been paid and grant the vehicle 104 entry into the fee area by opening or raising the access gate. In another example, after the payment module 2336 has paid a fee associated with entry into or use of a toll road or HOV lane, the server associated with the toll road or HOV lane may recognize a license plate on or a signal generated by the vehicle 104 as the vehicle travels through the fee area and not attempt to charge a second fee to the vehicle or attempt to charge a penalty for failing to pay the required fee.

Figure 36:
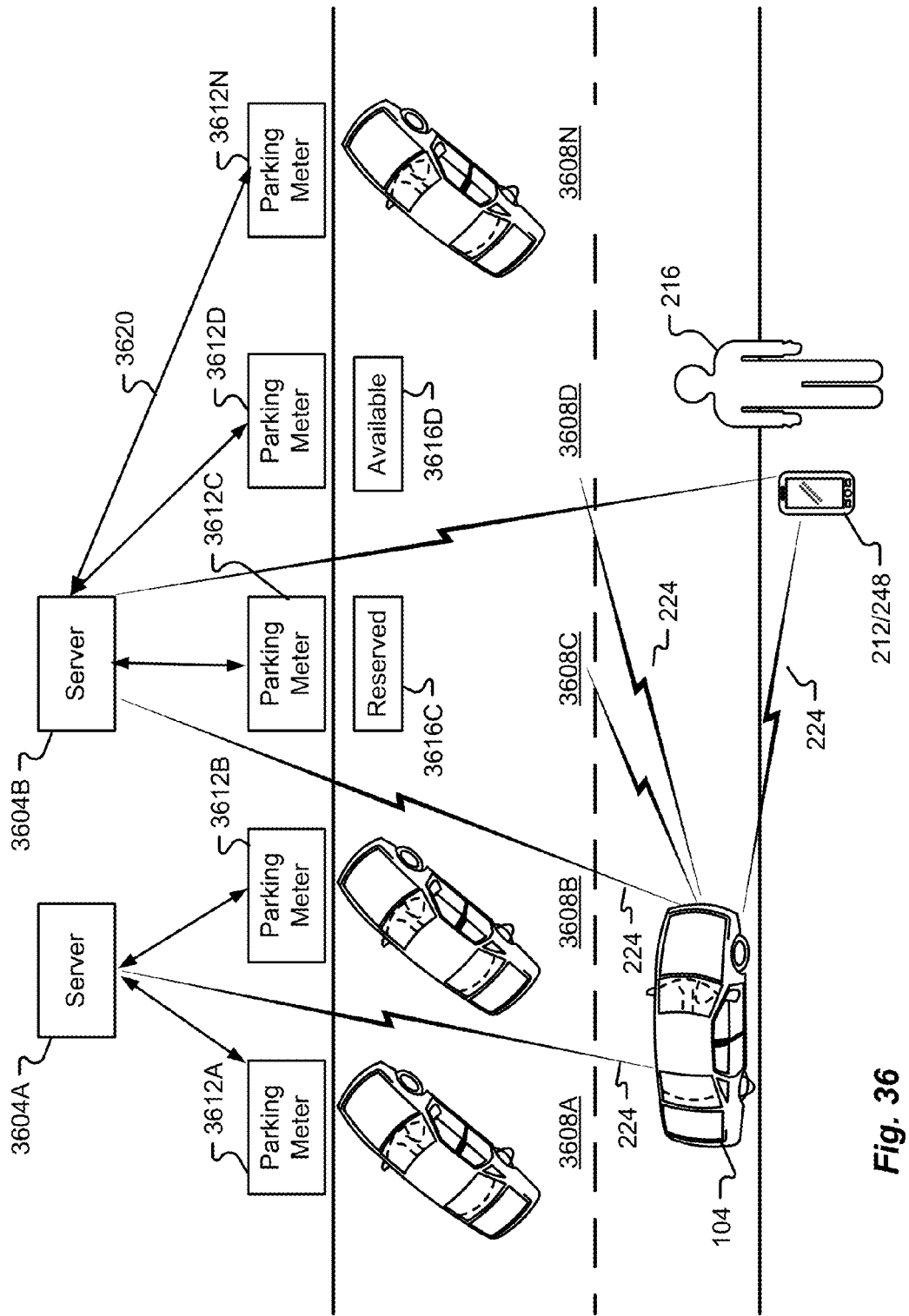
FIG. 36 depicts an embodiment of the operation of a parking space location module.

Referring to FIG. 36, the parking module 2340 can locate an available parking space 3608 for the vehicle 104. The parking module 2340 can receive the vehicle's destination from the navigation subsystem 336. The parking module 2340 can also use the user interaction subsystem 332 to obtain the vehicle's destination from the user. Additionally or alternative, the parking module 2340 can query, for example, a communication device 212, 248 associated with the user and determine from the communication device the currently programmed destination of the user and the vehicle.

After determining the vehicle's destination, the parking module 2340 can determine if the user has saved parking requirements in profile information 1238 of data structure 1200. If the user has not saved parking preferences, the parking module 2340 may obtain the user's parking requirements with the user interaction subsystem 332. After obtaining the user's parking requirements, the parking module 2340 can also determine if the user wants the requirements to be saved in user's profile information. The parking requirements can include: a preferred parking type (i.e., a parking garage, a preferred floor of a parking garage (such as a first floor or a floor lower than a certain level), a parking garage with an elevator, a parking lot, a covered parking lot, street-side parking, valet parking, secure parking); handicap accessibility information; a preferred distance from a destination (for example, within ¼ mile, within ⅛ mile, within 1 block, in a parking garage of the destination, within XX miles); price preferences (such as a maximum hourly or daily rate); a start time required; and/or a length of time the parking space is required. The parking requirements may be ranked hierarchically in an order of importance, such that if the highest ranked requirement is satisfied by an available parking space but the second highest ranked requirement is not, the available parking space may nonetheless be eligible as an acceptable parking space and presented to the driver for selection.

With the vehicle destination and the user's parking requirements, the parking module 2340 can determine one or more parking servers 3604A, 3604B that are within the preferred distance of the destination using information from the maps database 8100. The parking module 2340 includes locations and contact information for a plurality of parking servers 3604. The parking module 2340 can also automatically download and run an application provided by a parking server 3604 to communicate and interact with the parking server 3604. The connection between the parking module 2340 and the server 3604 may be at least partially encrypted by any method known to those of skill in the art.

Additionally or alternatively, the parking module 2340 can contact the server 228 to retrieve information to locate other parking servers 3604 that meet the user's parking requirements at the vehicle's destination. Each parking server 3604A, 3604B may be associated with a plurality of parking spaces 3608A, 3608B, . . . 3608N. The parking spaces 3608 may each use a series of sensors (not shown) to determine whether the parking space is vacant or occupied. These sensors may include pavement sensors, solar, weight, magnetic, video, and other sensing elements to sense a vehicle's presence and/or lack thereof. Additionally or alternatively, each parking space 3608 may have a parking meter 3612A, 3612B, . . . 3612N that can further determine if the associated parking space 3608A-3608N has been paid for and how much paid time remains. Parking space 3608C is unoccupied but has been reserved. Parking space 3608D is unoccupied and available. Although the parking spaces 3608A-3608N are illustrated in FIG. 36 along a street, it should be understood that the parking spaces 3608A, 3608B, . . . 3608N can be located in a parking lot, a parking garage with one or more levels, or any other type of parking facility operated by either a government entity or a private entity. Further, the parking spaces may be associated with a valet service or remote parking service in which case the user drives the vehicle 104 to a drop-off point and then the vehicle is moved to a remote parking space by a valet. Additionally or alternatively, parking servers 3604A, 3604B can represent parking servers owned and/or operated by different entities. For example, parking server 3604A may be associated with a government entity and parking server 3604B may be associated with a private parking facility operator.

All parking spaces 3608 and associated parking meters 3612 can connect to a parking server 3604 using a communication network 3620. Communication network 3620 can be any type of communication system using any type of communication modality as described above. Occupied parking spaces 3608A-3608B, and 3608N can send signals to the server 3604 indicating that these parking spaces are occupied and parking spaces 3608C-3608D can send signal indicating that these spaces are unoccupied. The parking space can also send update signals to the server when the status of the space changes. For example, if there is time remaining on a meter 3612 associated with a parking space, but the parking space detects that a vehicle has departed the parking space, this information can be forwarded to the associated server 3604 which can then change the status of the parking space to available.

Additionally, the parking spaces 3608A-3608N can send information to the associated server 3604A, 3604B to indicate the space is not available or is out of service due to, for example, a street closure, construction, a time-based no parking limitation (for example, a street-side parking space that is unavailable during periods of peak traffic), or the like.

The server 3604 can send a signal to parking space 3608C indicating that space 3608C is reserved. In response, space 3608C may indicate on an associated display 3616C that space 3608C is reserved. The display 3616C may optionally be associated with parking meter 3612C. Additionally or alternatively, parking meters 3612A-3612B, and 3612N can also send signals indicating how much time remains that has been paid for on the meter for the associated parking space 3608. As will be appreciated, the servers 3604 and/or the parking spaces 3608 may include a computing system operable to conduct the operations as described above.

Each of a plurality of servers 3604 can respond to the parking module 2340 and indicate if the server 3604 has an acceptable parking space available (i.e., a parking space that is available and that meets the user's requirements). An acceptable parking space can include a currently occupied parking space that is expected to become available by the start time required by the user.

Additionally or alternatively, the parking module 2340 can connect to an available parking space 3608D using communication network 224 and determine if the parking space is an acceptable parking space. The parking module 2340 can display a list of all acceptable parking spaces received from the parking servers 3604. Acceptable parking spaces can be ranked or sorted by the parking module 2340 based on the parking requirements of the user. The parking module 2340 can display a list of the ranked and/or sorted acceptable parking spaces on one or more displays 212, 248, 882, 2804, 2812, and 2816. The list can include information about each acceptable parking space, such as the type of parking space, the location of the parking space (for example, an address and/or coordinates), the proximity of the parking space to the vehicle's destination, the price, and the length of time the space is available. Additionally or alternatively, the list can be prioritized based on one or more of the user's preferences. The user can select an acceptable parking space from the list and the navigation subsystem will provide directions to the selected parking space.

If the user does not like the acceptable parking spaces, the user can instead direct the parking module 2340 to display a list of all available parking spaces. A list of all available parking spaces can displayed on one or more displays 212, 248, 882, 2804, 2812, and 2816. The parking module can also display the available parking spaces on a map presented by the navigation subsystem 336. The user can limit the list to available parking spaces within a predefined distance of the current vehicle's location and/or the destination. Optionally, the display can be limited by one or more of the user's preferences.

The user can select a parking space from the list of acceptable parking spaces or the list of all available parking spaces by one or more of a touch input, a gesture, or a voice command. Additionally or alternatively, the parking module 2340 can automatically select the highest ranked acceptable parking space without user input.

As will be appreciated, because parking space availability can change on a frequent basis, parking module 2340 can remain in communication with a plurality of parking servers 3604 and available parking space 3608D, and continuously update the lists of acceptable and/or available parking spaces, for example, on a regular or predetermined basis. In this manner, if one or more parking spaces 3608 become available, the parking module 2340 can update the lists and the user may select a new parking space. The user may enter a preference in profile data to limited the updating of the lists of acceptable and/or available parking spaces only if the selected parking space become unavailable. The system could then automatically provide the user with another recommendation for an acceptable parking space in the same manner as discussed above.

Once a parking space has been selected, the navigation subsystem 336 can provide directions to the selected parking space. If the selected parking space can be reserved, the parking module 2340 can connect to server 3604 and/or the parking space 3608 to request the reservation of the selected parking space for future use. The parking module 2340 can forward vehicle identification information, such as type of vehicle, make of vehicle, license or registration number, and the like to the server 3604.

Once the server 3604 confirms the reservation, the alert module 2348 can provide an alert that includes information about the reserved parking space. If the reservation expires after a certain period of time, the alert can include the amount of time until the reservation of the selected parking space expires. For example, the user may select parking space 3608C and use the parking module 2340 to reserve the parking space. The parking space 3608C can indicate that parking space 3608C is reserved in display 3616C. However, the reservation may expire if vehicle 104 does not occupy parking space 3608C within a predetermined amount of time.

When the vehicle arrives at the selected parking space, the payment module 2336 can pay for the parking space by connecting to the server or the parking space. For example, as illustrated in FIG. 36, if the user has selected parking space 3608D, the payment module can connect directly to the parking space or server 3604B to pay for the parking space. As will be appreciated, the payment module 2336 can pay for the parking space before the vehicle occupies the selected parking space, but this is not required. However, if advance payment is necessary to reserve a selected parking space, the payment module 2336 can connect to the parking space or the server while the vehicle 104 is driving to the parking space. The payment module 2336 can retrieve a credit card number, a bank account number, a debit card number, a parking account number, and/or another form of payment associated with the user from the server 228. If the user has not stored a payment method in the server, the VCS 204 can create use method 1500 to receive and store payment information for the user in data structure 1200 as previously described in FIG. 15. The payment module 2336 can then establish a connection to the parking space or the parking server to pay for the parking space. Optionally, the payment module 2336 can create an account with the parking location operator associated with server 3604 and may further pre-pay for a certain amount of parking. Additionally or alternatively, the connection between the payment module and the parking space/server can by encrypted using any method known by those of skill in the art.

After the parking space has been paid for, the parking module 2340 monitors the expiration time for the parking space and can determine whether there is less than a threshold time until the expiration time, such as 5 minutes. If less than the threshold amount of time remains, the alert module 2348 can generate and send a low-time remaining alert. The alert can optionally include information such as amount of time until the expiration time and ask the user if additional time should be purchased for the parking space. A typical alert may be "Your parking period expires in X minutes." The parking module 2340 can also determine when the time period for the parking space has expired and the alert module 2348 can provide an alert. The alert may provide "Parking period expired at AA time."

The user can respond to the alert using device 212, 248 and may direct the payment module 2336 to purchase more time from the server 3604 associated with the parking space. Optionally, the user can purchase additional time for the parking space directly from the server 3604 or the parking space 3608 using communication device 212, 248. Additionally or alternatively, the parking module 2340 can direct the payment module 2336 to purchase the additional time without input from the user.

When additional time is purchased, with or without user input, the parking server 3604 or the parking meter 3612 can confirm the purchase with the payment module 2336. The parking module 2340 can then begin monitoring the new expiration time. The alert module 2348 can send another alert including the new expiration time and the cost of the additional time purchased. The alert may provide, "X additional minutes purchase for $YY. The new expiration time is Z."

As will be appreciated, the user could leave the parking space at any time. If the parking module 2340 determines the user is leaving the parking space prior to the expiration time, the parking module 2340 can use the payment module 2336 to determine if a refund for the un-used time can be obtained from the server 3604 or the parking space 3608. The parking module 2340 can also request or order a payment receipt from the server to, for example, allow the user to track expenses. After obtaining the receipt and a refund, if available, the parking module can disconnect from the server 3604 or parking space 3608.

The user can save one or more parking spaces 3608 as a favorite in the user's profile data. The parking module 2340 can receive alerts for one or more of the user's favorite parking spaces and monitor the available of the favorite parking space.

Additionally or alternatively, the parking module 2340 can provide contact information for the user's communication device 212, 248 to the parking server 3608. The parking server can then contact the user 216 directly to provide updates (such as time remaining, time expired, cost of extension, penalty cost of violation), request payment, send confirmations (reservation received, payment received), and send receipts (transaction amount, date of transaction, location of parking space, balance remaining in parking account).

Figure 37:
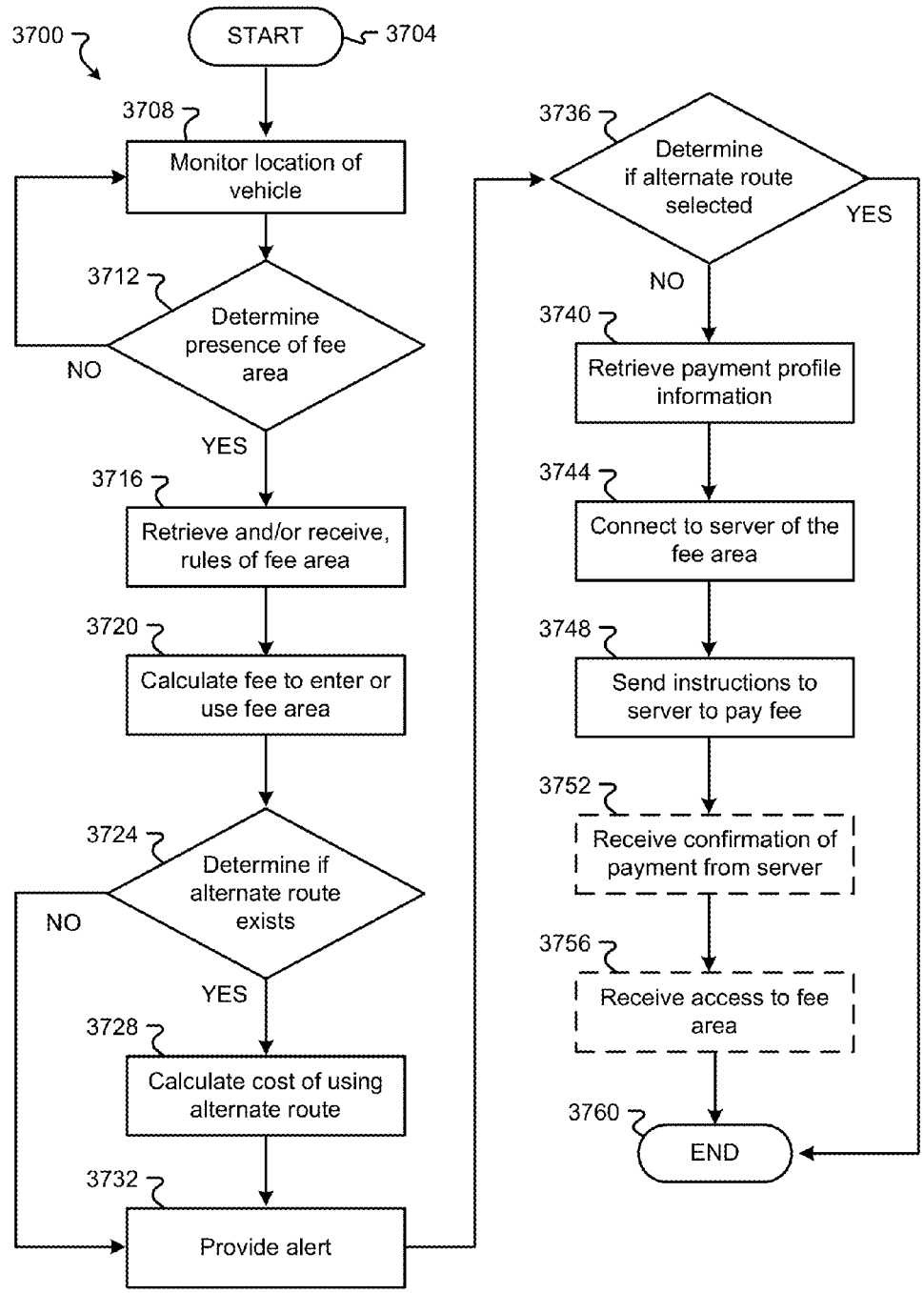
FIG. 37 is a flow or process diagram of a method of identifying and paying fees associated with entering a fee area.

Referring to FIG. 37, a flow diagram depicting a method 3700 for determining by a fee area module 2332 that the vehicle will enter a fee area and paying fees associated with the fee area is shown in accordance with embodiments of the present disclosure. While a general order for the steps of the method 3700 is shown in FIG. 37, the method 3700 can include more or fewer steps or can arrange the order of the steps differently than those shown in FIG. 37. Generally, the method 3700 starts with a start operation 3704 and ends with an end operation 3760. The method 3700 can be executed as a set of computer-executable instructions executed by a computer system and encoded or stored on a computer readable medium. Hereinafter, the method 3700 shall be explained with reference to the systems, components, modules, software, data structures, user interfaces, etc. described in conjunction with FIGS. 1-36.

In step 3708, the fee area module 2332 can monitor the position of the vehicle 104 using information from the navigation subsystem. As described above in conjunction with FIG. 35, the fee area module 2332 can determine the vehicle will enter a fee area 3504 in step 3712. The fee area module 2332 can determine the vehicle will enter the fee area using the location module 896 and data in the maps database 8100 of the navigation subsystem 336. Additionally or alternatively, the fee area module 2332 can detect a signal 3512 of an electronic fee collection system transceiver 3508 with one or more sensors of the sensor subsystem 340 and/or the wireless signal receivers 653, 758. If the fee area module 2332 does not determine the vehicle will enter a fee area, method 3700 returns NO to step 3708 and the fee area module 2332 continues monitoring the position of the vehicle. If entry into a fee area is determined, the method continues YES to step 3716.

In step 3716, the fee area module 2332 can retrieve and/or receive the rules associated with the fee area. The rules may comprise rates, occupant requirements, time based rate changes, pollution pricing, and congestion pricing. The fee area module 2332 can connect to a remote server, a server associated with the fee area, and/or the cloud to retrieve the rules.

The fee area module may then, in step 3720, evaluate the rules to calculate the fee required for the vehicle to enter and/or use the fee area. As described above, the fee area module can consider many factors to determine the fee of cost of entering and/or using the fee area.

The fee area module 2332 can also, in step 3724, determine if one or more alternate routes are available to reach the destination. The alternate routes can be determined using information from the maps database 8100 and the destination entered in the navigation subsystem 336. If one or more alternate routes are available, method 3700 proceeds YES to step 3728. If no alternate routes are available, method 3700 continues NO to step 3732.

The fee area module calculates the cost associated with taking each of the one or more alternate routes to the destination using default rules and/or rules configured by the user in step 3728. The rules used by the fee area module 2332 could be threshold based with a score, rank, or likelihood or probability in excess of a selected threshold making the alternate route eligible for selection. For example, an alternate route that provides access to the destination could be eligible for selection. The rules could use a composite scoring algorithm with one or more requirements being given a higher weighting than other requirements. For example, one or more of time, distance, road type, network availability, and environment could be weighted higher than one or more of time, distance, road type, network availability, and environment.

The alert module 2348 generates and presents an alert on one or more displays in step 3732. The alert can be provided to any one or more communication devices 212, 248 (including communication devices such as smart phones, laptops, and computers not located within the vehicle) and one or more displays 2804, 2812, and/or 2816 in the vehicle. The alert can include information from the fee area module 2332 about the type of fee area the vehicle will enter, the rules associated with the fee area, the fee to enter or use the fee area from step 3720. If alternate routes exist and step 3728 was performed, the alert can also include information about each of the alternate routes and the cost of using an alternate route.

The fee area module 2332 can determine, in step 3732, if the driver selects an alternate route. If an alternate route is selected, method 3700 proceeds YES to end 3760. If an alternate route is not selected, the method proceeds NO to step 3740 and the payment module 2336 can access and/or retrieve payment profile information for the vehicle. The payment profile information may be associated with the vehicle. Additionally or alternatively, if the driver of the vehicle has been identified, the payment module 2336 can retrieve payment profile information associated with the identified driver to pay the fee.

The payment module 2336 then connects the server 3516 of the fee area, in step 3744, to pay the fee. The payment module 2336 then sends, in step 3748, instructions and information to the server to pay the required fee for the fee area as determined in step 3720 by the fee area module 2332. The connection and fee payment can be automatically performed by the payment module 2336.

Optionally, in step 3752, the payment module can receive confirmation of payment received from the server. Then, if optional step 3756, the server can grant the vehicle access or entry into the fee area. Method 3700 the proceeds to END 3760.

Figure 38:
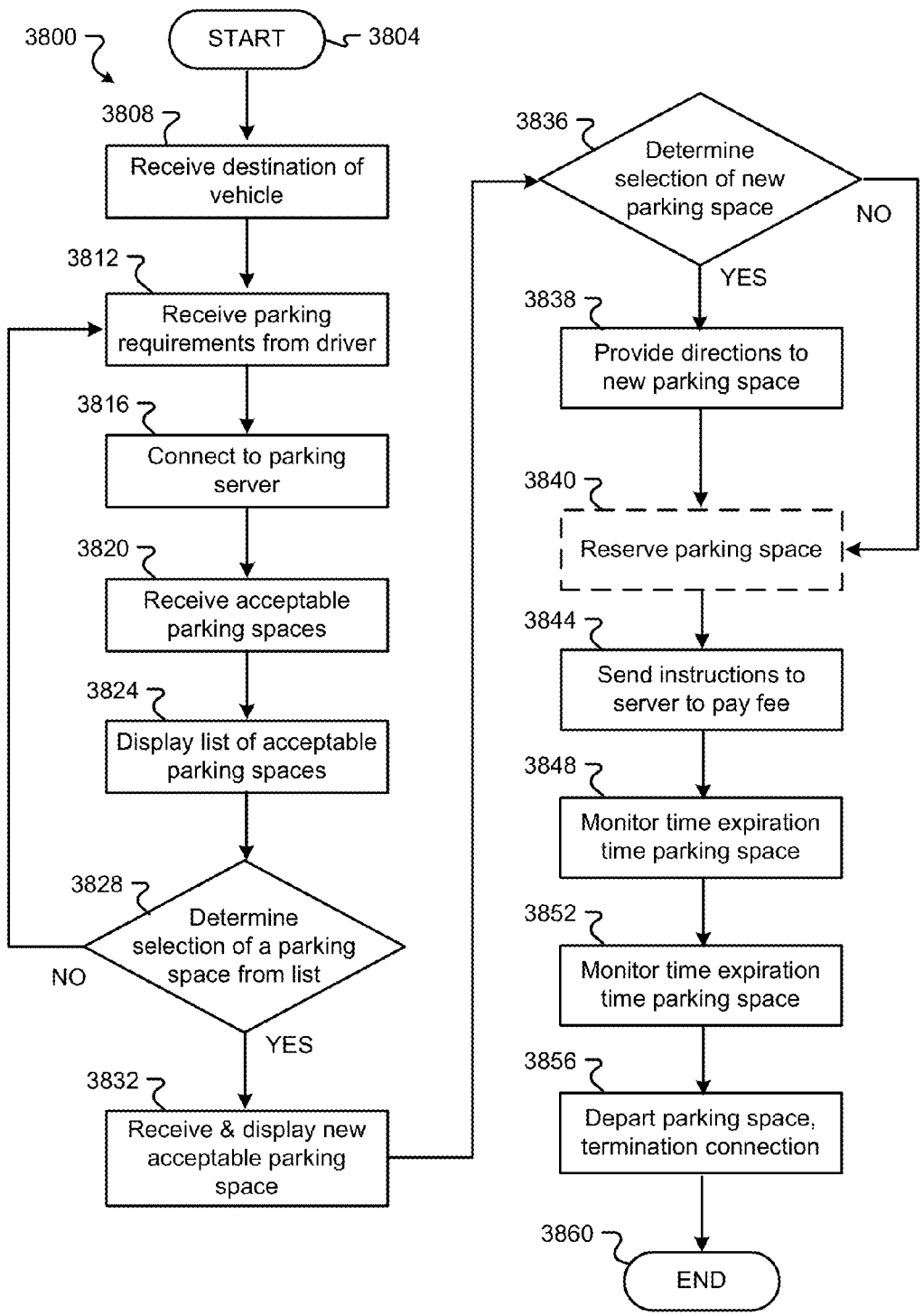
FIG. 38 is a flow or process diagram of a method of locating and paying for a parking space.

Referring to FIG. 38, a flow diagram depicting a method 3800 for locating a parking space and paying fees associated with the parking space is shown in accordance with embodiments of the present disclosure. While a general order for the steps of the method 3800 is shown in FIG. 38, the method 3800 can include more or fewer steps or can arrange the order of the steps differently than those shown in FIG. 38. Generally, the method 3800 starts with a start operation 3804 and ends with an end operation 3860. The method 3800 can be executed as a set of computer-executable instructions executed by a computer system and encoded or stored on a computer readable medium. Hereinafter, the method 3800 shall be explained with reference to the systems, components, modules, software, data structures, user interfaces, etc. described in conjunction with FIGS. 1-37.

The parking module 2340 can receive the vehicle's destination from the navigation subsystem 336 in step 3808. In step 3812, the parking module 2340 and retrieve parking requirements for an identified driver from profile information 1238 of data structure 1200. The parking requirements for the identified driver may also be retrieved from the identified driver's communication device and/or the cloud. If the driver has not been identified, the parking module 2340 can initiate the user interaction subsystem to receive parking requirements from the driver.

The parking module 2340 can use the vehicle's destination and the driver's parking requirements to connect to one or more parking servers within a preferred distance specified by the driver of the destination in step 3816. In step 3820, the parking module 2340 can receive one or more acceptable parking spaces from the servers 3604. The parking module displays, in step 3824, a list of the one or more acceptable parking spaces one or more displays 212, 248, 882, 2804, 2812, and 2816.

The driver can select a parking space, in step 3824, from the list. The selection can be accomplished by one or more of a touch input, a gesture, or a voice command by the driver. If the driver selects a parking space, method 3800 proceeds YES to step 3832. If the driver does not select a parking space from the list displayed during step 3824, method 3800 returns NO to step 3812. In repeated step 3812, the parking module 2340 may query the driver for new requirements, ask the driver to change the weight assigned by the driver's requirements, ask the driver to change the requirements, and/or ask the driver to remove one or more of the requirements. Additionally or alternatively, the parking module 2340 can automatically change the driver's requirements without driver input, and/or change the rank or priority assigned to one or more of the driver's requirements, to generate a new list of acceptable parking spaces. The changed or new requirements can be used by the parking module to connect to new parking servers 3604, in step 3816, and then receive and display a new list of acceptable parking spaces.

After selecting the parking space in step 3828, the navigation subsystem can provide directions to the selected space. As the vehicle is driving to the selected parking space, the parking module 2340 can maintain contact with one or more parking servers and/or directly with a parking space 3608 and may receive information about one or more new acceptable parking spaces. The new acceptable parking space may be a parking space that previously was not available, or that was not expected to be available, but is now available and meets the requirements of the driver. For example, the new acceptable parking space may be one that another vehicle departed from before time expired. The parking module 2340 can display new acceptable parking spaces as they are received. The display can be as described in step 3824, above.

In step 3836, the parking module 2340 can determine if the driver keeps the previously selected parking spaces in a manner similar to the determination of step 3828. If the driver selects a new parking space, method proceeds YES to step 3838 and the parking module 2340 generates directions to the new parking space using the navigation subsystem 336. If the driver does not pick a new parking space from the list of new acceptable parking space, the method continues NO to step 3840 with the previously selected parking space.

Optionally, in step 3840, the parking module 2340 can reserve the selected parking space with the parking server 3604. In step 3844, the payment module 2336 can pay for the parking space by establishing a connection with the parking server and sending payment instructions to the parking server. The payment module 2336 can access and/or retrieve payment profile information for the vehicle. The payment profile information may be associated with the vehicle. Additionally or alternatively, if the driver of the vehicle has been identified, the payment module 2336 can retrieve payment profile information associated with the identified driver to pay the fee. Optionally, the payment module 2336 can create an account with the parking location operator associated with server 3604 and may further pre-pay for a certain amount of parking. Additionally or alternatively, the connection between the payment module and the parking space/server can by encrypted using any method known by those of skill in the art.

After the payment module pays for the parking space, the parking module 2340 can monitor, in step 3848, the expiration time for the parking space. If less than a predetermined amount of time remains for the parking space, the alert module 2348 can send one or more alerts to the driver's or an other user's communication device 212, 248. In step 3852, the parking module 2340 can direct the payment module to purchase additional time for the parking space either automatically or after receive an input from the driver. In step 3856, the vehicle leaves the parking space and the parking module can request a receipt from the parking server and then terminate the connection to the parking module. Method 3800 then ends 3860.

Automatic Alert Sent to User Based on Host Location Information

Figure 39:
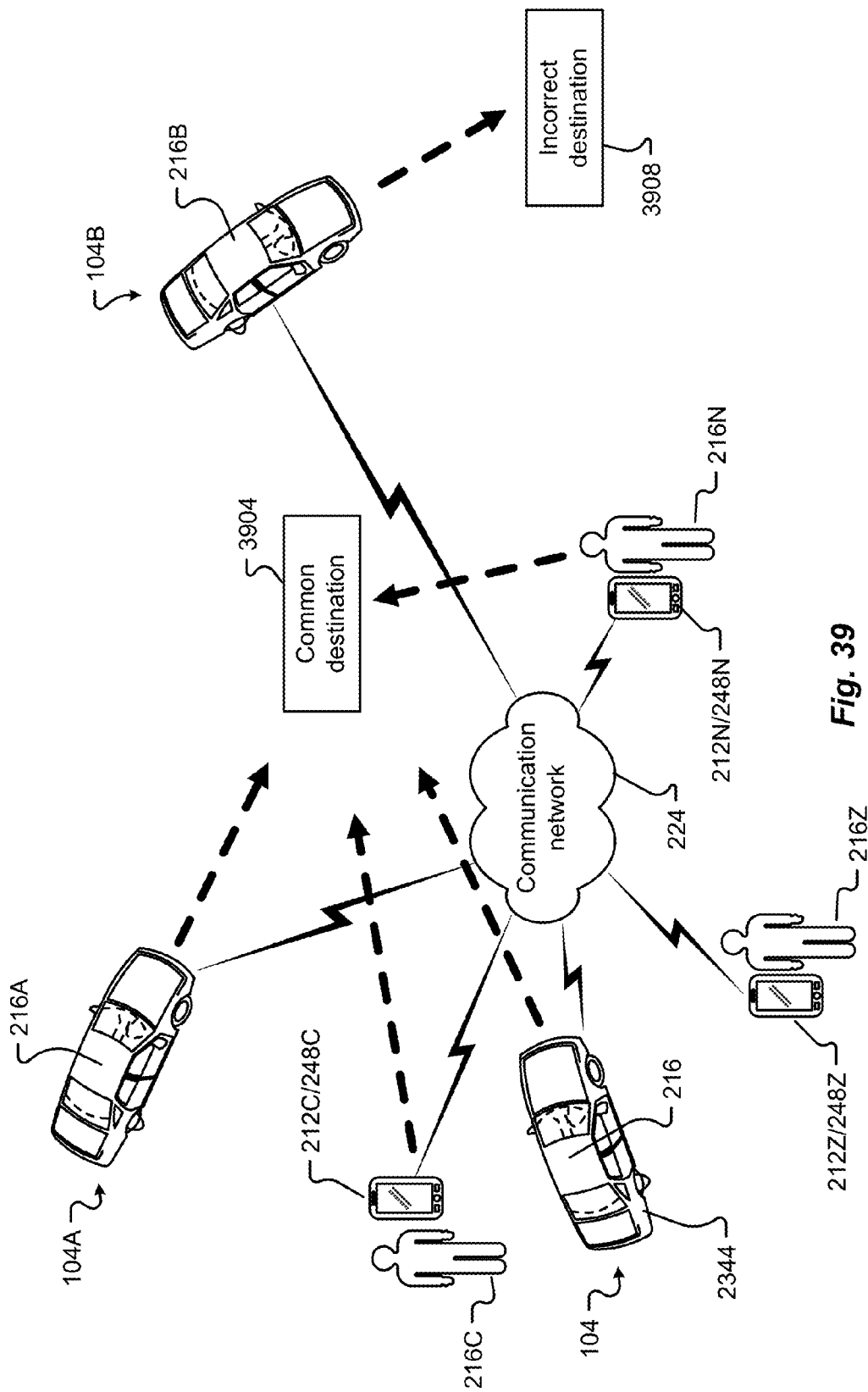
FIG. 39 depicts an embodiment of the operation of a destination coordination module.

Referring now to FIG. 39, the destination coordination module (DCM) 2344 can coordinate the travel to and arrival at a common destination 3904 for a plurality of people 216, 216A, 216B, 216C, . . . 216N. Each person may be travelling separately to the common destination 3904, for example, in a vehicle 104, 104A, 104B or by some other means, including by walking. As illustrated in FIG. 39, person 216 is within vehicle 104, person 216A is within vehicle 104A, person 216B is within vehicle 104B, and people 216C, 216N are walking. However, as may be appreciated, this is just one example and any number of people utilizing any mode of transportation, including bicycles, motorcycles, and other vehicles, whether public or private, may use the DCM 2344.

In one example, person 216 in vehicle 104 may use communication network 224 to contact people 216A . . . 216N by selecting their names from the people menu 2952F and/or the contacts and social networking display 2964 of display 2812A. The group of people 216-216N may be friends, co-workers, employers and employees, emergency response personnel, or any other group of people.

Additional people can be added or join the group at any time, including as the people travel to the common destination or after any or all of the people have arrived at the common destination. Each person 216-216N can invite additional people to meet at the common destination. Additionally or alternatively, other people may learn of the common destination by geo-location updates of friends or contacts received from social media sites, such as Linked-In™, Myspace™, Twitter™, YouTube™, DailyMotion™, Facebook™, Hotmail™, Yahoo Mail™, Gmail™, Second Life™ and the like. For example, person 216Z may be invited to meet at the common destination by one or more of people 216-216N. In another example, person 216Z may learn of the common destination by receiving a social media update from contact or friend 216N. Further, person 216Z may learn of the common destination based on a proximity of one or more social media contacts 216-216N. Person 216Z can join the group upon acceptance by the host person 216. Optionally, any person in the group can add person 216Z to the group. Additionally or alternatively, one or more of the group 216-216N can block the addition of people to the group after the common destination is selected 3904. As will be appreciated, a person can decline to meet at the common destination and can also withdraw from the group of people at any time.

One person of the group of people 216-216N can be a host. For example, person 216 can be the host of group 216-216N. The host can be a default assignment. As will be appreciated, the host person can be the person who initiates the gathering at the common destination. For example, the host may be the first person who contacts other people about meeting at the common destination. The host may also be the person who selects the common destination or the person closest to the common destination. The host person can also be determined by a social relationship of the people in the group (such as parent-child where the parent is the host, employer-employee where the employer is the host). The host could also be a teacher arranging to me students at a common destination. Additionally or alternatively, the host person can be selected by the group of people. The host can also be determined base on a context of a communication between the people 216-216N of the group. For example, if a child initiates a communication (an email, text, Tweet, phone call) with a parent, the child may be the host.

The host can change from one person to another person. In one example, a host person may leave the group and another person may be selected or chosen to act as the host. In another example, during travel to the common destination, the host person 216 may lose connect to network 224 and another person (for example, person 216N) may be selected or automatically be chosen to be the host. Continuing this example, when person 216 regains connection to network 224, person 216N could relinquish the host position to person 216.

The host person can enter the names of one or more other people 216A-216N the host would like to meet at a common destination into the DCM 2344. The one or more other people may have smart phones or other portable communication devices 212, 248 that provide location information, for example through a social media web site. The DCM 2344 of the host person 216 can obtain the locations of the other people 216A-216N by using communication network 224 to connect to the social media site as described in conjunction with FIG. 29A. The DCM 2344 may also receive location information from mobile devices 212, 248 or vehicle navigation systems associated with the other people 214A-214N.

The common destination 3904 can be selected by any of the people. In addition or alternatively, the host person 216 can set the common destination for the group 216-216N by dragging and dropping a location enabled destination into the destination input field 2952B as discussed above in conjunction with FIG. 29A. The host person 216 can also set the common destination in the navigation subsystem 336 by speaking the name and/or address of the destination, by selecting a point on a map displayed by display 2812A, and the like. For example, referring to FIG. 40, the host person can select common destination 3904 by tapping or pointing to a map displayed in console display 2812. The common destination can also be described in a text message, an email message, and a phone conversation addressed to the one or more communication devices of people 216A-216N.

The DCM 2344 can determine the common destination 3904 when it is entered in the vehicle navigation system 336 of the VCS 204 of host person 216. The DCM 2344 can also learn or determine the common destination 3904 when it is entered into in a communication device 224 associated with the host person 216, and/or and or by speech recognition when the location is spoken by person 216.

Additionally or alternatively, the DCM 2344 can query person 216 to determine and/or confirm the common destination and/or the address or coordinates of the common destination. For example, the DCM 2344 may use speech recognition to determine a name of the common location. The DCM 2344 can then search the maps database and determine there are several locations with the same name (or a similar sounding name or a similarly spelled name) near the current position of the vehicle 104. For example, DCM 2344 may query person 216 to select one of a plurality of Starbucks™ locations as the common destination. The DCM can also query person 216 to distinguish between similar sounding locations, such as "McDonald's™" or "MacDonals" by asking person 216 to select the correct common destination.

The DCM may also query person 216 for the location of the common destination when the DCM 2344 determines the name of the common location, but cannot determine an address or coordinates for the common destination. For example, the common destination may be the house of person 216N, but the address for the house may not be entered into the people menu 2952F, display 2964, or the contacts of person 216.

The query can be a list of one or more possible locations and can be displayed on any or all of displays 212, 248, 882, 2804, 2812, and 2816. Person 216 can confirm and/or select a common destination from the list, or enter a new or correct common destination. The confirmation or entry may be an oral command, a gesture input, or a touch input on one of the displays.

Additionally or alternatively, the common destination 3904 may be a location of any one of the people 216-216N. For example, host person 216 in vehicle 104 could make the common destination the current (or future) location of vehicle 104. The DCM 2344 can then send the geographic coordinates of the location of vehicle 104 received from the navigation subsystem to the other people 216A-216N. Thus, when the common destination 3904 is the location person 216 in vehicle 104, a street address is not required for the DCM 2344.

Once the common destination is entered, the DCM 2344 may then use the navigation subsystem 336 and the maps database to generate directions to the common location for each person 216-216N. The directions can include a location enabled object (such as pin indication 2954 described in conjunction with FIG. 29A, above) that can be sent to each person 216-216N for entry into a navigation system. The directions may also be provided as text, for example in a text, email, and/or a Tweet to one or more people 216A-216N. Additionally or alternatively, the DCM 2344 can provide voice directions to one or more of people 216-216N. For example, as person 212C is walking to the common destination 3904, the DCM 2344 of host person 216 can provide turn-by-turn spoken direction to communication device 212C/248C using communication network 224 and speech synthesis module 820.

Each of the people 216A-216N may, optionally, enter the location of the common destination into their own associated communication device 212A-212N, 248A-248N, and/or vehicle navigation system. If any of people 216A-216N enter a location into a device or vehicle navigation system, the DCM 2344 of host person 216 can receive the entered location and compare it to the address of the common destination 3904. In one example, if person 216A in vehicle 104A enters the address or coordinates of common destination 3904 into the vehicle control system or a navigation system, the DCM 2344 can receive the address/coordinates. The DCM can then compare the address/coordinates entered by person 216A and determine the correct address was entered for the common destination 3904. Optionally, the alert module 2348 can provide an alert to one or more of people 216-216N indicating that person 216A entered the correct address for common destination 3904. In one example, the alert may only be sent to people 216, 216A

Similarly, if a person enters an incorrect address, the alert module 2348 can provide an alert to the host person 216 and the person who entered the incorrect address. Thus, if person 216B in vehicle 104B enters an address for incorrect destination 3908 into a communication device or vehicle navigation system, the DCM 2344 can receive the address/coordinates entered. The DCM 2344 of the host person 216 can then determine that person 216B entered an incorrect address. In response, the alert module 2348 can provide an alert to both person 216B and person 216 indicating the incorrect address was entered by person 216B. Additionally or alternatively, the alert of the incorrect address entered by person 216B may be sent to all people 216-216N. The alert may also include the correct address or coordinates for the common destination 3904 and/or directions to the common destination from the current location of vehicle 104B.

As people 216-216N are travelling to the common destination, the DCM 2344 of the host person 216, can periodically or continually receive position updates of people 216A-216N over network 224 from a communication device or vehicle control system associated with each of the people 216-216N. The position updates can be provided automatically by (or "pushed from") the communication devices and navigation systems associated with people 216A-216N and/or upon a request from DCM 2344 (or "pulled to"). The position updates can be provided to the host DCM 2344 at scheduled intervals. The DCM 2344 can also send the schedule to the communications devices associated with people 216A-216N. The scheduled intervals may be randomly determined, determined by the host, or at fixed time intervals. The host person 216 can register a setting in the DCM 2344 to modify or change the timing of the position updates.

Figure 40:
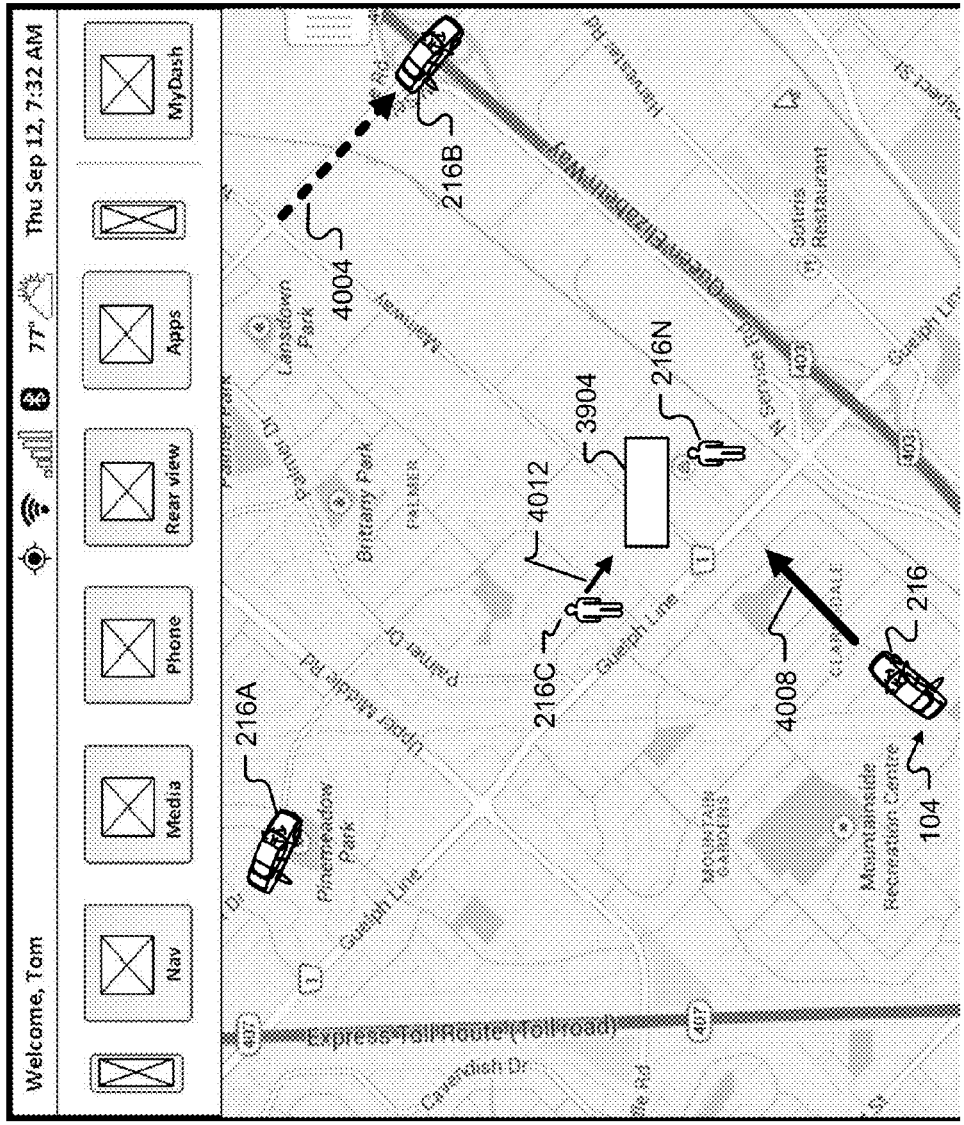
FIG. 40 depicts another embodiment of a console display of a vehicle.

As the people 216-216N travel to the common destination, the DCM 2344 can evaluate the position updates received and compare the route of the person to the location of the common destination using the navigation subsystem 336 and the maps database 8100. The DCM 2344 can provide updates to each of people 216-216N with information about the current location and an estimate time of arrival at the common destination 3904 of teach person. The information can be provided as a map on a display and can include indications of the most recent position of each person 216-216N based on the most recent position update received. The DCM 2344 can send the map to each person to provide a common point of reference of the relative progress of each person to the common destination. A representation of an exemplary map generated by DCM 2344 and displayed by console display 2812 of vehicle 104 is illustrated in FIG. 40. The map can be resized, reoriented, or otherwise manipulated individually by each person 216-216N. The DCM 2344 can also automatically resize the map as each person moves. Additionally or alternatively, the path traveled can be indicated for each person by showing previous reported positions and a direction of travel of each person, for example, as a dashed line 4004 or by some other means. Further, the current direction of travel of each person may be indicated by an arrow that may also indicate a velocity. For example, person 216 in vehicle 104 is travelling faster than person 216C (who is walking), as illustrated by indicators 4008, 4012. Of course, as can be appreciated, these are only examples and other icons and indications can be used to illustrate the positions and movement of people travelling to the common destination 3904. In another example, each person 216-216N may select an avatar or icon to represent their position and the DCM 2344 can update the map display of each person 216-216N with the selected avatar or icon. Each person can select an indication 216-216N to receive more information about the location and progress of the person 216-216N represented by the indication to the common destination 3904.

The alert module 2348 can provide alerts to the host person 216, and/or one or more other people 216A-216N, if the DCM 2344 determines any people are travelling to an incorrect destination 3908, such as an incorrect Starbucks™ located in close proximity to the correct Starbucks™ that is the common destination 3904. For example, person 216B is travelling away from the common destination 3904 as illustrated in FIG. 40 by indicator 4004. One or more other people 216, 216A, 216C, and/or 216N may notice the incorrect direction of travel of person 216B and send an alert to the DCM 2344. The DCM 2344 may independently determine person 216B is travelling to an incorrect destination 3908 by using the navigation subsystem to monitor the route of each person 216-216N to the common destination.

When a person is determined to be travelling to the incorrect destination, the alert module 2348 can provide an alert to the person travelling to the incorrect destination and/or to one or more of the other people. The alert can include directions to the common location.

The DCM 2344 continues monitoring progress of the people, providing directions, and providing alerts until all of the people 216-216N arrive at the common destination.

In one example, the DCM 2344 can create a connection between each communication device and/or vehicle control system associate with each person 216-216N. Further, the DCM 2344 can set up a client-server session where the DCM 2344 of the host person acts as the server. The session may be an HTTP session, a telnet remote login session, a session initiation protocol based session, a server side web session, a client side web session, or a transmission control protocol (TCP) session. The DCM 2344 can generate a unique session identification that includes information about preferences and/or authorization levels of each person 216-216N. Additionally or alternatively, the DCM 2344 can access server 228 to gain access to further computing capabilities. Thus, the DCM 2344 can coordinate the movement of each person to the common destination with server 228 and use server 228 to generate the instruction, directions, and interact with the alert module 2348 to send alerts to the user 216-216N.

Figure 41:
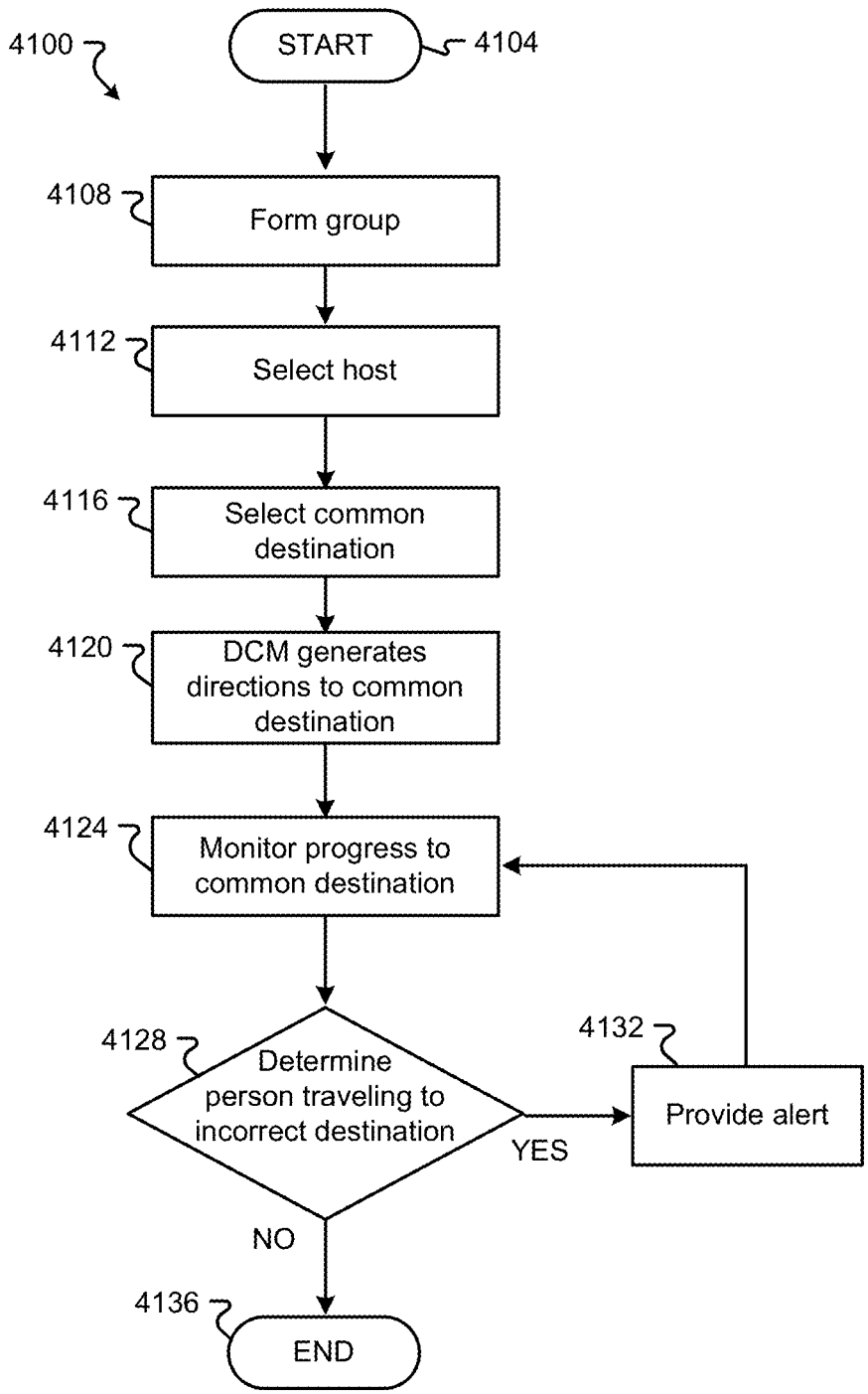
FIG. 41 is a flow or process diagram of a method of coordinating the arrival of a plurality of people at a common destination.

Referring to FIG. 41, a flow diagram depicting a method 4100 of coordinating travel to a common destination by a plurality of people is shown in accordance with embodiments of the present disclosure. While a general order for the steps of the method 4100 is shown in FIG. 41, the method 4100 can include more or fewer steps or can arrange the order of the steps differently than those shown in FIG. 41. Generally, the method 4100 starts with a start operation 4104 and ends with an end operation 4136. The method 4100 can be executed as a set of computer-executable instructions executed by a computer system and encoded or stored on a computer readable medium. Hereinafter, the method 4100 shall be explained with reference to the systems, components, modules, software, data structures, user interfaces, etc. described in conjunction with FIGS. 1-40.

In step 4108 a group of people 214-214N is formed and entered into the DCM 2344. People can be invited to the group by selecting their names from the people menu 2952F and/or the contacts and social networking display 2964 of display 2812A. People can also be invited to the group by selecting them from a social network site. Each person 216-216N can invite additional people to meet at the common destination. Additional people may learn of the common destination and ask to be added to the group.

A host person is selected in step 4112 and entered into the DCM 2344. The host may be selected in any number of ways. For example, the host may be selected based on a family or social relationship of a plurality of people 216-216N. In another example, the host can be the person who organized the group of people 216-216N, the person closest to the common destination, a person with control of the common destination (such as an owner or rentor), or the person who starts travelling to the common destination first. The host may also be selected based on a rank or priority of the people, by an experience level, by age, or by a social status (such as teacher/students, employer/employees, and the like). Additionally or alternatively, the host can be chosen by vote among members of the group. Further, the host can change or a person may decline or refuse to be the host.

A common destination 3904 is selected in step 4116 and entered into the DCM 2344. The common destination can be selected by any of the people in the group. In addition or alternatively, the host person 216 can set the common destination for the group 216-216N by dragging and dropping a location enabled destination into the destination input field 2952B. The common destination can be a location of any of the people 216-216N in the group.

The DCM 2344, in step 4120, uses the navigation subsystem 336 and the maps database 8100 to generate directions to the common location for each person 216-216N. The DCM 2344 then sends the directions to each person. The directions can be provided as written directions for each person, or as a turn-by-turn spoken directions provided by the speech synthesis module 820.

As each person travels to the common destination, the DCM 2344 can monitor their progress to the common destination in step 4124. The DCM 2344 can receive position updates from communication devices or vehicle control systems associated with each person 216-216N. The DCM 2344 continues to monitor the progress of each person to the common destination until everyone who has not withdrawn from the group has arrived at the common destination.

In step 4128, the DCM 2344 can determine if one of the people 216-216N is travelling to an incorrect destination 3908. The DCM 2344 can use the position updates received and monitor the route of each person to the common destination using the navigation subsystem. If the DCM 2344 determines at least one person is travelling to the incorrect destination, method 4100 proceeds YES to step 4132. If not, the method 4100 proceeds NO to END step 4136.

In step 4132, the alert module 2348 generates and sends an alert to the person travelling to the incorrect destination. The alert can be sent to a communication device 212, 248 associated with the person, or a vehicle control system of a vehicle the person is within. Additionally or alternatively, the alert can be sent to the host and/or one or more other people of the group. The alert can include a statement that the person is travelling to the incorrect destination and directions to the common destination. After sending the alert, method 4100 returns to step 4124 and continues to monitor the progress of each person to the common destination.

Method 4100 ENDS, step 4136, when each person who has not withdrawn from the group has arrived at the common destination.

The exemplary systems and methods of this disclosure have been described in relation to configurable vehicle consoles and associated devices. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

It should be appreciated that the various processing modules (e.g., processors, vehicle systems, vehicle subsystems, modules, etc.), for example, can perform, monitor, and/or control critical and non-critical tasks, functions, and operations, such as interaction with and/or monitoring and/or control of critical and non-critical on board sensors and vehicle operations (e.g., engine, transmission, throttle, brake power assist/brake lock-up, electronic suspension, traction and stability control, parallel parking assistance, occupant protection systems, power steering assistance, self-diagnostics, event data recorders, steer-by-wire and/or brake-by-wire operations, vehicle-to-vehicle interactions, vehicle-to-infrastructure interactions, partial and/or full automation, telematics, navigation/SPS, multimedia systems, audio systems, rear seat entertainment systems, game consoles, tuners (SDR), heads-up display, night vision, lane departure warning, adaptive cruise control, adaptive headlights, collision warning, blind spot sensors, park/reverse assistance, tire pressure monitoring, traffic signal recognition, vehicle tracking (e.g., LoJack™), dashboard/instrument cluster, lights, seats, climate control, voice recognition, remote keyless entry, security alarm systems, and wiper/window control). Processing modules can be enclosed in an advanced EMI-shielded enclosure containing multiple expansion modules. Processing modules can have a "black box" or flight data recorder technology, containing an event (or driving history) recorder (containing operational information collected from vehicle on board sensors and provided by nearby or roadside signal transmitters), a crash survivable memory unit, an integrated controller and circuitry board, and network interfaces.

Critical system controller(s) can control, monitor, and/or operate critical systems. Critical systems may include one or more of (depending on the particular vehicle) monitoring, controlling, operating the ECU, TCU, door settings, window settings, blind spot monitor, monitoring, controlling, operating the safety equipment (e.g., airbag deployment control unit, collision sensor, nearby object sensing system, seat belt control unit, sensors for setting the seat belt, etc.), monitoring and/or controlling certain critical sensors such as the power source controller and energy output sensor, engine temperature, oil pressure sensing, hydraulic pressure sensors, sensors for headlight and other lights (e.g., emergency light, brake light, parking light, fog light, interior or passenger compartment light, and/or tail light state (on or off)), vehicle control system sensors, wireless network sensor (e.g., Wi-Fi and/or Bluetooth sensors, etc.), cellular data sensor, and/or steering/torque sensor, controlling the operation of the engine (e.g., ignition, etc.), head light control unit, power steering, display panel, switch state control unit, power control unit, and/or brake control unit, and/or issuing alerts to a user and/or remote monitoring entity of potential problems with a vehicle operation.

Non-critical system controller(s) can control, monitor, and/or operate non-critical systems. Non-critical systems may include one or more of (depending on the particular vehicle) monitoring, controlling, operating a non-critical system, emissions control, seating system controller and sensor, infotainment/entertainment system, monitoring certain non-critical sensors such as ambient (outdoor) weather readings (e.g., temperature, precipitation, wind speed, and the like), odometer reading sensor, trip mileage reading sensor, road condition sensors (e.g., wet, icy, etc.), radar transmitter/receiver output, brake wear sensor, oxygen sensor, ambient lighting sensor, vision system sensor, ranging sensor, parking sensor, heating, venting, and air conditioning (HVAC) system and sensor, water sensor, air-fuel ratio meter, hall effect sensor, microphone, radio frequency (RF) sensor, and/or infrared (IR) sensor.

It is an aspect of the present disclosure that one or more of the non-critical components and/or systems provided herein may become critical components and/or systems, and/or vice versa, depending on a context associated with the vehicle.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

This application is also related to PCT Patent Application Nos. PCT/US14/34092, filed on Apr. 15, 2014, entitled, "Building Profiles Associated with Vehicle Users"; PCT/US14/34099, filed on Apr. 15, 2014, entitled "Access and Portability of User Profiles Stored as Templates"; PCT/US14/34087, filed on Apr. 15, 2014, entitled "User Interface and Virtual Personality Presentation Based on User Profile"; PCT/US14/34088, filed on Apr. 15, 2014, entitled "Creating Targeted Advertising Profiles Based on User Behavior"; PCT/US14/34232, filed on Apr. 15, 2014, entitled "Behavior Modification via Altered Map Routes Based on User Profile Information"; PCT/US14/34098, filed on Apr. 15, 2014, entitled "Vehicle Location-Based Home Automation Triggers"; PCT/US14/34108, filed on Apr. 15, 2014, entitled "Vehicle Initiated Communications with Third Parties via Virtual Personalities"; PCT/US14/34101, filed on Apr. 15, 2014, entitled "Vehicle Intruder Alert Detection and Indication"; PCT/US14/34103, filed on Apr. 15, 2014, entitled "Driver Facts Behavior Information Storage System"; PCT/US14/34114, filed on Apr. 15, 2014, entitled "Synchronization Between Vehicle and User Device Calendar"; PCT/US14/34125, filed on Apr. 15, 2014, entitled "User Gesture Control of Vehicle Features"; PCT/US14/34254, filed on Apr. 15, 2014, entitled "Central Network for the Automated Control of Vehicular Traffic"; and PCT/US14/34194, filed on Apr. 15, 2014, entitled "Vehicle-Based Multimode Discovery". The entire disclosures of the applications listed above are hereby incorporated by reference, in their entirety, for all that they teach and for all purposes.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A method, comprising:
    determining, by a microprocessor executable home automation system, that a person has entered a home associated with a vehicle user;
    sending, by the microprocessor executable home automation system, an alert to a vehicle control system indicating the person has entered the home;
    monitoring, by the microprocessor executable home automation system, a status of the person in the home;
    determining, by the microprocessor executable home automation system, that the status of the person has changed;
    sending, by the microprocessor executable home automation system, a status alert to the vehicle control system;
    including, by the microprocessor executable home automation system, in the status alert when the person cannot be identified an intruder alert;
    including, by the microprocessor executable home automation system, in the status alert when the person is leaving the home one of an estimated time the person will leave the home and the time the person has left the home;

including, by the microprocessor executable home automation system, in the status alert when the person is asleep that the person is asleep;

including, by the microprocessor executable home automation system, in the status alert when the person is experiencing a health crisis information about the health crisis, and including, by the microprocessor executable home automation system, in the status alert when the person has entered an area of the home the person is not authorized to enter the information about the location in the home of the person.

2. The method of claim 1, wherein the microprocessor executable home automation system determines the person is experiencing the health crisis using information from at least one of a sensor of the home automation system and a device worn by the person.

3. The method of claim 2, wherein the information from the sensor is a call for help from the person.

4. The method of claim 2, wherein the device worn by the person is at least one of a heart rate monitor, a blood pressure monitor, a glucose monitor, and medical alert device activated by the person.

5. The method of claim 1, wherein the sensor of the home automation system includes one or more of an interior motion sensor, an exterior motion sensor, an interior camera, an exterior camera, an interior sound receiver, an exterior sound receiver, an infrared sensor, a weight sensor, a biometric sensor, a device worn by the person, a Bluetooth sensor, a radio frequency signal sensor, and a door motion sensor.

6. The method of claim 1, wherein the alert includes one or more of an identity of the person, a picture of the person, a voice recording of the person, a time the person entered the home, and a location of the person in the home.

7. The method of claim 1, wherein the person includes a plurality of persons and the microprocessor sends an alert to the vehicle control system for each of the plurality of persons.

8. The method of claim 1, further comprising:
sending, by the microprocessor executable home automation system, the alert to one or more of a cell phone, a laptop, a tablet computer, and a personal digital assistant.

9. The method of claim 1, further comprising, presenting, by the vehicle control system, the alert to the user in the vehicle.

10. A non-transitory computer readable medium having instructions stored thereon that, when executed by a microprocessor executable home automation system, perform a method comprising:
determining that a person has entered a home associated with a vehicle user;
sending an alert to a vehicle control system indicating the person has entered the home;
monitoring a status of the person in the home;
determining that the status of the person has changed;
sending a status alert to the vehicle control system;
including in the status alert when the person can be identified the name of the person;
including in the status alert when the person cannot be identified an intruder alert;
including in the status alert when the person is leaving the home one of an estimated time the person will leave the home and the time the person has left the home;
including in the status alert when the person is asleep that the person is asleep;
including in the status alert when the person is experiencing a health crisis information about the health crisis; and
including in the status alert when the person has entered an area of the home the person is not authorized to enter the information about the location in the home of the person.

11. The non-transitory computer readable medium of claim 10, further comprising:
receiving information from at least one sensor, wherein the at least one sensor includes one or more of an interior motion sensor, an exterior motion sensor, an interior camera, an exterior camera, an interior sound receiver, an exterior sound receiver, an infrared sensor, a weight sensor, a biometric sensor, a device worn by the person, a Bluetooth sensor, a radio frequency signal sensor, and a door motion sensor.

12. The non-transitory computer readable medium of claim 11, wherein the alert includes one or more of an identity of the person, a picture of the person, a voice recording of the person, a time the person entered the home, and a location of the person in the home.

13. A home automation system of a home, comprising:
a memory; and
a microprocessor in communication with the memory, the microprocessor operable to:
determine that a person has entered the home associated with a vehicle user;
send an alert to a vehicle control system indicating the person has entered the home;
monitor a status of the person in the home;
determine that the status of the person ha changed;
send a status alert to the vehicle control system, wherein:
when the person can be identified the status alert includes the name of the person;
when the person cannot be identified the status alert includes an intruder alert;
when the person is leaving the home the status alert includes one of an estimated time the person w ill leave the home and the time the person has left the home;
when the person is asleep and status alert indicates that the person is asleep;
when the person is experiencing a health crisis and status alert includes information about the health crisis; and
when the person has entered an area of the home the person is not authorized to enter and status alert includes information about the location in the home of the person.

14. The home automation system of claim 13, wherein the microprocessor is further operable to:
receive information from at least one sensor, wherein the at least one sensor includes one or more of an interior motion sensor, an exterior motion sensor, an interior camera, an exterior camera, an interior sound receiver, an exterior sound receiver, an infrared sensor, a weight sensor, a biometric sensor, a device worn by the person, a Bluetooth sensor, a radio frequency signal sensor, and a door motion sensor.

15. The home automation system of claim 14, wherein the alert includes one or more of an identity of the person, a picture of the person, a voice recording of the person, a time the person entered the home, and a location of the person in the home.

* * * * *